(12) United States Patent
Soumiya et al.

(10) Patent No.: US 6,760,774 B1
(45) Date of Patent: Jul. 6, 2004

(54) BOUNDARY APPARATUS AND METHOD FOR ESTABLISHING THE NETWORK CONNECTION USING A RESOURCE RESERVING FUNCTION

(75) Inventors: Toshio Soumiya, Kawasaki (JP); Kenya Takashima, Kawasaki (JP); Koji Nakamichi, Kawasaki (JP); Naotoshi Watanabe, Kawasaki (JP); Yutaka Ezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/489,822

(22) Filed: Jan. 24, 2000

(30) Foreign Application Priority Data

Feb. 18, 1999 (JP) .......................................... 11-039731

(51) Int. Cl.[7] .......................... G06F 15/16; G06F 15/173
(52) U.S. Cl. ........................ 709/233; 709/238; 709/226
(58) Field of Search ................................ 709/204, 226, 709/238, 233; 370/233, 235, 389, 398 351, 468

(56) References Cited

U.S. PATENT DOCUMENTS

| | | | | |
|---|---|---|---|---|
| 5,287,347 A | * | 2/1994 | Spanke ........................ | 370/235 |
| 5,583,857 A | * | 12/1996 | Soumiya et al. ............ | 370/233 |
| 5,631,908 A | * | 5/1997 | Saxe .......................... | 370/235 |
| 5,673,393 A | * | 9/1997 | Marshall et al. ............ | 709/226 |
| 5,850,395 A | * | 12/1998 | Hauser et al. ............... | 370/398 |
| 5,914,945 A | * | 6/1999 | Abu-Amara et al. ........ | 370/468 |
| 5,982,771 A | * | 11/1999 | Caldara et al. ............. | 370/389 |
| 5,983,261 A | * | 11/1999 | Riddle ........................ | 709/204 |
| 6,041,359 A | * | 3/2000 | Birdwell ..................... | 709/238 |
| 6,314,093 B1 | * | 11/2001 | Mann et al. ................. | 370/351 |

FOREIGN PATENT DOCUMENTS

| JP | 9-214504 | 8/1997 |
|---|---|---|
| JP | 9-247190 | 9/1997 |

* cited by examiner

Primary Examiner—Rupal Dharia
Assistant Examiner—Quang Nguyen
(74) Attorney, Agent, or Firm—Katten Muchin Zavis Rosenman

(57) ABSTRACT

A boundary apparatus on the transmission side provided on the boundary between an IP network accommodating a transmitting terminal and an ATM network separates the requests for bandwidth which are received from receiving terminals via boundary apparatuses on the reception side into a plurality of groups on the basis of a required bandwidth, establishes a point-multipoint connection between the boundary apparatus on the transmission side and each of the boundary apparatuses on the reception side for each group, and transmits the data from the transmitting terminal to each of the receiving terminals via the connection. When there is a change in the number of the requests for bandwidth due to the delivery of a new request for bandwidth or the interruption of a flow of requests, the boundary apparatus on the transmission side calculates the effective bandwidth allocation ratio of the group in which there is a change in the number of the requests for bandwidth, and if the effective bandwidth allocation ratio is not more than a preset value, the boundary apparatus separates the requests belonging to the group into two groups, and establishes a connection for each group.

22 Claims, 73 Drawing Sheets

| Internet Service Class | Guaranteed Service (for real time) | Controlled Load Service | Best Effort Service |
|---|---|---|---|
| ATM Bearer (Broadband Internet) | DBR | UBR/ABR | UBR |
| Mapping (Under study) | Peak Information Rate ↔ Peak Cell Rate<br><br>Packet Delay ↔ Cell Transfer Delay | Peak Information Rate ↔ Peak Cell Rate | — |

BOUNDARY APPARATUS AND METHOD FOR ESTABLISHING THE NETWORK CONNECTION USING A RESOURCE RESERVING FUNCTION

BACKGROUND OF THE INVENTION

1. Field of the Invention

The present invention relates to a boundary apparatus for controlling the connection between communication networks and, more particularly, to a boundary apparatus for mapping a resource reservation protocol (e.g., RSVP) in an ATM network for the purpose of controlling the quality of communication in an IP network (Internet Protocol Network) in the network structure in which the ATM network exists between a transmitting terminal in an IP network and a receiving terminal in another IP network, and the method of controlling the connection by the boundary apparatus.

2. Description of the Related Art (a) Guarantee of Quality in an Internet

Recently, internets have been rapidly developing owing to the improvement and expansion of applications. Especially, owing to the image and sound superposing technique and the hyperlinkage technique which have been realized in a www (world wide web), internets have been developing as a communication means which becomes more accessible and which gives a feeling that the correspondents are actually conversing face to face. On the other hand, the problem of delay in communication in a network has become remarkable. One reason is that an appropriate means or technique does not catch up with the increase in the traffic, but the root cause is that internets are based on the best-effort transfer system which transfers IP packets with the best effort.

In the transfer circumstance of the best-effort system, the best efforts are directed only on transferring the packet which has arrived to the next stage without discriminating the packet by the user or the application, and the packets which can not be transferred, for example, the packets which overflow the buffer are discarded as they are. The discarded packets are detected at the end terminal by a TCP (Transmission Control Protocol) which is upper on the IP layer, and retransmitted, thereby avoiding discard. The retransmission, however, leads to some evils. For example, unnecessary packets stay in the network, and the prevention of a delay in the transfer is not guaranteed to a real-time application.

In order to eliminate these problems, the method of realizing the QoS (Quality of Service) has been investigated by the IETF (Internet Engineering Task Force), and the QoS control technique in the IP layer based on the RSVP (Resource Reservation Protocol) version 1 was already standardized and the study has been continued toward the realization thereof.

(b) Resource Reservation Protocol in an Internet

An RSVP is a control protocol for resource reservation in an IP layer, and exerts the control shown in FIG. 62. In this control, control messages (Path message, Reserve message) are transmitted and received between a router 2 which supports an RSVP on IP network 1 and a sender 3 of information (transmitting terminal), and between the router 2 and a receiver 4 (receiving terminal). Due to the control, memory resource and the like within the transmission path and the router 2 are reserved for the application of the sender 3, and the quality of communication is guaranteed. Generally, the sender 3 is able to provide the same information for a plurality of receivers 4 by point-multipoint communication (multicast).

The sender 3 first transmits a Path message containing traffic characteristics of the contents which are delivered to the receivers 4. The Path message is transferred along the routers 2 and distributed into a plurality of receivers 4. Each of the receivers 4 returns a Reserve message containing the resource which requires reservation to the sender 3 by reference to the contents of the Path message. The router 2 on the way merges the requests for reservation sent from the plurality of receivers 4 and transfers the Reserve message to the router 2 on the upper stream and the sender 3, and reserves the transmission path (bandwidth) and the memory resource for the receivers 4.

The mechanism of bandwidth reservation by the RSVP will be schematically described in the following. This mechanism is based on RFC2205 (Resource Reservation Protocol (RSVP)-Version 1 Functional Specification).

In the RSVP, the data flow to a specified destination and a transport layer protocol is defined as a session. The destination of a certain session (data flow) is generally defined by DestAddress. The DestAddress corresponds to the IP destination address which is written on the IP header potion of an IP packet. The process of bandwidth reservation consists of the following steps 1 to 4. It is here assumed that all of the transmitting terminal (sender host), the receiving terminals (receiver host) and the nodes (routers) on the path mount the RSVP.

(1) Establishment of Session

A route is set between the transmitting terminal and each of the receiving terminals by a certain routing protocol. The receiving terminals join a multicast group which is determined by the DestAddress according to an IGMP (Internet Group Multicast Protocol) or the like.

(2) Transmission of a Path Message

The transmitting terminal periodically transmits a Path message to the route (i.e., each DestAddress) established by the routing protocol. The Path message contains information on the data transmitted from the transmitting terminal, for example, IP address, traffic characteristics, and the IP address of the previous Hop to the transmitting terminal, as will be described later in detail.

Each node on the path holds the information on the transmitting terminal and the session as a Path state on the basis of the information in the Path message, and when the node receives a new Path message, it updates the Path state in accordance with the contents thereof and transfers the updated Path state to the next Hop (node). Similar operations are repeated thereafter, and the Path message ultimately reaches all the receiving terminals.

(3) Transmission of a Reserve Message

Each receiving terminal transmits a message for resource reservation (Reserve message) to the transmitting terminal. The Reserve message is transmitted to the Previous IP address (the IP address of the HOP on the upper stream) which is held in the Path state of each node. As will be described later, the Reserve message contains the QoS information which is required by the receiving terminal, the information on the form of bandwidth reservation, the IP address of the node to which the Reserve message is transmitted (i.e., the previous IP address), etc.

(4) Processing by Each Node which has Received a Reserve Message

The RSVP controller of each node which has received Reserve message reserves a bandwidth. The RSVP controller holds the reservation information as a reservation state on the basis of the QoS information, the information on the form of bandwidth reservation, etc. required in the message. The RSVP controller also merges the reservation state from each route, and holds the merged information for finally reserving the bandwidth as a traffic control state.

The RSVP controller requires the traffic controller of the node to reserve the bandwidth on the basis of the traffic control state information. The admission control section of the traffic controller judges whether or not the required QoS is to be accepted. That is, whether or not the required QoS is to be accepted is determined in accordance with whether or not a bandwidth corresponding to the required QoS is vacant. If the acceptance is possible, the admission control section secures the bandwidth in accordance with the contents of the required reservation, and the RSVP controller transmits the Reserve message to the node of the previous IP address which is recorded in the Path state of its own node. On the other hand, if the acceptance is impossible, the RSVP controller discards the Reserve message and transmits an error message to the receiving terminal which has transmitted the Reserve message.

(c) RSVP Message (c-1) Path message

FIG. 63 is an explanatory view of the format of a Path message.

The Path message PATH contains parameters which are necessary at least for supporting both GS (Guaranteed Service) and CLS (Controlled Load Service). An RSVP common header 4b is attached to an IP header 4a, and parameter fields 4c to 4h are attached to the RSVP common header 4b. A session field 4c which identifies the QoS session contains a destination address, protocol ID (which is freely determined by the sender) and a destination port (UDP service port of the destination). In the case of multicast, the multicast addresses is written in the destination address. In an RSVP HOP field 4d, the address of the previous RSVP router is written. This information designates the router to which the RESV message generated by the receiver is transferred. A TIME VALUE field 4e shows the effective period of the Path message. The value is freely determined by each network element, and the default value is 30 seconds. A SENDER TEMPLATE field 4f shows the address of the sender of the data. A sender TSPEC field 4g for showing the characteristics of data flow and an ADSPEC field 4h follow the SENDER TEMPLATE field 4f. The TSPEC contains information such as the peak bandwidth, the average bandwidth and the recommended bandwidth. The ADSPEC field 4h is provided with a field for a common portion and fields for respective specific services. In the field for common portion, path information necessary for each service is written, and the GS field contains parameters C, D necessary for the calculation of the largest delay. Nothing is substantially written in the field for CLS.

(C-2) Resource Reservation (RESV) Message

FIG. 64 is an explanatory view of the format of a resource reservation message.

The format of the Reserve message RESV is common to that of the Path message PATH as far as the IP header field 5a, the RSVP common header field 5b, the session field 5c, the RSVP HOP field and the TIME VALUE field 5e. A STYLE CLASS field 5f follows the TIME VALUE field 5e. In the STYLE CLASS field 5f, the style WF/FF/SE of reservation of RSVP is written. A FLOW SPEC field 5g consists of TSPEC and RSPEC. The traffic characteristics (required bandwidth, etc.) required by the receiver are written in the TSPEC. The TSPEC holds the same value as or a lower value than the value of the TSPEC contained in the Path message. In the GS field, the receiver requires the bandwidth by the RSPEC (combinations of parameters R and S). The resource reservation at each router is executed in accordance with the TSPEC and the RSPEC. The destination of the RESV message is written in the FILTER SPEC field 5h.

(d) ATM Network

As a communication network having a different form from that of the IP network which executes the above-described communication quality control, there is an asynchronous transfer mode (ATM) network. The ATM is a transfer technique which is specified by ITU-T (International Telecommunication Union-Telecommunication Standardization Sector), etc. as a solution of a future ISDN (Integrated Services Digital Network).

The ATM originally aimed at realizing effective transfer and economical networking irrespective of the kind of media by uniformly dealing with and transferring any service as the cells of a short fixed length (53 bytes). Thereafter, the ATM has been applied to ATM-LAN and the like by utilizing the strong QoS control technique, and it is now in a process of application to a service of a higher real-time quality such as image transfer.

The ATM is basically adopted by the communication of connection type. Communication is executed after a virtual connection is established in advance in a network consisting of terminals and an ATM switches using a VP (Virtual Path) or a VC (Virtual Channel). A VP/VC is identified by a virtual path identifier VPI/a virtual channel identifier VCI which are written in the header portion of an ATM cell. These identifiers are also called ATM connection identifiers. The process of establishing a VP/VC is into two types. One is a PVP/PVC (Permanent VP/Permanent VC) process for establishing semipermanently a VP/VC by an operation system OPS or the like. The other is an SVP/SVC (Switched VP/Switched VC) process for establishing a VP/VC by a signaling process when an application is necessary. In establishing a VP/VC, the user reports the bandwidth and the quality class which are necessary for communication, and secures the VP/VC.

In the SVP/SVC process, the call setting and the call releasing are executed by transmitting and receiving signaling messages (Setup message, Release message, etc.) which are defined by the ITU-T Q.2900 series. FIG. 65 shows the process of establishing such a connection. In FIG. 65, ATM switches 12 are provided in the ATM network 11, and data are transferred between a transmitting terminal 13 and a receiving terminal 14.

When a call is set, a Setup message is transmitted from the transmitting terminal 13, and negotiation is executed between the transmitting terminal 13 and the ATM switch 12, and between the ATM switch 12 and the receiving terminal 14. When the Connect message transmitted from the receiving terminal 14 reaches the transmitting terminal 13, a channel (connection) for user data is established.

In the ATM, it is possible to distribute a message from one sender (Root) to a plurality of receivers (Leaves) by a point-multipoint call setting process (multicast setting process), as shown in FIG. 66. In this case, the sender 15 first transmits a Setup message (SETUP#1, SETUP#2) to a first receiver 18 via a switch 16, and a connection is established between the sender 15 and the receiver 18. Thereafter, a next receiver 19 is added by an ADD party message ADD PARTY.

When the switch 16 receives ADD PARTY from the sender 15, it transmits a Setup message (SETUP#3, SETUP#4) to a receiver 19 via a switch 17. When the switch 16 receives a Connect message CONNECT from the receiver 19, it returns an ADD Party Ack. message to the sender 15. In this manner, the receiver 19 is added to the connection which has been established between the sender 15 and the receiver 18 as a party.

Similarly, when the sender 15 transmits an ADD party message, a third receiver 20 is added to the connection. It is possible to add a fourth and subsequent receivers in a similar process. Additionally, in an ATM forum, the process for establishing a point-multipoint call led by a receiver is also defined.

(e) Cooperation with the ATM Network

Transfer of IP packets in the ATM has already been frequently executed in a WAN (Wide Area Network) and the like. However, transfer in such a network is best-effort transfer by a point-point connection, and the quality securing control by the RSVP is limited to an IP layer.

It is considered that the use of the resource securing mechanism controlled by the RSVP in combination with the connection control mechanism utilizing the quality control and the point-multipoint control in the ATM enables more flexible and more reliable communication having a higher network usage ratio than IP communication. The technique of combination, however, has not been established.

The IETF is at present standardizing Integrated Service so as to realize QoS securing service. Only the RSVP is proposed as the signaling protocol for such a service, but the technique of mapping an RSVP in an ATM network has not been established, as described above.

(f) Communication Network Containing an ATM Network

The resource reservation process by an RSVP is started by a resource reservation message (Reserve message) from a receiving terminal, as described above. On the boundary between an ATM network and an IP network, a boundary apparatus (IP-ATM combining apparatus) which has both the functions of IP communication and ATM communication is provided. Accordingly, in order to map the RSVP in the ATM network, it is only necessary to establish an ATM connection such that when the boundary apparatus receives the Reserve message, the quality required by the RSVP may be guaranteed.

FIG. 67 shows the structure of a communication network containing such a boundary apparatus. This network is composed of IP networks 31, 32-1 to 32-n, and an ATM network 33 provided between those IP networks. It is assumed here that data is transferred by point-multipoint transfer between a transmitting terminal S in the IP network 31 and each of the n receiving terminals $R_1$ to $R_n$ in the respective IP networks 32-1 to 32-n via the ATM network 33.

The ATM network 33 contains an ATM switch ATMsw, and a boundary apparatus $EN_0$ is provided on the boundary between the IP network 31 of the transmitting terminal S and the ATM network 33, while boundary apparatuses $EN_1$ to $EN_n$ are provided on the respective boundaries between the IP networks 32-1 to 32-n of the receiving terminals $R_1$ to $R_n$ and the ATM network 33. The ATM network 33 generally contains a plurality of ATM switches, but only one is shown in FIG. 67 for convenience of explanation. The structure and the operation of the following example is the same even if a plurality of ATM switches are provided.

If an ATM network exists on the route from the transmitting terminal to the receiving terminal, as described above, high-quality communication is enabled by an ATM quality control mechanism which directly establishes an ATM connection between the boundary apparatuses, converts IP packet data into ATM cells, and transfers the cells through the ATM connection.

FIGS. 68 and 69 are explanatory views of a control process in IP communication via an ATM network. The symbol S denotes a sender, RT1-RT2 routers, Sw an ATM switch, and R a receiver. It is assumed that the route between the sender S and the receiver R has been obtained by a routing protocol.

The sender S first transmits a PATH message toward the receiver R. The PATH message arrives the receiver R via the router RT1, the boundary apparatus $EN_0$ on the transmission side, the boundary apparatus $EN_1$ on the reception side and the router RT2. When the receiver R receives the PATH message and wants to receive the data from the sender S, the receiver R writes the bandwidth (required bandwidth) necessary for the reception of the data in the RESV message and transmits the RESV message in the opposite direction to the direction of the PATH message. The RESV message reaches the boundary apparatus $EN_0$ on the transmission side via the router RT2 and the boundary apparatus $EN_1$ on the reception side. When the RESV message arrives, the boundary apparatus $EN_0$ on the transmission side judges whether or not it is possible to secure the required bandwidth, and if it is possible to secure the required bandwidth, the boundary apparatus $EN_0$ transfers the SETUP message to the boundary apparatus $EN_1$ on the reception side by using an ATM signaling message. If the boundary apparatus $EN_1$ on the reception side is able to establish a connection, it returns a CONNECT message to the boundary apparatus $EN_0$ on the transmission side in response to the SETUP message. As a result, an ATM connection for data transfer is established. When the boundary apparatus $EN_0$ on the transmission side receives the CONNECT message, it transfers the RESV message received from the receiver R to the sender S.

In FIG. 70, the physical structure of the network is divided into an IP layer and an ATM layer. In the IP layer, the transmitting terminal S executes IP communication to the receiving terminals $R_1$ to $R_n$ via the boundary apparatuses $EN_0$, $EN_1$ to $EN_n$, and the in the ATM layer, the boundary apparatus $EN_0$ on the transmission side establishes an ATM connection between the boundary apparatus $EN_0$ and each of the boundary apparatuses $EN_1$ to $EN_n$ on the reception side, and executes ATM communication. The transmitting terminal S and the receiving terminals $R_1$ to $R_n$ have a function of transferring a packet by an IP protocol, and each of the receiving terminals $R_1$ to $R_n$ has its own IP address. For example, when the transmitting terminal S transfers application data to the receiving terminals $R_1$ to $R_n$, the data are divided into packets (datagrams) of a variable length by an IP processor, and after IP addresses of the destinations are added thereto, the packets are transmitted to the transmission paths. The receiving terminals $R_1$ to $R_n$ assemble the received packets into the original data and transfer the data to an application executing portion.

The ATM switch is placed in the ATM network 33, and data are divided into cells for switching. All the data which transfer into the ATM network 33 are divided into cells of 53 bytes.

The boundary apparatuses $EN_0$, $EN_1$, to $EN_n$ between different networks (IP network and ATM network) have both a function of dividing the IP packets which have arrived from the IP networks 31, 32-1 to 32-n into ATM cells and transferring the cells to ATM network 33, and the opposite function thereof. In addition, the boundary apparatuses $EN_0$, $EN_1$ to $EN_n$ have a function of deciding the route of IP packets as an IP communication function, and a function of switching ATM cells and establishing an ATM connection as an ATM communication function.

The boundary apparatuses $EN_0$, $EN_1$ to $EN_n$ further have the following three functions.

(1) Bandwidth Control Function

This function includes a policing function for deciding what kind of ATM connection is to be established in which bandwidth on the basis of the bandwidth required by the receiving terminals $R_1$ to $R_n$.

(2) Connection Control Function

The boundary apparatuses control the remaining unused VPI/VCIs and the vacant bandwidth, judges whether or not it is possible to offer the VPI/VCIs and the required bandwidth when a new bandwidth is required (admission control), and executes signaling.

(3) Address Resolution Connection

When an IP packet is transferred to the target receiver via the ATM network 33, it is necessary to obtain the ATM address (VPI/VCI) of the destination selected from the boundary apparatuses $EN_1$ to $EN_n$ using the flow identifier (session identifier). As the flow identifier, the IP address of the destination is used. Each boundary apparatus (1) holds a routing table so that the IP address of the boundary apparatus to which the receiving terminal as the destination is connected can be obtained from the IP address of the receiving terminal, and (2) holds the IP address-ATM address (VPI/VCI) conversion table (address resolution table).

As described above, the control messages of the RSVP are transmitted from both the transmitting terminal S and a receiving terminal Ri. In order to transfer these control messages via the ATM network 33, an ATM connection is directly established between the boundary apparatus $EN_0$ on the transmission side and each of the boundary apparatus $EN_1$ to $EN_n$ on the reception side which are placed on the boundary of the ATM network 33. By establishing the ATM connection, it is possible td prevent a delay in the processing time due to IP routing and to provide a high-quality connection for a control message. The connection for a control message is established separately from a connection for data transfer and is used for exclusively for the transfer of a control message.

(g) Establishment of a Connection for Control Message

There are two methods of establishing an ATM connection for a control message, as shown in FIGS. 71 and 72. FIG. 71 shows a method of establishing an ATM point-point connection in two ways between the boundary apparatus $EN_0$ on the transmission side and each of the boundary apparatus $EN_1$ to $EN_n$ on the reception side. In this manner, it is possible to provide a high-quality path for transferring a control message in two ways for each of the boundary apparatus $EN_1$ to $EN_n$ on the reception side.

FIG. 72 shows a method of using an ATM point-multipoint connection in combination with an ATM point-point connection. In this method, with respect to downward communication from the transmission side to the reception side, a point-multipoint connection is established between the boundary apparatus $EN_0$ on the transmission side and the boundary apparatuses $EN_1$ to $EN_n$ on the reception side, while, with respect to upward communication, ATM point-point connections are individually established for the respective boundary apparatus $EN_1$ to $EN_0$ on the reception side. By using the ATM point-multipoint connection for downward communication, it is possible to effectively utilize the VPI/VCI resource and the bandwidth resource between the boundary apparatus $EN_0$ and the ATM switch.

As described above, in order to transfer the control message of a communication quality control protocol which is operated in the IP network, an ATM point-point connection or an ATM point-multipoint connection is used in the ATM network 33.

As a transfer method using an established connection, a best-effort transfer or a transfer with a QoS guarantee will be considered. In a signaling protocol such as an RSVP which holds a state by a software state, a loss of a control message packet directly leads to a deterioration in the efficiency of the protocol. For this reason, it is desirable to prepare a transfer route with some QoS guarantee for a connection for transferring a control message.

One of the problems of an ATM mapping technique which maps an RSVP in an ATM network is what kind of connection of which bandwidth is allocated to a request for resource (bandwidth) generated from each of a plurality of users (receivers).

The bandwidth BWr(i) required by the receiving terminal Ri (i=1, 2 . . . ) is different from another bandwidth required by another receiving terminal. However, if the ATM switch sets a different SVC for each of the receiving terminals, SVC resource will be exhausted (VPI/VCIs will be wasted).

An RSVP is a protocol which is defined on the assumption of multicast to a plurality of receiving terminals $R_1$ to $R_n$, and a plurality of receivers require different resources (bandwidth). An ATM technique includes a point-multipoint (p-mp) connection for one to multi communication which supports multicast. In an ATM network, however, one p-mp connection can only be established in one bandwidth. This causes another problem. More specifically, if a plurality of receivers require connections in different bandwidths such as in the RSVP, it is necessary to establish a p-mp connection in the largest bandwidth of all the required bandwidths in order to satisfy the requests from all the receivers. That is, it is necessary to establish a multiconnection in the largest bandwidth for each receiver, which leads to the waste of a network resource.

In addition, when an RSVP is used, the bandwidth BWs recommended by a transmitting terminal and the bandwidth BWr required by a receiving terminal changes with time. If an SVC is reset in the ATM network with every change, there is a fear of an overload of the processor in the ATM switch.

FIG. 73 is an explanatory view of the establishment of a p-mp connection between the boundary apparatus $EN_0$ on the transmission side and five boundary apparatus $EN_1$ to $EN_5$ on the reception side.

With respect to one multicast session offered from a sender, there are bandwidths required by five receivers which belong to the boundary apparatuses $EN_1$ to $EN_5$. The required bandwidths are different from each other. If it is assumed that the unit of the optional bandwidth is B, the boundary apparatuses $EN_1$ to $EN_5$ receive the requests for bandwidths 10B, 5B, 6B, 1B, and 2B from the respective receivers. Of all the five required bandwidths, the largest one is 10B. If the ATM network 33 services through only one p-mp connection, it is necessary to establish a connection of a bandwidth of 10B. According to this method, since only one connection suffices, it is possible to economize VPI/

VCIs. However, since a bandwidth of 10B is provided for the receiver which requires a bandwidth of only 1B, the network resource (bandwidth resource) is wasted.

On the other hand, if the establishment of a connection faithful to the request from a receiver is considered. it is natural for the ATM network 33 to utilize a point-point (p-p) connection for one-to-one communication. If the ATM network 33 services to every receiver through a p-p connection, connections of bandwidths required by the respective receivers are established, as shown in FIG. 74. According to this method, since a connection of a bandwidth required by a receiver is established, there is no waste of a bandwidth in each connection itself. However, since it is necessary that the boundary apparatus $EN_0$ on the transmission side provides the number of connections corresponding to the number of requirements, there is a waste of a VPI/VCI. In addition, since there are a plurality of connections with respect to one data transmitted in the same direction, there is a waste of bandwidth resource on the side of the ATM network of the boundary apparatus $EN_0$ on the transmission side. This tendency increases toward the transmission side.

As described above, in the ATM network 33, it is difficult to establish a connection of an appropriate bandwidth with respect to a multicast session. In order to solve these problems, combined use of the two connection systems (p-mp connection and p-p connection) will be considered. That is, a method of supporting a multicast session by combining a p-p connection with a p-mp connection will be effective. In the prior art, however, no method has been provided for the optimum combination of a p-p connection and a p-mp connection.

SUMMARY OF THE INVENTION

Accordingly, it is an object of the present invention to eliminate the above-described problems in the related art and to avoid the exhaustion of the SVC resource (VPI/VCI resource) in an ATM network and reduce the number of times of setting an SVC even if the bandwidth BWs recommended by a transmitting terminal and the bandwidth BWr required by a receiving terminal changes.

It is another object of the present invention to enable the optimum combination of a point-point connection (p-p connection and a point-multipoint connection (p-mp connection) in an ATM network to be selected when an IP packet is transmitted to a plurality of receivers which require different bandwidths.

It is still another object to enable the optimum connection to be established with consideration for the resource (VPI/VCI resource and the bandwidth resource) usage state between the boundary apparatus on the transmission side in which the exhaustion of the tag resource (VPI/VCI) and the bandwidth resource is the largest and an ATM switch which is connected to the boundary apparatus.

It is a further object of the present invention to enable the optimum connection for data transfer service to be established in an ATM network with consideration for the effective bandwidth usage ratio of not only the bandwidth between the boundary apparatus on the transmission side and an ATM switch which is connected thereto but also the bandwidth used by another ATM switch in the ATM network, i.e., the effective bandwidth usage ratio of the entire ATM network.

It is a further object of the present invention to instruct the separation of an existent connection in a case where the separation of the existent connection increases the effective bandwidth allocation ratio in an ATM network.

It is a still further object of the present invention to suppress the separation or re-establishing of a connection in a state in which the number of reservation requests from receivers rapidly changes, for example, at the time of starting a data transmitting session and at the time of changing contents, thereby preventing an increase in the amount of signaling message in an ATM network and lightening the signaling processing load on not only a boundary apparatus but also each ATM switch.

It is a still further object of the present invention to instruct the separation or re-establishing of a connection when the effective bandwidth allocation rate increases by introducing the variance of required bandwidths, more specifically, the square variation coefficient of the required bandwidths.

It is a still further object of the present invention to separate one multicast connection into an existent connection and a new connection by a simple method so that the effective bandwidth allocation rate may increase, when the separation is necessary.

It is a still further object of the present invention to lighten the signaling processing load of an ATM switch by limiting the number of requests for resource belonging to a new connection after one multicast connection is separated into an existent connection and the new connection.

It is a still further object of the present invention to periodically monitor the effective bandwidth allocation ratio on the assumption that two adjacent connections are unified for each data transmission session, and to unify the connections while suppressing a drop of the effective bandwidth allocation ratio on the basis of the result of monitoring, so as to eliminate a shortage in the resource between the boundary apparatus on the transmission side and an ATM switch, and while introducing the variance of required bandwidths, more specifically, the square variation coefficient of the required bandwidths so that a high effective bandwidth allocation rate can be maintained in the unified connection.

It is a still further object of the present invention to lighten the signaling processing load on an ATM switch or the like by unifying connections such that the number of requests for resource belonging to the unified connection does not exceed a preset value.

(a) First Connection Establishing Method

To achieve these objects, in a first aspect of the present invention, there is provided a method of establishing a single p-mp connection in an IP communication network for executing one to N communication (1-to-N communication) between a transmitting terminal and a plurality of receiving terminals, the IP communication network having an ATM network between an IP network accommodating a transmitting terminal and an IP network accommodating N receiving terminals, boundary apparatuses having an IP communication function and an ATM communication function and provided on the boundaries between the respective IP networks and the ATM network, and the connection established in the ATM networks so as to execute 1 to N communication between the transmitting terminal and the plurality of receiving terminals.

(a-1) First Method

If it is assumed that the recommended bandwidth transmitted from a transmitting terminal to a receiving terminal in accordance with a communication quality control protocol with respect to one data transmission session is BWs, the boundary apparatus on the transmission side establishes a point-multipoint connection (p-mp connection) of a bandwidth of BWs/ρ(k) so as to execute 1 to N communication, wherein ρ(k) is the usage ratio of not more than 1.

(a-2) Second Method

If it is assumed that the largest required bandwidth of the bandwidths BWr(i) required by the respective receiving terminals with respect to one data transmission session is BWmax, the boundary apparatus on the transmission side establishes a point-multipoint connection (p-mp connection) of a bandwidth of BWmax/ρ(k) so as to execute 1 to N communication, wherein ρ(k) is the usage ratio of not more than 1.

In this manner, it is possible to avoid the exhaustion of the SVC resource (VPI/VCI resource) in the ATM network. In addition, since the bandwidth of the p-mp connection does not change or does not frequently change even if the bandwidth BWr required by a receiving terminal changes, it is possible to reduce the number of times of setting an SVC. Furthermore, since ρ(k) is set such as to become smaller as the number of connections accommodated in the link increases, in other words, since the bandwidth of the p-mp connection is established to be large, even if the number of connections accommodated in the link increases and the bandwidth allocation is unstable, the user can transmit data with a desired quality.

(b) Second Connection Establishing Method (Separation of a Connection)

In a second aspect of the present invention, there is provided a method of establishing a connection in an IP communication network having an ATM network between an IP network accommodating a transmitting terminal and an IP network accommodating N receiving terminals, boundary apparatuses having an IP communication function and an ATM communication function and provided on the boundaries between the respective IP networks and the ATM network, in which the receiving terminals require predetermined resources (bandwidths) with respect to one data transmission session in accordance with a communication quality control protocol, and the boundary apparatus on the transmission side establishes a point-multipoint connection or a point-point connection in the ATM network on the basis of the required bandwidth from each receiving terminal so as to execute 1 to N communication between the transmitting terminal and the N receiving terminals. The connection is established in the following manner.

(b-1) Judgment as to Separation

The requests for bandwidth from the receiving terminals are divided into a plurality of groups depending upon the required bandwidths, and one p-p connection or p-mp connection is established for each group. When the number of requests of bandwidth changes, if the effective bandwidth allocation ratio of the connection which corresponds to the group in which the number of requests for bandwidth changes is not more than a preset value, the requests belonging to the group is separated into two groups so as to improve the effective bandwidth allocation ratio, and a connection is established for each separated group. In this manner, it is possible to establish an optimum connection for data transmission with consideration for not only the bandwidth between the boundary apparatus on the transmission side and an ATM switch which is connected thereto but also the effective bandwidth usage ratio of the entire ATM network.

In addition, the preset value is made variable on the basis of the rate of change of the number of requests for bandwidth. In this manner, it is possible to suppress the separation or re-establishing of a connection in a state in which the number of reservation requests from receivers rapidly changes, for example, at the time of starting a data transmitting session and at the time of changing contents, thereby preventing an increase in the amount of signaling message in the ATM network and lightening the signaling processing load on not only the boundary apparatus but also each ATM switch.

Furthermore, whether or not the connection is to be separated is determined with consideration for the variance of the required bandwidths of the connection. In this manner, it is possible to separate or re-establish the connection so that the effective bandwidth allocation ratio may increase.

(b-2) Method of Separation

A plurality of bandwidth classes are set for each predetermined bandwidth, one group is composed of more than one class, and one connection is established for each group. When a connection is separated, the group corresponding to the connection (the group as the object of separation) is separated into two groups, and a connection is established for each of the separated groups. It is possible to divide the group in accordance with the following methods (1) to (3). In the first method (1), the group is divided into a group consisting of a predetermined number of classes of smaller bandwidths and a group of the rest, and one connection is established for each group. In the second method (2), the average value of all the required bandwidths belonging to the group as the object of separation is calculated, the group is separated into a group consisting of the smaller bandwidth classes, and a group consisting of the remaining classes on the basis of the average value, and a connection is established for each of the separated groups. In the third method (3), the number of requests is added up, beginning from the class of the minimum bandwidth in the group as the object of separation until the total sum reaches a preset value, the calculated classes form one group, and the rest the other group, and a connection is established for each of the separated groups.

If the methods (1), (2) of separation are adopted, it is possible to divide a group into two by a simple method and to improve the effective bandwidth allocation ratio. If the method (3) is adopted, it is possible to limit the number of requests for bandwidth which belong to the new connection, and to lighten the signaling processing load on the ATM switch.

(c) Third Method of Establishing a Connection

In a third aspect of the present invention, there is provided a method of establishing a connection comprising the steps of classifying the requests for bandwidth into a plurality of groups on the basis of a required bandwidth, establishing a connection for each group, periodically calculating the effective bandwidth allocation ratio on the assumption that the two connections in adjacent bandwidths are unified, and unifying the connections of the two groups if the effective bandwidth allocation ratio is not less than a preset value, so as to establish one point-multipoint connection.

In this manner, it is possible to unify connections while suppressing a drop in the effective bandwidth allocation ratio, thereby eliminating a shortage in the resource between the boundary apparatus on the transmission side and the ATM switch. In addition, if the variance of the required bandwidths is introduced, it is possible to unify connections so that the high effective bandwidth allocation ratio may be maintained. If connections are unified under the condition that the number of requests in the unified connection is not more than a preset value, it is possible to lighten the signaling processing load on the ATM switch.

Other features and advantages of the present invention will be apparent from the following description taken in conjunction with the accompanying drawings.

DESCRIPTION OF THE PREFERRED EMBODIMENTS (A) Root-leading Type Connection Establishing Method In data communication of transmission type represented by multicast, there are a transmitting terminal for transmitting data and more than one receiving terminals for receiving the data. In the present internet, resource reservation for guaranteeing the characteristics and the quality of data is required in accordance with the characteristics of the transmitted data.

An ATM is a network technique which is suitable for guaranteeing the quality, and to accommodate an IP network in an ATM network means that a resource reservation protocol (e.g., RSVP) which is operated in the IP network is accommodated in the ATM network. In other words, a boundary apparatus which is situated on the boundary of the ATM network and the IP network must establish an ATM connection in accordance with the message of the resource reservation protocol which is operated in the IP network.

Taking an RSVP, which is at present a leading reservation protocol in the IP network, as an example, a transmitting terminal transmits a Path message indicating data traffic characteristics downward (to a receiving terminal), and the receiving terminal transmits a Reserve message for reserving resource upward (to the transmitting terminal). When a boundary apparatus establishes an ATM connection on the basis of the Reserve message from the boundary apparatus on the reception side, there are two types of methods. One is a root-leading type connection establishing method in which the boundary apparatus on the transmission side establishes an ATM connection, and the other is a leaf-leading type connection establishing method in which the boundary apparatus on the reception side establishes an ATM connection.

The present invention is based on a root-leading type connection establishing method in which the boundary apparatus on the transmission side establishes an ATM connection when a Reserve message is received from a boundary apparatus on the reception side. The boundary apparatus on the transmission side must establish an appropriate connection (p-p connection, p-mp connection) in accordance with the bandwidths required by a group of boundary apparatuses on the reception side. The present invention proposes a policing function which the bandwidth control function of the boundary apparatus on the transmission side is to obey in each phase of the operation.

Figure 1:
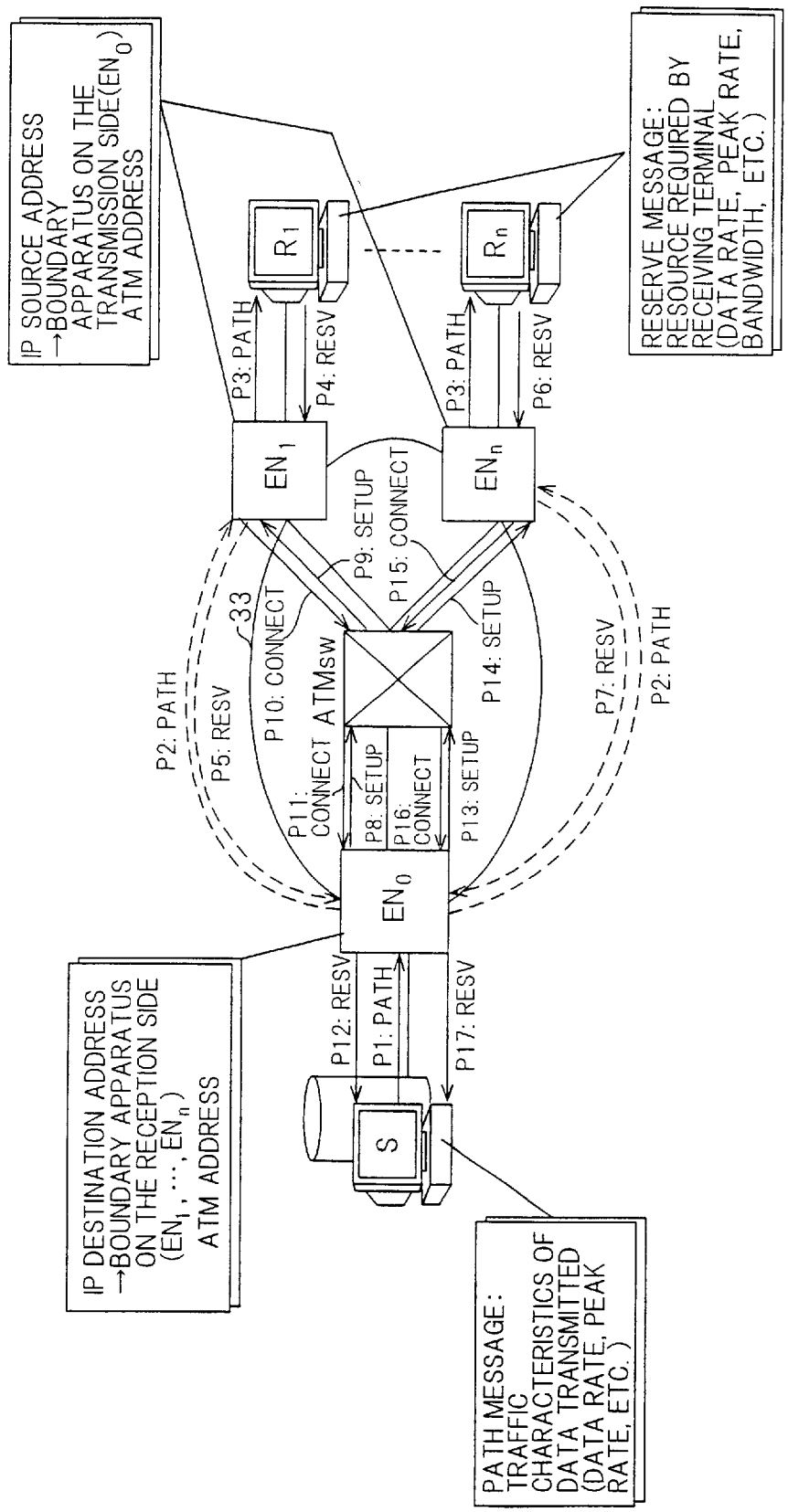
FIG. 1 shows the operation of a root-leading type connection establishing method.
Figure 67:
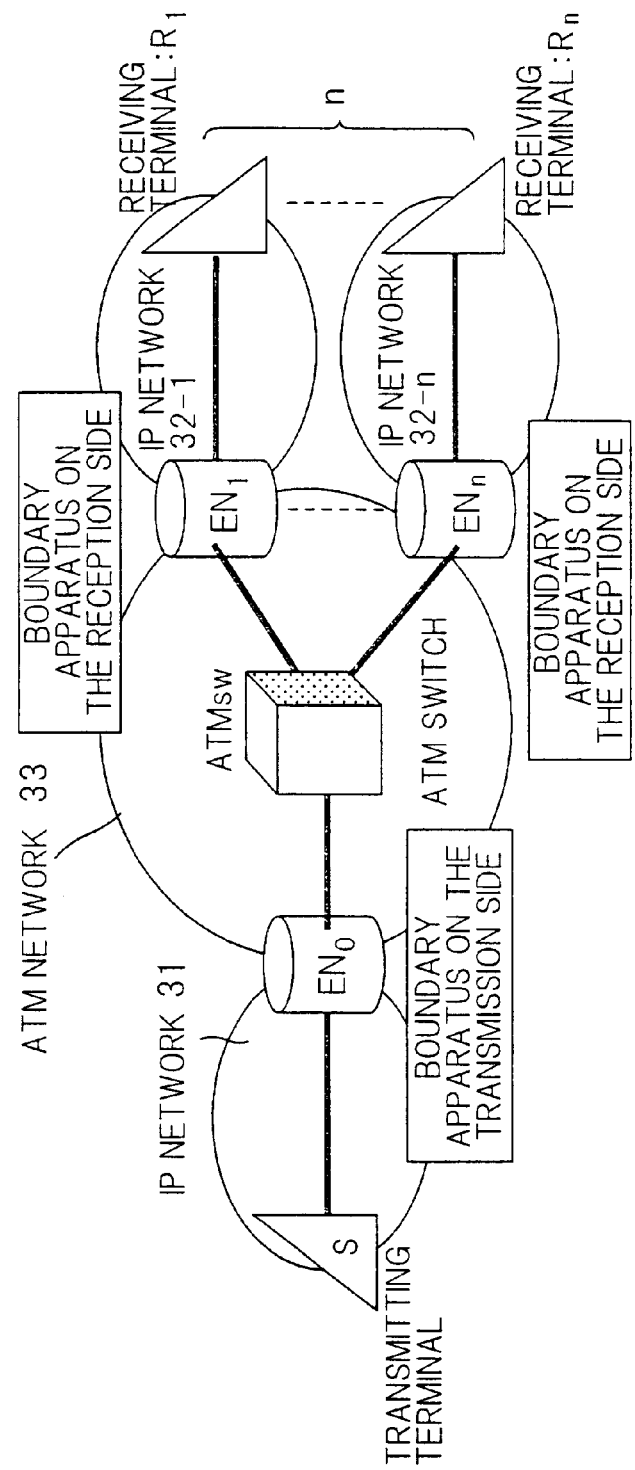
FIG. 67 shows the structure of a network.
Figure 68:
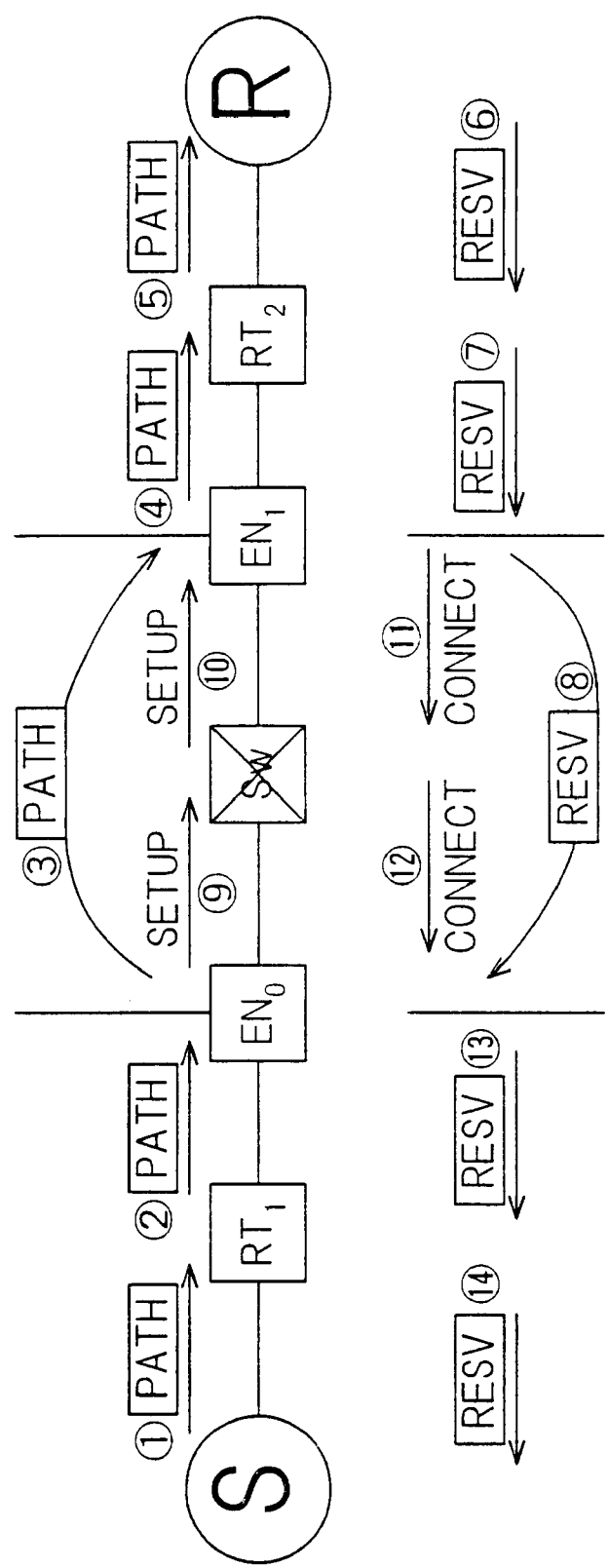
FIG. 68 is an explanatory view of a control in the case in which IP communication is executed by an RSVP via an ATM network.
Figure 69:
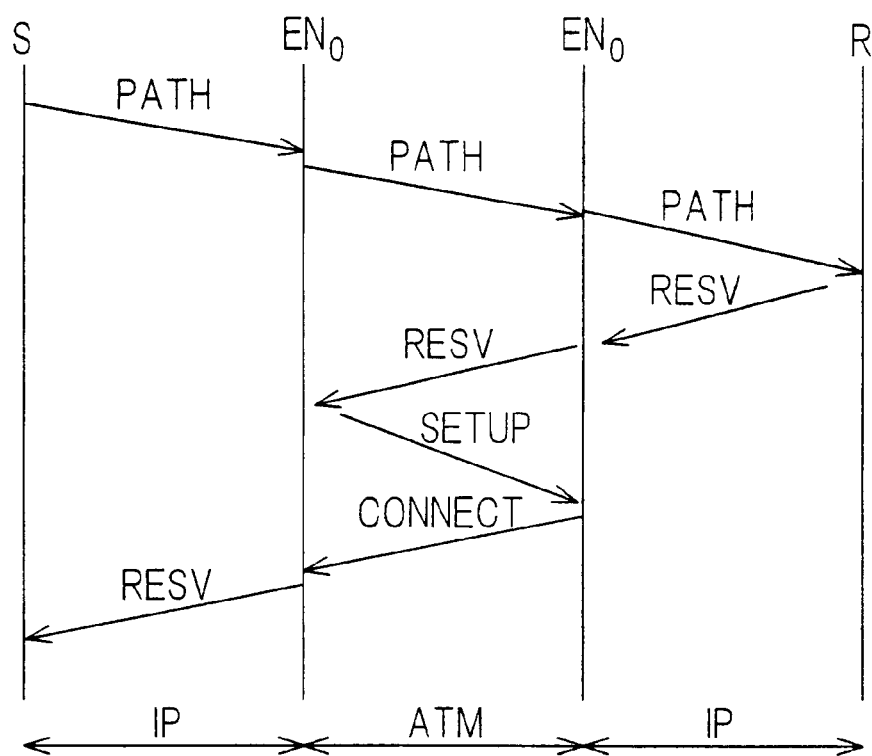
FIG. 69 is an explanatory view of the signaling process in the case in which IP communication is executed by an RSVP.
Figure 70:
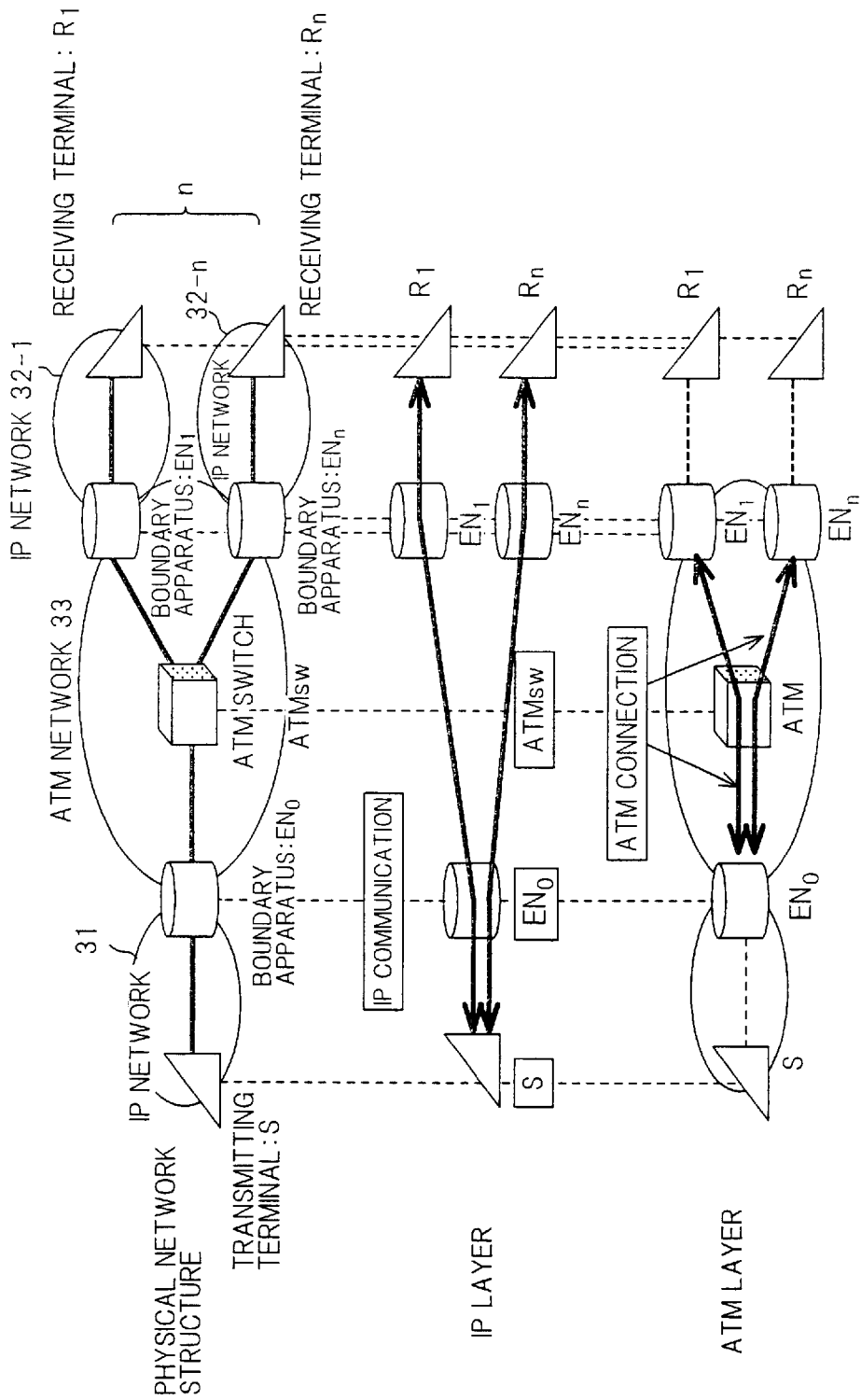
FIG. 70 shows the relationship between an IP network and an ATM network.
Figure 71:
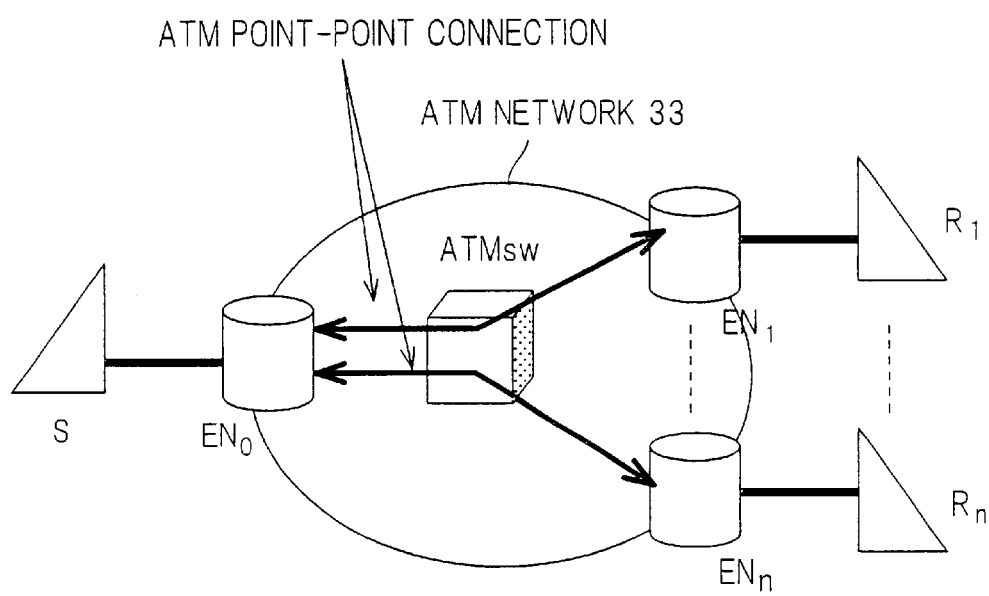
FIG. 71 shows a point-point connection.
Figure 72:
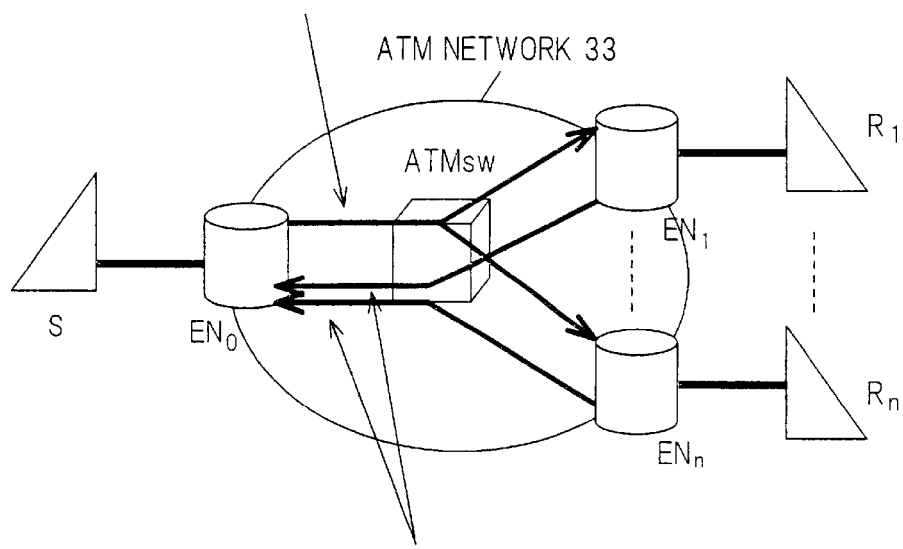
FIG. 72 shows a use of point-multipoint connection in combination with a point-point connection.
Figure 73:
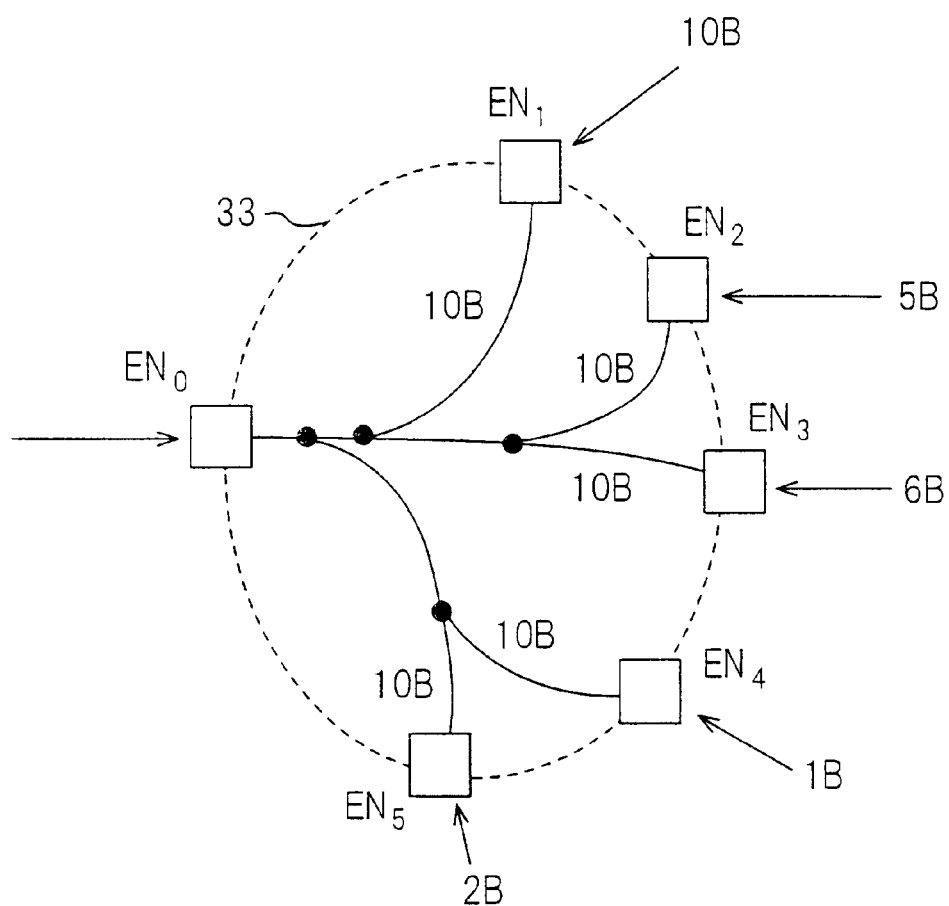
FIG. 73 explains a problem in a point-multipoint connection.
Figure 74:
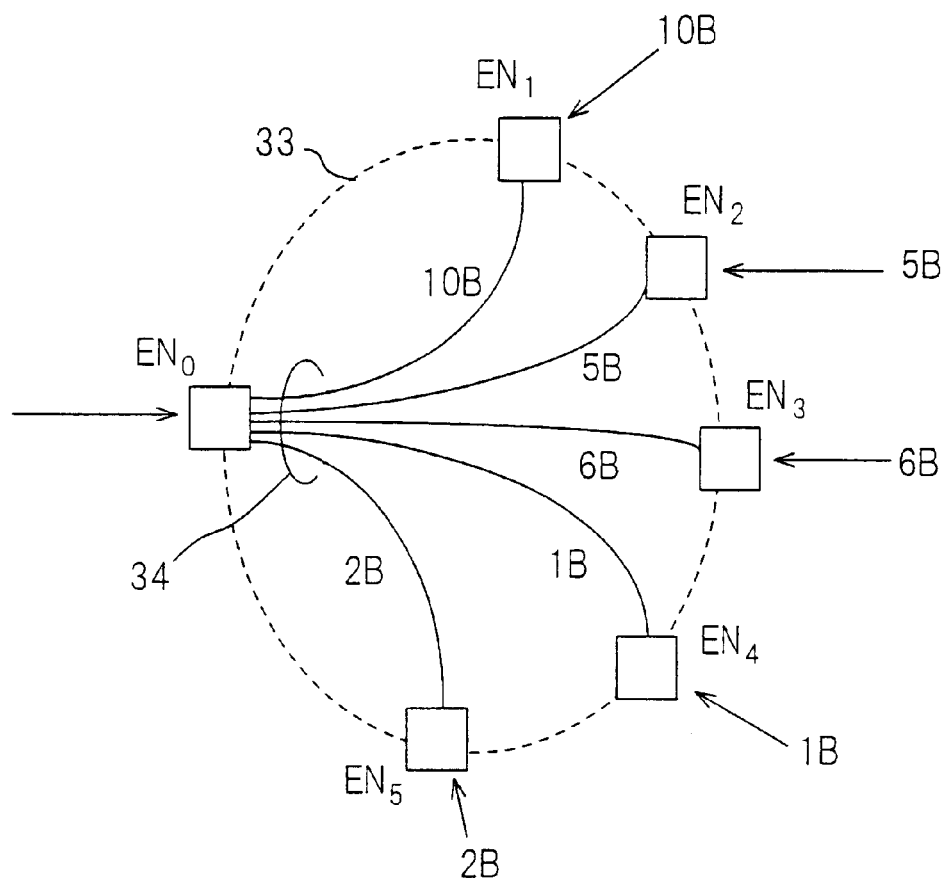
FIG. 74 explains a problem in a point-point connection.

FIG. 1 is an explanatory view of the operation of a root-leading type connection establishing method. The network has the same structure as that shown in FIG. 67.

The transmitting terminal S simultaneously transmits a Path message to receiving terminals $R_1$ to $R_n$ in advance of the transmission of predetermined contents. If the receiving terminals $R_1$ to $R_n$ want communication when they receive the Path message, they transmit packets of Reserve message at an IP level toward the transmitting terminal S. When boundary apparatuses $EN_1$ to $EN_n$ on the reception side receive the IP packets of the Reserve message, they know the IP address of the boundary apparatus $EN_0$ on the transmission side to which the transmitting terminal S belongs from the information in the received packets.

Each of the boundary apparatuses $EN_1$ to $EN_n$ on the reception side is provided with an IP address-ATM address conversion table so as to obtain the ATM address of the boundary apparatus $EN_0$ on the transmission side by reference to the table. The boundary apparatuses $EN_1$ to $EN_n$ on the reception side transfer the received IP packets to the boundary apparatus $EN_0$ on the transmission side in the form of cells via the existent connection for message.

In order to know the IP address of the boundary apparatus $EN_0$ on the transmission side, each of the boundary apparatuses $EN_1$ to $EN_n$ on the reception side utilizes the RSVP flow state (Path state) which is controlled on the basis of the Path message. As described above, each of the apparatuses (transmitting terminal, receiving terminals, boundary apparatuses, etc.) provided with an RSVP function in the network holds a flow identifier (e.g., IP destination address) for specifying the RSVP flow during the present communication, and also holds information such as the IP address in the network, and the IP address of the previous HoP as the path state with respect to each flow identifier.

In addition, since the RSVP control message itself has a flow identifier, each of the boundary apparatuses $EN_1$ to $EN_n$ knows the flow identifier when it receives the Reserve message. If each of the boundary apparatuses $EN_1$ to $EN_n$ refers to the flow state corresponding to the flow identifier of the Reserve message, it is possible to obtain the IP address of the Hop precedent to the transmitting terminal S, that is, the IP address of the boundary apparatus $EN_0$ on the transmission side.

The boundary apparatus $EN_0$ on the transmission side which has received the IP packets of the Reserve message establishes a connection for data transfer which satisfies the required bandwidth in accordance with a specific judging policy, and transfers the IP packets of the Reserve message to the transmitting terminal S. In this manner, the bandwidth in the network is reserved.

(B) Root-leading Type Connection Establishing Operation

The Root-leading type connection establishing operation will be explained in more detail in the following.

P1: The transmitting terminal S transmits the traffic characteristics (data rate, peak rate, recommended rate, etc.) of data to all the receivers in the form of the Path message PATH of an RSVP.

P2: When the Path message reaches the boundary apparatus $EN_0$ on the transmission side, the boundary apparatus $EN_0$ on the transmission side obtains the ATM addresses of the boundary apparatuses $EN_1$ to $EN_n$ on the reception side from the IP destination address of the Path message. The boundary apparatus $EN_0$ on the transmission side transfers the Path message to each of the boundary apparatuses $EN_1$ to $EN_n$ on the reception side via the ATM connection which is prepared in advance between the boundary apparatus $EN_0$ on the transmission side and each of the boundary apparatuses $EN_1$ to $EN_n$ on the reception side.

P3: When each of the boundary apparatuses $EN_1$ to $EN_n$ on the reception side receives the Path message, it transmits the Path message to the corresponding receiving terminals $R_1$ to $R_n$. In this manner each receiver knows the characteristics of the data.

P4: Each of the receiving terminals $R_1$ to $R_n$ generates a Reserve message RESV on the basis of the received Path message. The Reserve message RESV contains the data rate, peak rate, bandwidths required by the receiving terminal. It is now assumed that the receiving terminal $R_1$ first transmits the Reserve message to the boundary apparatus $EN_1$.

P5: The boundary apparatus $EN_1$ which has received the Reserve message from the receiving terminal $R_1$ knows the IP address of the boundary apparatus $EN_0$ as the destination of the Reserve message from the flow identifier included in the Reserve message, obtains the ATM address of the boundary apparatus $EN_0$ by reference to the IP address-ATM address conversion table, and transfers the Reserve message to the boundary apparatus $EN_0$.

P6: The receiving terminals $R_2$ to $R_n$ transmit the Reserve message RESV to the boundary apparatuses $EN_2$ to $EN_n$ in the same way as the receiving terminal $R_1$.

P7: The boundary apparatuses $EN_2$ to $EN_n$ transfer the Reserve message RESV to the boundary apparatus $EN_0$ in the same way as the boundary apparatus $EN_1$.

P8: The boundary apparatus $EN_0$ on the transmission side which has received the Reserve message from the receiving terminal $R_1$ judges whether or not it is possible to establish an ATM connection which satisfies the request of the receiving terminal $R_1$ on the basis of the required bandwidth contained in the Reserve message. If it is possible, the boundary apparatus $EN_0$ transmits a Setup message SETUP to an ATM switch so as to establish an ATM connection with respect to the boundary apparatus $EN_1$ on the reception side.

P9: The ATM switch which has received the Setup message transfers it to the boundary apparatus $EN_1$.

P10: The boundary apparatus $EN_1$ which has received the Setup message returns the connection acknowledgement message CONNECT to the ATM switch.

P11: The ATM switch which has received the connection acknowledgement message transfers it to the boundary apparatus $EN_0$.

P12: The boundary apparatus $EN_0$ which has received the connection acknowledgement message transfers the Reserve message from the receiving terminal $R_1$ to the transmitting terminal S.

P13: The boundary apparatus $EN_0$ on the transmission side which has received the Reserve message from each of the receiving terminals $R_2$ to $R_n$ in the same way as from the receiving terminal $R_1$ judges whether or not it is possible to establish an ATM connection which satisfies the request of each of the receiving terminals $R_2$ to $R_n$ on the basis of the required bandwidth contained in the Reserve message. If it is possible, the boundary apparatus $EN_0$ transmits a Setup message SETUP to an ATM switch so as to establish an ATM connection with respect to each of the boundary apparatuses $EN_2$ to $EN_n$ on the reception side.

P14: The ATM switch which has received the Setup message transfers it to the each of the boundary apparatuses $EN_2$ to $EN_n$.

P15: Each of the boundary apparatuses $EN_2$ to $EN_n$ which has received the Setup message returns the connection acknowledgement message CONNECT to the ATM switch.

P16: The ATM switch which has received the connection acknowledgement message transfers it to the boundary apparatus $EN_0$.

P17: The boundary apparatus $EN_0$ which has received the connection acknowledgement message transfers the Reserve message from each of the receiving terminals $R_2$ to $R_n$ to the transmitting terminal S.

In the above connection establishing operation, the operation of establishing a point-point (p-p) connection between the boundary apparatus $EN_0$ on the transmission side and each of the boundary apparatuses $EN_1$ to $EN_n$ on the reception side is mainly described, but it is possible to establish a point-multipoint (p-mp) connection in a similar way. In the p-mp connection establishing operation, a leaf adding message ADD PARTY and a leaf addition acknowledgement message ADD PARTY ACK are used.

In the above-described operation, a p-p connection or a p-mp connection is established, but actually, the optimum connection is established between the boundary apparatus $EN_0$ on the transmission side and the boundary apparatuses $EN_1$ to $EN_n$ on the reception side, as will be described later.

As described above, in a root-leading type connection establishing method, the boundary apparatus on the transmission side receives Reserve messages from all the receiving terminals, judges what is the optimum ATM connection on the basis of each request and establishes the connection. According to this method, since the boundary apparatus $EN_0$ on the transmission side controls all from the holding of the information on the connection state to the establishment of a connection, management is easy. Especially, since a p-mp connection of an ATM is basically possible only from the transmission side, the root-leading type method is also advantageous at this point.

(C) Entry Type Connection Establishing Method

An entry type connection establishing method will now be explained. In this method, a predetermined entry time is provided in a root-leading type connection establishing method. When a first of the Reserve messages from a plurality of receiving terminals reaches the boundary apparatus $EN_0$ on the transmission side, the boundary apparatus does not immediately start the establishment of a connection, but waits for a specific reservation entry time by using a timer before the starting. In this case, one entry timer is prepared in the boundary apparatus $EN_0$ on the transmission side for each data flow, i.e., each Path message.

For example, when a sender simultaneously transmits data of a commercial program or the like to a plurality of receivers (users), it periodically transmits a Path message to the receivers as information advertising the program. In this case, the same Path message is repeatedly transferred with respect to one program. When a receiver wants to receive the program, he instructs a receiving terminal to transmit a Reserve message.

Accordingly, all the receiving terminals to which the Path message are transmitted not always return a Reserve message immediately, so that a plurality of Reserve messages reach the boundary apparatus $EN_0$ on the transmission side at different timings. In order to collectively receive these Reserve messages, a predetermined entry time is provided.

Figure 2:
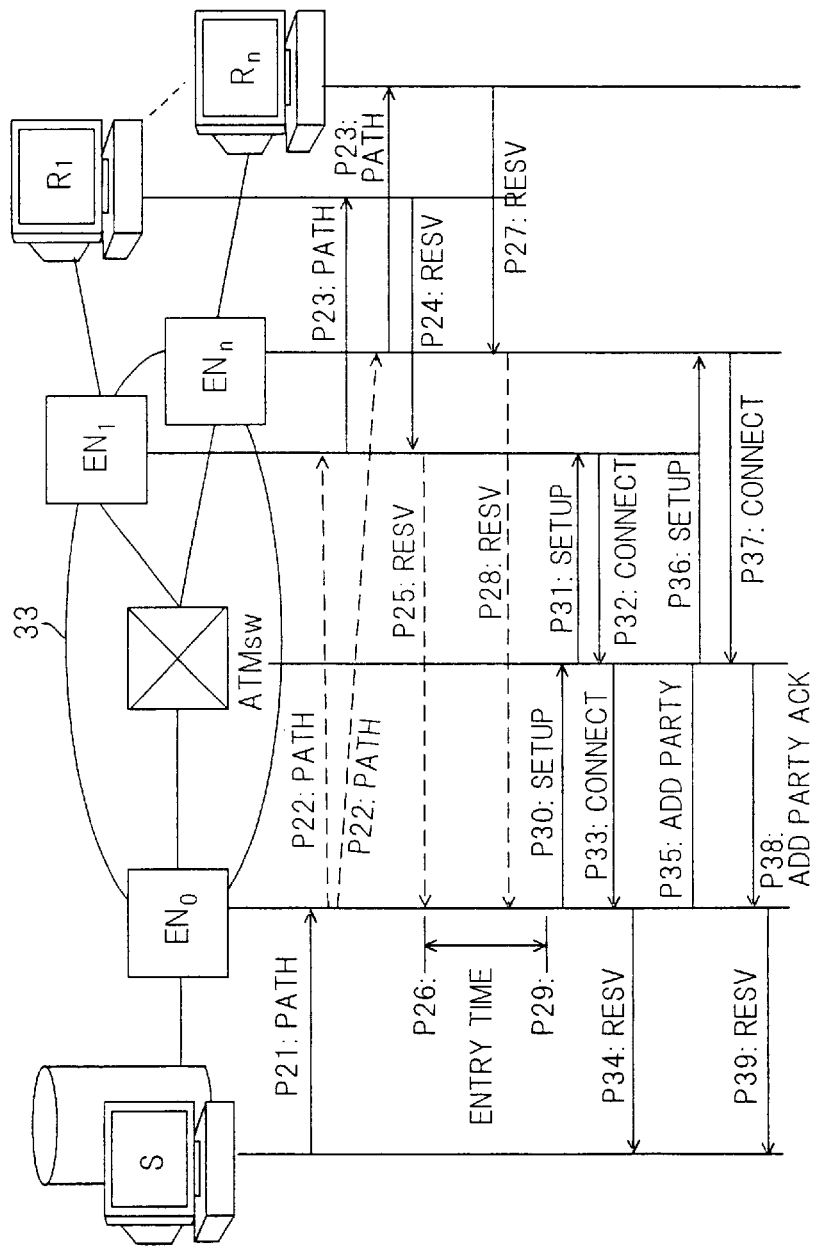
FIG. 2 shows the sequence for the operation of an entry type connection establishing method.

FIG. 2 shows the sequence for the operation of an entry type connection establishing method. A p-mp connection is established in the ATM network 33 in accordance with the following sequence.

P21: The transmitting terminal S transmits a Path message PATH containing transmission traffic characteristics toward all the receiving terminals $R_1$ to $R_n$ by using a multicast address.

P22: The Path message is transferred to each of the boundary apparatuses $EN_1$ to $EN_n$ on the reception side through the connection for control message in the ATM 33.

P23: The Path message reaches all the receiving terminals $R_1$ to $R_n$.

P24: A Reserve message from the receiving terminal $R_1$ reaches the boundary apparatus $EN_1$.

P25: The Reserve message from the boundary apparatus $EN_1$ reaches the boundary apparatus $EN_0$ on the transmission side via the fundamentally same route as that of the Path message.

P26: When the Reserve message from the receiving terminal $R_1$ reaches the boundary apparatus $EN_0$ on the transmission side as a first request, the entry timer starts, thereby starting entry reception.

P27: The Reserve message from each of the receiving terminals $R_2$ to $R_n$ reaches the corresponding boundary apparatuses $EN_2$ to $EN_n$.

P28: The Reserve message from each of the boundary apparatuses $EN_2$ to $EN_n$ reaches the boundary apparatus $EN_0$ on the transmission side via the fundamentally same route as that of the Path message within the entry time.

P29: The entry time is up, and the entry reception for this session is finished. The operation of establishing a connection in the ATM network 33 is started in response to the received requests.

P30: The boundary apparatus $EN_0$ on the transmission side first transmits a Setup message SETUP to the ATM switch so as to establish an ATM connection with respect to the boundary apparatus $EN_1$ on the reception side to which the receiving terminal $R_1$ belongs.

P31: The ATM switch which has received the Setup message transfers it to the boundary apparatus $EN_1$.

P32: The boundary apparatus $EN_1$ which has received the Setup message returns the connection acknowledgement message CONNECT to the ATM switch.

P33: The ATM switch which has received the connection acknowledgement message transfers it to the boundary apparatus $EN_0$.

P34: The boundary apparatus $EN_0$ which has received the connection acknowledgement message transfers the Reserve message from the receiving terminal $R_1$ to the transmitting terminal S.

P35: The boundary apparatus $EN_0$ on the transmission side then transmits a leaf adding message ADD PARTY to the ATM switch so as to incorporate each of the boundary apparatuses $EN_2$ to $EN_n$ on the reception side into the already established connection as a leaf.

P36: The ATM switch which has received the leaf adding message ADD PARTY transmits a Setup message SETUP to each of the boundary apparatuses $EN_2$ to $EN_n$.

P37: Each of the boundary apparatuses $EN_2$ to $EN_n$ which has received the Setup message returns the connection acknowledgement message CONNECT to the ATM switch.

P38: The ATM switch which has received the connection acknowledgement message transmits a leaf addition acknowledgement message ADD PARTY ACK to the boundary apparatus $EN_0$.

P39: The boundary apparatus $EN_0$ which has received the leaf addition acknowledgement message transfers the Reserve message from each of the receiving terminals $R_2$ to $R_n$ to the transmitting terminal S.

In FIG. 2, the entry timer starts when the Reserve message reaches from the receiving terminal $R_1$, but generally, the entry timer starts when the Reserve message reaches from any of the plurality of receiving terminals $R_1$ to $R_n$. The boundary apparatus $EN_0$ on the transmission side judges what kind of connection is to be established on the basis of all the Reserve messages received within a predetermined time, and establishes the connection.

As described above, by providing an entry timer, it is possible to collectively deal with the requests from the receiving terminals, thereby preventing a connection from being uselessly re-established. As a result, it is possible to reduce various kinds of connection control messages which flow within the network in the prior art, and the lightening of a signaling processing load on the apparatuses in the network will be expected.

Figure 3:
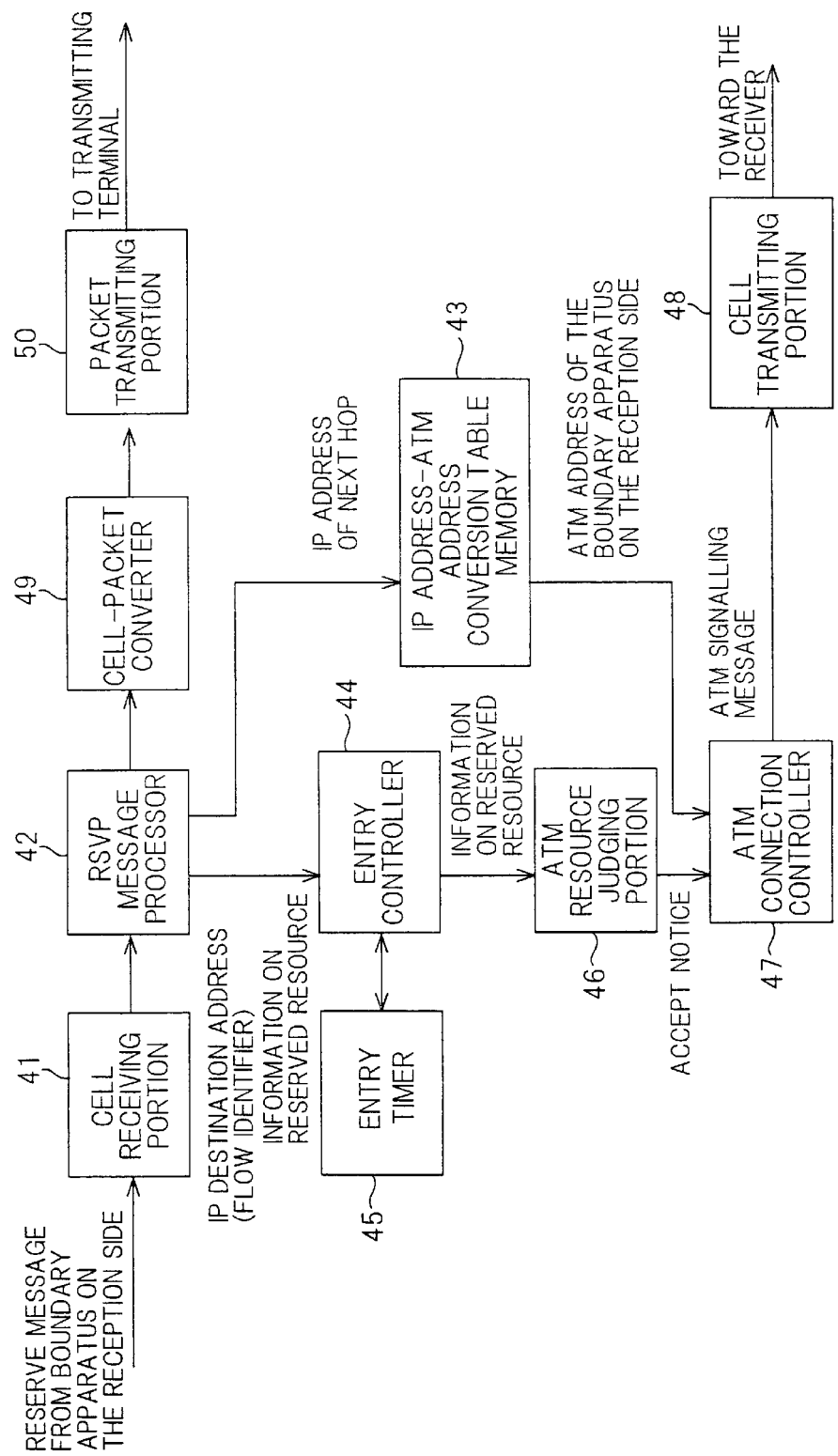
FIG. 3 shows the structure of a boundary apparatus on the transmission side.

Especially, when the number of Reserve messages is very large, since it is possible to suppress the load of the boundary apparatus $EN_0$ on the transmission side and the amount of control message which flow on the circuit of the ATM network 33, this method is considered to be an effective one. In addition, the fear of bursting caused due to the concentration of request messages from the receiving terminals at the staring/ending time of a multicast session or the like may be eliminated by providing the entry time. On the other hand, a receiver is kept waiting for the time corresponding to the entry time at the most before the establishment of a connection (D) Structure of a Boundary Apparatus on the Transmission Side FIG. 3 shows an example of the structure of the boundary apparatus $EN_0$ on the transmission side which executes such an entry type connection establishing operation. The boundary apparatus shown in FIG. 3 is provided with a cell receiving portion 41, an RSVP message processor 42, an IP address-ATM address conversion table memory 43, an entry controller 44, an entry timer 45, an ATM resource judging portion 46, an ATM connection controller 47, a cell transmitting portion 48, a cell-packet converter 49 and a packet transmitting portion 50.

The cell receiving portion 41 receives an IP packet from a boundary apparatus on the reception side in the form of ATM cells, and transfers the message contained in the cells to the RSVP message processor 42. If the received message is a Reserve message, the RSVP message processor 42 transfers the session identifier (flow identifier), the IP address of the boundary apparatus on the reception side, and the information on the resource reservation (required bandwidth, etc.) contained therein to the entry controller 44.

The RSVP message processor 42 also transfers the IP address of the boundary apparatus on the reception side to the IP address-ATM address conversion table memory 43. In addition, the RSVP message processor 42 transfers the text of the message to the cell-packet converter 49. The IP address-ATM address conversion table memory 43 outputs the ATM address (i.e., the ATM address of the boundary apparatus on the reception side) which corresponds to the IP address received from the RSVP message processor 42, to the ATM connection controller 47.

The entry controller 44 uses the IP address received from the RSVP message processor 42 as a flow identifier, and starts the entry timer 45 for each flow identifier. Within the entry time, the entry controller 44 collects the information on the resource reservation having the corresponding flow identifier. The entry timer 45 includes a plurality of counters, and measures the entry time by using the counters which are assigned for the respective flow identifiers as the objects of processing.

The entry controller 44 processes the collected information on the resource reservation in accordance with a predetermined algorithm within or after the entry time, and outputs the result to the ATM resource judging portion 46 as the information on the resource reservation.

The ATM resource judging portion 46 judges whether or not an ATM connection can be accepted with respect to the information on the resource reservation received from the entry controller 44. If the ATM connection is acceptable, it transmits a notice of acceptance to the ATM connection controller 47.

The ATM connection controller 47 controls the ATM connection establishing operation. When it receives the notice of acceptance from the ATM resource judging portion 46, it generates an ATM signaling message and transfers it to the cell transmitting portion 48. The cell transmitting portion 48 transmits ATM cells including the ATM signaling message toward the receiver. Thereafter, the ATM signaling message (SETUP CONNECT) is transmitted and received between the boundary apparatus $EN_0$ on the transmission side and the boundary apparatus $EN_1$ on the reception side and, as a result, a connection is established.

The cell-packet converter 49 converts the Reserve message received from the RSVP message processor 42 in the form of cells into an IP packet, and transmits it to the packet transmitting portion 50. The packet transmitting portion 50 transmits the IP packet received from the cell-packet converter 49 to the transmitting terminal.

The entry controller 44 and the ATM resource judging portion 46 are deeply related to a policing function for judging the optimum connection, and usually provided with a processor such as a microprocessor. The processor executes a program stored in the memory and provides various policing functions, as will be described later. The entry controller 44 and the ATM resource judging portion 46 may be composed as a hardware circuit which realizes similar functions.

(E) Control for Establishing Various Connections

In the entry type connection establishing method, there are (1) a system for establishing a single point-multipoint connection, (2) a system for establishing a plurality of point-multipoint connections, (3) a system for establishing a plurality of point-point connections, and (4) a system for establishing both a point-point connection and a point-multipoint connection.

(a) Single Point-multipoint (p-mp) Connection

A system for establishing a single point-multipoint (p-mp) connection is a system in which the boundary apparatus $EN_0$ on the transmission side receives requests for resource from receiving terminals within the entry time and establishes a single (p-mp) connection with respect to one transmission session.

When the boundary apparatus $EN_0$ on the transmission side receives a first Reserve message from a receiving terminal, the entry timer starts, and the boundary apparatus $EN_0$ receives other Reserve messages for a predetermined time. When the entry timer stops, the boundary apparatus $EN_0$ establishes a single p-mp connection which satisfies all the requests for resource which have been received within the entry time.

Figure 4:
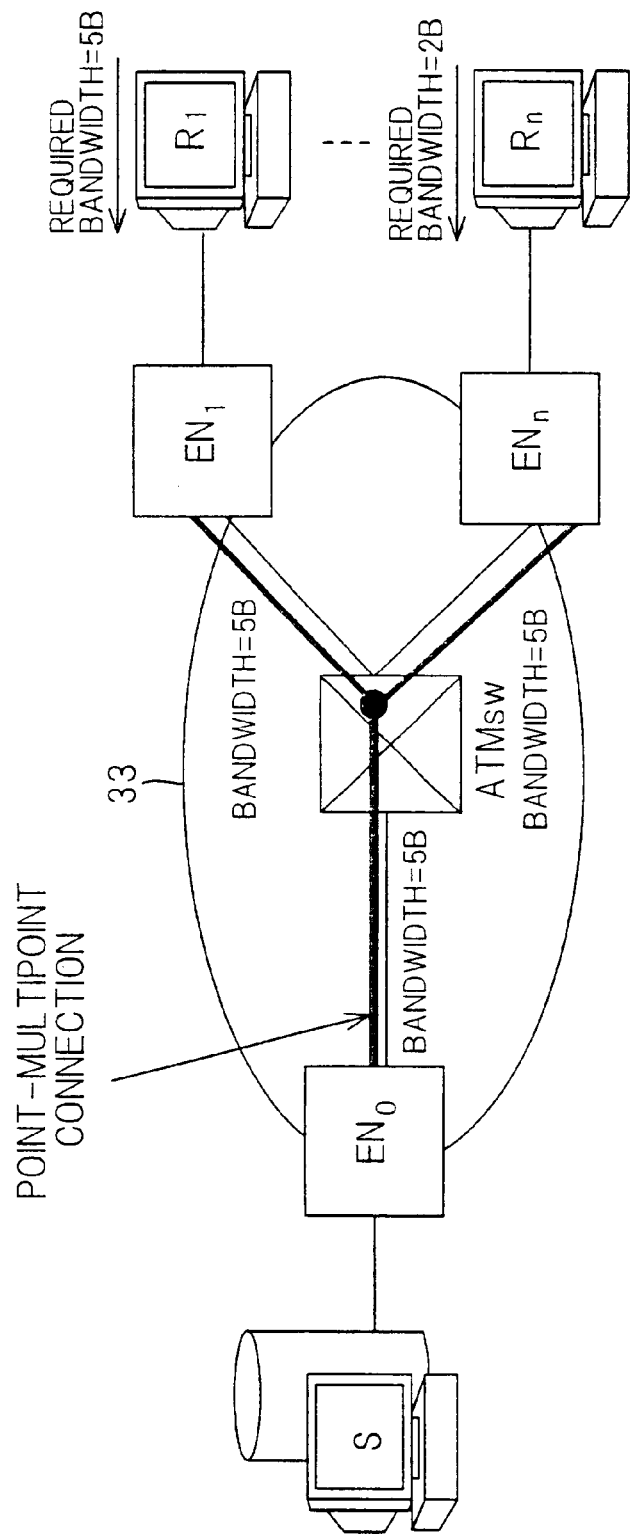
FIG. 4 shows a single point-multipoint (p-mp) connection.

FIG. 4 shows an example of the operation of such a system. In FIG. 4, there are requests for resource from a plurality of receiving terminals $R_1$ to $R_n$. For example, the receiving terminal $R_1$ requests a bandwidth of 5B, and the receiving terminal $R_n$ request a bandwidth of 2B. For these requests for bandwidths, the boundary apparatus $EN_0$ on the transmission side establishes a single p-mp connection and provides service. In FIG. 4, a single p-mp connection of a bandwidth of 5B is established between the boundary apparatus $EN_0$ on the transmission side and each of the boundary apparatuses $EN_1$ to $EN_n$.

According to this system, since it is possible to judge an appropriate bandwidth collectively with respect to a plurality of requests, a wasteful operation such as the re-establishing of an already established connection is avoided. In addition, since a single p-mp connection is used with respect to one transmission session, the number of VPI/VCIs used in the ATM network 33 can be curtailed.

Furthermore, in a link nearer to the boundary apparatus on the transmission side, the bandwidth resource is economized. Actually, in the example shown in FIG. 4, the bandwidth of 5B is only used in the link between the boundary apparatus $EN_0$ on the transmission side and the ATM switch.

If it is assumed that a p-p connection is established between the boundary apparatus $EN_0$ on the transmission side and each of the boundary apparatuses $EN_1$ and $EN_n$, a connection of a bandwidth of 5B and a connection of a bandwidth of 2B are necessary, so that a bandwidth of 7B (=5B+2B) is used merely between the boundary apparatus $EN_0$ and the ATM switch. In other words, by using a single point-multipoint connection, it is possible to save a bandwidth of 2B.

In the entire ATM network 33, however, since the largest bandwidth of the required bandwidths is used as the bandwidth of the p-mp connection, the bandwidth resource nearer to the boundary apparatus on the reception side is wasted. In FIG. 4, since the connection of a bandwidth of 5B is provided for the required bandwidth of 2B, the bandwidth is wasted by 3B.

A method of determining the bandwidth of a single p-mp connection and changing a connection by this system will be explained later in detail.

(b) A Plurality of Point-multipoint (p-mp) Connections

In a system for establishing a plurality of p-mp connections, the boundary apparatus $EN_0$ on the transmission side receives requests for resource from the receiving terminals within an entry time and establishes a plurality of p-mp connections with respect to one session.

When the boundary apparatus $EN_0$ on the transmission side receives a first Reserve message from a receiving terminal, the entry timer starts, and the boundary apparatus $EN_0$ receives other Reserve messages for a predetermined time. When the entry timer stops, the boundary apparatus $EN_0$ establishes a plurality of p-mp connections which satisfy all the requests for resource which have been received within the entry time.

At this time, the boundary apparatus $EN_0$ on the transmission side establishes a new connection by SETUP message in accordance with a judging policy, or adds a leaf to an existent p-mp connection tree by an ADD PARTY message. The judging policy will be described later in detail.

Figure 5:
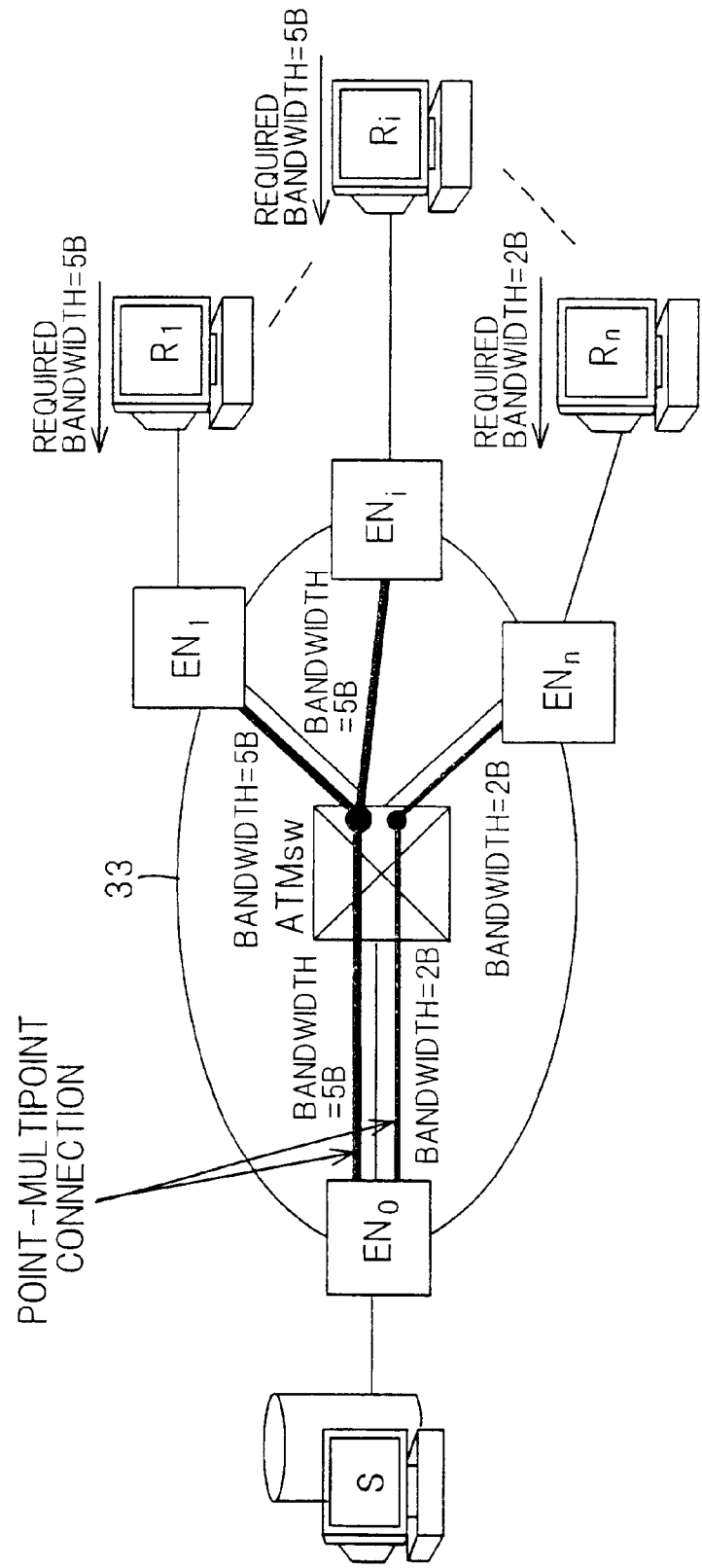
FIG. 5 shows a plurality of point-multipoint connections.

FIG. 5 shows an example of the operation of such a system. In FIG. 5, the boundary apparatus $EN_0$ on the transmission side receives requests for resource from $EN_1$, $EN_i$ (i=2 . . . , n−1) and $EN_n$. In this example, a bandwidth of 5B is required by $EN_1$ and $EN_i$, and a bandwidth of 2B is required by $EN_n$.

After these requests are received, the boundary apparatus $EN_0$ on the transmission side allots a p-mp connection of a bandwidth of 5B to the boundary apparatuses $EN_1$ and $EN_i$ which require the same bandwidth, and allots a p-mp connection of a bandwidth of 2B to the boundary apparatus $EN_n$ which requires a bandwidth of 2B.

In this system, more VPI/VCIs are consumed than in a system which provides service via a single p-mp connection, but since a more appropriate connection is allotted to a receiving terminal on the basis of the required bandwidth, the effective use of resource is possible. For example, according to this system, more bandwidth resource is saved in the link which is nearer to the boundary apparatuses on the reception side than in the system shown in FIG. 4. As a result, the probability of acceptance of requests for resource increases, and the possibility of rejection of a call is reduced.

In FIG. 5, the links of the same bandwidths as those required by the respective boundary apparatuses $EN_1$, $EN_i$ to $EN_n$ on the reception side are provided from the ATM switch. Accordingly, a bandwidth of 3B (=5B−2B) is saved between the ATM switch and the boundary apparatus $EN_n$ as compared with the system shown in FIG. 4. On the other hand, the bandwidth consumed between the boundary apparatus $EN_0$ and the ATM switch is 2B more than in the system shown in FIG. 4.

(c) A Plurality of Point-point (p-p) Connections

In a system for establishing a plurality of p-p connections, the boundary apparatus $EN_0$ on the transmission side receives requests for resource from the receiving terminals within an entry time and establishes a plurality of p-p connections with respect to one session.

In this system, after the starting of reception, p-p connections are allotted in the order of reception of resource. According to this system, although VPI/VCIs are wasted, no judging policy is necessary. In addition, this system is simple, and the most fundamental service method in the ATM network 33. Accordingly, in multicast service, when the number of requests for resource is small, this system may be considered to be one available choice.

Figure 6:
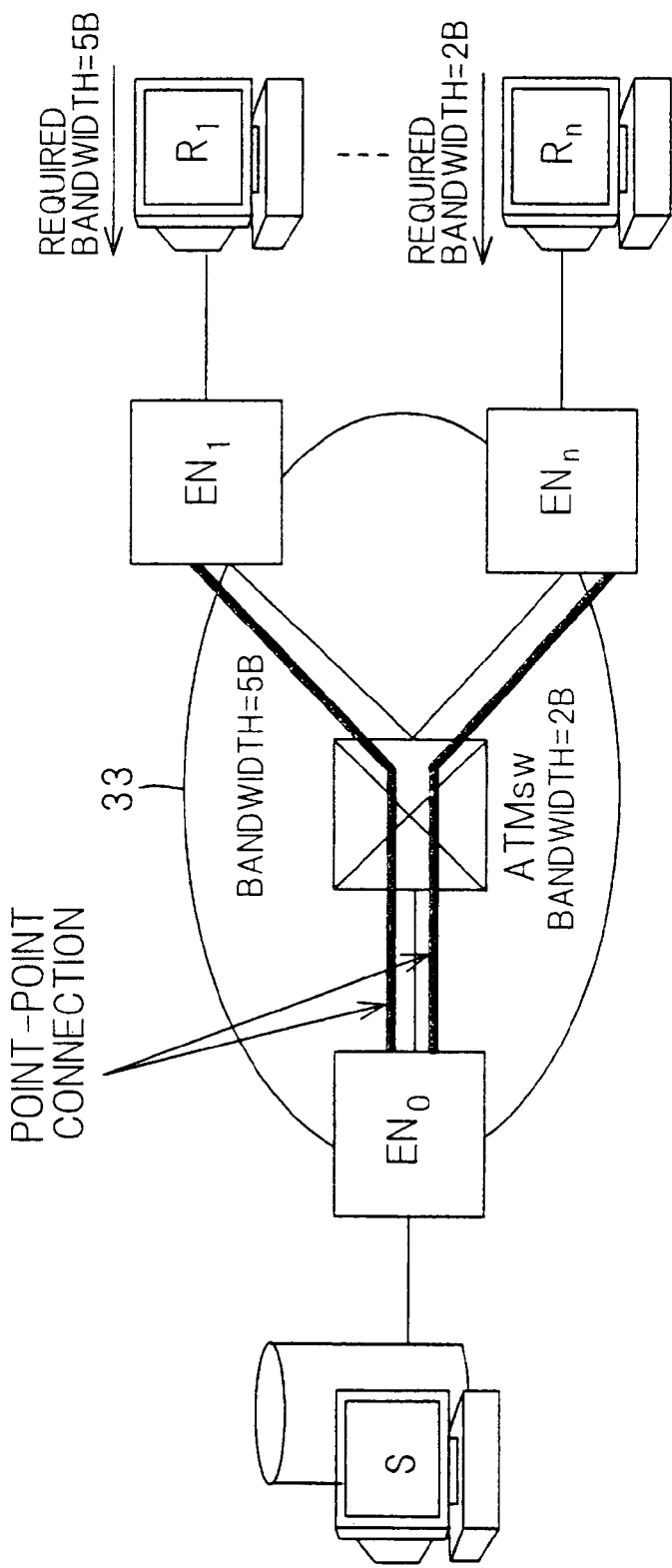
FIG. 6 shows a plurality of point-point connections.

FIG. 6 shows an example of the operation of such a system. In FIG. 6, there are requests for resource from a plurality of receiving terminals $R_1$ to $R_n$, and p-p connections are established in accordance with the respective required bandwidths. For example, the receiving terminal $R_1$ requires a bandwidth of 5B, and the receiving terminal $R_n$ requires a bandwidth of 2B. The boundary apparatus $EN_0$ on the transmission side allots a connection of a bandwidth of 5B between the ATM switch and the boundary apparatus $EN_1$ and a bandwidth of 2B between the ATM switch and the boundary apparatus $EN_n$.

Figure 7:
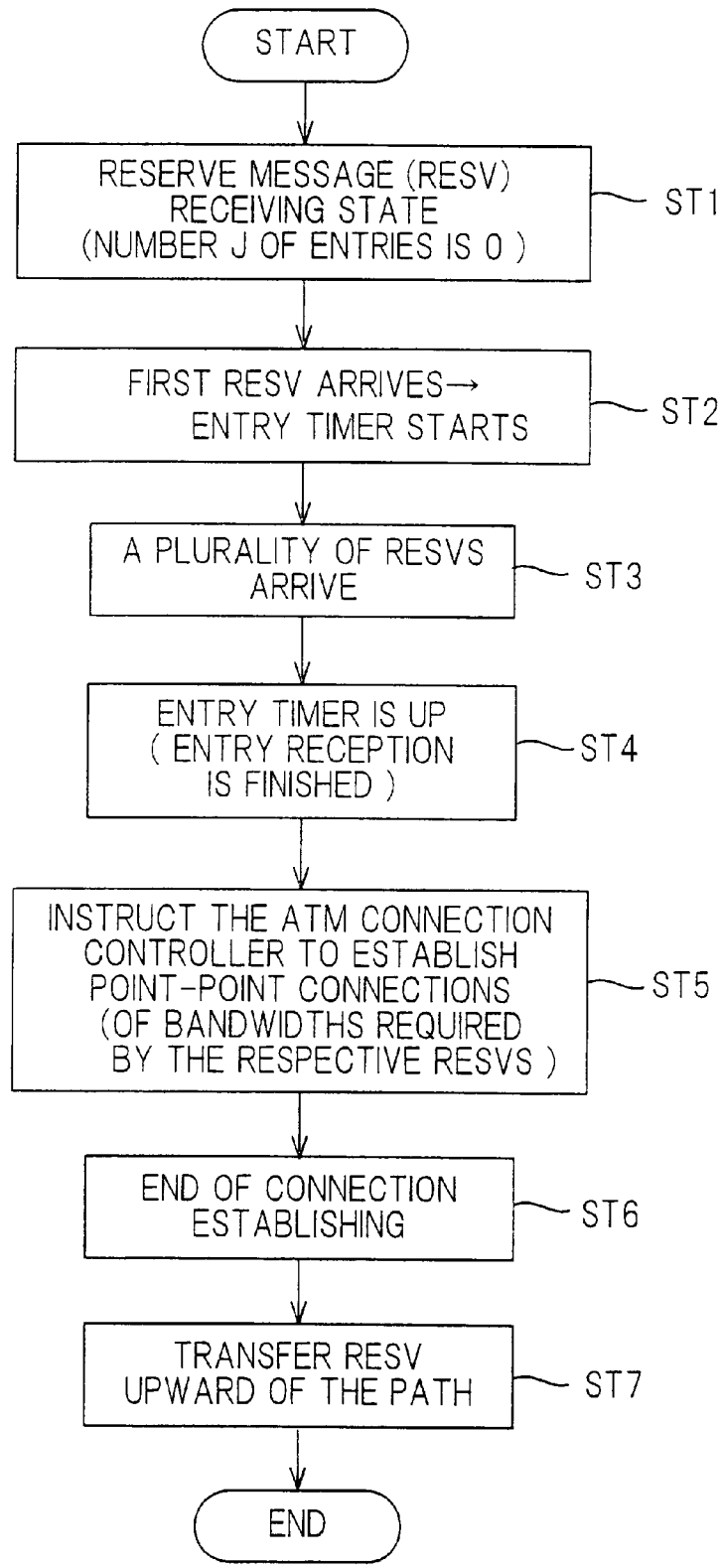
FIG. 7 is a flowchart of a first operation of a boundary apparatus on the transmission side.

FIG. 7 is a flowchart of the operation of the boundary apparatus $EN_0$ in such a system. After transmitting a Path message PATH to the receiving terminals $R_1$ to $R_n$, the boundary apparatus $EN_0$ assumes a Reserve message RESV receiving state (step ST1). When a first Reserve message arrives, the boundary apparatus $EN_0$ starts the entry timer 45 (step ST2). Thereafter, other Reserve messages arrive (step ST3), and when the entry timer 45 stops, the reception of a Reserve message is finished (step ST4).

The entry controller 44 then instructs the ATM connection controller 47 to establish a p-p connection via the ATM resource judging portion 46, and the ATM connection controller 47 establishes p-p connections of the bandwidths corresponding to the respective Reserve messages (step ST5). When the establishment of the connections corresponding to all the Reserve messages is finished (step ST6), the packet transmitting portion 50 transfers the Reserve messages RESV upward of the path (step ST7), thereby finishing the operation.

According to this system, a new p-p connection is established every time a Reserve message is received from a new receiving terminal. This can be said to be the most natural system for establishing an ATM connection. Since judgment as to what kind of connection is to be established is unnecessary in this system, the connection establishing operation is simple. However, the waste of VPI/VCIs is unavoidable.

(d) Combination of p-p Connection and p-mp Connection

In a system using a p-mp connection in combination with a p-p connection, the boundary apparatus $EN_0$ on the transmission side receives requests for resource from the receiving terminals within an entry time and establishes a plurality of p-mp connections and p-p connections with respect to one session.

In this system, the network resource is effectively utilized by accommodating the same or similar requests for resource in a p-mp connection, and allotting a p-p connection to an exceptional or unusual request. If it is assumed that the system shown in FIG. 5 for establishing connections using only p-mp connection and the system shown in FIG. 6 for establishing connections using only p-p connection are two extreme systems, this system can be said to be intermediate between them.

Figure 8:
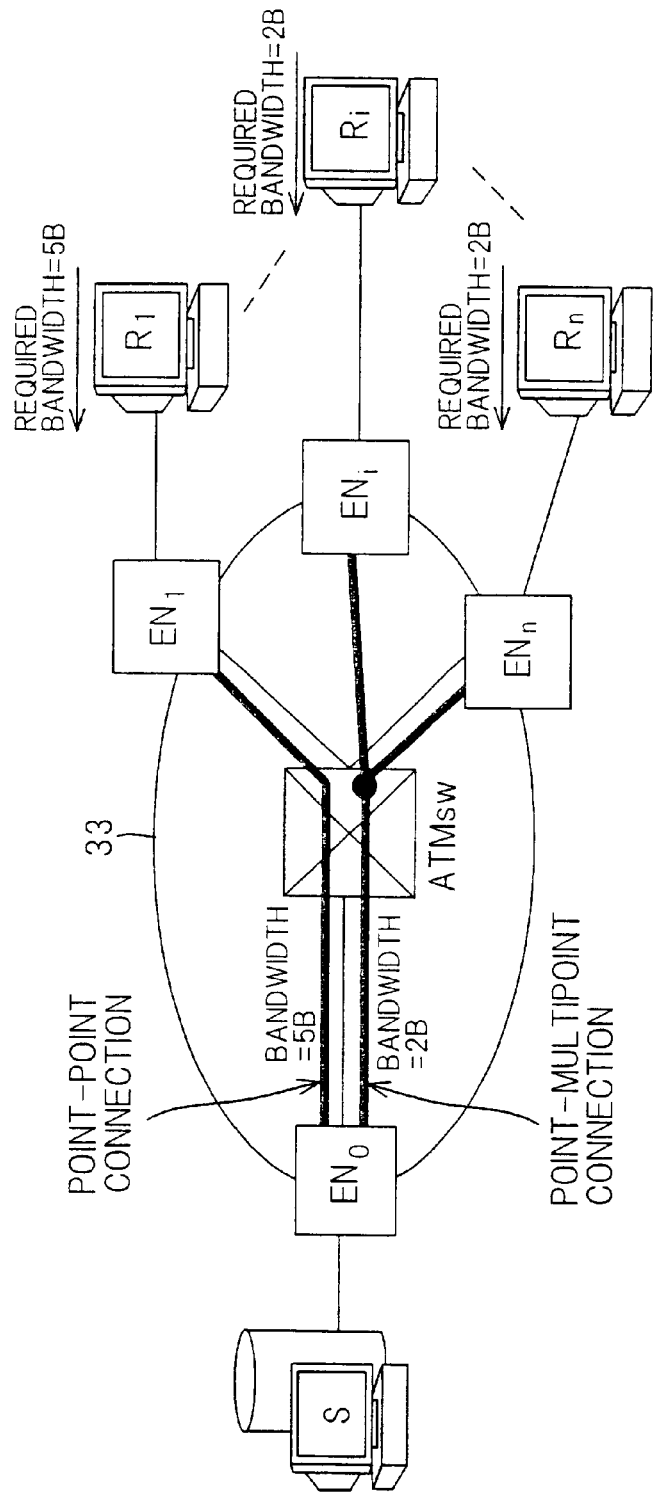
FIG. 8 shows a mixture of a point-multipoint connection and a point-point connection.

FIG. 8 shows an example of the operation of such a system. In FIG. 8, the boundary apparatus $EN_0$ on the transmission side receives a request for a bandwidth of 5B from the boundary apparatus $EN_1$, a request for a bandwidth of 2B from the boundary apparatus $EN_i$ (i=2, . . . , n−1), and a request for a bandwidth of 2B from the boundary apparatus $EN_n$. The boundary apparatus $EN_0$ on the transmission side allots a p-mp connection of the bandwidth of 2B to the boundary apparatuses $EN_i$, $EN_n$ which require the same bandwidth, and allots a p-p connection of the bandwidth of 5B to the boundary apparatus $EN_1$ only which requires a different bandwidth.

According to this system, since the same or similar requests for resource are accommodated in a p-mp connection, and a p-p connection is allotted to an exceptional or unusual request, it is possible to accommodate a group of a multiplicity of receiving terminals efficiently. In addition, if the boundary apparatus $EN_0$ on the transmission side follows an appropriate judging policy with respect to a plurality of requests for resource, it is possible to establish an optimum connection. The details of the judging policy will be described later.

(F) Decision of Bandwidth/Re-establishing Existent Connection/Adding Leaf

A method of deciding the bandwidth of a single p-mp connection established by the system shown in FIG. 4 and a method of changing a connection will be explained in the following.

(a) First Bandwidth Deciding Method
Decision of a Bandwidth Based on the Maximum Value of Required Bandwidths The kinds of parameters and values of the parameters contained in the requests for resource from the receiving terminals which belong to the IP network depend on the data traffic characteristics (QoS guarantee service). The data traffic is roughly divided into data traffic which the sender wants to provide and the data traffic which a receiver actually requires of the traffic.

Seen from the ATM network side, a method of determining a bandwidth is divided into a method of establishing a connection of the largest bandwidth in advance that has a possibility of being required on the basis of the data traffic characteristic (on the basis of a Path message in the RSVP) which is reported from the sender, and a method of faithfully determining a bandwidth on the basis of the Reserve message from a receiver.

A system in which the boundary apparatus $EN_0$ on the transmission side establishes the bandwidth of a connection on the basis of the Reserve message from a receiver is first proposed. In this system, when the boundary apparatus $EN_0$ on the transmission side starts to establish a connection on the basis of all the requests for resource from the receiving terminals which have been received within the entry time, the boundary apparatus establishes a single p-mp connection by using the maximum value of the bandwidths required in all the Reserve messages from the receiving terminals.

Figure 9:
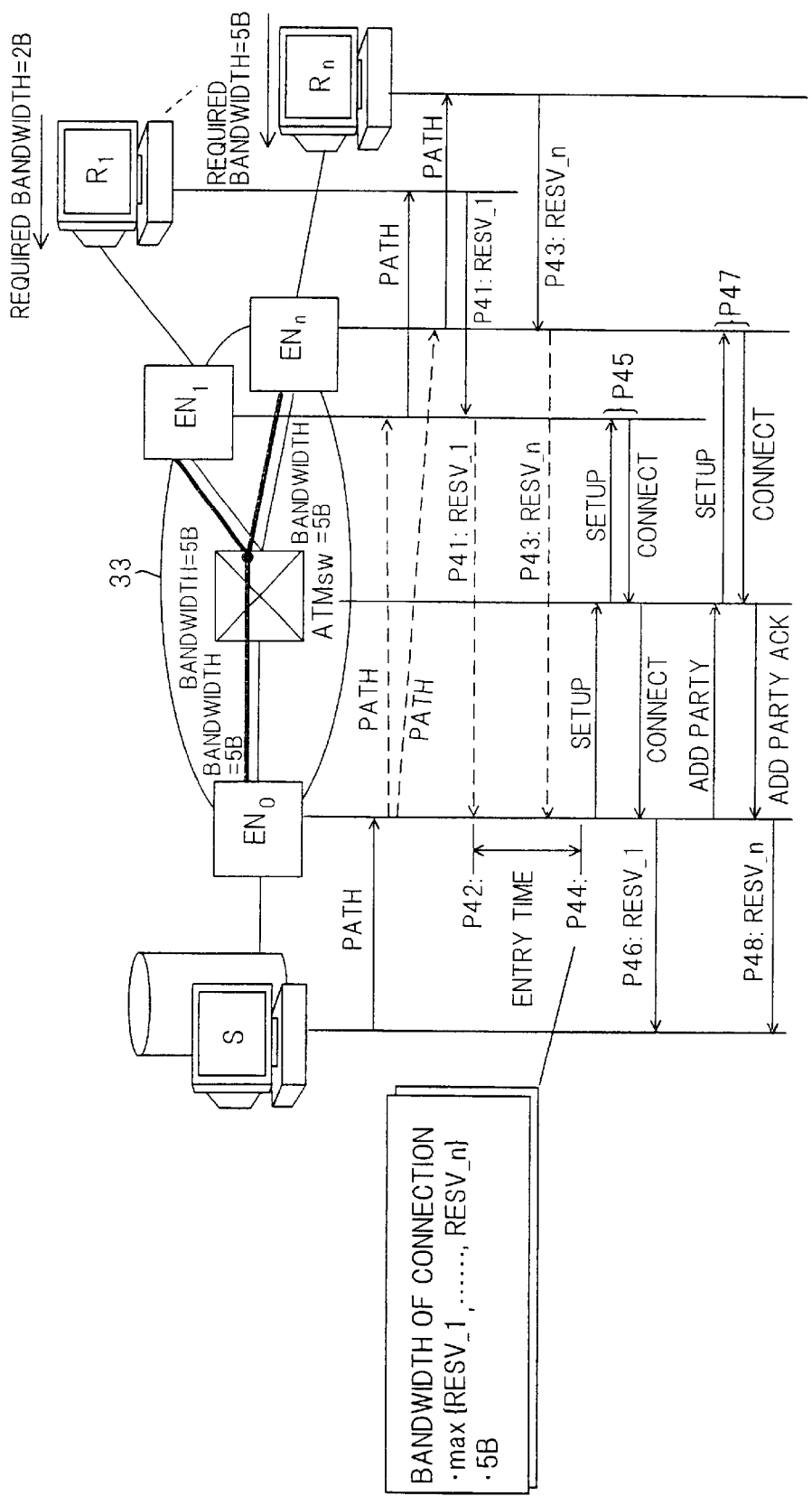
FIG. 9 shows a sequence for determining the bandwidth of a single p-mp connection on the basis of the maximum value of required bandwidths (first bandwidth determining method)

FIG. 9 shows a sequence for such a connection establishing operation. In FIG. 9, it is assumed that each of the receiving terminals $R_1$ to $R_n$ has received an RSVP Path message PATH from the transmitting terminal S. Thereafter, a connection is established in accordance with the following sequence.

P41: A reserve message RESV_1 is transmitted from the receiving terminal $R_1$. As a result, a request for the bandwidth of 2B reaches the boundary apparatus $EN_0$ on the transmission side via the boundary apparatus $EN_1$ on the reception side. In the Reserve message RESV generated on the basis of the Path message PATH is written a traffic characteristic required by a receiving terminal. In FIG. 9, the peak rate p of the RESV_1 is set at 2B.

RESV_1 is transferred to the boundary apparatus $EN_0$ through a connection (indicated by the dotted arrow) which has been prepared in advance and used for the transmission of the Path message PATH in the ATM network 33. The boundary apparatus $EN_1$ is able to know the IP address of the boundary apparatus $EN_0$ by referring to the pass state on the basis of the flow identifier of RESV_1. The boundary apparatus $EN_1$ then knows the ATM address of the boundary apparatus $EN_0$ from the IP address-ATM address conversion table, and transmits RESV_1 thereto.

P42: When the boundary apparatus $EN_0$ on the transmission side receives RESV_1 from the receiving terminal $R_1$, the entry timer starts.

P43: The boundary apparatus $EN_0$ receives the Reserve message RESV_n from the receiving terminal $R_n$ within the entry time.

P44: When the entry timer stops, the boundary apparatus $EN_0$ determines the largest one of the bandwidths in the requests received until this point of time as the bandwidth of a p-mp connection to be established. More specifically, if the Reserve messages RESV_1 to RESV_n have been received from the receiving terminals $R_1$ to $R_n$ within the entry time, the bandwidth of the p-mp connection is determined by max {RESV_1, . . . , RESV_n}. In this example, it is 5B.

P45: The boundary apparatus $EN_0$ on the transmission side establishes a p-mp connection. In this example, a connection of the bandwidth of 5B is established between the boundary apparatus $EN_0$ and the boundary apparatus $EN_1$, which has transmitted the request for resource received first, in accordance with the above-described signaling procedure (transmission and reception of SETUP, CONNECT messages).

P46: At the same time with the establishment of the connection between the boundary apparatus $EN_0$ on the transmission side and the boundary apparatus $EN_1$ on the reception side, the boundary apparatus $EN_0$ transfers RESV_1 to the transmitting terminal S.

P47: A link of the bandwidth of 5B for the boundary apparatus $EN_n$ is added to the established p-mp connection in accordance with a signaling procedure using an ADD PARTY message (addition of a leaf).

P48: At the same time with the establishment of the connection between the boundary apparatus $EN_0$ on the transmission side and the boundary apparatus $EN_n$ on the reception side, the boundary apparatus $EN_0$ transfers RESV_n to the transmitting terminal S.

According to this system, it is possible to save the connection resource (VCIs, bandwidth) between the boundary apparatus $EN_0$ on the transmission side and the ATM switch. On the other hand, there is a possibility of the bandwidth of the link between the ATM switch and each of the boundary apparatuses $EN_1$ to $EN_n$ on the reception side partially enlarging. In FIG. 9, the bandwidth between the ATM switch and the boundary apparatus $EN_1$ on the reception side is larger than the required bandwidth by 3B (=5B−2B).

Re-establishing of the Existent Connection

A system for changing an established connection will now be explained in detail.

It is assumed that a p-mp connection has already been established in a system in which a single p-mp connection accommodates a session. At this time, if the boundary apparatus $EN_0$ on the transmission side receives a request for resource from a new receiver, and the required bandwidth is larger than that of the existent p-mp connection, the existent p-mp connection is re-established.

Figure 10:
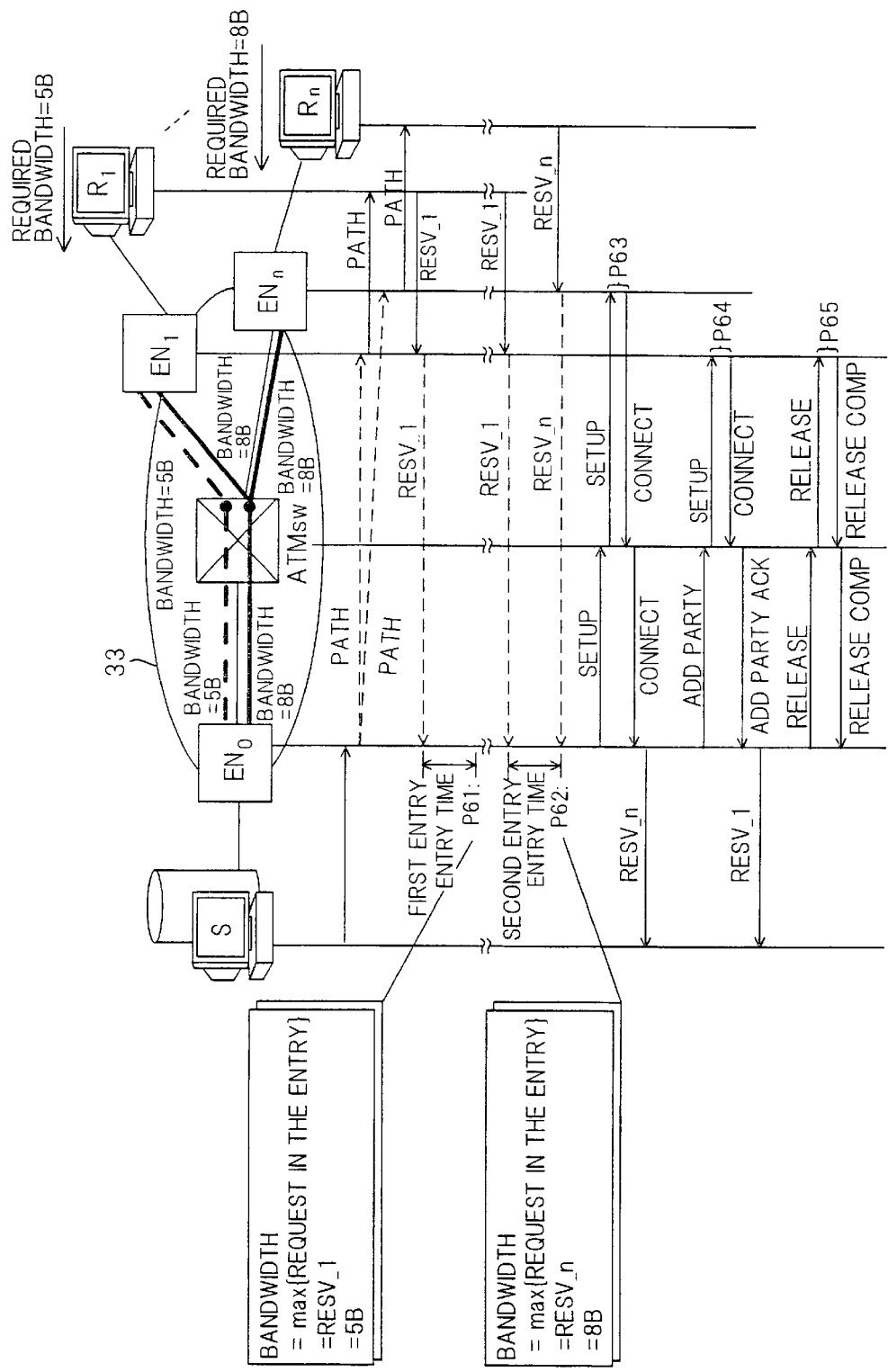
FIG. 10 shows a sequence for re-establishing a connection when a newly required bandwidth is larger than the bandwidth of a p-mp connection.

FIG. 10 shows the sequence for such a p-mp connection re-establishing operation. In FIG. 10, a Path message PATH periodically reaches each of the receiving terminals $R_1$ to $R_n$ from the transmitting terminal S. Thereafter, the connection is re-established in accordance with the following sequence.

P61: At a first entry, the boundary apparatus $EN_0$ on the transmission side receives the Reserve message RESV_1 requesting a bandwidth of 5B from the receiving terminal $R_1$, and the entry time stops, thereby ending the first entry. The boundary apparatus $EN_0$ thereafter establishes a connection of a bandwidth of 5B between the boundary apparatuses $EN_0$ and $EN_1$.

P62: At a second entry, the boundary apparatus $EN_0$ on the transmission side continues to receive the Reserve message RESV_1 requesting a bandwidth of 5B from the receiving terminal $R_1$. In addition, a Reserve message RESV_n requesting a bandwidth of 8B reaches the boundary apparatus $EN_0$ on the transmission side from the receiving terminal $R_n$ via the boundary apparatus $EN_n$.

When the entry time is up, the boundary apparatus $EN_0$ compares the required bandwidth which has arrived with the bandwidth of the existent p-mp connection in the same transmission session. In this example, since the newly required bandwidth (=8B) is larger than the bandwidth (=5B) of the existent connection, the connection is started to be re-established.

P63: The boundary apparatus $EN_0$ on the transmission side first establishes a new p-mp connection of a bandwidth of 8B between the boundary apparatus $EN_0$ and the boundary apparatus $EN_n$ which has transmitted the new request in accordance with the above-described signaling procedure. The boundary apparatus $EN_0$ then transfers RESV_n to the transmitting terminal S.

P64: The boundary apparatus $EN_0$ next adds the boundary apparatus $EN_1$ to the new connection of the bandwidth of 8B in accordance with the above-described signaling procedure using ADD PARTY, and transfers RESV_1 to the transmitting terminal S.

P65: The boundary apparatus $EN_0$ immediately releases the old connection of the bandwidth of 5B between the boundary apparatuses $EN_0$ and $EN_1$ in accordance with a predetermined signaling procedure. In this example, the boundary apparatus $EN_0$ transmits a release message RELEASE to the boundary apparatus $EN_1$ via the ATM switch, and the boundary apparatus $EN_1$ returns a release acknowledgement message RELEASE COMP to the boundary apparatus $EN_0$ via the ATM switch.

According to this system, it is possible to hold the consumption of the resource in the ATM network 33 within a certain level by re-establishing the existent p-mp connection without adding a new connection. However, if the connection re-establishing operation is executed frequently, the processing load on the ATM switch in the ATM network 33 increases, which necessitates the adjustment of the entry time.

Addition of a Leaf to the Existent Connection

If the boundary apparatus $EN_0$ on the transmission side receives a request for resource from a new receiver, and the required bandwidth is smaller than the bandwidth of the existent p-mp connection, the link (leaf) corresponding to the request is added to the existent p-mp connection. In this system, if a new request for a bandwidth smaller than the bandwidth of the existent p-mp connection is received in an optional entry after a first entry, a new link is added to the existent p-mp connection.

Figure 11:
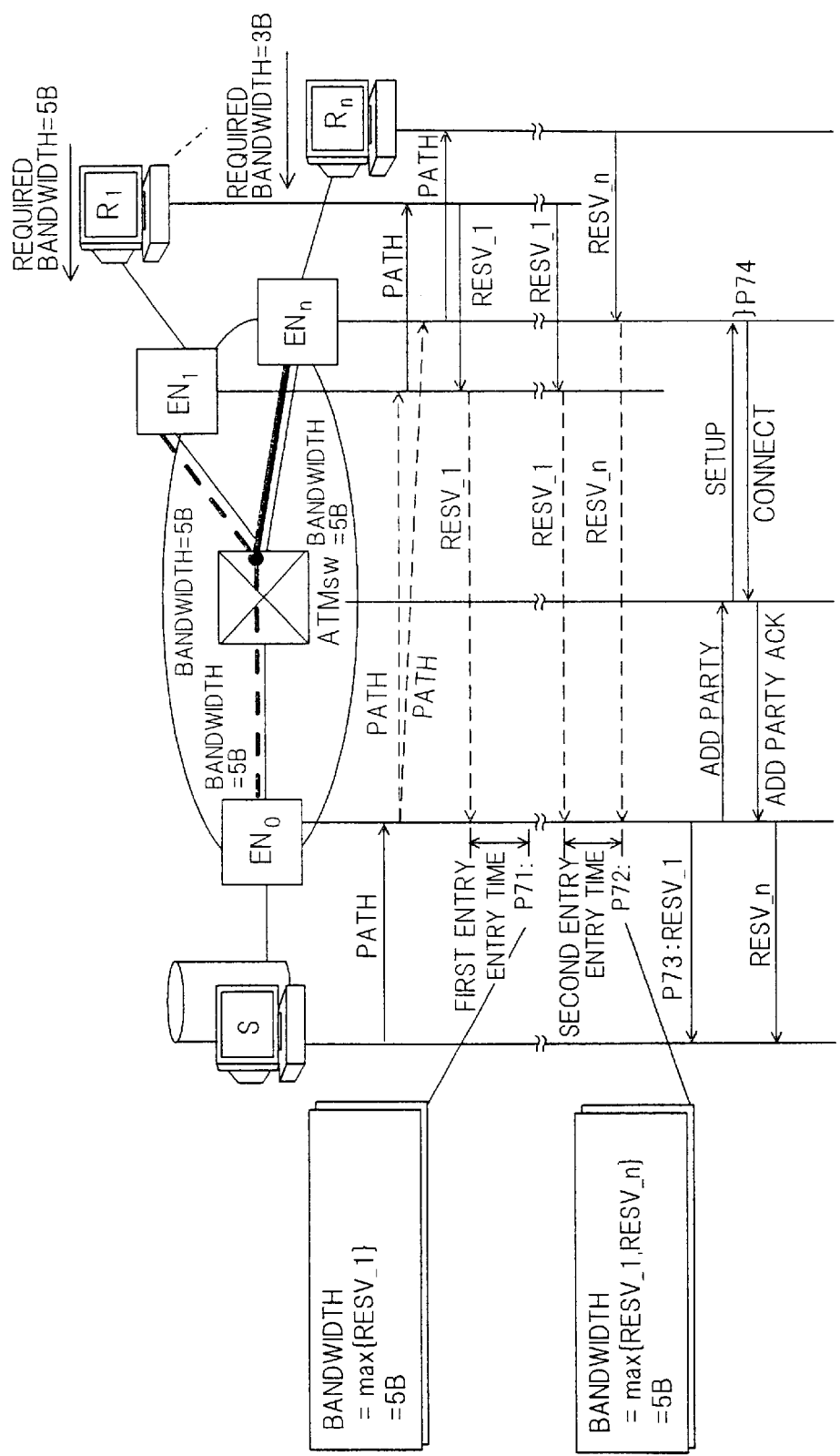
FIG. 11 shows a sequence for adding a leaf when a newly required bandwidth is smaller than the bandwidth of an existent p-mp connection.

FIG. 11 shows the sequence for such a connection re-establishing operation. In FIG. 11, a Path message PATH periodically reaches each of the receiving terminals $R_1$ to $R_n$ from the transmitting terminal S. Thereafter, the connection is changed in accordance with the following sequence.

P71: At a first entry, the boundary apparatus $EN_0$ on the transmission side receives the Reserve message RESV_1 requesting a bandwidth of 5B from the receiving terminal $R_1$, and the entry time stops, thereby ending the first entry. The boundary apparatus $EN_0$ thereafter establishes a connection of a bandwidth of 5B between the boundary apparatuses $EN_0$ and $EN_1$.

P72: At a second entry, the boundary apparatus $EN_0$ continues to receive the Reserve message RESV_1 requesting a bandwidth of 5B from the receiving terminal $R_1$. In addition, a Reserve message RESV_n requesting a bandwidth of 3B reaches the boundary apparatus $EN_0$ on the transmission side from the receiving terminal $R_n$ via the boundary apparatus $EN_n$.

When the entry time is up, the boundary apparatus $EN_0$ compares the required bandwidth which has arrived with the bandwidth of the existent p-mp connection in the same transmission session. In this example, since the newly required bandwidth (=3B) is smaller than the bandwidth (=5B) of the existent connection, the new receiver is started to be added to the connection.

P73: Since there is no necessity of re-establishing the connection, the boundary apparatus $EN_0$ immediately transfers RESV_n to the transmitting terminal S.

P74: The boundary apparatus $EN_0$ next adds the boundary apparatus $EN_n$ to the existent connection of the bandwidth of 5B in accordance with the above-described signaling procedure using ADD PARTY, and transfers RESV_n to the transmitting terminal S.

According to this system, since it is possible to deal with a new request merely by adding a link to the p-mp connection, it is possible to hold the consumption of the resource in the ATM network 33 within a certain level.

Flow of a Connection Establishing Operation

Figure 12:
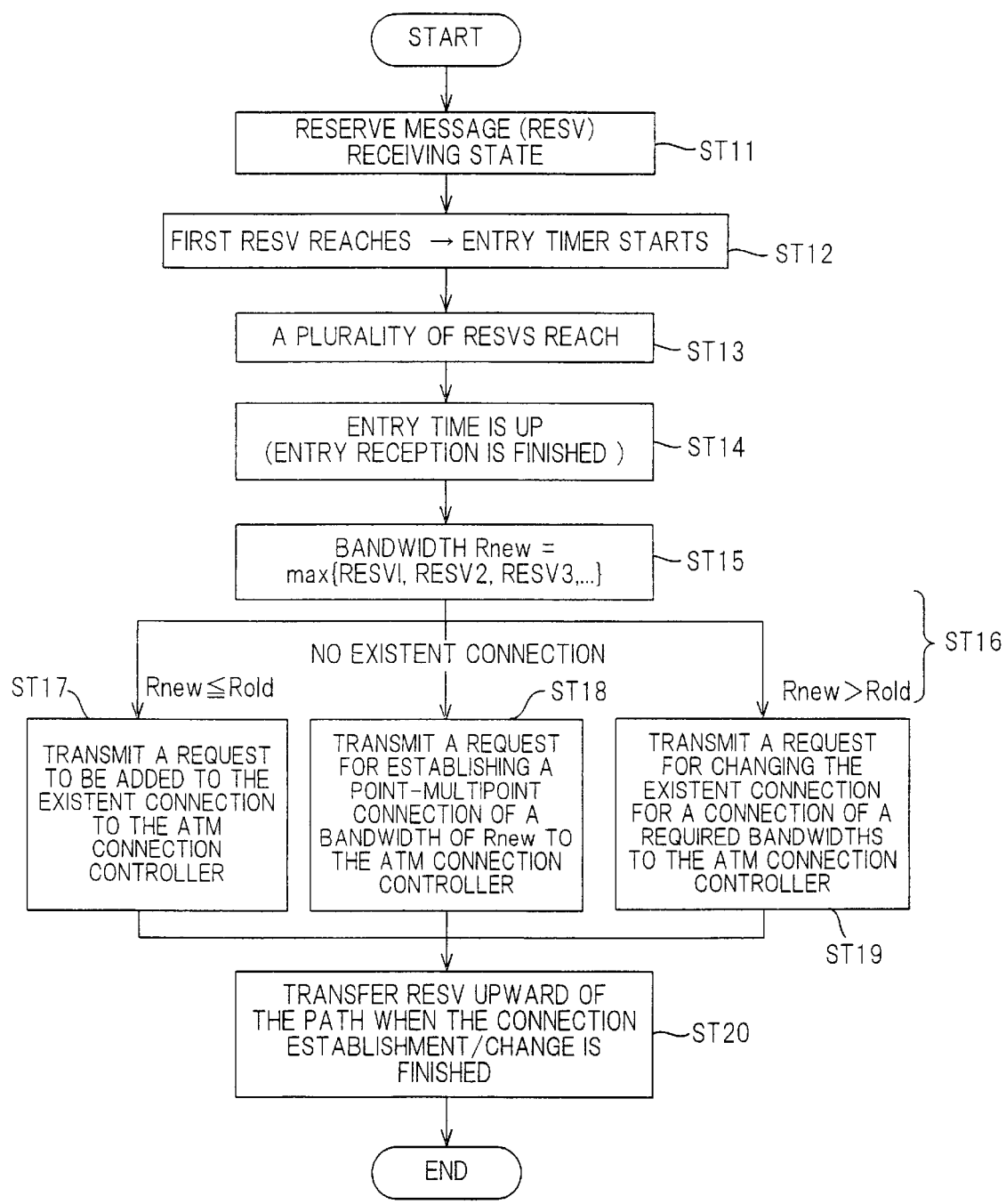
FIG. 12 is a flowchart of the operation of establishing a connection by a boundary apparatus on the transmission side in accordance with FIGS. 9 to 11.

FIG. 12 is a flowchart of the operation of the boundary apparatus $EN_0$ on the transmission side in a system provided with any of the sequences shown in FIGS. 9 to 11. After transmitting a Path messages PATH to the receiving terminals $R_1$ to $R_n$, the boundary apparatus $EN_0$ assumes a Reserve message RESV receiving state (step ST11), and when a first Reserve message RESV_1 reaches, it starts the entry timer 45 (step ST12). Thereafter, other Reserve messages (step ST13) arrive, and when the entry timer 45 stops, the reception of a Reserve message is finished (step ST14).

The entry controller 44 then obtains the maximum value Rnew of the bandwidths required in the received Reserve messages RESV1, RESV2, RESV3, . . . (step ST15). If the existent p-mp connection exists with respect to the same transmission session, the entry controller 44 compares Rnew with the bandwidth Rold of the existent p-mp connection (step ST16).

If there is an existent connection, and Rnew≦Rold, the entry controller 44 instructs the ATM connection controller 47 to add the boundary apparatus on the reception side corresponding to the received Reserve message to the existent connection via the ATM resource judging portion 46. The ATM connection controller 47 executes the instructed adding leaf operation in accordance with the sequence shown in FIG. 11 (step ST17).

At the step ST16, if there is no existent connection with respect to the same transmission session, the entry controller 44 instructs the ATM connection controller 47 to establish a p-mp connection of a bandwidth of Rnew via the ATM resource judging portion 46, and the ATM connection controller 47 establishes the p-mp connection in accordance with the sequence shown in FIG. 9 (step ST18).

At the step ST16, if there is an existent connection with respect to the same transmission session, and Rnew>Rold, the entry controller 44 instructs the ATM connection controller 47 to change the existent connection for a connection of a bandwidth of Rnew via the ATM resource judging portion 46. The ATM connection controller 47 executes the instructed connection re-establishing operation in accordance with the sequence shown in FIG. 10 (step ST19).

When the instructed connection establishment/change is finished, the packet transmitting portion 50 transfers the Reserve message upward of the path (step ST20), thereby ending the operation.

(b) Second Bandwidth Determining Method
Decision of a Bandwidth Based on the Maximum Bandwidth Estimated from the Path Message In a system for determining a bandwidth on the basis of the traffic characteristic reported from the sender, the bandwidth of a connection is decided on the basis of the Path message PATH transmitted from the sender.

Figure 13:
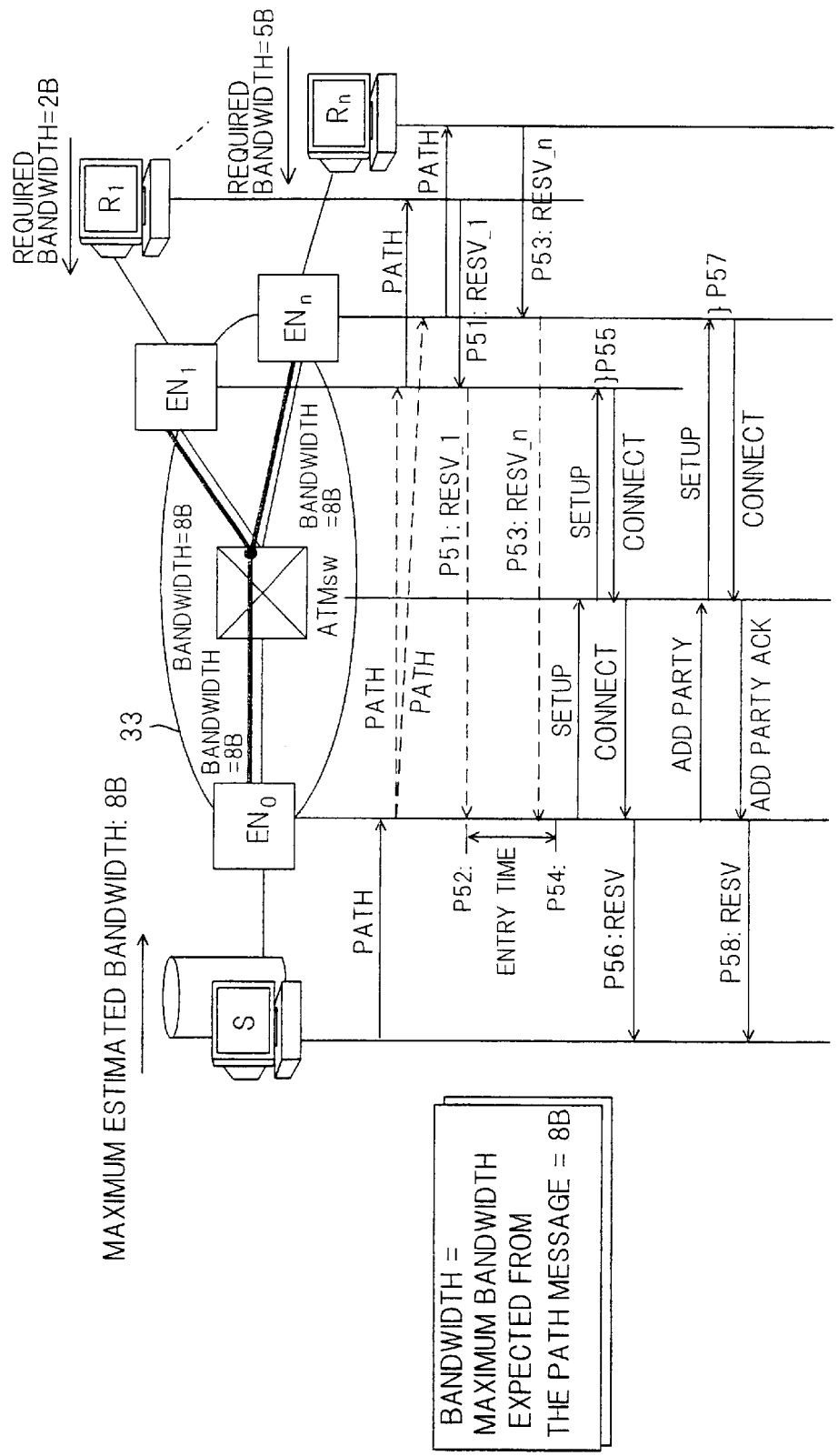
FIG. 13 shows a sequence for determining the bandwidth of a p-mp connection on the basis of the maximum bandwidth estimated from a Path message (second bandwidth determining method)
Figure 63:
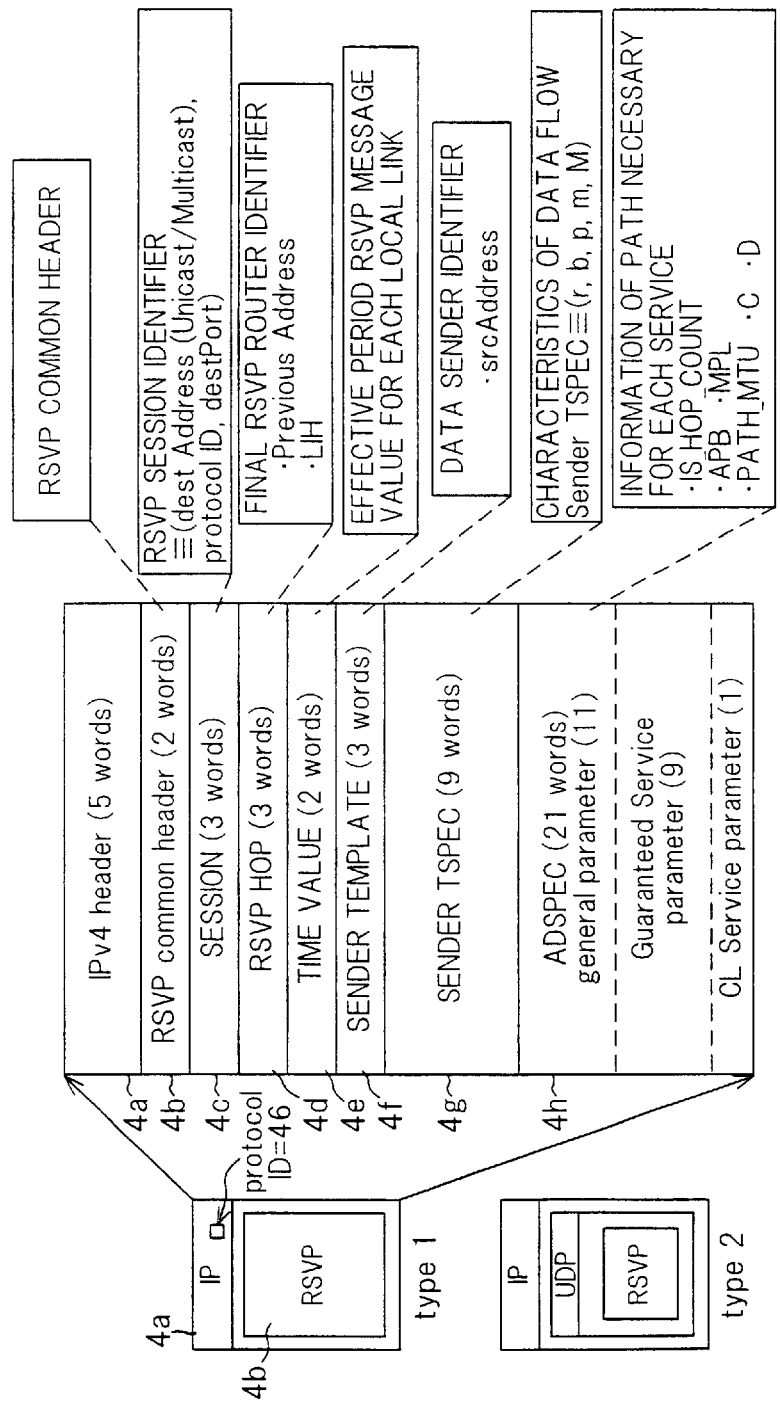
FIG. 63 shows an RSVP message (PATH message)
Figure 64:
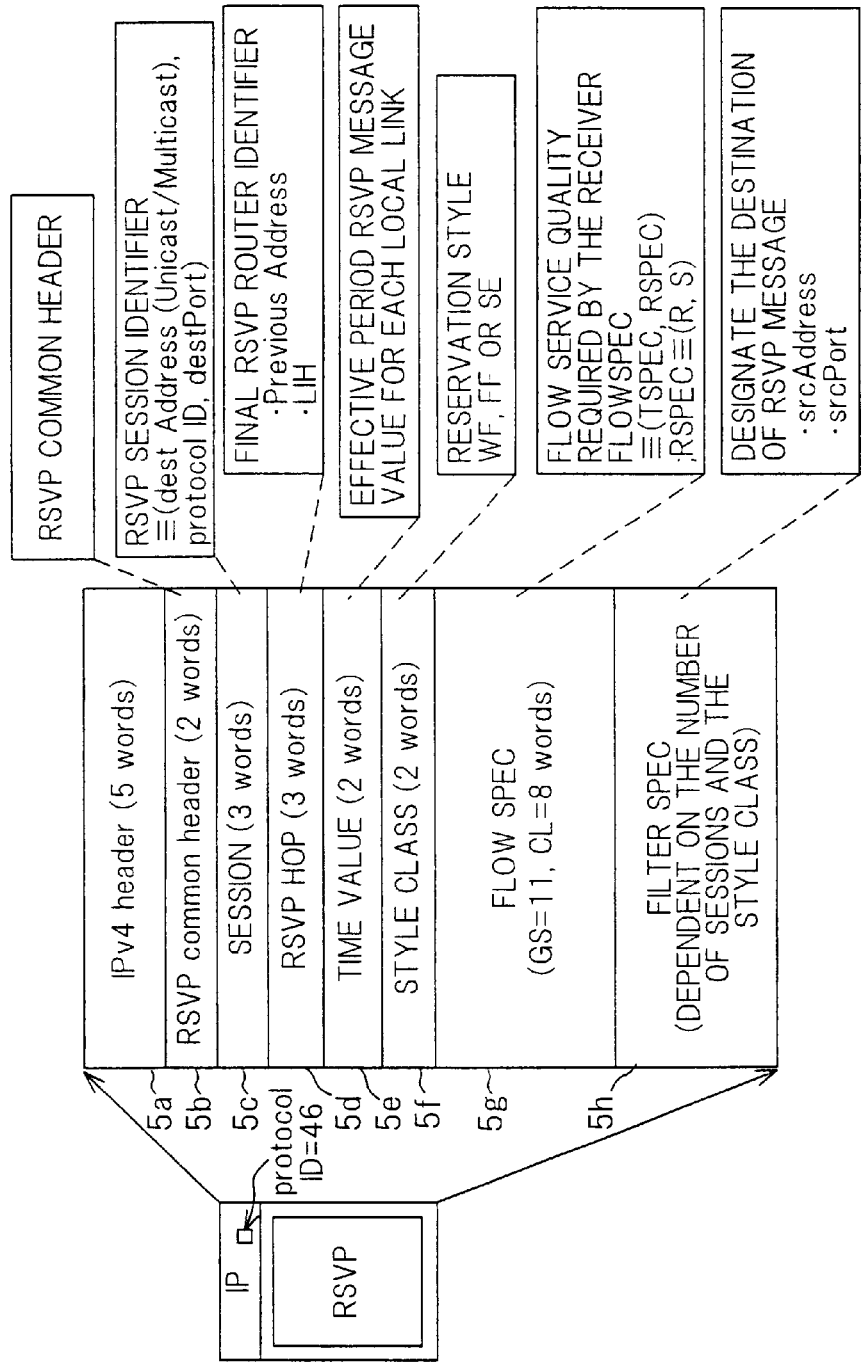
FIG. 64 shows an RSVP message (RESV message)
Figure 65:
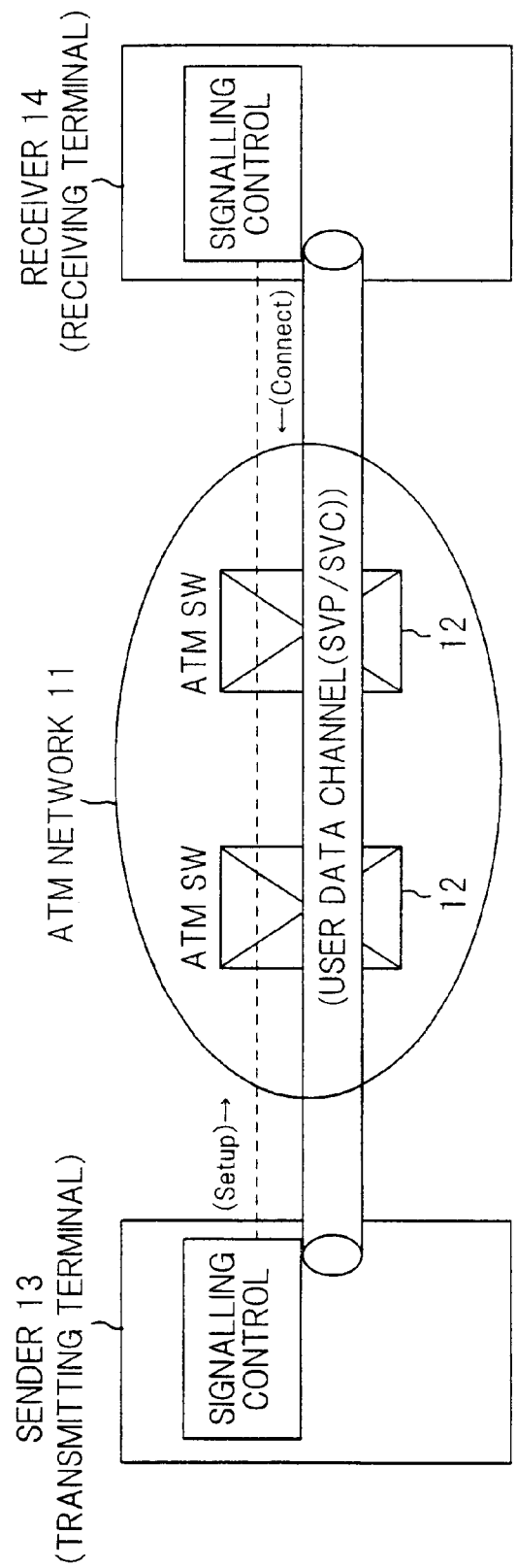
FIG. 65 shows an ATM connection control in the prior art.
Figure 66:
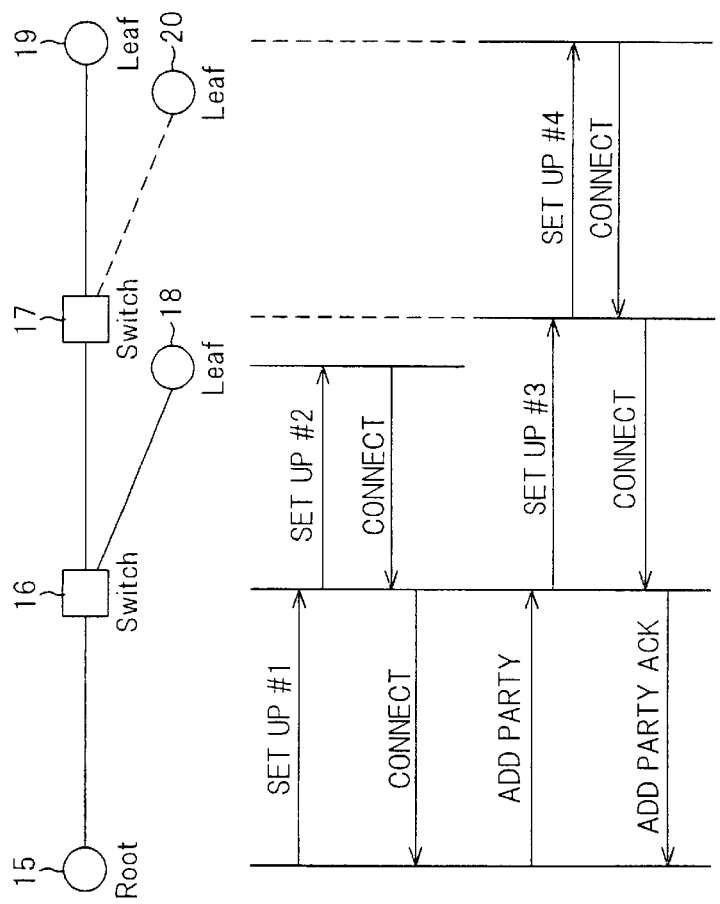
FIG. 66 shows a point-multipoint call control in the prior art.

FIG. 13 shows a sequence for establishing a connection in such a system. In FIG. 13, the data traffic characteristic of the transmitting terminal S is written in the SENDER TSPEC field in the Path message PATH (see FIG. 63), and it is transferred to each of the receiving terminals $R_1$ to $R_n$. Thereafter, a connection is established in accordance with the following sequence.

P51: The receiving terminal $R_1$ transmits a Reserve message RESV_1. As a result, a request for a bandwidth of 2B reaches the boundary apparatus $EN_0$ on the transmission side via the boundary apparatus $EN_1$.

P52: When the boundary apparatus $EN_0$ on the transmission side receives RESV_1 from the receiving terminal $R_1$, the entry timer immediately starts.

P53: Within the entry time, the boundary apparatus $EN_0$ receives RESV_n requesting a bandwidth of 5B from the receiving terminal $R_n$.

P54: When the entry time is up, the boundary apparatus $EN_0$ decides the bandwidth of a p-mp connection to be established with respect to the group of receiving terminals whose request have been received. More specifically, the maximum necessary bandwidth which can be estimated is obtained on the basis of the Path message which the boundary apparatus $EN_0$ holds, and the maximum necessary bandwidth is adopted as the bandwidth of a p-mp connection which is to be established. For example, the peak rate p written in the Path message PATH from the transmitting terminal S is adopted as the maximum estimated bandwidth. In this example, p=8B.

P55: The boundary apparatus $EN_0$ on the transmission side establishes a p-mp connection of a bandwidth of 8B. That is, a connection of a bandwidth of 8B is established between the boundary apparatus $EN_0$ and the boundary apparatus $EN_1$, which has transmitted the request for resource received first, in accordance with the above-described signaling procedure.

P56: At the same time with the establishment of the connection between the boundary apparatus $EN_0$ on the transmission side and the boundary apparatus $EN_1$ on the reception side, the boundary apparatus $EN_0$ transfers RESV_1 to the transmitting terminal S.

P57: A link of the bandwidth of 8B for the boundary apparatus $EN_n$ is added to the established p-mp connection in accordance with the above-described signaling procedure using an ADD PARTY message (addition of a leaf).

P58: At the same time with the establishment of the connection between the boundary apparatus $EN_0$ on the transmission side and the boundary apparatus $EN_n$ on the reception side, the boundary apparatus $EN_0$ transfers RESV_n to the transmitting terminal S.

According to this system, since the maximum bandwidth is secured in advance on the basis of the traffic characteristic reported from the sender, when a new receiver is added thereafter, a newly required bandwidth never exceeds the existent bandwidth. It is therefore advantageously unnecessary to re-establish the existent connection.

This system is, however, considered to be disadvantageous from the point of view of the effective use of a bandwidth. In addition, in adopting this system, attention must be paid to the fact that it is difficult to decide the maximum bandwidth with respect to a maximum delay guarantee service for which the parameter of a request for resource from a receiver must be referred to.

Flow of a Connection Establishing Operation

Figure 14:
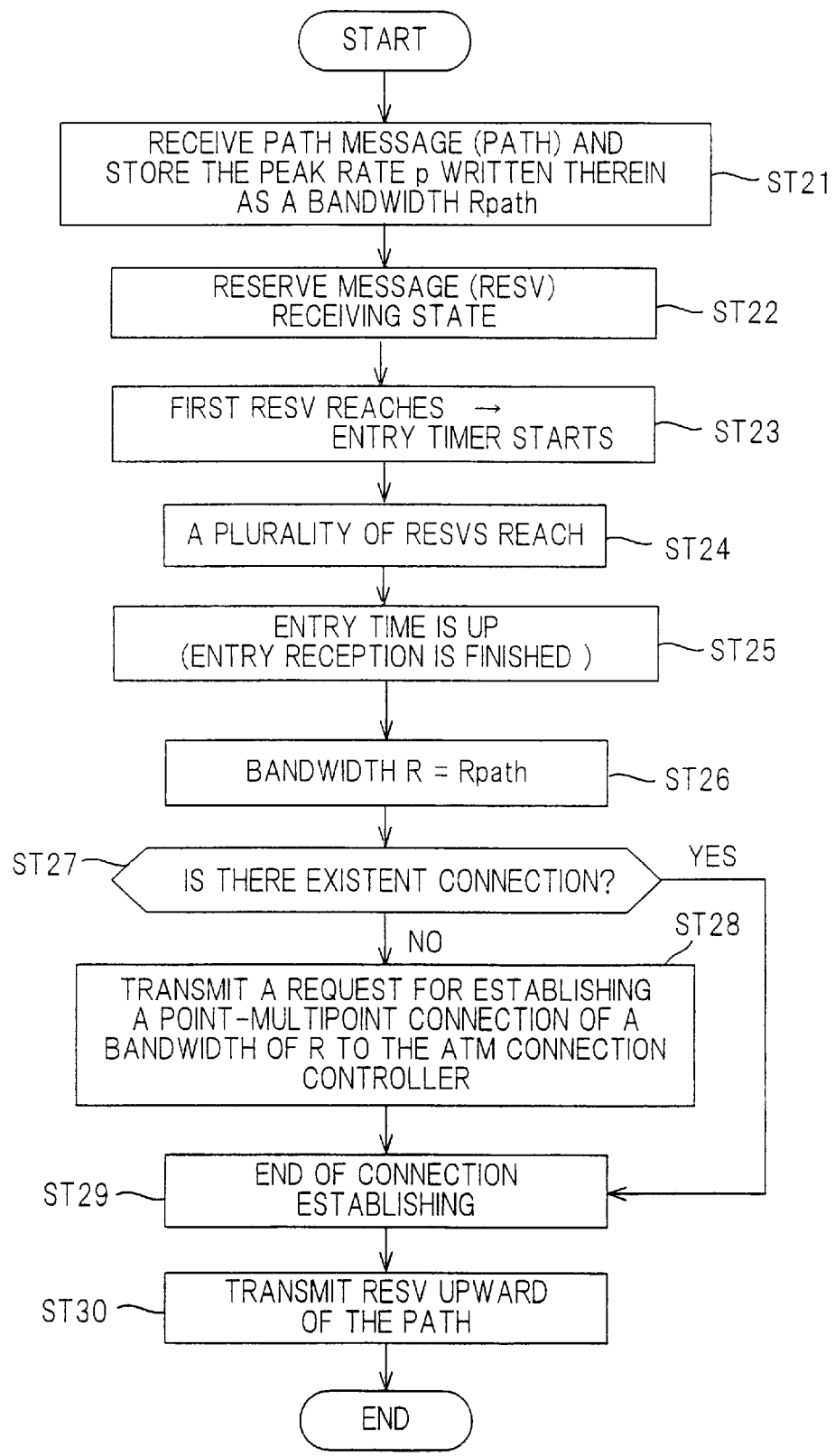
FIG. 14 is a flowchart of the operation of establishing a connection by a boundary apparatus on the transmission side in accordance with FIG. 13.

FIG. 14 is a flowchart of the operation of the boundary apparatus $EN_0$ on the transmission side in the system provided with the sequence shown in FIG. 13.

When the boundary apparatus $EN_0$ receives the Path message PATH from the transmitting terminal S, it stores the peak rate p written in the message in the entry controller 44 as a bandwidth Rpath (step ST21). The operations at the subsequent steps ST22, ST23, ST24 and ST25 are the same as the operations at the steps ST11, ST12, ST13 and ST14 shown in FIG. 12.

The entry controller 44 then decides that a bandwidth R=Rpath (step ST26), and judges whether or not there is an existent connection (step ST27). If there is no existent connection with respect to the same transmission session, the entry controller 44 instructs the ATM connection controller 47 to establish a p-mp connection of the bandwidth of R via the ATM resource judging portion 46. The ATM connection controller 47 executes the instructed connection establishing operation (step ST28).

When the instructed connection establishing operation is finished (step ST29), the packet transmitting portion 50 transfers the Reserve message upward of the path (step ST30), thereby ending the operation. If there is an existent connection at the step ST27, the operation at the step ST30 is immediately executed, thereby finishing the operation.

(c) Third Bandwidth Determining Method

Figure 15:
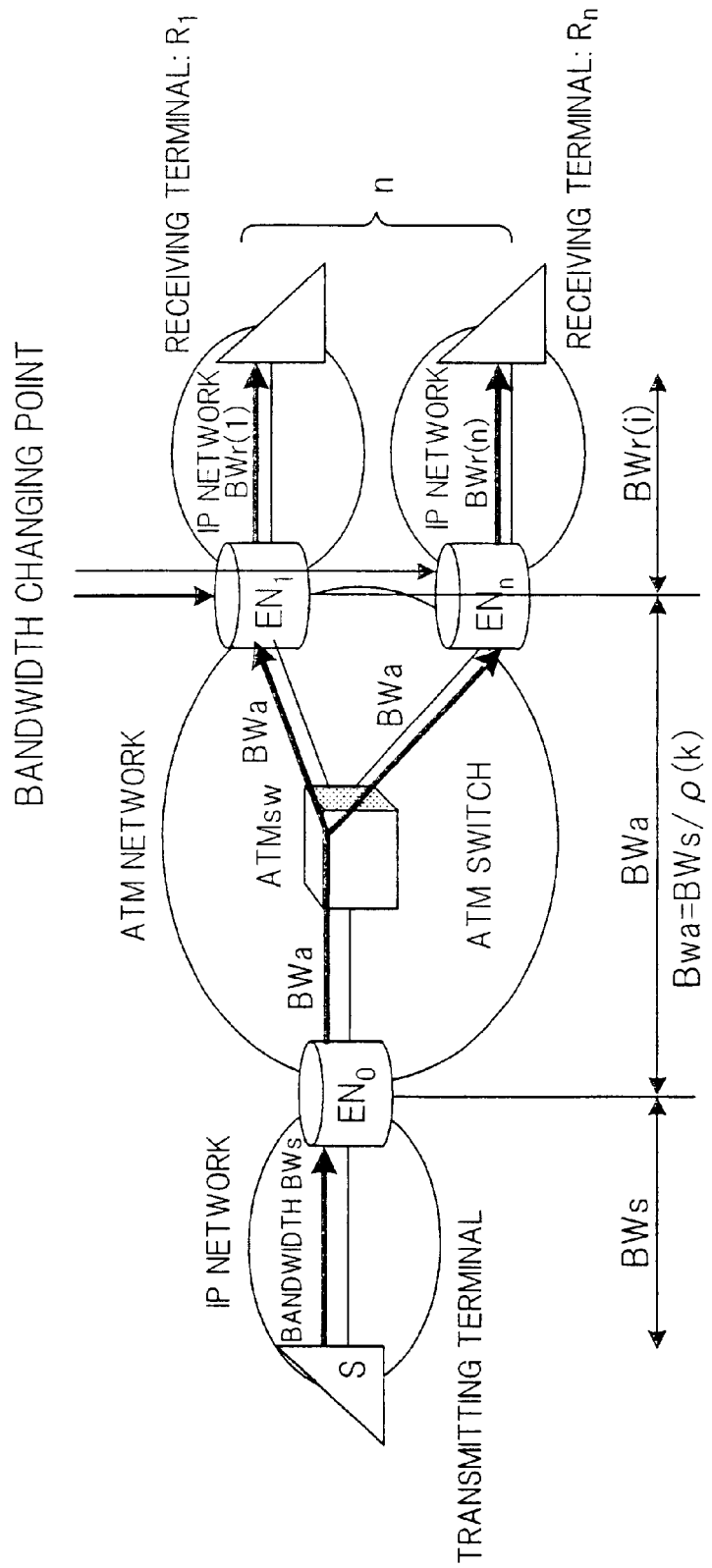
FIG. 15 is an explanatory view of a third bandwidth determining method.

FIG. 15 is an explanatory view of a third bandwidth determining method according to the present invention.

In a third bandwidth determining method, the boundary apparatus $EN_0$ on the transmission side $EN_0$ establishes a p-mp connection between the boundary apparatus $EN_0$ and each of the boundary apparatuses $EN_1$ to $EN_n$ on the reception side, and decides the bandwidth BWa of the connection from the following formula:

$$BWa = BWs/\rho(k) \tag{1}$$

wherein BWs represents a bandwidth recommended by the transmitting terminal S and written in the SENDER TSPEC field of the Path message PATH, k the number of connections accommodated in the link between the boundary apparatus $EN_0$ on the transmission side and the ATM switch ATMsw, and $\rho(k)$ a permissible usage ratio ($\rho(k) \leq 1$). The permissible usage ratio $\rho(k)$ is, for example, 1.0 when the number of connections k is not more than a preset value, while it is 0.8 to 0.9 when k is larger than the present value.

In FIG. 15, a Path message PATH has already reached each of the receiving terminals $R_1$ to $R_n$ from the transmitting terminal S via the boundary apparatuses $EN_0$ to $EN_n$ with respect to a predetermined transmission session. In the SENDER TSPEC field of the Path message PATH is written a data traffic characteristic including the recommended bandwidth BWs.

If each receiving terminal $R_i$ (i=1, 2, . . . n) wants the reception of the transmission data, it creates a Reserve message RESV_i including a service quality (required bandwidth BWr(i), etc., provided that BWr(i)≦BWs) and transmits it to the boundary apparatus $EN_i$ on the reception side.

When the boundary apparatus $EN_i$ on the reception side receives the Reserve message, it judges whether or not the required bandwidth BWr(i) is different from the recommended bandwidth BWs written in the Path message PATH. If it is different, the boundary apparatus $EN_i$ changes BWr(i) for BWs, and transmits the Reserve message RESV_i to the boundary apparatus $EN_0$ on the transmission side. In other words, the bandwidth conversion point is the boundary apparatus $EN_i$ on the reception side.

If the boundary apparatus $EN_0$ on the transmission side receives the Reserve message RESV_i from the boundary apparatus $EN_i$ on the reception side, it compares the bandwidth required by each receiving terminal. Since all the required bandwidths are BWs, the bandwidth BWa of a p-mp connection is calculated from the formula (1) with BWs as the maximum required bandwidth. In other words, a connection of a bandwidth of BWa is established between the boundary apparatus $EN_0$ and the boundary apparatus $EN_1$, which has transmitted the request received first, in accordance with the above-described signaling procedure. At the same time with the establishment of the connection between the boundary apparatus $EN_0$ on the transmission side and the boundary apparatus $EN_1$ on the reception side, the boundary apparatus $EN_0$ transfers RESV_1 to the transmitting terminal S.

A link of the bandwidth of BWa for the boundary apparatus $EN_i$ (i=2 to n) is added to the established p-mp connection in accordance with the signaling procedure using an ADD PARTY message. At the same time with the establishment of the connection between the boundary apparatus $EN_0$ on the transmission side and the boundary apparatus $EN_i$ on the reception side, the boundary apparatus $EN_0$ transfers RESV_i to the transmitting terminal S. Subsequently, a connection is established in the same way between the boundary apparatus $EN_0$ on the transmission side and each of all the boundary apparatuses $EN_i$ (i=1, 2, . . . n) on the reception side which have transmitted Reserve messages.

In the above example, there is no existent p-mp connection with respect to the same transmission session. If there is an existent p-mp connection of a bandwidth of BWa, a leaf is added to the existent p-mp connection in accordance with the signaling procedure using an ADD PARTY message (leaf adding procedure).

According to the third method of determining a bandwidth, since the required bandwidth BWr(i) is changed for BWs by the boundary apparatus $EN_i$ on the reception side before the bandwidth is reported to the boundary apparatus $EN_0$ on the transmission side, even if there is a frequent change in the bandwidth required by a receiving terminal, the SVC is not reset, so that it is possible to reduce the number of connections, thereby preventing a waste of the SVC resource (VPI/VCI resource). In addition, since ρ(k) is reduced, i.e., the bandwidth is enlarged with an increase in the number of connections accommodated in the link, even if the allocation of a bandwidth becomes unstable due to an increase in the number of accommodated connections, it is possible to transmit data with a quality desired by a user.

(d) Fourth Method of Determining a Bandwidth

Figure 16:
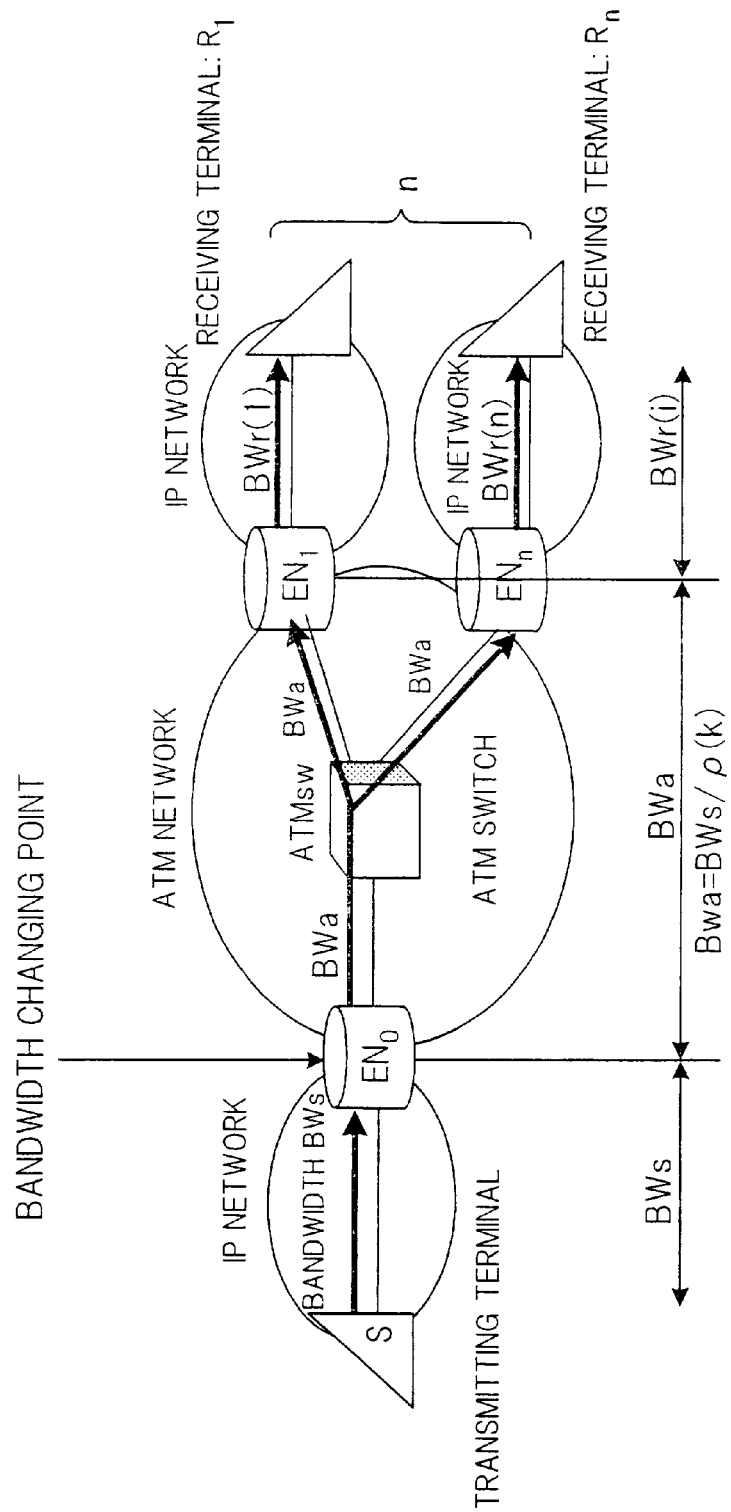
FIG. 16 is an explanatory view of a fourth bandwidth determining method.

FIG. 16 is an explanatory view of a fourth method of determining a bandwidth.

In the fourth method of determining a bandwidth, the boundary apparatus $EN_0$ on the transmission side establishes a p-mp connection for each of the boundary apparatuses $EN_1$ to $EN_n$ on the reception side and determines the bandwidth of the connection from the following formula in the same way as in the third method:

$$BWa = BWs/\rho(k)$$

However, while the bandwidth conversion point is the boundary apparatus $EN_i$ on the reception side in the third method, it is the boundary apparatus $EN_0$ on the transmission side in the fourth method.

In FIG. 16, a Path message PATH has already reached each of the receiving terminals $R_1$ to $R_n$ from the transmitting terminal S via the boundary apparatuses $EN_0$ to $EN_n$ with respect to a predetermined transmission session. In the SENDER TSPEC field of the Path message PATH is written a data traffic characteristic including the recommended bandwidth BWs.

If each receiving terminal $R_i$ (i=1, 2, . . . n) wants the reception of the transmission data, it creates a Reserve message RESV_i including a service quality (required bandwidth BWr(i etc.) and transmits it to the boundary apparatus $EN_0$ on the transmission side via the boundary apparatus $EN_i$ on the reception side.

When the boundary apparatus $EN_0$ on the transmission side receives the Reserve message RESV_i requiring a bandwidth of BWr(i) from the boundary apparatus $EN_i$ on the reception side, it changes the required bandwidth BWr(i) for BWs, and calculates the bandwidth Bwa of a p-mp connection from the above formula.

The boundary apparatus $EN_0$ on the transmission side then establishes a p-mp connection of the bandwidth of BWa. In other words, a connection of a bandwidth of BWa is established between the boundary apparatus $EN_0$ and the boundary apparatus $EN_1$, which has transmitted the request received first, in accordance with a predetermined signaling procedure. At the same time with the establishment of the connection between the boundary apparatus $EN_0$ on the transmission side and the boundary apparatus $EN_1$ on the reception side, the boundary apparatus $EN_0$ transfers RESV_1 requiring the bandwidth of BWs to the transmitting terminal S. A link of the bandwidth of BWa for the boundary apparatus $EN_i$ (i=2 to n) is then added to the established p-mp connection in accordance with the signaling procedure using an ADD PARTY message.

At the same time with the establishment of the connection between the boundary apparatus $EN_0$ on the transmission side and the boundary apparatus $EN_i$ on the reception side, the boundary apparatus $EN_0$ transfers RESV_i which requires a bandwidth of BWs to the transmitting terminal S. Subsequently, a connection is established in the same way between the boundary apparatus $EN_0$ on the transmission side and each of all the boundary apparatuses $EN_i$ (i=1 to n) on the reception side which have transmitted Reserve messages.

In the above example, there is no existent p-mp connection with respect to the same transmission session. If there is an existent p-mp connection of a bandwidth of BWa, a leaf is added to the existent p-mp connection in accordance with the signaling procedure using an ADD PARTY message (leaf adding procedure).

According to the fourth method of determining a bandwidth, it is possible to establish a single p-mp connection between the boundary apparatus $EN_0$ on the transmission side and a boundary apparatus $EN_i$ on the reception side by changing a required bandwidth only by the boundary apparatus $EN_0$ on the transmission side, so that a waste of the SVC resource is prevented. In addition, even if there is a frequent change in the bandwidth required by a receiving terminal, the SVC is not reset.

(e) Fifth Method of Determining a Bandwidth

Figure 17:
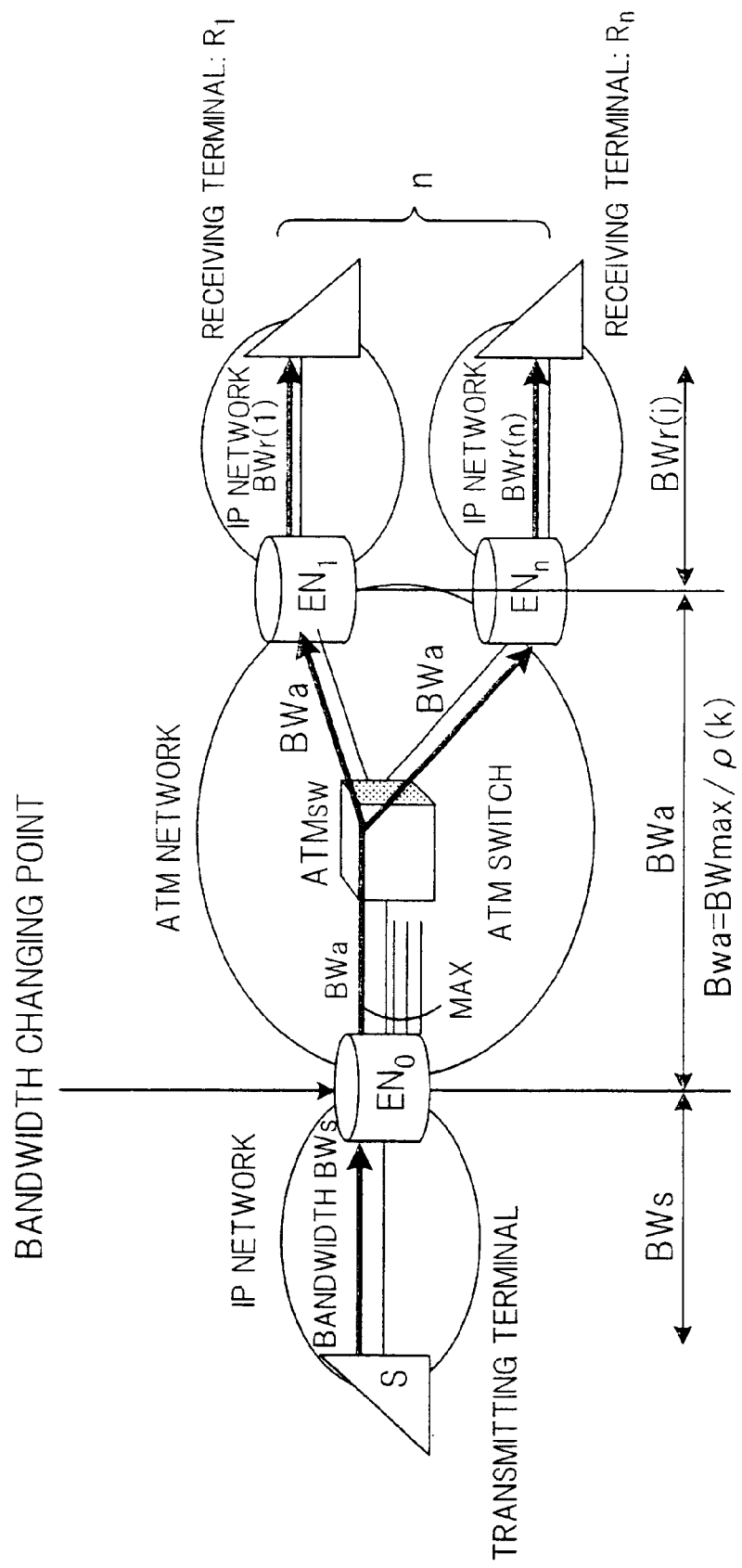
FIG. 17 is an explanatory view of a fifth bandwidth determining method.

FIG. 17 is an explanatory view of a fifth method of determining a bandwidth.

In the fifth method of determining a bandwidth, the boundary apparatus $EN_0$ on the transmission side establishes a p-mp connection for each of the boundary apparatuses $EN_1$ to $EN_n$ on the reception side and determines the bandwidth of the connection from the following formula:

$$BWa = BWmax/\rho(k) \qquad (2)$$

wherein BWmax represents the maximum value of the required bandwidths which have been transmitted from the boundary apparatuses $EN_1$ to $EN_n$ on the reception side, and it is the value indicating the largest bandwidth that have been required by the receiving terminals $R_1$ to $R_n$, k the number of connections accommodated in the link between the boundary apparatus $EN_0$ on the transmission side and the ATM switch ATMsw, and $\rho(k)$ a permissible usage ratio ($\rho(k) \leq 1$).

In FIG. 17, a Path message PATH has already reached each of the receiving terminals $R_1$ to $R_n$ from the transmitting terminal S via the boundary apparatuses $EN_0$ to $EN_n$ with respect to a predetermined transmission session.

If each receiving terminal $R_i$ (i=1, 2, . . . n) wants the reception of the transmission data, it creates a Reserve message RESV_i including a service quality (required bandwidth BWr(i), etc.) and transmits it to the boundary apparatus $EN_0$ on the transmission side via the boundary apparatus $EN_i$ on the reception side.

When the boundary apparatus $EN_0$ on the transmission side receives the Reserve message RESV_i requiring a bandwidth of BWr(i) from the boundary apparatus $EN_i$ on the reception side, it obtains the maximum value BWmax of the required bandwidths BWr(i), changes the required bandwidth BWr(i) for BWmax, and calculates the bandwidth of a p-mp connection from the above formula (2).

The boundary apparatus $EN_0$ on the transmission side then establishes a p-mp connection of the bandwidth of BWa. In other words, a connection of a bandwidth of BWa is established between the boundary apparatus $EN_0$ and the boundary apparatus $EN_1$, which has transmitted the request received first, in accordance with a predetermined signaling procedure. At the same time with the establishment of the connection between the boundary apparatus $EN_0$ on the transmission side and the boundary apparatus $EN_1$ on the reception side, the boundary apparatus $EN_0$ transfers RESV_1 requiring the bandwidth of BWmax to the transmitting terminal S. A link of the bandwidth of BWa for the boundary apparatus $EN_i$ (i=2 to n) is then added to the established p-mp connection in accordance with the signaling procedure using an ADD PARTY message.

At the same time with the establishment of the connection between the boundary apparatus $EN_0$ and the boundary apparatus $EN_i$ on the reception side, the boundary apparatus $EN_0$ on the transmission side transfers RESV_i which requires a bandwidth of BWmax to the transmitting terminal S. Subsequently, a connection is established in the same way between the boundary apparatus $EN_0$ on the transmission side and each of all the boundary apparatuses $EN_i$ (i=1, 2, . . . n) on the reception side which have transmitted Reserve messages.

According to the fifth method of determining a bandwidth, it is possible to establish a single p-mp connection between the boundary apparatus $EN_0$ on the transmission side and a boundary apparatus $EN_i$ on the reception side by changing a required bandwidth only by the boundary apparatus $EN_0$ on the transmission side, so that a waste of the SVC resource is prevented. In addition, even if there is a frequent change in the bandwidth required by a receiving terminal, the number of times for setting an SVC can be reduced. Furthermore, since the bandwidth of the p-mp connection is established at BWa=BWmax/$\rho(k)$, it is possible to transmit data while securing the bandwidth required by the user.

(f) Sixth Method of Determining a Bandwidth

Figure 18:
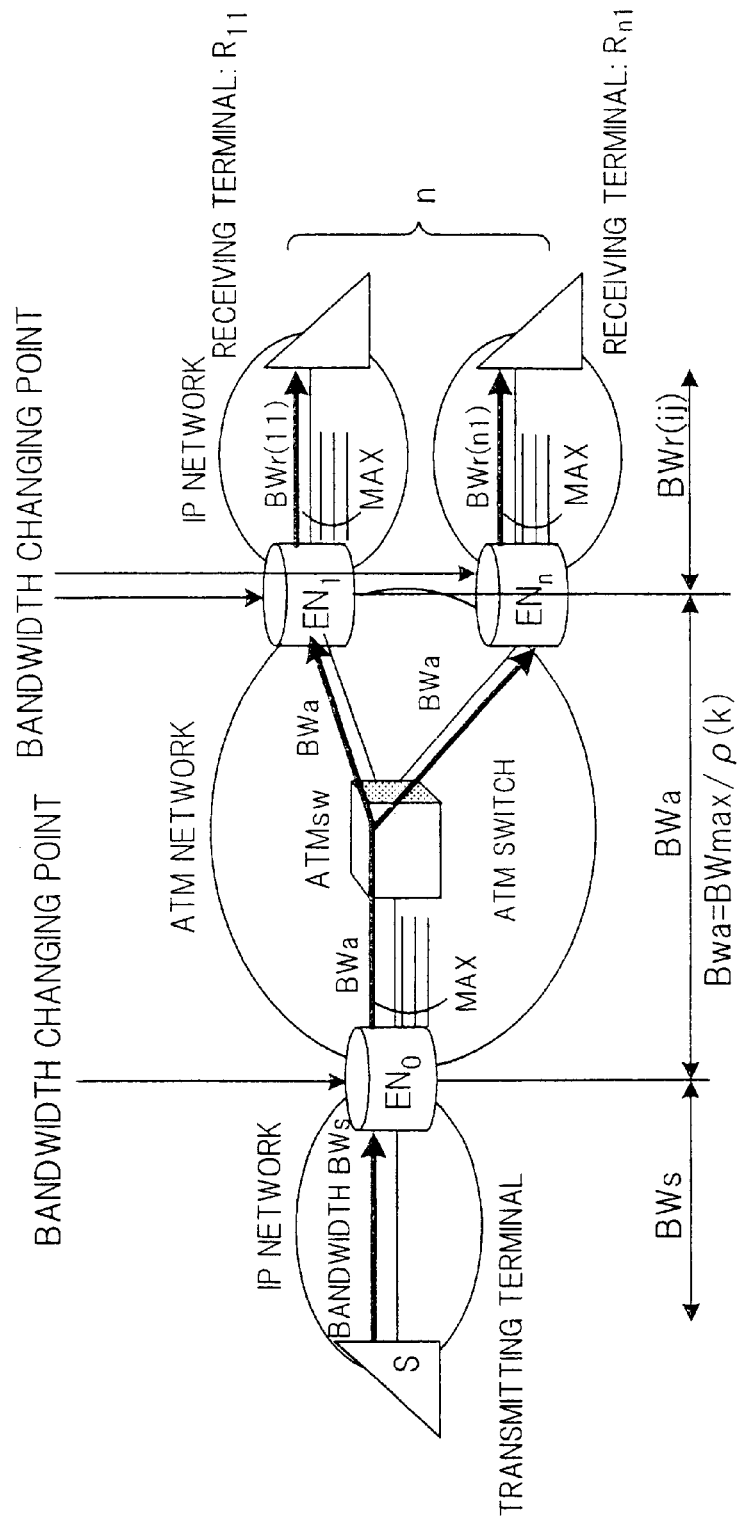
FIG. 18 is an explanatory view of a sixth bandwidth determining method.

FIG. 18 is an explanatory view of a sixth method of determining a bandwidth.

In the sixth method of determining a bandwidth, the boundary apparatus $EN_0$ on the transmission side establishes a p-mp connection for each of the boundary apparatuses $EN_1$ to $EN_n$ on the reception side and determines the bandwidth of the connection from the following formula in the same way as in the fifth method:

$$BWa = BWmax/\rho(k)$$

wherein BWmax represents the maximum value of the required bandwidths which have been transmitted from the boundary apparatuses $EN_1$ to $EN_n$ on the reception side, and it is the value indicating the largest bandwidth that have been required by the receiving terminals $R_1$ to $R_n$. A multiplicity of receiving terminals $R_{ij}$ (j=1 to m) are connected to each boundary apparatus $EN_i$ (i=1 to n) on the reception side, and each receiving terminal transmits a Reserve message RSVP-ij to the boundary apparatus $EN_i$ on the reception side in response to the Path message PATH. The boundary apparatus $EN_i$ on the reception side obtains the maximum value BWr(i) of the required bandwidths BWr(ij), changes each of the required bandwidths BWr(ij) for BWr(i), and transmits a Reserve message RESV_ij to the boundary apparatus $EN_0$ on the transmission side.

When the boundary apparatus $EN_0$ on the transmission side receives the Reserve message from each of the boundary apparatuses $EN_i$ on the reception side, it obtains the maximum value BWmax of the required bandwidths BWr(i), changes the required bandwidth BWr(i) for BWmax, and calculates the bandwidth of a p-mp connection from the above formula.

The boundary apparatus $EN_0$ on the transmission side then establishes a p-mp connection of the bandwidth of BWa. In other words, a connection of a bandwidth of BWa is established between the boundary apparatus $EN_0$ and the boundary apparatus $EN_1$, which has transmitted the request received first, in accordance with a predetermined signaling procedure.

At the same time with the establishment of the connection between the boundary apparatus $EN_0$ on the transmission side and the boundary apparatus $EN_1$ on the reception side, the boundary apparatus $EN_0$ on the transmission side transfers RESV_11 requiring the bandwidth of BWmax to the transmitting terminal S.

A link of the bandwidth of BWa for the boundary apparatus $EN_i$ (i=2 to n) is then added to the established p-mp connection in accordance with the signaling procedure using an ADD PARTY message.

According to the sixth method of determining a bandwidth, it is possible to establish a single p-mp connection between the boundary apparatus $EN_0$ on the transmission side and a boundary apparatus $EN_i$ on the reception side by changing a required bandwidth by the boundary apparatus $EN_0$ on the transmission side and the boundary apparatus $EN_i$ on the reception side, so that a waste of the SVC resource is prevented. In addition, even if there is a frequent change in the bandwidth required by a receiving terminal, the number of times for setting an SVC can be reduced. Furthermore, since the bandwidth of the p-mp connection is established at $BWa=BWmax/\rho(k)$, it is possible to transmit data while securing the bandwidth required by the user.

(g) Modifications

In the third to sixth methods of determining a bandwidth, a p-mp connection of a bandwidth of BWa is established between the boundary apparatus $EN_0$ on the transmission side and each of boundary apparatuses $EN_i$ on the reception side. However, it is also possible to individually establish a p-p connection of a bandwidth of BWa which is obtained in any of the above methods between the boundary apparatus $EN_0$ on the transmission side and each of boundary apparatuses $EN_i$ on the reception side.

In addition, although an ATM connection is individually established by an SVC (Switched Virtual Channel) by transmitting and receiving the messages SETUP, CONNECT, ADD PARTY, etc. in the third to sixth methods of determining a bandwidth, it is also possible to establish a connection by using a PVC (Permanent Virtual Channel).

(G) Judging Policy About the Establishment of a Plurality of p-mp Connections

A policy in the system about the establishment of a plurality of p-mp connections shown in FIG. 5 will now be explained. This system is divided into three systems: fixed class system, variable class system and connection identifier threshold value system, depending upon the judging policy at the time of connection establishment.

(a) Fixed Class System

In a fixed class system, the level of a bandwidth is fixedly classified in advance into x classes. For example, bandwidths of 0 to Bmax are classified into x classes on the basis of the maximum bandwidth Bmax, and the bandwidth of an i-th class (i=1, 2, . . . , x) is set at $Bmax\cdot(i-1)/x$ to $Bmax\cdot i/x$.

The request for resource from each receiving terminal is distributed to the class i which contains the required bandwidth, and a p-mp connection of a bandwidth $Bmax\cdot i/x$ is allotted to the request for resource. If there is already a p-mp connection of class i, the boundary apparatus on the reception side which has transmitted the new request is added to the p-mp connection by using ADD PARTY.

Figure 19:
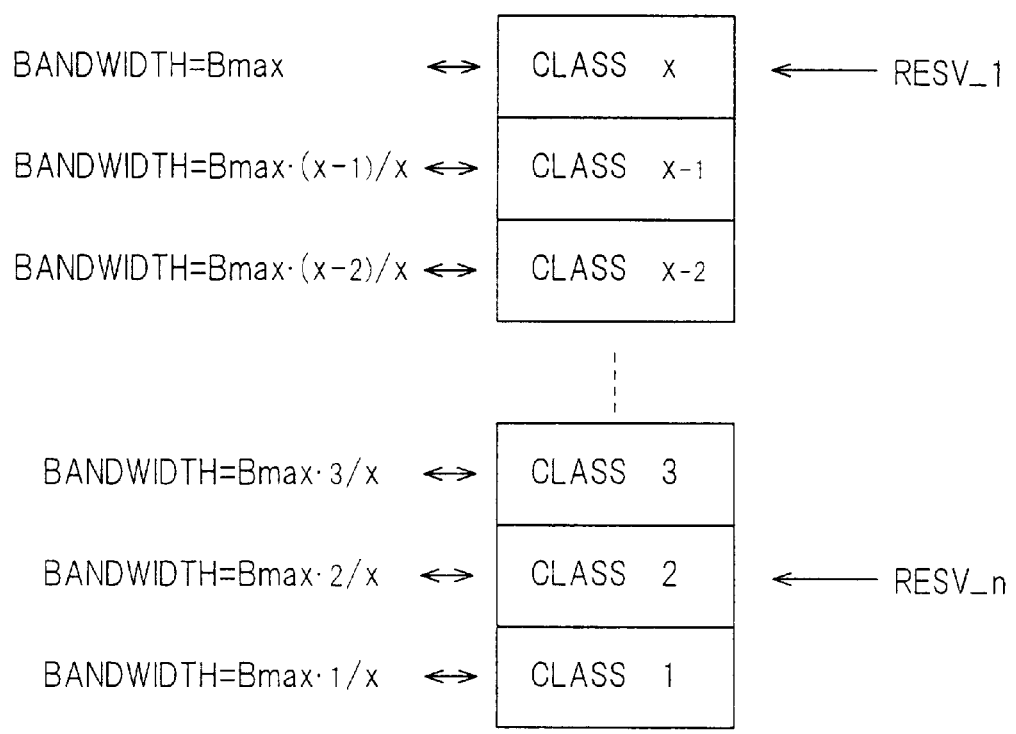
FIG. 19 shows fixed classes.

FIG. 19 shows the correspondence between each class and the bandwidth allotted to the class when the maximum bandwidth is Bmax. It is assumed that the number x of classes is 10, and that the Reserve message RESV_1 from the receiving terminal $R_1$ requires a bandwidth of 0.92 Bmax.

At this time, the RESV_1 which has reached the boundary apparatus $EN_0$ on the transmission side is distributed to class 10, and a p-mp connection of a bandwidth of Bmax is established between the boundary apparatuses $EN_0$ and $EN_1$. If a p-mp connection of a bandwidth of Bmax already exists, the boundary apparatus $EN_1$ is added to the connection by using ADD PARTY.

If the Reserve message RESV_n from the receiving terminal $R_n$ is distributed to class 2, a bandwidth of Bmax/5 (=Bmax·2/10) is allotted to the corresponding connection.

As the method of deciding the bandwidth Bmax, there are some choices. In this example, the peak rate written in the Path message is adopted as Bmax.

Figure 20:
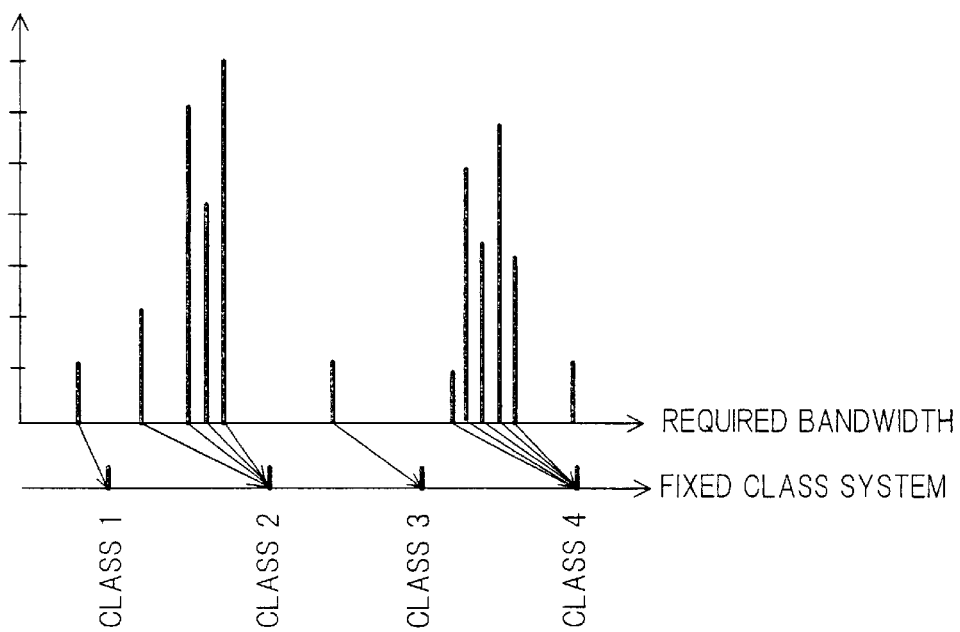
FIG. 20 shows a method of dividing required bandwidths into fixed classes.

FIG. 20 shows the distribution of the bandwidths required in the Reserve messages received by the boundary apparatus $EN_0$ on the transmission side at a certain entry. The abscissa represents a required bandwidth, and the ordinate the number of receiving terminals (Reserve messages) which require the same bandwidth. In FIG. 20, the required bandwidths in the range of classes 1 to 4 are shown, and each of the Reserve messages is distributed to one of classes 1 to 4.

According to this system, since one p-mp connection is allotted to a range of certain bandwidths (one class), the boundary apparatus $EN_0$ on the transmission side is able to limit the maximum number of connections to be established. In addition, the difference between the required bandwidth and the bandwidth of the connection which is established between the ATM switch and the boundary apparatus on the reception side is limited to Bmax/x at most. Accordingly, this system is considered to be a system which is capable of avoiding a waste of resource.

Figure 21:
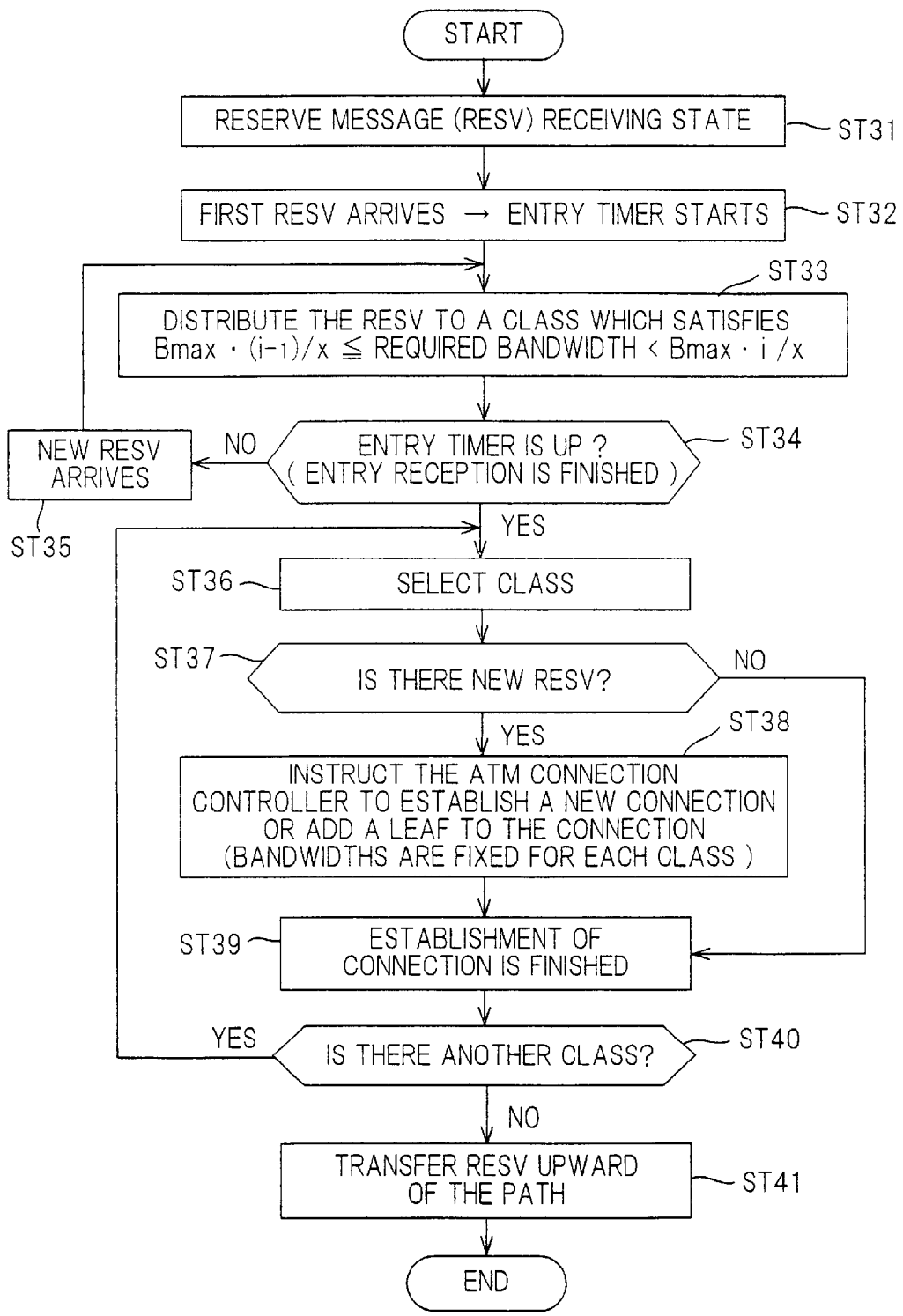
FIG. 21 is a flowchart of the process for adding and re-establishing a connection by dividing required bandwidths into fixed classes by a boundary apparatus on the transmission side in a system in which a plurality of p-mp connections are possible.

FIG. 21 is a flowchart of the operation of the boundary apparatus $EN_0$ on the transmission side in a fixed class system.

After transmitting a Path message PATH to the receiving terminals $R_1$ to $R_n$, the boundary apparatus $EN_0$ assumes a Reserve message RESV receiving state (step ST31). When a first Reserve message arrives, the boundary apparatus $EN_0$ starts the entry timer 45 (step ST32).

The entry controller 44 distributes the Reserve message to class i which satisfies $$Bmax\cdot(i-1)/x \leq \text{required bandwidth} \leq Bmax\cdot i/x$$

by reference to the required bandwidth of the Reserve message (step ST33). Whether or not the entry timer 45 has stopped is judged (step ST34). If the measuring operation by the entry timer 45 has not been finished, and a new Reserve message arrives (step ST35), the distribution of the Reserve message at the step ST33 is executed.

This operation is repeated until the entry timer 45 stops at the step ST34. The entry controller 44 then selects a first class (e.g., class 1) (step ST36), and judges whether or not a new Reserve message exists in the selected class (step ST37).

If a new Reserve message exists and there is not an existent p-mp connection in the same class, the entry controller 44 instructs the ATM connection controller 47 to establish a new connection corresponding to the new Reserve message via the ATM resource judging portion 46 (step ST38).

At this time, if there is an existent p-mp connection in the same class, the entry controller 44 instructs the ATM connection controller 47 to add the boundary apparatus on the reception side which has transmitted the new Reserve message to the existent connection as a leaf. The ATM connection controller 47 executes the instructed operation.

When the establishment of the connection in the class is finished (step ST39), the entry controller 44 judges whether or not there is another unselected class (step ST40).

If there is no new Reserve message at the step ST37, the operations at the steps ST39 and thereafter are executed.

If there is another unselected class at the step ST40, the operations at the steps ST36 and thereafter are repeated, and when there is no unselected class, the packet transmitting portion 50 transfers the Reserve messages RESV upward of the path (step ST41), thereby finishing the operation.

(b) Variable Class System

In the fixed class system, bandwidths are fixedly divided into classes at regular intervals. In contrast, in a variable class system, the bandwidth corresponding to a class is made variable. The method of deciding the maximum bandwidth Bmax is the same as in the fixed class system.

In this system, the maximum number x of connections which the boundary apparatus $EN_0$ on the transmission side establishes with respect to one session is set in advance, and one new p-mp connection is established with respect to a new request for a bandwidth until x p-mp connections are established. Once x p-mp connections are established, a new request for a bandwidth is thereafter merged with the p-mp connection of the bandwidth which is the closest to the required bandwidth. If the bandwidth of the existent p-mp connection which is the closest to the required bandwidth is smaller than the required bandwidth, the p-mp connection is changed for a p-mp connection of the required bandwidth. On the other hand, if the bandwidth of the existent p-mp connection which is the closest to the required bandwidth is larger than the required bandwidth, a link corresponding to the new request is added to the p-mp connection by using ADD PARTY.

Figure 22:
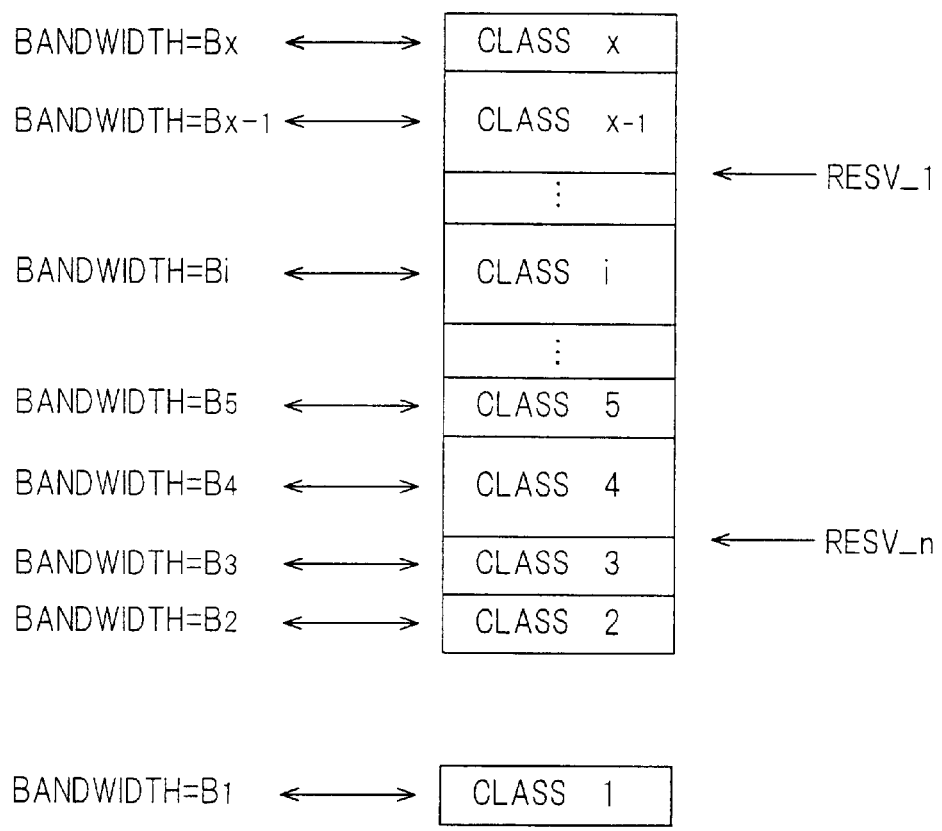
FIG. 22 shows variable classes.

FIG. 22 shows the correspondence between each class and the bandwidth allotted to the class at a certain point of time after the start of entry. In this system, the range of the bandwidth in each class is not always much the same, but there is a general tendency of classes toward congesting in the bandwidths which are required by many receiving terminals, and dispersing in the bandwidths which are required by a few receiving terminals.

Figure 23:
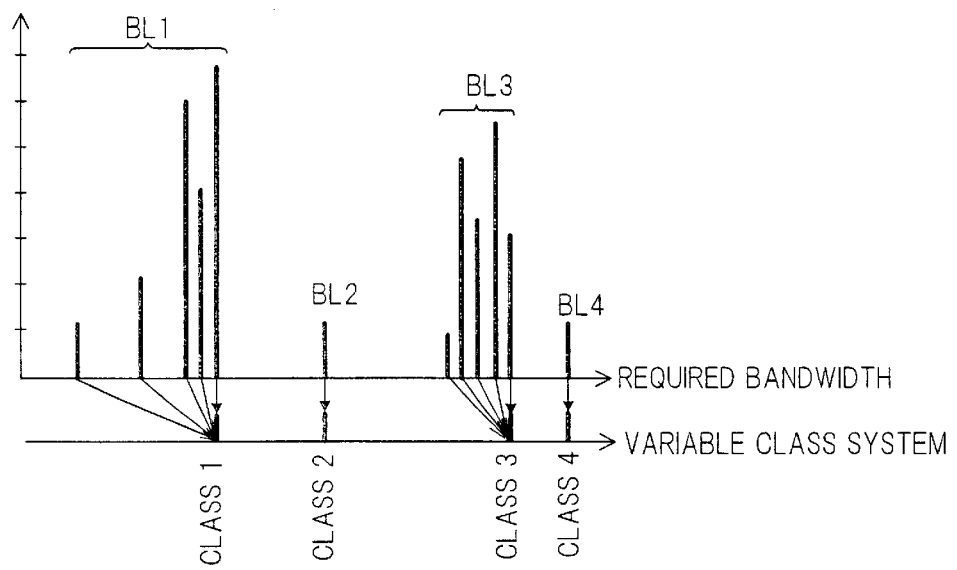
FIG. 23 shows a method of dividing required bandwidths into variable classes.

FIG. 23 shows the distribution of the bandwidths required in the Reserve messages received by the boundary apparatus $EN_0$ on the transmission side at a certain entry. The abscissa represents a required bandwidth, and the ordinate the number of receiving terminals (Reserve messages) which require the same bandwidth.

In FIG. 23, the required bandwidths are classified into 4 blocks: BL1, BL2, BL3 and BL4, and the bandwidth corresponding to the upper limit of each block is set as the bandwidth of the p-mp connection of the class. In other words, classes are organized in accordance with the state in which the required bandwidths are distributed. When this is compared with the distribution shown in FIG. 20, it is clear that the possibility of providing a connection more faithful to the required bandwidth is higher in the variable class system.

Since the organization of classes changes in this system, it is advantageous in the case where required bandwidths closely gather around a certain bandwidth. In this case, classes are finely separated in the vicinity of the bandwidth where requests closely gather, but classes are roughly divided in the bandwidths which are required by a few receiving terminals.

Figure 24:
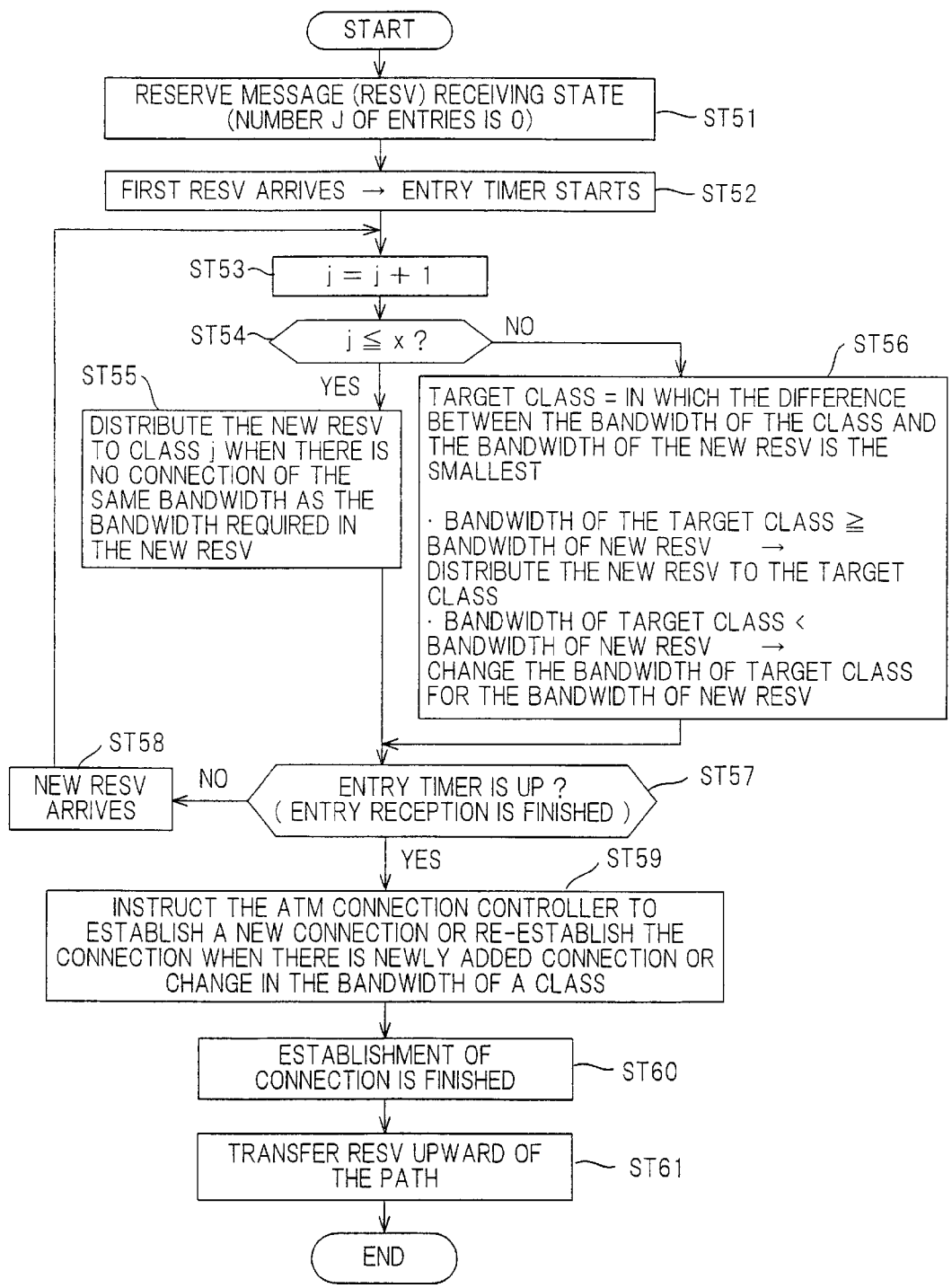
FIG. 24 is a flowchart of the process for adding and re-establishing a connection by dividing required bandwidths into variable classes by a boundary apparatus on the transmission side in a system in which a plurality of p-mp connections are possible.

FIG. 24 is a flowchart of the operation of the boundary apparatus $EN_0$ on the transmission side in a variable class system.

After transmitting a Path message PATH to the receiving terminals $R_1$ to $R_n$, the boundary apparatus $EN_0$ assumes a Reserve message RESV receiving state, and the entry controller 44 sets the control variable j representing the number of Reserve messages which have arrived (number of entries) at 0 (step ST51). When a first Reserve message arrives, the boundary apparatus $EN_0$ starts the entry timer 45 (step ST52).

The entry controller 44 then increases j by one (j=j+1, step ST53), and compares j with the number x of classes (step ST54). If j≦x, and there is no connection of the same bandwidth as the bandwidth required in the Reserve message, the entry controller 44 distributes the Reserve message to class j (step ST55), and judges whether or not the entry timer 45 has stopped (step ST57). If the measuring operation by the entry timer 45 has not been finished, and a new Reserve message arrives (step ST58), the operations at the steps ST53 and thereafter are repeated with respect to the new Reserve message.

If j>x at the step ST54, by referring to the x classes which have already been set, the class in which the difference between the bandwidth of the class and the bandwidth of the new RESV is the smallest is designated as a target class (step ST56). If the bandwidth of the target class≧the bandwidth of the new RESV, the new RESV is distributed to the target class. On the other hand, if the bandwidth of the target class<the bandwidth of the new RESV, the bandwidth of the target class is changed for the bandwidth of the new RESV, and the new RESV is distributed to the target class. Thereafter, the operations at the steps ST57 and thereafter are executed.

If the entry timer 45 has stopped at the step ST57, the entry controller 44 judges the bandwidth of each class. If there is a newly added connection, or a change in the bandwidth of a class, it instructs the ATM connection controller 47 to establish a new connection or re-establish the connection via the ATM resource judging portion 46 (step ST59). When the establishment of the connection is finished (step ST60), the packet transmitting portion 50 transfers the Reserve messages RESV upward of the path (step ST61), thereby finishing the operation.

(c) Connection Identifier Threshold Value System

A connection identifier threshold value system will be explained in the following.

In this system, a threshold value is provided for the number of remaining connection identifiers (VPI/VCIs) which the boundary apparatus $EN_0$ on the transmission side can use, and when a boundary apparatus on the reception side transmits a new request for resource, if there are sufficient VPI/VCIs remaining, a p-mp connection is established. On the other hand, the boundary apparatus on the reception side transmitting the new request for resource is added to the existent connection as a leaf without establishment of a new p-mp connection, if the number of remaining VPI/VCIs is insufficient.

In the VPI/VCI space controlled by the boundary apparatus $EN_0$ on the transmission side, the state in which the ratio of used VPI/VCIs (=[the number of used VPI/VCIs]/[the maximum permissible number of used VPI/VCIs]) is not more than a threshold value T1 is called "a tag rich mode" and the state in which the ratio exceeds T1 is called "a tag save mode".

In the tag rich mode, when the boundary apparatus $EN_0$ on the transmission side receives a new request for resource, it judges that a p-mp connection can be established until the number of p-mp connections reaches the value $C_0$ which is obtained from the threshold value T1 and the number of available VPI/VCIs. When the boundary apparatus $EN_0$ on the transmission side assumes the tag save mode as a result of establishment of new p-mp connections, it does not establish a new p-mp connection but adds the boundary apparatus on the reception side transmitting a new request for resource to the existent connection as a leaf (see FIG. 11) or re-establishes the existent connection (see FIG. 10).

In the tag rich mode, a p-mp connection is allotted to every request for resource. In contrast, in the tag save mode, a link of a new request for resource is added to the existent p-mp connection (target connection) which has a bandwidth larger than and the closest to the new request for resource. The target connection is found by the ATM resource judging portion in accordance with the procedure shown in FIG. 25.

The ATM resource judging portion first generates a set U of existent connections having a bandwidth larger than a newly required bandwidth (step ST71), and judges whether or not U is a null set (step ST72).

If U is not a null set, the minimum value of the differences obtained by subtracting the required bandwidth from the respective bandwidths of the connections contained in U is obtained, and the connection corresponding to the minimum value is selected as the target connection (step ST73). The ATM connection controller 47 adds the boundary apparatus on the reception side which has transmitted the new request for resource to the target connection by using ADD PARTY, thereby finishing the operation.

If U is a null set, the connection having the largest bandwidth among the existent connections is merged with the new request for resource, and the connection is changed for a connection of the required bandwidth (see the re-establishing operation in FIG. 10) (step ST75), thereby finishing the operation.

In this manner, in the tag save mode, the boundary apparatus $EN_0$ on the transmission side holds the consumption of the bandwidth resource accompanied with the establishment of a new connection within a certain level so as to prevent a further increase.

Figure 26:
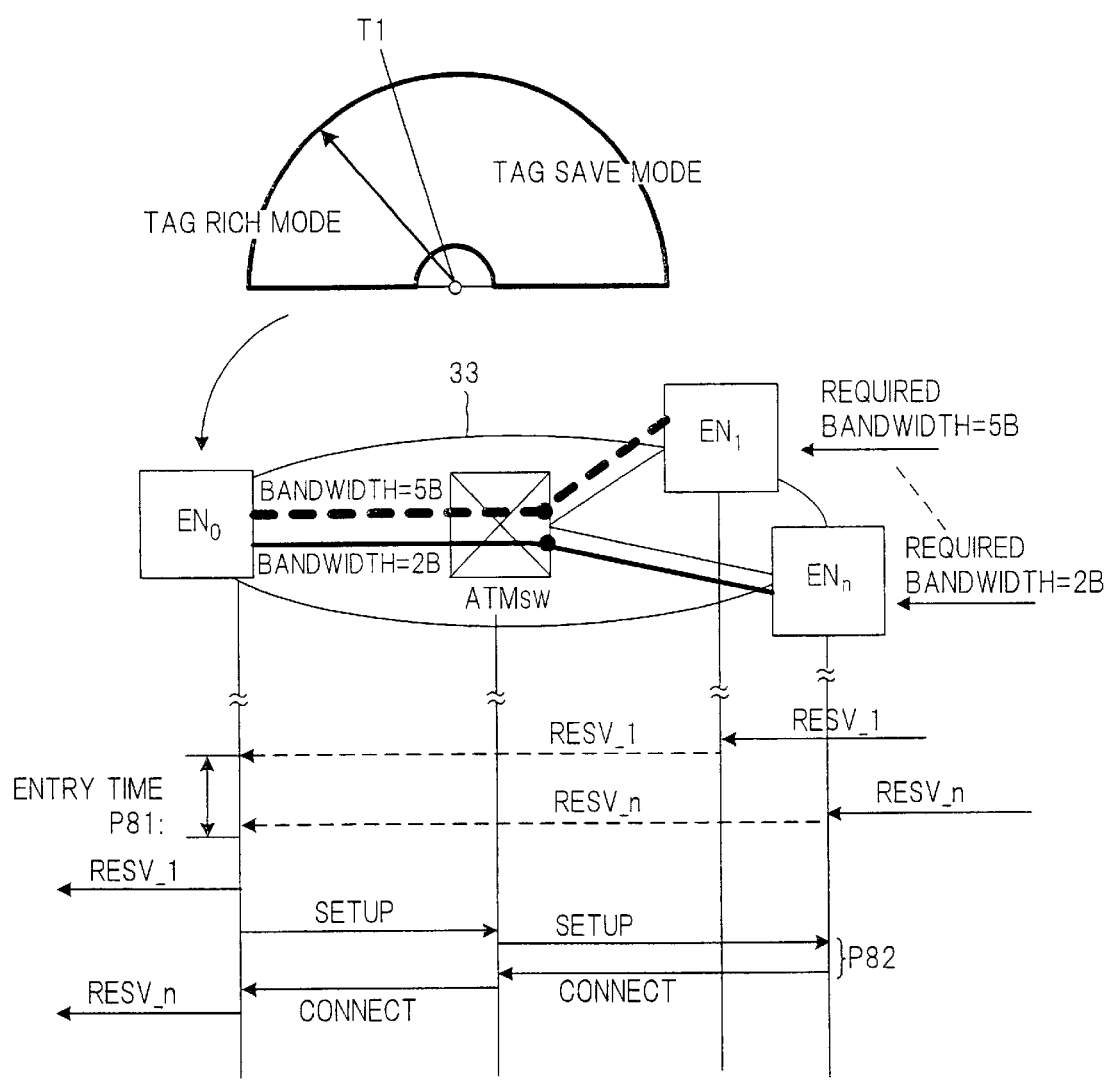
FIG. 26 shows a tag rich mode.
Figure 27:
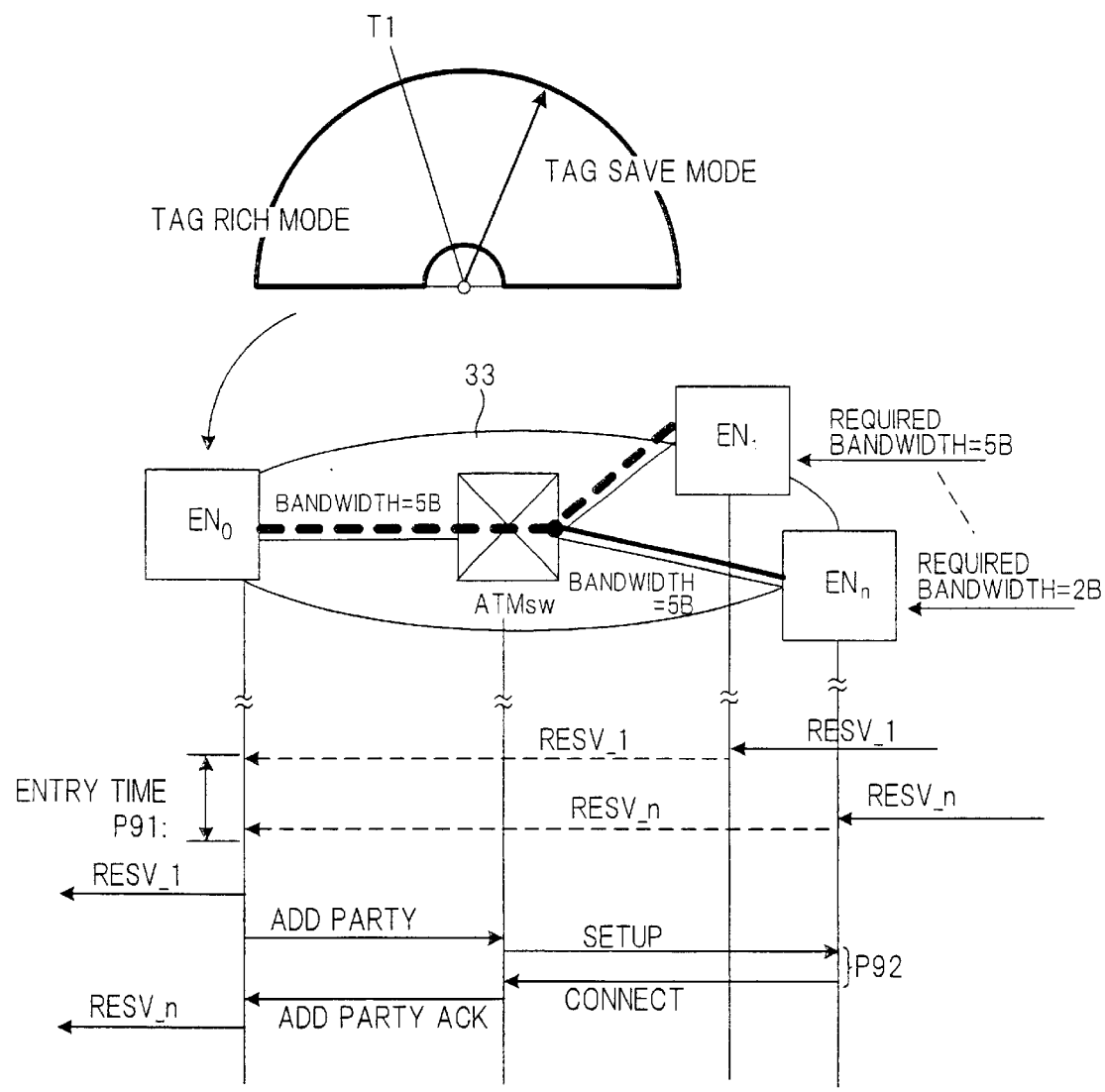
FIG. 27 shows a tag save mode.

FIGS. 26 and 27 show the sequences of the tag rich mode and the tag save mode, respectively. In FIGS. 26 and 27, a point-multipoint connection of a bandwidth of 5B has already been established between the boundary apparatuses $EN_0$ and $EN_1$.

In FIG. 26, the consumption rate of VPI/VCIs is smaller than the threshold value T1, the boundary apparatus $EN_0$ on the transmission side establishes a new connection in response to a new request for resource. In this case, the establishing operation is executed in accordance with the following sequence.

P81: At the point of time when the entry time is up, the Reserve message RESV_1 from the boundary apparatus $EN_1$ and the Reserve message RESV_n from the boundary apparatus $EN_n$ have been received. A connection of a bandwidth of 5B has already been allotted to RESV_1, and RESV_1 is immediately transferred to the transmitting terminal S. The boundary apparatus $EN_0$ starts to establish a connection with respect to the Reserve message RESV_n.

P82: The boundary apparatus $EN_0$ establishes a p-mp connection of the requested bandwidth of 2B between the boundary apparatus $EN_0$ and the boundary apparatus $EN_n$.

In FIG. 27, since the consumption rate of VPI/VCIs is larger than the threshold value T1, the boundary apparatus $EN_0$ on the transmission side changes the existent connection with respect to a new request for resource. In this case, the re-establishing operation is executed in accordance with the following sequence.

P91: At the point of time when the entry time is up, the Reserve message RESV_1 from the boundary apparatus $EN_1$ and the Reserve message RESV_n from the boundary apparatus $EN_n$ have been received. A connection of a bandwidth of 5B has already been allotted to RESV_1, and RESV_1 is immediately transferred to the transmitting terminal S. The boundary apparatus $EN_0$ starts to change the connection with respect to the Reserve message RESV_n.

Figure 25:
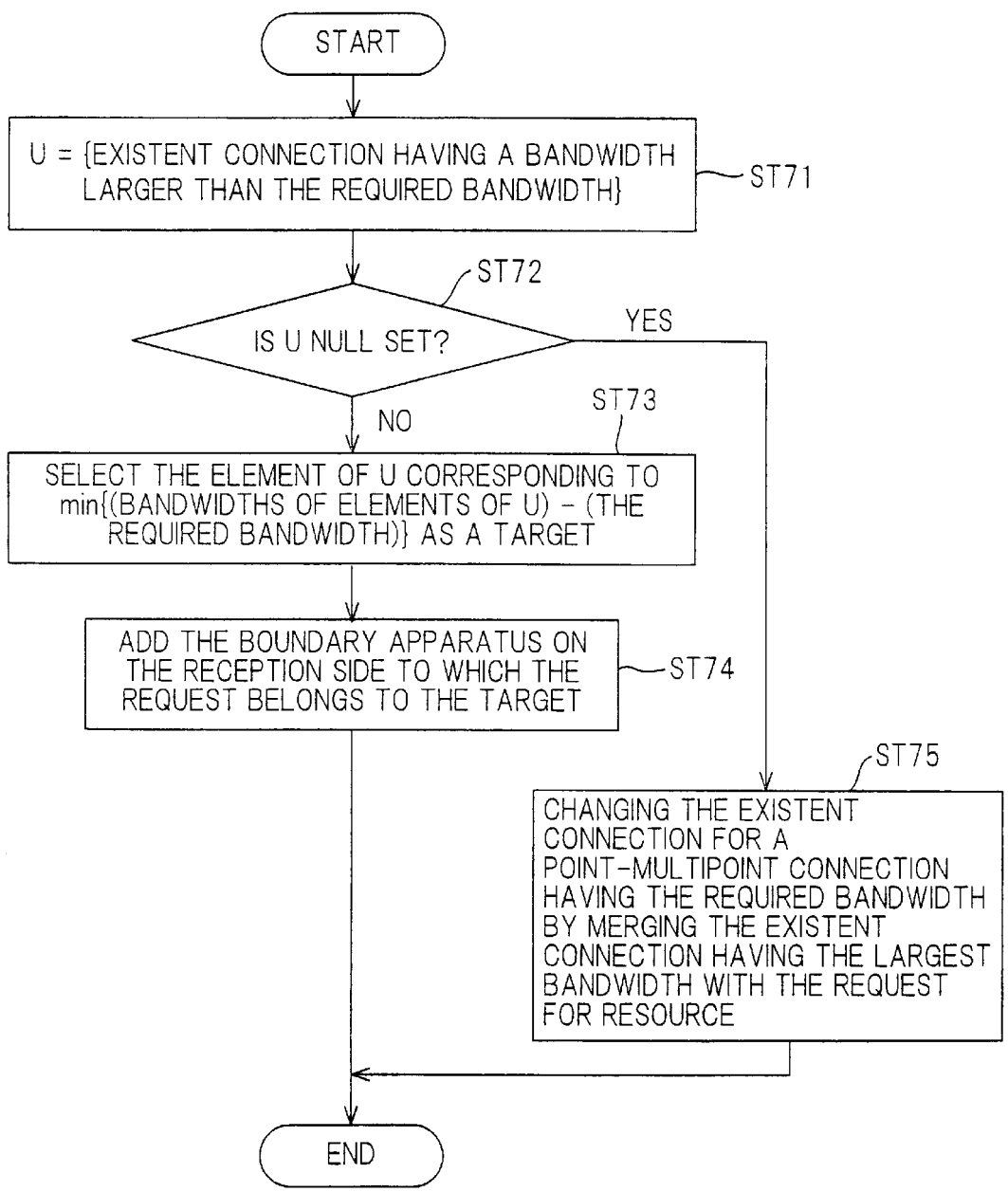
FIG. 25 is a flowchart of the process for adding and re-establishing a connection by adopting a connection identifier threshold value system (tag save mode) by a boundary apparatus on the transmission side in a system in which a plurality of p-mp connections are possible.

The boundary apparatus $EN_0$ selects a target connection in accordance with the operation shown in FIG. 25, and merges the connection with the new Reserve message RESV_n. In this example, since the existent connection is only the connection of a bandwidth of 5B between the boundary apparatuses $EN_0$ and $EN_1$, and the bandwidth requested by RESV_n is 2B, the element of the set U is only the connection between the boundary apparatuses $EN_0$ and $EN_1$. Consequently, this connection is selected as the target connection.

P92: The boundary apparatus $EN_0$ on the transmission side adds the link for the boundary apparatus $EN_n$ to the existent connection of a bandwidth of 5B by using ADD PARTY.

According to this system, the consumption state of the VPI/VCI resource in the boundary apparatus $EN_0$ on the transmission side is monitored, and the number of p-mp connections is limited in accordance with the usage ratio of the resource. Accordingly, the waste of connection identifier (VPI/VCI) and bandwidth is prevented.

Figure 28:
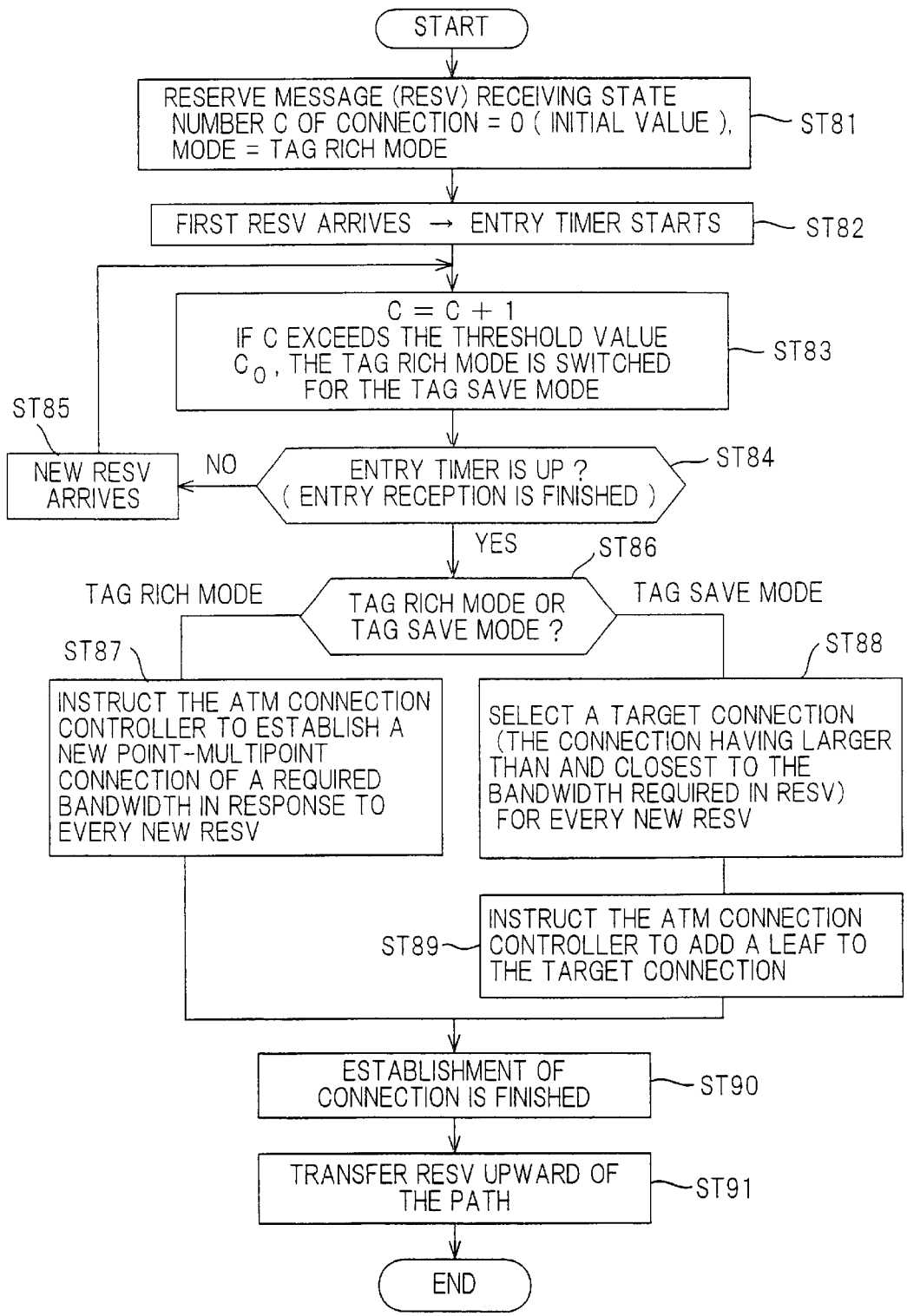
FIG. 28 is a flowchart of the operation of establishing a connection with consideration for a tag rich mode/tag save mode.

FIG. 28 is a flowchart of the operation of the boundary apparatus $EN_0$ on the transmission side in the connection identifier threshold value system.

After transmitting a Path message PATH to the receiving terminals $R_1$ to $R_n$, the boundary apparatus $EN_0$ assumes a Reserve message RESV receiving state, and the entry controller 44 resets the control variable C representing the number of Reserve messages which have arrived (number of connections) to 0, and initializes the mode to the tag rich mode (step ST81). When a first Reserve message arrives, the boundary apparatus $EN_0$ starts the entry timer 45 (step ST82).

The entry controller 44 then increases the number C of connections by one (C=C+1), and when the number C of connections exceeds the threshold value $C_0$, it changes the tag rich mode for the tag save mode (step ST83). As the threshold value $C_0$, for example, the value (=N·T1) obtained multiplying the threshold value T1 by the maximum permissible number N of VPI/VCIs is used. In this case, when the number C of connections reaches this value $C_0$, the rate of the consumed VPI/VCIs reaches the threshold value T1.

The entry controller 44 judges whether or not the entry timer 45 has stopped (step ST84). If the measuring operation by the entry timer 45 has not been finished, and a new Reserve message arrives (step ST85), the operations at the steps ST83 and thereafter are repeated with respect to the new Reserve message.

If the entry timer 45 stops, the entry controller 44 judges in which mode the boundary apparatus $EN_0$ is (step ST86). If it is in the tag rich mode, the entry controller 44 instructs the ATM connection controller 47 to establish new p-mp connections of the required bandwidths respectively for all the received Reserve messages via the ATM resource judging portion 46 (step ST87). The ATM connection controller 47 executes the instructed operation.

If the boundary apparatus $EN_0$ is in the tag save mode, the ATM resource judging portion 46 obtains a target connection for a new Reserve message in accordance with the procedure shown in FIG. 25 (step ST88). The ATM resource judging portion 46 then instructs the ATM connection controller 47 to add a leaf to the existent connection (see FIG. 11) or re-establish the existent connection (see FIG. 10) (step ST89). The ATM connection controller 47 executes the instructed operation.

When the establishment of the connection is finished (step ST90), the packet transmitting portion 50 transfers the Reserve messages upward of the path (step ST91), thereby finishing the operation.

(H) Judging Policy About Establishing a p-mp Connection and a p-p Connection

A policing function in the system using a p-mp connection in combination with a p-p connection shown in FIG. 8 will now be explained. This system is divided into five systems: fixed class system, variable class system, connection identifier threshold value system, bandwidth threshold value system, and resource threshold value system, depending upon a judging policy at the time of establishing a connection.

(a) Fixed Class System

A fixed class system is basically the same as the system shown in FIGS. 19 and 20. This system is different from the one shown in FIGS. 19 and 20 in that a p-p connection is provided for a first request for resource in each class and in that the existent p-p connection is switched for a p-mp connection in response to second and subsequent requests.

In this system, a p-p connection is combined with a p-mp connection so as to provide the optimum ATM connection. Since the levels of bandwidths are fixedly classified, the judging operation of the boundary apparatus $EN_0$ on the transmission side is simple, so that this system is considered to be an efficient system. In addition, since it is possible to determine the number x of classes and the maximum bandwidth Bmax in accordance with the network structure, this system also has an excellent flexibility.

Figure 29:
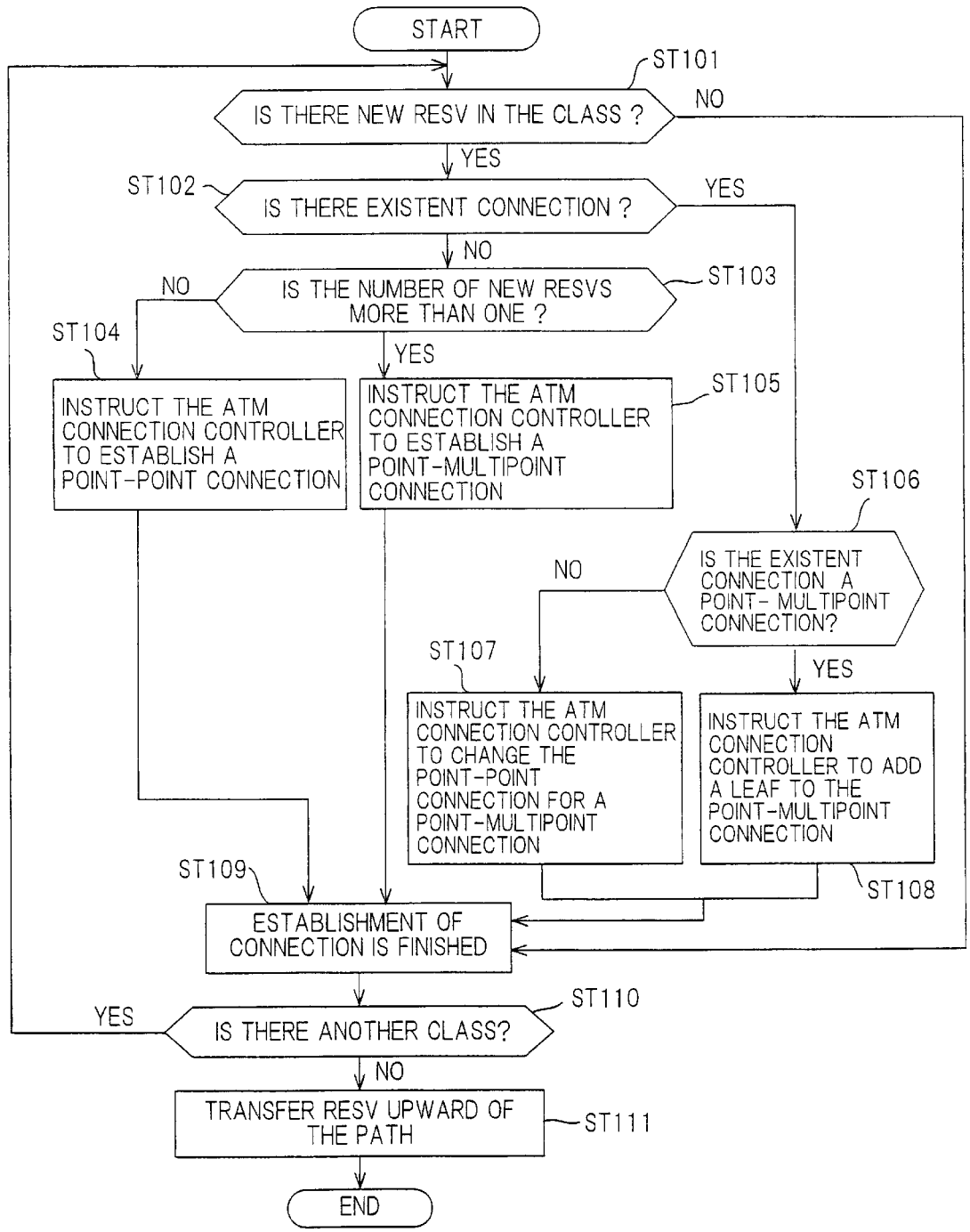
FIG. 29 is a flowchart of the operation of establishing a connection by a fixed class system or by a variable class system which uses a p-mp connection in combination with a p-p connection.

The boundary apparatus $EN_0$ on the transmission side in this system first executes the operations at the steps ST31 to ST35 shown in FIG. 21 so as to fixedly classify the Reserve messages which the boundary apparatus $EN_0$ has received at one entry and, thereafter, establishes a connection in accordance with the flow shown in FIG. 29.

The entry controller 44 selects one class and judges whether or not a new Reserve message (new RESV) exists in the selected class (step ST101). If a new Reserve message exists, whether or not there is an existent connection in the same class is judged (step ST102). If there is no existent connection, whether or not the number of new RESVs is more than one is judged (step ST103).

If the new RESV is only one, the entry controller 44 instructs the ATM connection controller 47 to establish a p-p connection corresponding to the new RESV via the ATM resource judging portion 46 (step ST104). The ATM connection controller 47 executes the instructed operation.

If the number of new RESVs is more than one, the entry controller 44 instructs the ATM connection controller 47 to establish a p-mp connection corresponding to the new RESVs (step ST105). The ATM connection controller 47 executes the instructed operation.

If there is an existent connection at the step ST102, judgment is made as to whether the connection is a p-mp connection or a p-p connection (step ST106).

If the existent connection is a p-p connection, the entry controller 44 instructs the ATM connection controller 47 to change the p-p connection for a p-mp connection (step ST107). The ATM connection controller 47 executes the instructed operation.

If the existent connection is a p-mp connection, the entry controller 44 instructs the ATM connection controller 47 to add the boundary apparatus on the reception side which has transmitted the new RESV to the p-mp connection as a leaf (step ST108). The ATM connection controller 47 executes the instructed operation.

When the establishment of the connection in the selected class is finished (step ST109) in the above-described manner, the entry controller 44 judges whether or not there is another unselected class (step ST110).

If there is another unselected class at the step ST110, the operations at the steps ST101 and thereafter are repeated, and when there is no unselected class, the packet transmitting portion 50 transfers the Reserve messages upward of the path (step ST111), thereby finishing the operation. If there is no new Reserve message at the step ST101, the operations at the steps ST110 and thereafter are executed.

(b) Variable Class System

A variable class system is basically the same as the system shown in FIGS. 22 and 23. This system is different from the one shown in FIGS. 22 and 23 in that when the boundary apparatus $EN_0$ on the transmission side allots a new request for resource to a variable class, it provides a p-p connection until the number of connections reaches x. For the (x+1)th request for resource, the request is merged with the connection of the bandwidth which is the closest to the required bandwidth, and the p-p connection is changed for a p-mp connection.

In this system, a p-p connection is combined with a p-mp connection so as to provide the optimum ATM connection. Since the levels of bandwidths are variably classified, even if there is a bias in the required bandwidths, it is possible to take appropriate means. In addition, since it is possible to determine the number x of classes and the maximum bandwidth Bmax in accordance with the network structure, this system also has an excellent flexibility.

The boundary apparatus $EN_0$ on the transmission side in this system first executes the operations at the steps ST51 to ST58 shown in FIG. 24 so as to variably classify the Reserve messages which the boundary apparatus $EN_0$ has received at one entry, and thereafter, establishes a connection in accordance with the flow shown in FIG. 29.

(c) Connection Identifier Threshold Value System

A connection identifier threshold value system is basically the same as the system shown in FIGS. 26 and 27. This system is different from the one shown in FIGS. 26 and 27 in that in the tag rich mode, a p-p connection is established in response to a new request for resource, while in the tag save mode, a new request for resource is merged with an existent p-p connection and the p-p connection is changed for a p-mp connection without the establishment of a new connection. However, if the target connection as the object of merge is a p-mp connection, a new request for resource is added to the connection as a leaf by using ADD PARTY.

Figure 30:
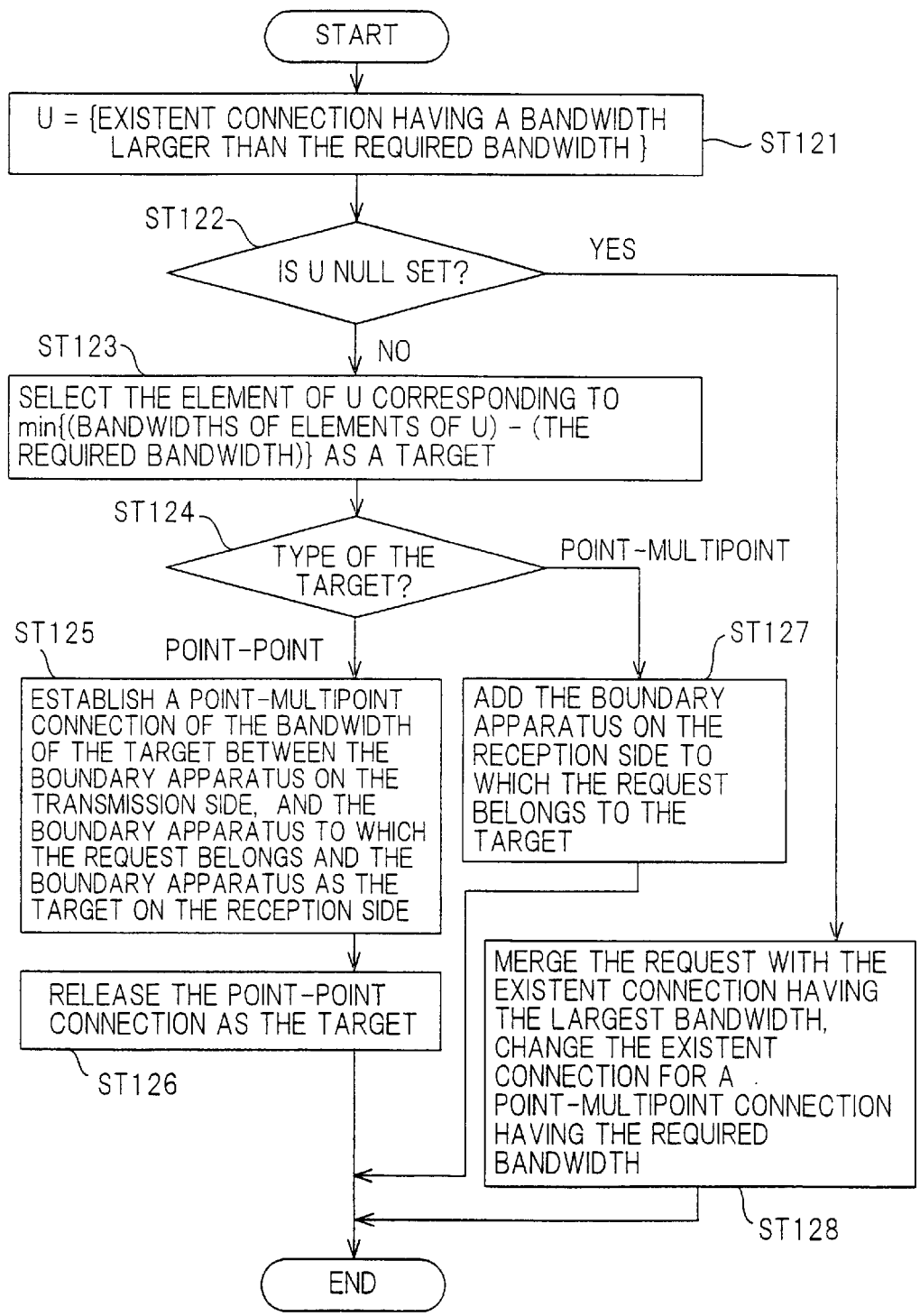
FIG. 30 is a flowchart of the operation of establishing a connection in a tag save mode by a system which uses a p-mp connection in combination with a p-p connection.

FIG. 30 shows the operation of the boundary apparatus on the transmission side in the tag save mode. The operation of determining a target connection at the steps ST121 to ST123 are the same as the operations at the steps ST71 to ST73 in the flowchart of FIG. 25. After the execution of the operation at the step ST123, the ATM resource judging portion 46 judges the type of the target connection (step ST124).

If the target connection is a p-p connection, the ATM connection controller 47 establishes a p-mp connection of the bandwidth of the target connection between the boundary apparatus $EN_0$ on the transmission side and the boundary apparatus on the reception side which has transmitted the new request for resource (step ST125). The p-p connection as the target connection is then released (step ST126), thereby finishing the operation.

If the target connection is a p-mp connection, the ATM connection controller 47 adds the boundary apparatus on the reception side which has transmitted the new request for resource to the target connection by using ADD PARTY (step ST127), thereby finishing the operation.

If the set U is a null set at the step ST122, the new request for resource is merged with the existent connection having the largest bandwidth, and the connection is changed for a p-mp connection of the required bandwidth (step ST128), thereby finishing the operation.

Figure 31:
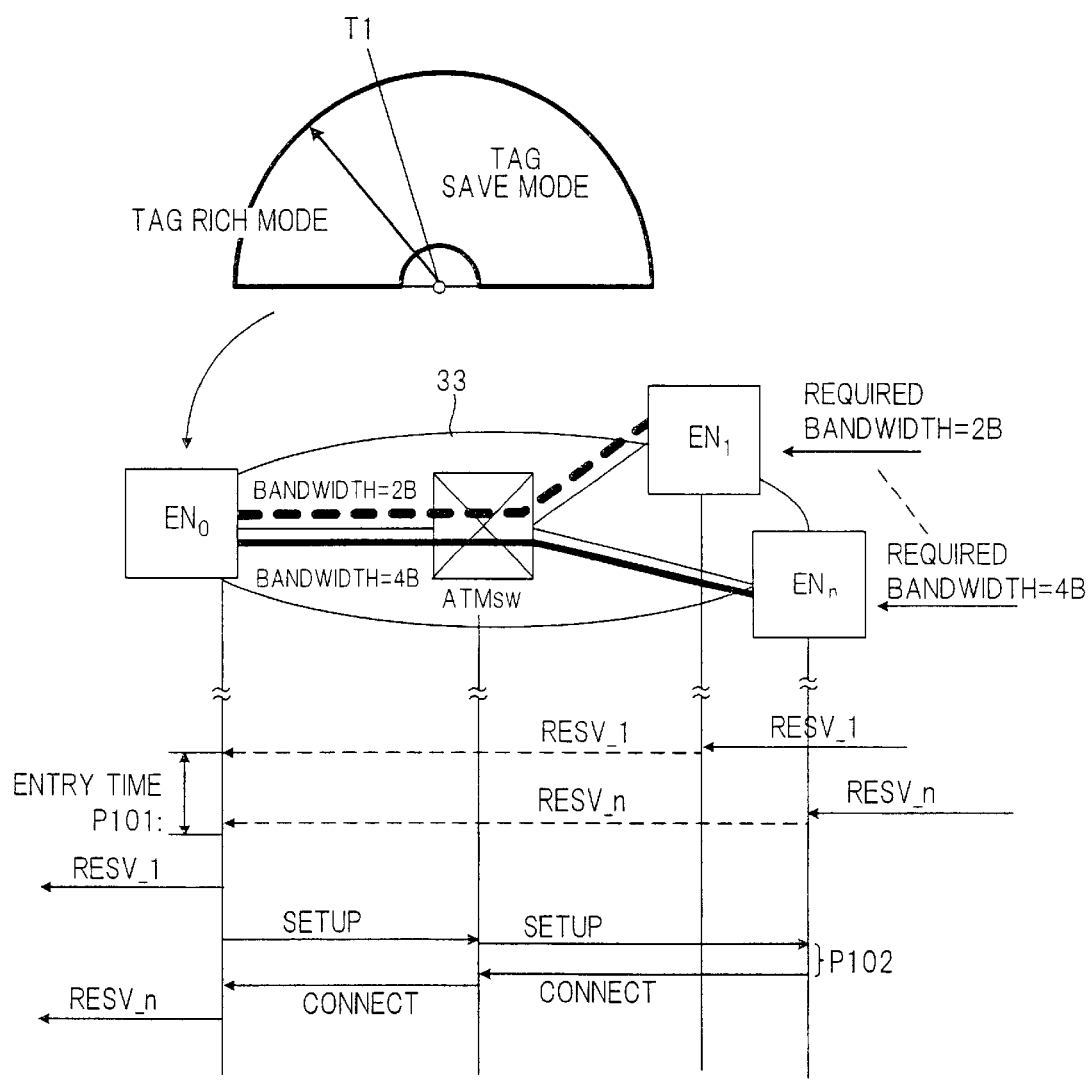
FIG. 31 shows a tag rich mode.
Figure 32:
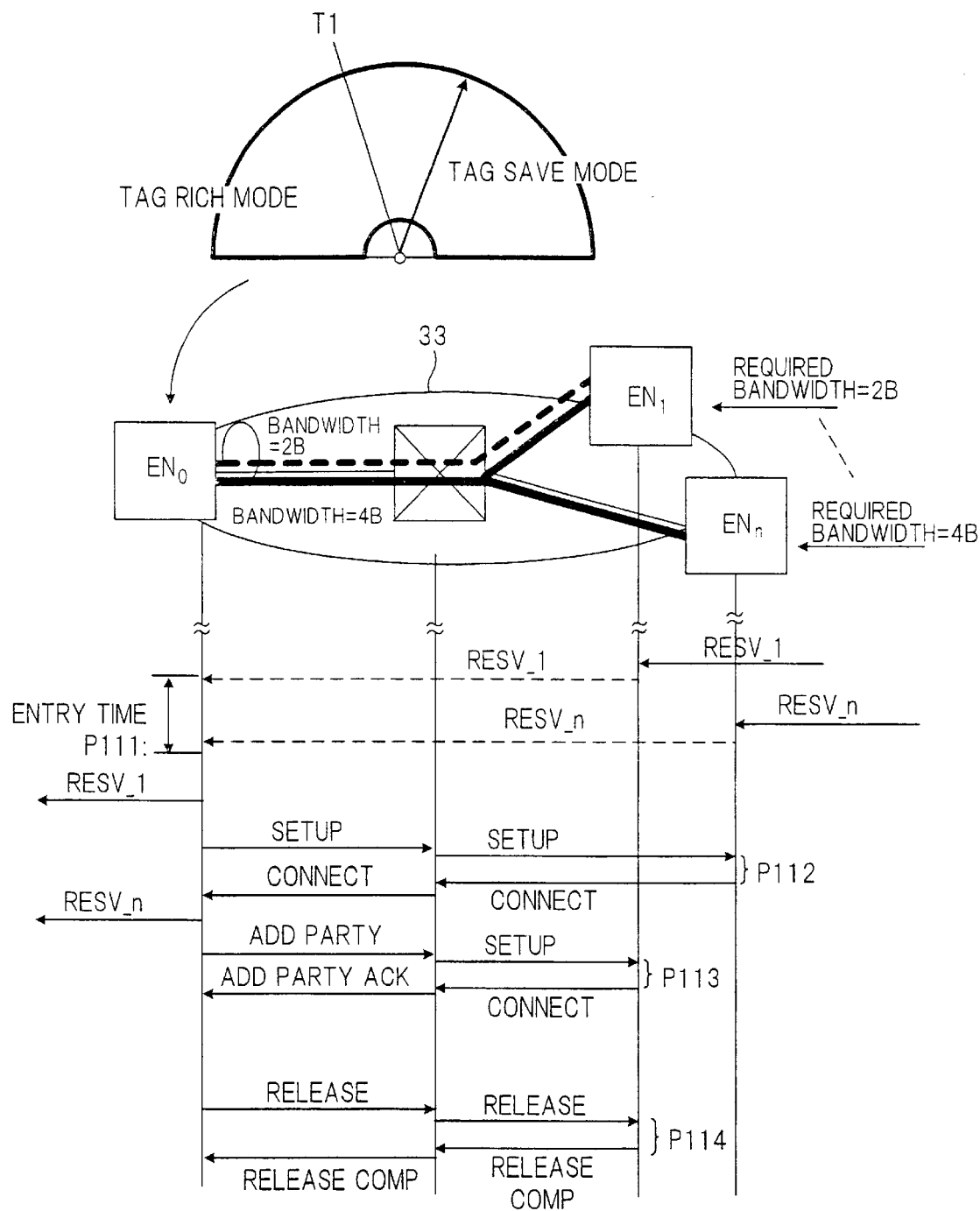
FIG. 32 shows a tag save mode.

FIGS. 31 and 32 show the sequences of the tag rich mode and the tag save mode, respectively. In FIGS. 31 and 32, a bandwidth of 2B has already been established between the boundary apparatuses $EN_0$ and $EN_1$.

In FIG. 31, since the consumption rate of VPI/VCIs is smaller than the threshold value, the boundary apparatus $EN_0$ on the transmission side establishes a new p-p connection in response to a new request for resource in accordance with the following sequence.

P101: At the point of time when the entry time is up, the Reserve message RESV_1 from the boundary apparatus $EN_1$ and the Reserve message RESV_n from the boundary apparatus $EN_n$ have been received. A connection of a bandwidth of 2B has already been allotted to RESV_1, and the boundary apparatus $EN_0$ immediately transfers RESV_1 to the transmitting terminal S. The boundary apparatus $EN_0$ also starts to establish the connection with respect to the Reserve message RESV_n.

P102: The boundary apparatus $EN_0$ establishes a p-p connection of the requested bandwidth of 4B between the boundary apparatus $EN_0$ and the boundary apparatus $EN_n$.

In FIG. 32, since the consumption rate of VPI/VCIs is larger than the threshold value T1, the boundary apparatus $EN_0$ on the transmission side changes the existent connection with respect to a new request for resource. In this case, the re-establishing operation is executed in accordance with the following sequence.

P111: At the point of time when the entry time is up, the Reserve message RESV_1 from the boundary apparatus $EN_1$ and the Reserve message RESV_n from the boundary apparatus $EN_n$ have been received. Since a connection of a bandwidth of 2B has already been allotted to RESV_1, the boundary apparatus $EN_0$ immediately transfers RESV_1 to the transmitting terminal S. Further, the boundary apparatus $EN_0$ starts to re-establish the connection with respect to the new Reserve message RESV_n.

More specifically, the boundary apparatus $EN_0$ attempts to select a target connection in accordance with the operation shown in FIG. 30. In this example, since the existent connection is only the connection of a bandwidth of 2B between the boundary apparatuses $EN_0$ and $EN_1$, and the bandwidth required by RESV_n is 4B, the set U at the step ST122 is a null set. Accordingly, the connection between the boundary apparatuses $EN_0$ and $EN_1$ is regarded as the existent connection having the maximum bandwidth, and this connection is merged with RESV_n so as to change the connection for a new p-mp connection.

P112: The boundary apparatus $EN_0$ establishes a p-mp connection of a bandwidth of 4B between the boundary apparatuses $EN_0$ and $EN_n$.

P113: The boundary apparatus $EN_0$ adds a link for the boundary apparatus $EN_1$ to the established p-mp connection by using ADD PARTY.

P114: The p-p connection between the boundary apparatuses $EN_0$ and $EN_1$ is released.

Incidentally, if a p-p connection is basically provided for all the requests for resource in one transmission session, the number of the consumed VPI/VCIs corresponds to the number of the receiving terminals which transmit the requests. If the number of the boundary apparatuses on the reception side increases which take part in the session, the VPI/VCI resource of the boundary apparatus $EN_0$ on the transmission side naturally comes to be drained.

To prevent this, if the consumption rate of VPI/VCIs exceeds the threshold value T1 (tag save mode), p-p connections are successively changed for p-mp connections. By this method, it is possible to save the VPI/VCIs of the boundary apparatus $EN_0$ on the transmission side. In addition, since the existent connection having a bandwidth approximate to the required bandwidth is merged with the request for resource, it is expected that in the generated p-mp connection, the waste of bandwidth resource in a link close to the boundary apparatuses on the reception side will not become extremely large.

Figure 33:
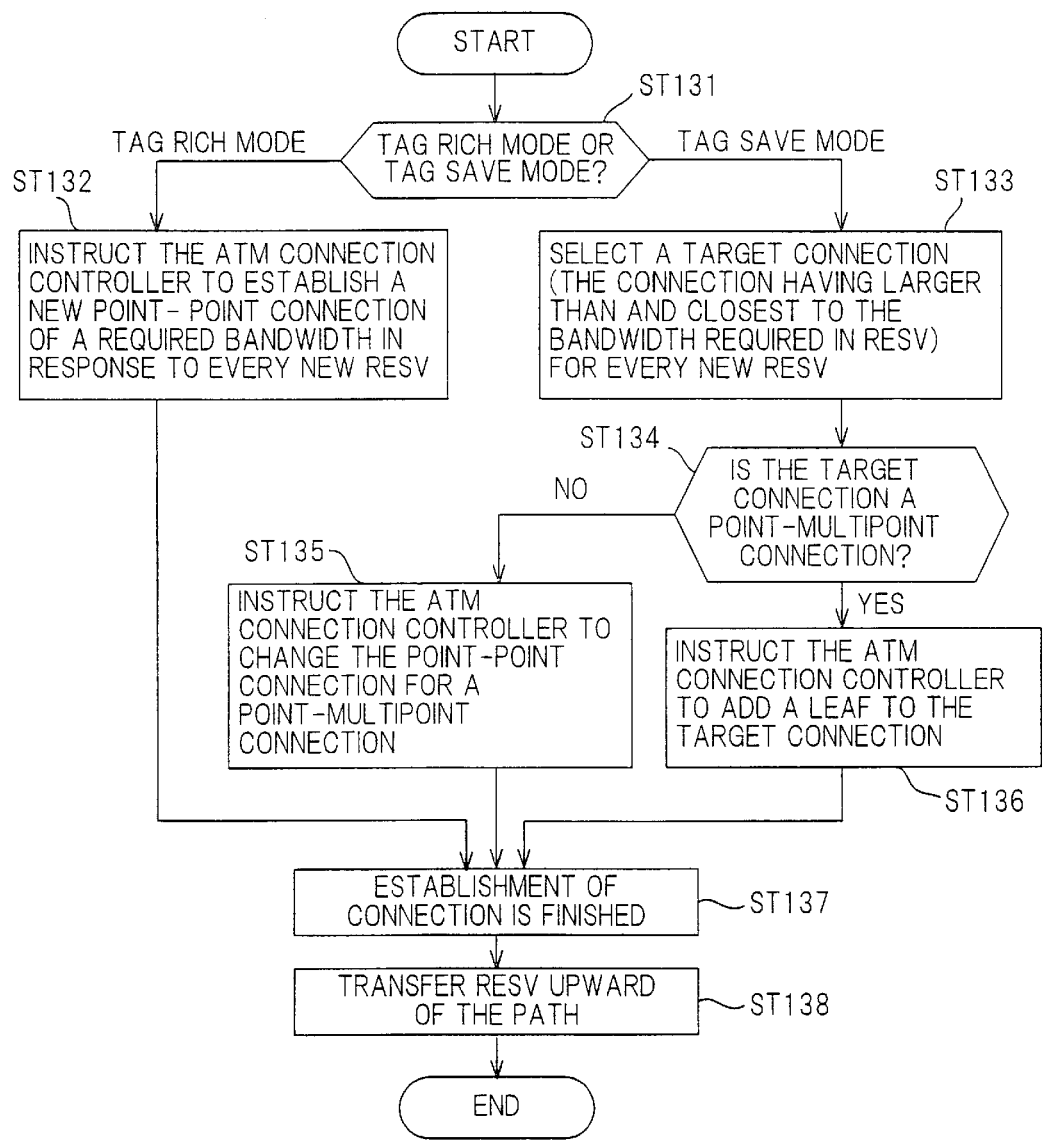
FIG. 33 is a flowchart of the operation of establishing a connection with consideration for a tag rich mode/tag save mode in a system which uses a p-mp connection in combination with a p-p connection.

After receiving Reserve messages by executing the operations at the steps ST81 to ST85 shown in FIG. 28, the boundary apparatus $EN_0$ on the transmission side in this system establishes a connection in accordance with the flow shown in FIG. 33.

The entry controller 44 first judges the mode (step ST131). If it is the tag rich mode, the entry controller 44 instructs the ATM connection controller 47 to establish new p-p connections of the required bandwidths respectively for all the received Reserve messages via the ATM resource judging portion 46 (step ST132). The ATM connection controller 47 executes the instructed operation.

If it is the tag save mode, the ATM resource judging portion 46 obtains a target connection for a new Reserve message in accordance with the procedure shown in FIG. 30 (step ST133), and then judges the type of the connection (st ST134)

If the target connection is a p-p connection, the ATM resource judging portion 46 instructs the ATM connection controller 47 to change the target connection for a p-mp connection (step ST135). The ATM connection controller 47 executes the instructed operation.

If the target connection is a p-mp connection, the ATM resource judging portion 46 instructs the ATM connection controller 47 to add a leaf to the target connection (step ST136). The ATM connection controller 47 executes the instructed operation.

When the establishment of the connection is finished (step ST137), the packet transmitting portion 50 transfers the Reserve messages upward of the path (step ST138), thereby finishing the operation.

(d) Bandwidth Threshold Value System

A bandwidth threshold value system will now be explained. In this system, the boundary apparatus $EN_0$ on the transmission side monitors the used bandwidth, and if there is room in the bandwidth, it establishes a p-p connection in response to a new request for resource. On the other hand, if the used bandwidths exceeds a predetermined usage ratio, it merges a new request for resource with an existent connection and changes the existent connection for a p-mp connection.

For this purpose, a threshold value is prepared for the bandwidth used by the boundary apparatus on the transmission side. If the used bandwidth is not more than the threshold value, it is called "bandwidth rich mode", while if the used bandwidth exceeds the threshold value, it is called "bandwidth save mode".

The boundary apparatus $EN_0$ on the transmission side monitors the used bandwidth, and it establishes a p-p connection in response to every new request for resource in the bandwidth rich mode.

On the other hand, in the bandwidth save mode, the boundary apparatus $EN_0$ selects the existent connection which has a bandwidth larger than and the closest to the new request for resource as the target connection. The target connection is switched for a p-mp connection, and a link corresponding to the new request is added to the p-mp connection. The operation of the boundary apparatus $EN_0$ on the transmission side in the bandwidth save mode is similar to that in the tag mode shown in FIG. 30. According to this system, it is possible to hold the consumption of a bandwidth within a certain level and prevent a further increase.

Figure 34:
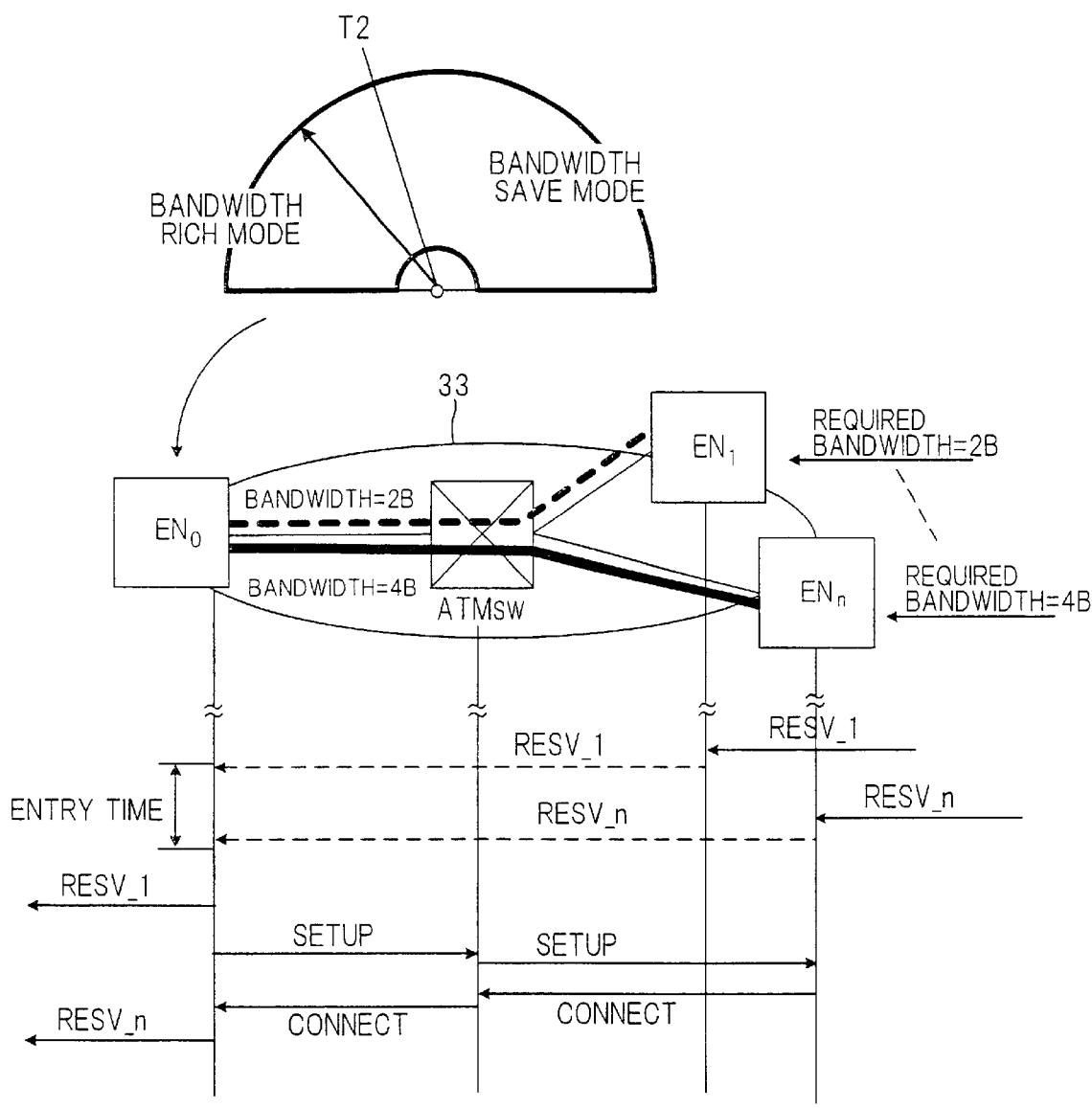
FIG. 34 shows a bandwidth rich mode.
Figure 35:
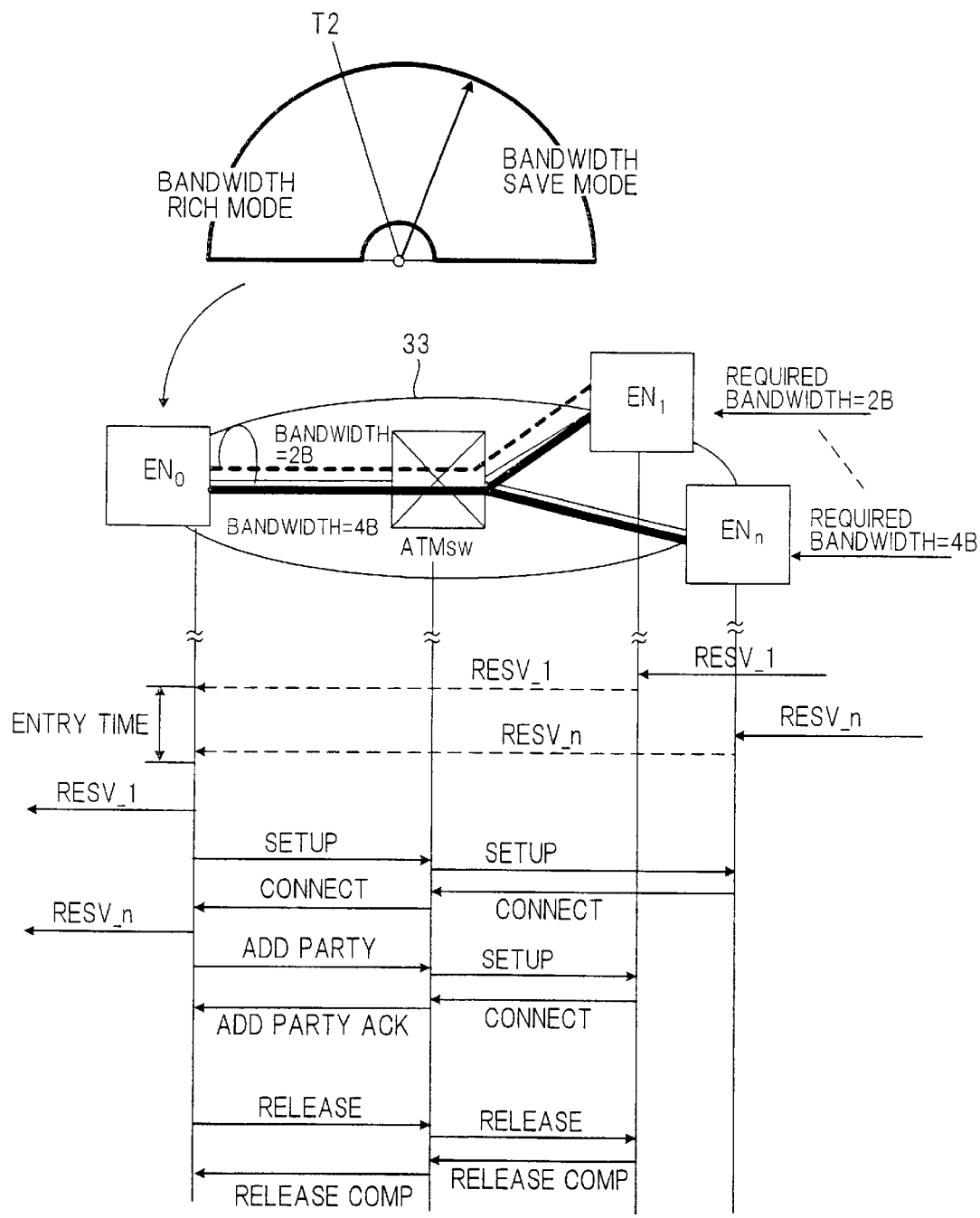
FIG. 35 shows a bandwidth save mode.

FIGS. 34 and 35 show the sequences of the bandwidth rich mode and the bandwidth save mode, respectively. These sequences are almost the same as those in the tag rich mode and in the tag save mode shown in FIGS. 31 and 32, respectively. The sequences shown in FIGS. 34 and 35 are different from the latter in that the object to be monitored is not a VPI/VPI but a bandwidth, and in that a threshold value T2 is used in place of the threshold value T1.

It is here assumed that the physical bandwidth of the entire ATM network 33 is homogeneous. If a p-p connection is provided for every request for resource, the bandwidth comes to be drained from the link close to the boundary apparatus $EN_0$ on the transmission side. To prevent this, when the used bandwidth exceeds the threshold value (in the bandwidth save mode), the p-p connections are successively changed for p-mp connections. In this manner, the system assumes the state in which the bandwidth of the boundary apparatus $EN_0$ on the transmission side is saved.

In addition, since a request for resource is merged with an existent connection having a bandwidth close to the required one, it is expected that, in the generated p-mp connection, the waste of bandwidth source in a link close to the boundary apparatuses on the reception side will not become extremely large.

Figure 36:
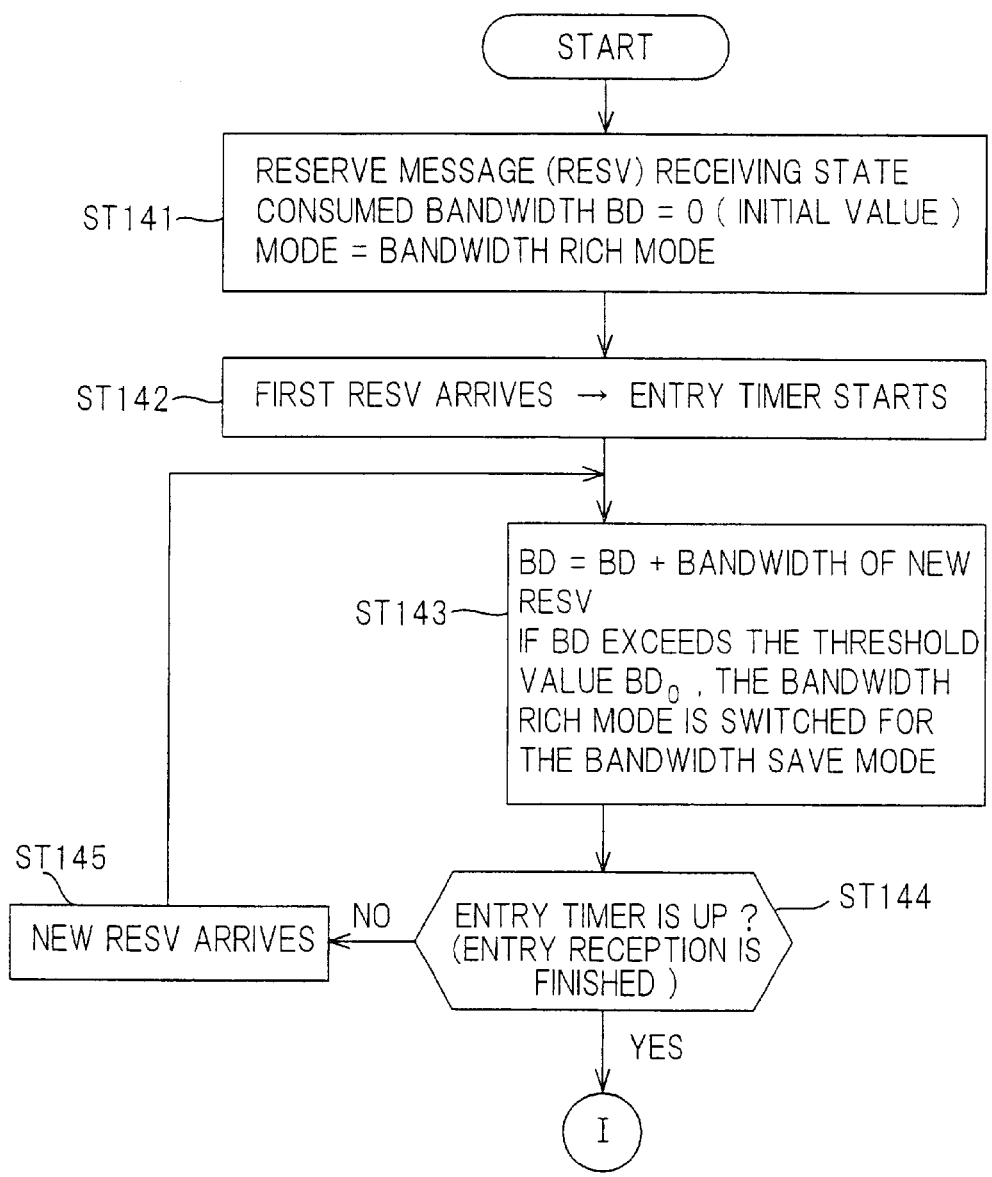
FIG. 36 is a flowchart of a first connection establishing process in a bandwidth threshold value system which uses a p-mp connection in combination with a p-p connection.
Figure 37:
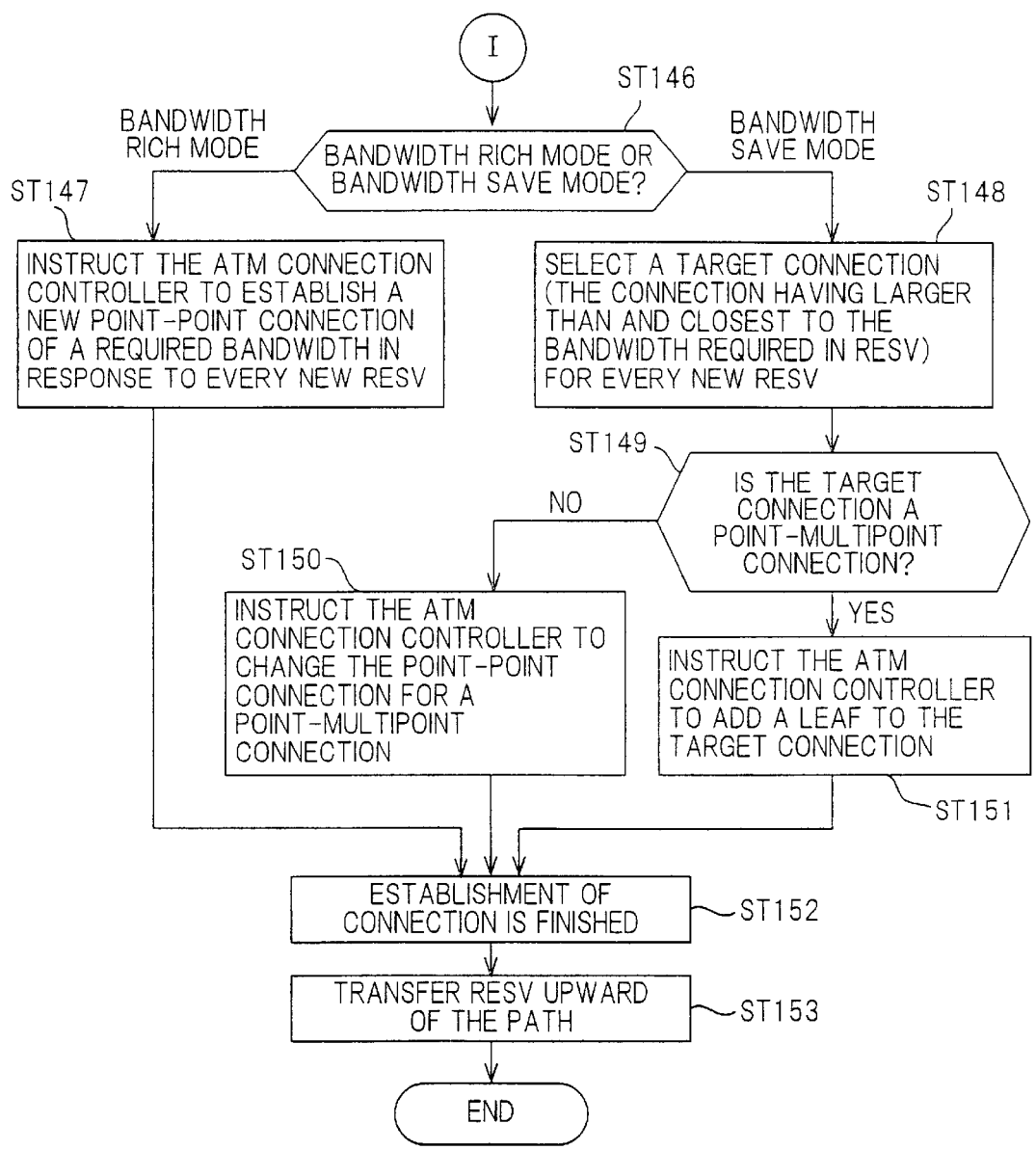
FIG. 37 is a flowchart of a connection establishing process in a bandwidth threshold value system which uses a p-mp connection in combination with a p-p connection.

FIGS. 36 and 37 are flowcharts of the operation of the boundary apparatus $EN_0$ on the transmission side in the bandwidth threshold value system.

After transmitting a Path message PATH to the receiving terminals $R_1$ to $R_n$, the boundary apparatus $EN_0$ assumes a Reserve message RESV receiving state. The entry controller 44 resets a control variable BD representing the bandwidth (consumed bandwidth) required in the Reserve messages which have arrived to 0, and initializes the mode to the bandwidth rich mode (step ST141 in FIG. 36). When a first Reserve message arrives, the boundary apparatus $EN_0$ starts the entry timer 45 (step ST142).

The entry controller 44 then adds the bandwidth required in the request for resource to BD, thereby renewing BD (step ST143). When BD exceeds the threshold value $BD_0$, the bandwidth rich mode is switched for the bandwidth save mode.

Thereafter, the entry controller 44 judges whether or not the entry timer 45 has stopped (step ST144). If the measuring operation by the entry timer 45 has not been finished, and a new Reserve message arrives (step ST145), the operations at the steps ST143 and thereafter are repeated with respect to the new Reserve message.

If the entry timer 45 has stopped, the entry controller 44 judges in which mode the boundary apparatus $EN_0$ is (step ST146 in FIG. 37). If it is in the bandwidth rich mode, the entry controller 44 executes a similar operation to that at the step ST132 in FIG. 33, and if it is in the bandwidth save mode, it executes similar operations to those at the steps ST133, ST134, ST135 and ST136 in FIG. 33, at steps ST148, ST149, ST150 and ST151, respectively.

When the establishment of the connection is finished (step ST152), the packet transmitting portion 50 transfers the Reserve messages upward of the path (step ST153), thereby finishing the operation.

(e) Resource Threshold Value System

A resource threshold value system will now be explained. This is a system using the above-described connection identifier threshold value system and bandwidth threshold value system in combination. The boundary apparatus $EN_0$ on the transmission side monitors both the consumption rate of VPI/VCI and the consumed bandwidth, and if the consumption of both resource is small, it establishes a p-p connection in response to a new request for resource, and if the consumption of either resource exceeds a predetermined threshold value, it merges a new request for resource with an existent connection and changes it for a p-mp connection without establishing a new connection.

In this system, the state in which the consumption rate of VPI/VCI is not more than the threshold value T1, and the consumed bandwidth is not more than the threshold value T2 is called "resource rich mode", and the state in which the consumption rate of VPI/VCI is more than the threshold value T1, or the consumed bandwidth is more than the threshold value T2 is called "resource save mode". In other words, the state of the tag rich mode and the bandwidth rich mode corresponds to the resource rich mode, and the state of the tag save mode or the bandwidth save mode corresponds to the resource save mode.

In the resource rich mode, the boundary apparatus $EN_0$ on the transmission side allots a p-p connection to every request for resource.

In the resource save mode, the boundary apparatus $EN_0$ on the transmission side selects the existent connection which has a bandwidth larger than and the closest to the new request for resource as the target connection. The target connection is switched for a p-mp connection, and a link corresponding to the new request is added to the p-mp connection. The operation of the boundary apparatus $EN_0$ on the transmission side in the resource save mode is similar to that in the tag mode shown in FIG. 30.

Figure 38:
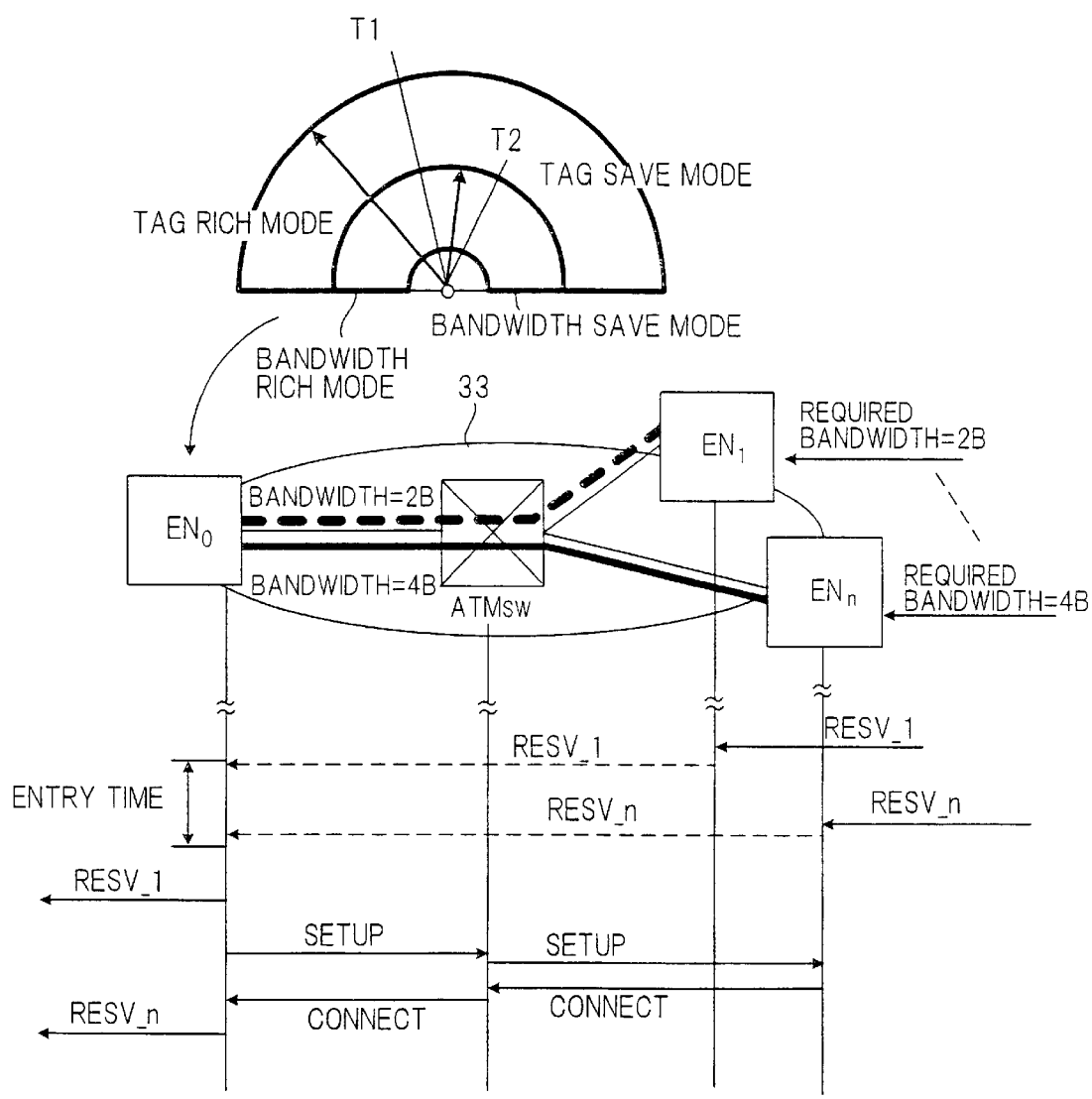
FIG. 38 shows a resource rich mode.
Figure 39:
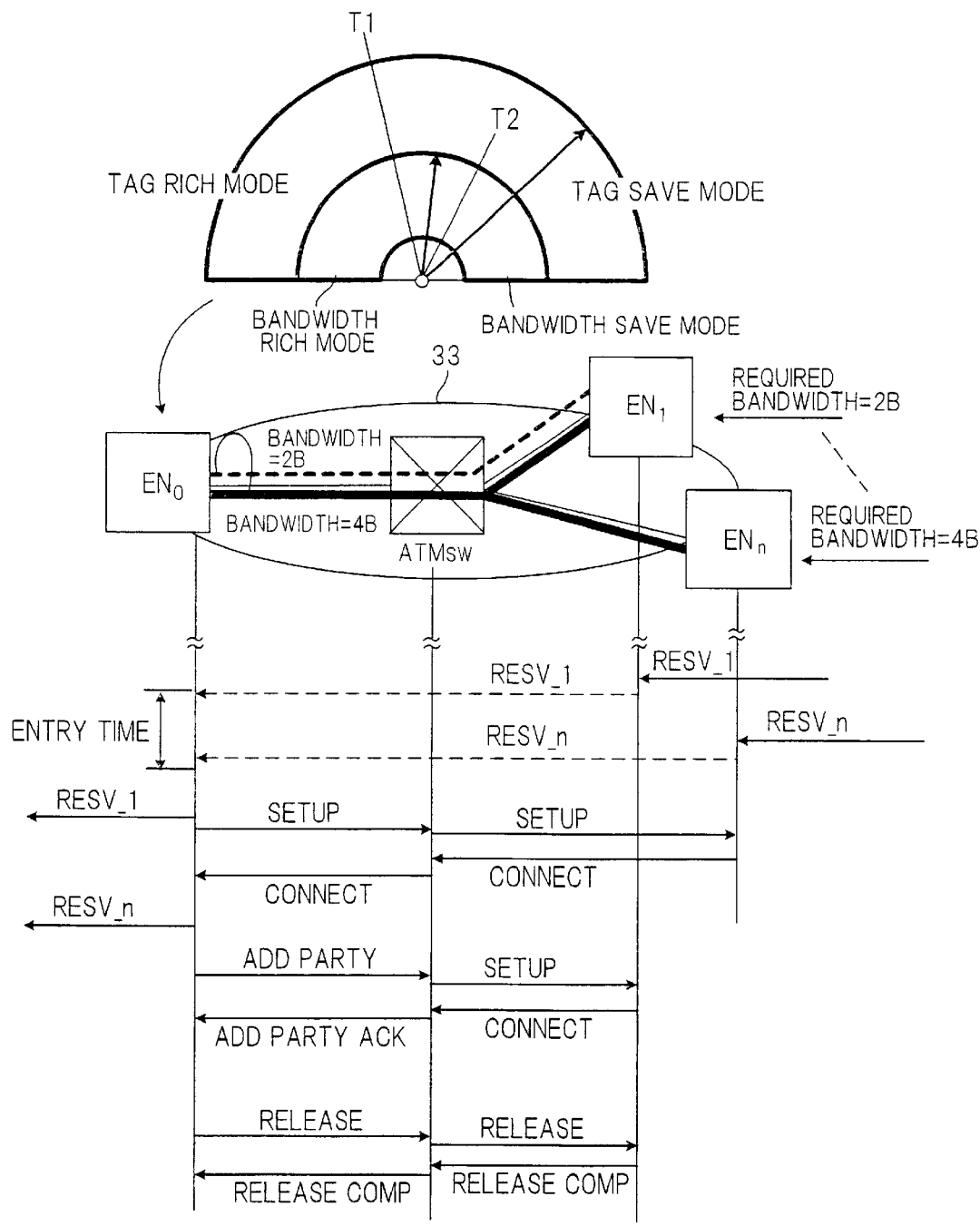
FIG. 39 shows a resource save mode.

FIGS. 38 and 39 show the sequences of the resource rich mode and the resource save mode, respectively. In FIG. 38, since the boundary apparatus $EN_0$ on the transmission side is in the tag rich mode and the bandwidth rich mode, it is in the resource rich mode. In FIG. 39, the boundary apparatus $EN_0$ on the transmission side is in the tag save mode and the bandwidth rich mode, it is the resource save mode. These sequences are almost the same as those in the tag rich mode and in the tag save mode shown in FIGS. 31 and 32, respectively.

According to this system, it is possible to provide the optimum connection by monitoring the resource of VPI/VCI and the bandwidth, and appropriately using a p-p connection and a p-mp connection in combination in accordance with the usage ratio of the resource.

Figure 40:
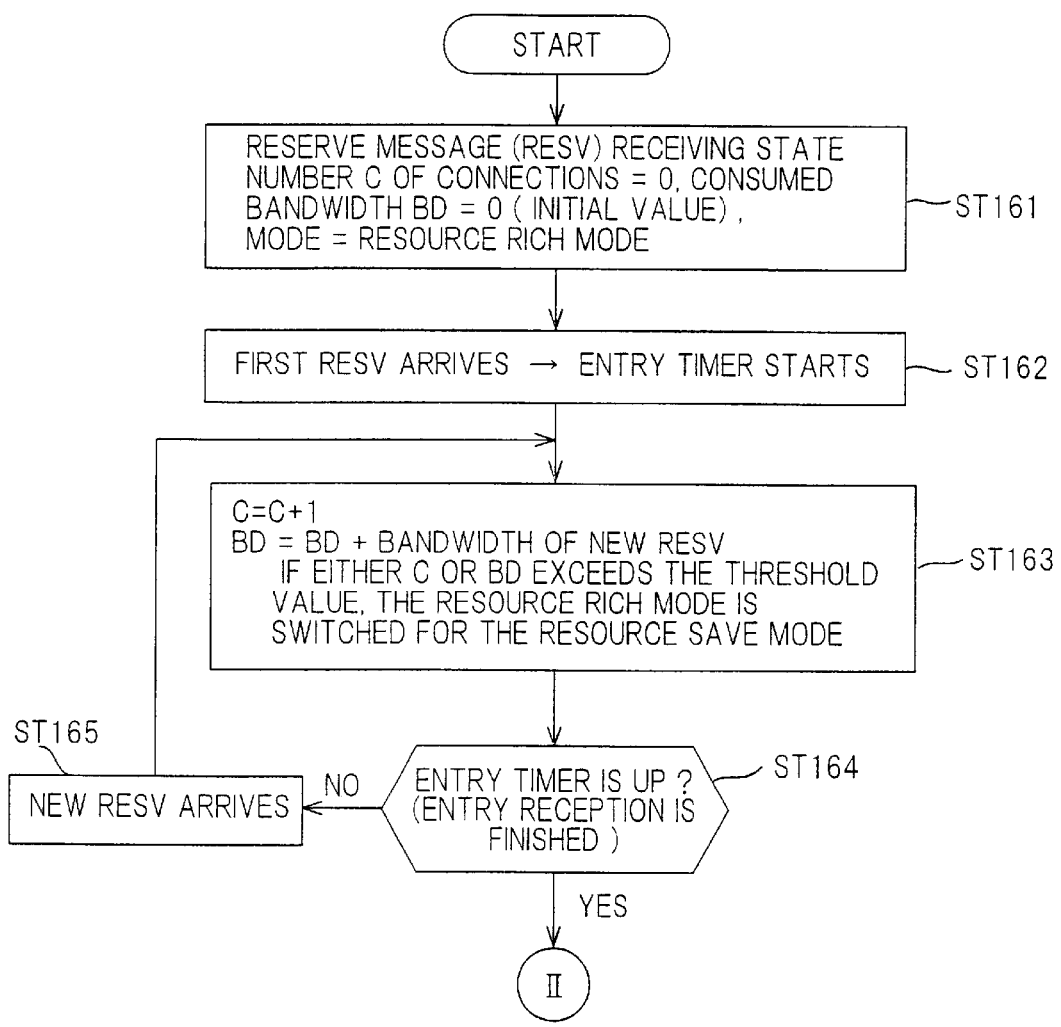
FIG. 40 is a flowchart of a first connection establishing process in a resource threshold value system which uses a p-mp connection in combination with a p-p connection.
Figure 41:
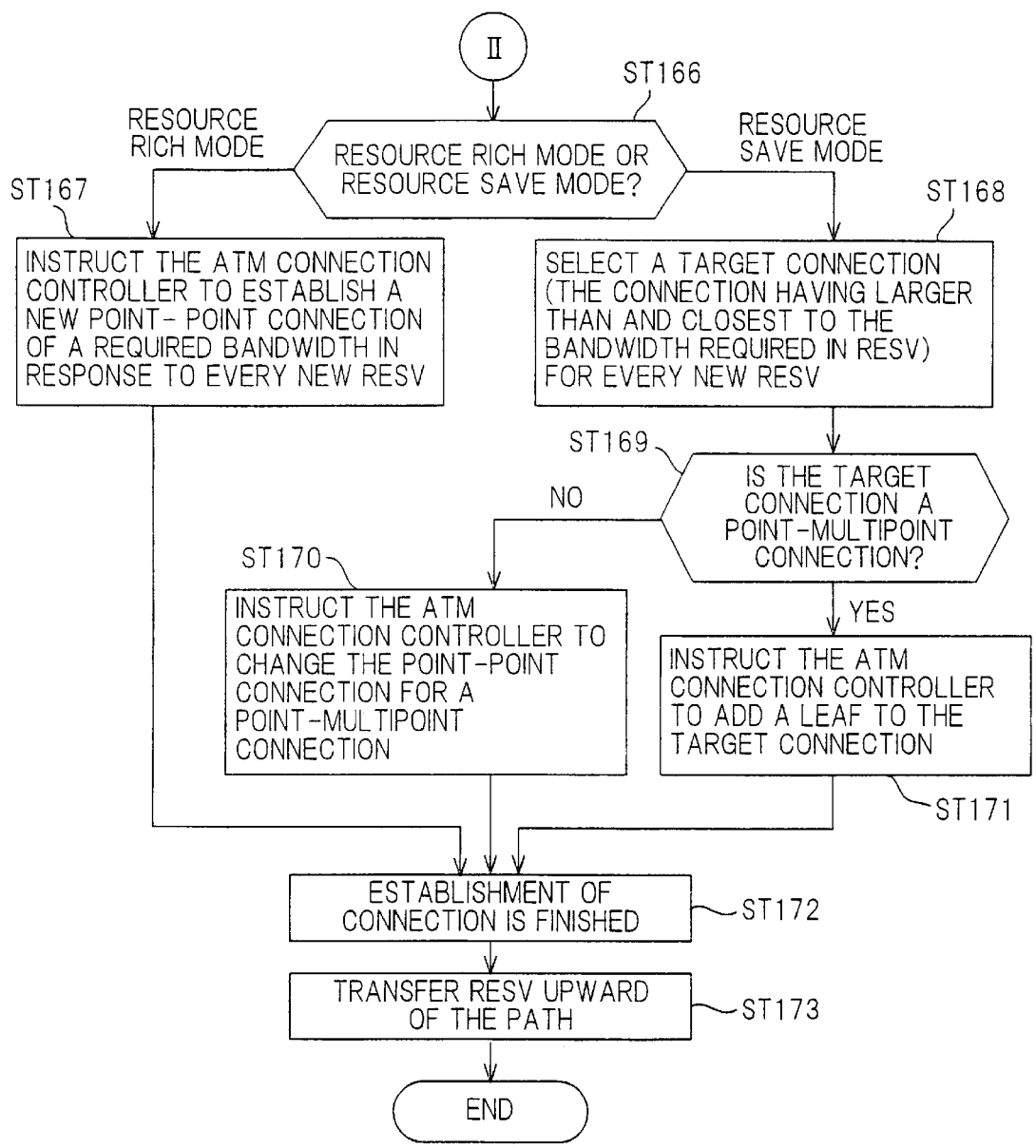
FIG. 41 is a flowchart of a second connection establishing process in a resource threshold value system which uses a p-mp connection in combination with a p-p connection.

FIGS. 40 and 41 are flowcharts of the operation of the boundary apparatus $EN_0$ on the transmission side in the resource threshold value system.

After transmitting a Path message PATH to the receiving terminals $R_1$ to $R_n$, the boundary apparatus $EN_0$ assumes a Reserve message RESV receiving state. The entry controller 44 resets a control variable C representing the number of Reserve messages which have arrived (number of connections) to 0, resets a control variable BD representing the bandwidth required in the Reserve message which have arrived to 0, and initializes the mode to the resource rich mode (step ST161 in FIG. 40). When a first Reserve message arrives, the boundary apparatus $EN_0$ starts the entry timer 45 (step ST162).

The entry controller 44 then increases the number C of connections by one (C=C+1), and adds the bandwidth required by the new RESV to BD, thereby renewing BD (step ST163). When the number C of connections exceeds $C_0$ or the bandwidth BD exceeds the threshold value $BD_0$, the resource rich mode is switched for the resource save mode.

The entry controller 44 then judges whether or not the entry timer 45 has stopped (step ST164). If the measuring operation by the entry timer 45 has not been finished, and a new Reserve message arrives (step ST165), the operations at the steps ST163 and thereafter are repeated with respect to the new Reserve message.

If the entry timer 45 has stopped, the entry controller 44 judges in which mode the boundary apparatus $EN_0$ is (step ST166 in FIG. 41). If it is in the resource rich mode, the entry controller executes a similar operation to that at the step ST132 in FIG. 33, and if it is in the resource save mode, it executes similar operations to those at the steps ST133, ST134, ST135 and ST136 in FIG. 33, at steps ST168, ST169, ST170 and ST171, respectively.

When the establishment of the connection is finished (step ST172), the packet transmitting portion 50 transfers the Reserve messages upward of the path (step ST173), thereby finishing the operation.

Figure 42:
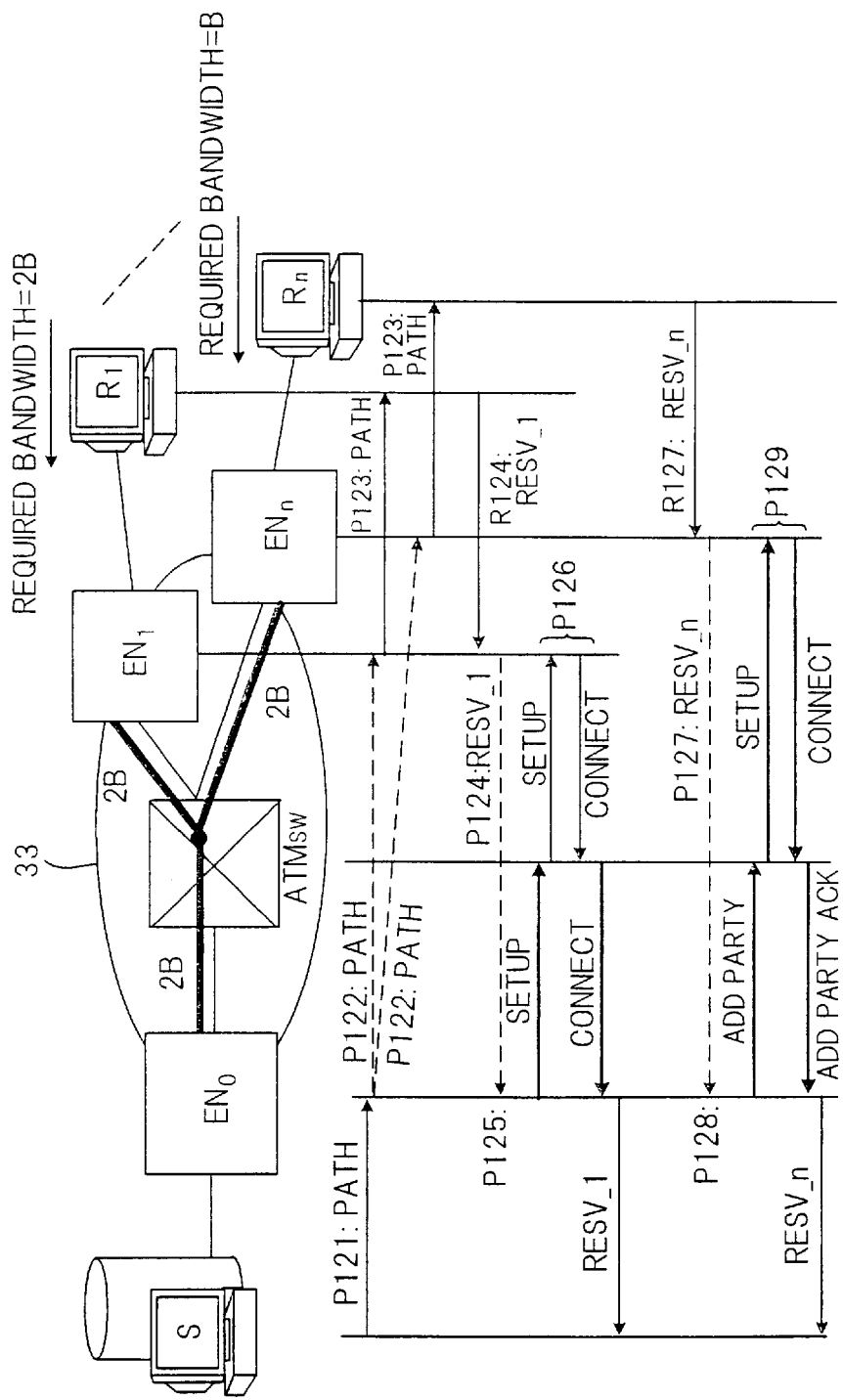
FIG. 42 shows a sequence for immediate connection establishment.

In the systems for the entry time connection establishing method explained above, it is possible to start a connection establishing operation immediately after a request for resource is received from a receiver, if the entry time is set at 0. FIG. 42 is an explanatory view of the sequence of an immediate connection establishing system.

Figure 43:
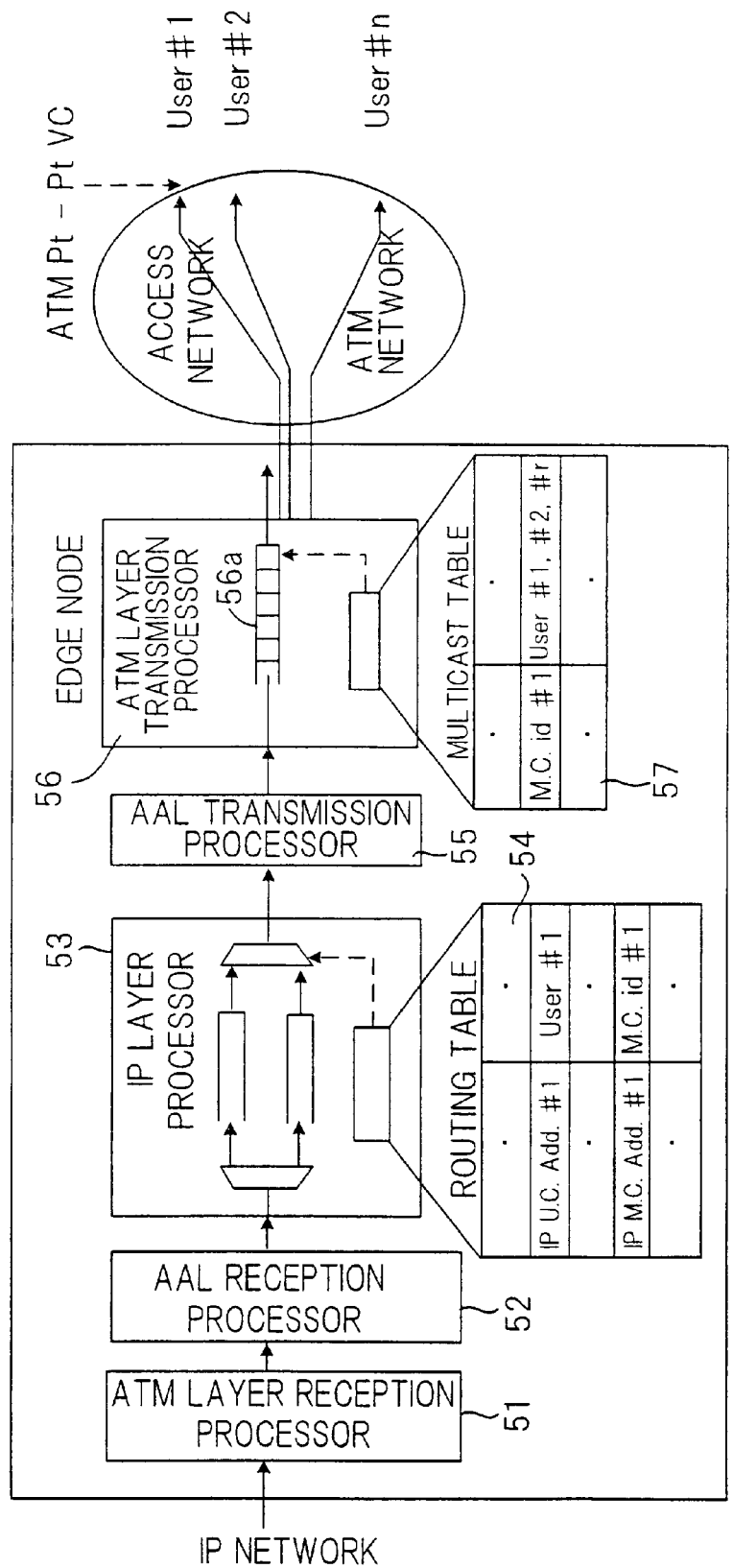
FIG. 43 shows the structure of a boundary apparatus.

(I) Mapping of the QoS Classes of RSVP and ATM (a) Structure of a Boundary Apparatus FIG. 43 shows the structure of a boundary apparatus which is separated into blocks mainly on the basis of the flow of a signal.

A boundary apparatus is a multi-function exchange which has an ATM function, an ATM signaling processing function and an IP transferring function. It is provided with an ATM layer reception processor 51, an AAL (ATM Adaptation Layer) reception processor 52, an IP layer processor 53, a routing table 54, an AAL transmission processor 55, an ATM layer transmission processor 56, etc.

A plurality of ATM cells created by dividing an IP packet delivers from the terminals via the IP network. The ATM layer reception processor 51 executes processing related to an ATM layer such as conversion to an AAL. The AAL reception processor 52 executes processing related to an AAL. Generally, the AAL reception processor 52 assembles an AAL packet and analyzes the contents. The IP layer processor 53 receives the packet transmitted from the AAL reception processor 52, analyzes the IP header and outputs the packet to the corresponding path in accordance with the routing table 54. The IP layer processor 53 also processes a protocol such as an RSVP. The AAL transmission processor 55 attaches an AAL header to an IP packet, and transmits it to the ATM layer transmission processor 56. The ATM layer transmission processor 56 divides the packet into cells, and successively queues the cells to a buffer 56a for traffic shaping, At the same time, it reads cells from the buffer 56a at a predetermined speed and transmits them to an ATM network. The ATM layer transmission processor 56 also transmits the packet for multicast by reference to a multicast table 57.

(b) QoS Classes of RSVP and ATM

An RSVP provides three types of services: Guaranteed Service (GS), Controlled Load Service (CLS) and Best Effort Service (BES) having the following characteristics.

(1) Guaranteed Service (GS)

GS guarantees the bandwidth and the largest delay between the ends. In GS, the maximum delay time is not accepted as a parameter required by the user but the maximum delay time is accepted as a result of transfer. In other words, GS cannot control a fixed delay time such as the processing time and the transfer time of the router, but it can guarantee the maximum delay time by controlling only a delay caused by queuing.

(2) Controlled Load Service (CLS)

In CLS, the same service as Best Effort Service is provided even if the network is in a congested state. In other words, it offers low service of packet delay and packet discard without a strict guarantee. This service is realized by the admission control of data flow. Viewed from a different angle, CLS is a service guaranteeing the least bandwidth.

(3) Best Effort Service (BES)

BES is the service in the present internet.

In the ATM, there are three types of services: DBR (Deterministic Bit Rate), ABR (Available Bit Rate) and UBR (Unspecified Bit Rate) services which have the following characteristics.

(1) DBR (Deterministic Bit Rate) Service

The DBR service is a service for allotting a predetermined bandwidth to a connection. More specifically, in the DBR service, the bandwidth necessary for guaranteeing a required quality such as a cell loss rate and a cell transfer delay is allotted on the basis of the traffic parameter reported from the user. This is a service which can enable the network to be used most extravagantly.

(2) ABR (Available Bit Rate) Service

The ABR service is a service for allotting the minimum guaranteed rate to a connection. It is permitted to communicate at a speed higher than the minimum guaranteed rate. In this case, if there is room in the network, cells are transferred.

(3) UBR (Unspecified Bit Rate) Service

The UBR service is a class in which the quality is not regulated. This is a service provided for the BES in the internet. It is possible to allot a predetermined bandwidth to a USR connection in the ATM network.

(c) Service Class Conversion Control

Figures 44, 45:
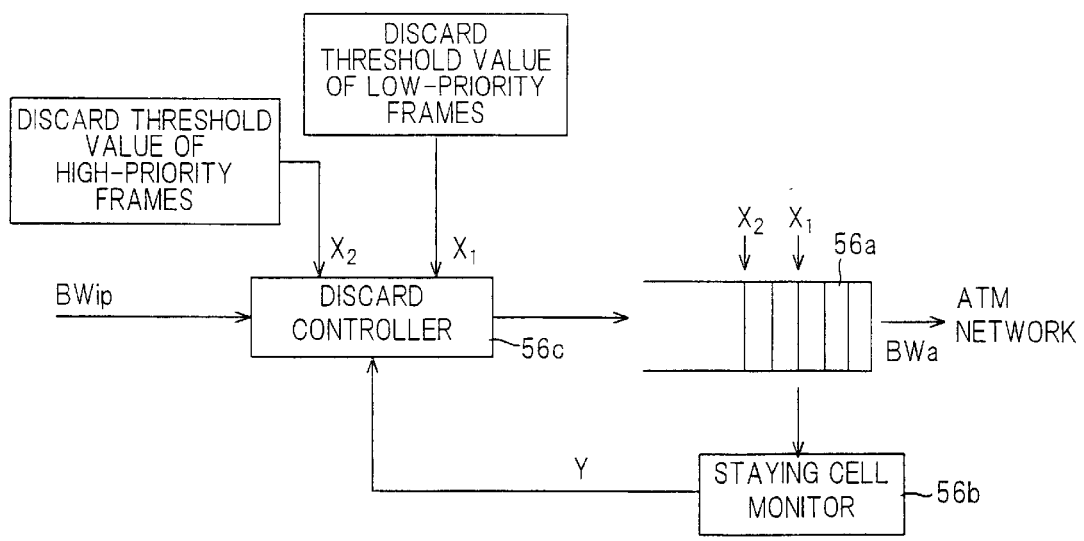
FIG. 44 is an explanatory view of mapping traffic classes in the RSVP and the ATM.
FIG. 45 shows a frame discard control of a boundary apparatus on the transmission side.

The three types of services in an RSVP correspond to the three types of services in the ATM, as shown in the table of FIG. 44. That is, (1) The Guaranteed Service (GS) in the RSVP corresponds to the DBR (Deterministic Bit Rate) service in the ATM, (2) The Controlled Load Service (CLS) corresponds to the ABR (Available Bit Rate) service, and (3) The Best Effort Service (BES) corresponds to the UBR (Unspecified Bit Rate) service.

In the IP, it is possible to designate a traffic class in the IP header. Accordingly, the ATM layer reception processor 51 of each boundary apparatus discerns the traffic class by referring to the IP header, and discerns the corresponding class in the ATM network by referring to the table shown in FIG. 44 before AAL conversion. For example, if the traffic class in the IP requires real-time processing (GS), the corresponding class in the ATM which guarantees real-time processing (DBR) is selected. In this manner, even if there is an ATM network between IP networks, similar QoS control is possible in the IP communication as a whole.

(J) Packet Discard Control

The boundary apparatus $EN_0$ on the transmission side discards a packet which has arrived when the traffic flown from the IP network is larger than the traffic transmitted to the ATM network. The boundary apparatus $EN_1$ on the reception side discards cells in a frame (IP packet) when the traffic flown from the ATM network is larger than the traffic transmitted to the IP network. In both cases, the order of priority is determined among frames, and cells are discarded in the reverse order of priority.

(a) Discard Control in the Boundary Apparatus $EN_0$ on the Transmission Side If it is assumed that the traffic transmitted to the ATM network is BWa and the traffic arriving from the IP network is BWip, when BWip becomes larger than BWa, cells begin to dwell in the buffer 56a for shaping of the ATM layer transmission processor 56 (FIG. 43). When the buffer 56a becomes overflowing with the cells, i.e., when the queue length Y becomes larger than a preset length X, the ATM layer transmission processor 56 discards cells in a packet (frame).

In addition, if the order of priority is attached to each frame, it is possible to control the discard of a frame in the reverse order of priority. In this case, since an identifier which indicates the last cell in a frame is written in the cell header (the last cell identifier of AAL5), frames are separated by utilizing the identifier. The priority identifier attached to the frame is used in order to know the order of discarding the frame.

FIG. 45 shows the structure of discard control with the priority in consideration. In FIG. 45, the reference numeral 56a represents the buffer for shaping, 56b a dwelling cell monitor for monitoring the amount (queue length) Y of cell dwelling in the buffer 56a, and 56c a discard controller. It is now assumed that the frame discard threshold value of frames of a low priority is $X_1$ and the frame discard threshold value of frames of a high priority is $X_2$ ($>X_1$). With respect to a frame of a low priority, if the amount Y of dwelling cell exceeds $X_1$, the discard controller 56c discards the frame. With respect to a frame of a high priority, if the amount Y of dwelling cell exceeds $X_2$, the discard controller 56c discards the frame.

(b) Discard Control in the Boundary Apparatus $EN_i$ on the Reception Side

Figure 46:
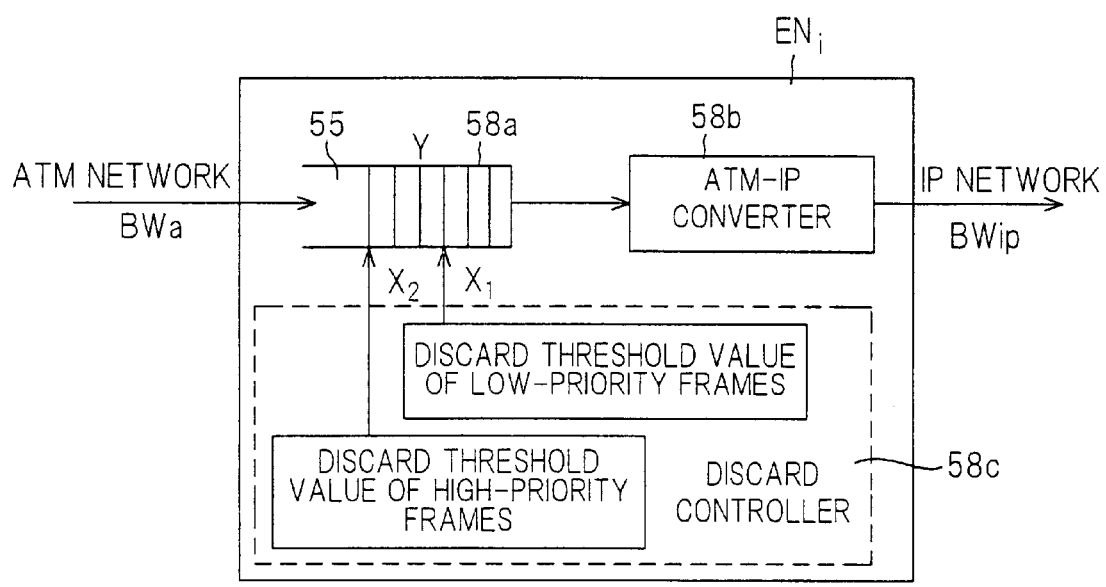
FIG. 46 shows a frame discard control of a boundary apparatus on the reception side.

FIG. 46 is an explanatory view of the discard control in the boundary apparatus $EN_i$ on the reception side. In FIG. 46, the reference numeral 58a represents a buffer for traffic shaping which queues the cells, and reads and outputs the cells at a predetermined rate, 58b an ATM-IP converter for converting ATM cells to an IP packet, and 58c a discard controller.

If it is assumed that the traffic transmitted to the IP network is BWip and the traffic arriving from the ATM network is BWa, when BWa becomes larger than BWip, cells begins to dwell in the buffer 58a. When the buffer 58a becomes overflowing with the cells, i.e., when the queue length Y becomes larger than a preset length, the discard controller 58c discards cells in a packet.

In this case, it is possible to exert discard control by adding the order of priority to each frame in the same way as the discard control in the boundary apparatus $EN_0$ on the transmission side. For example, it is assumed that the frame discard threshold value of low-priority frames is $X_1$ and the frame discard threshold value of high-priority frames is $X_2$ ($>X_1$). With respect to a low-priority frame, if the amount Y of dwelling cell exceeds $X_1$, the discard controller 58c discards the frame. With respect to a high-priority frame, if the amount Y of dwelling cell exceeds $X_2$, the discard controller 58c discards the frame.

(c) Processing for Discarding Cells in a Packet

Figure 47:
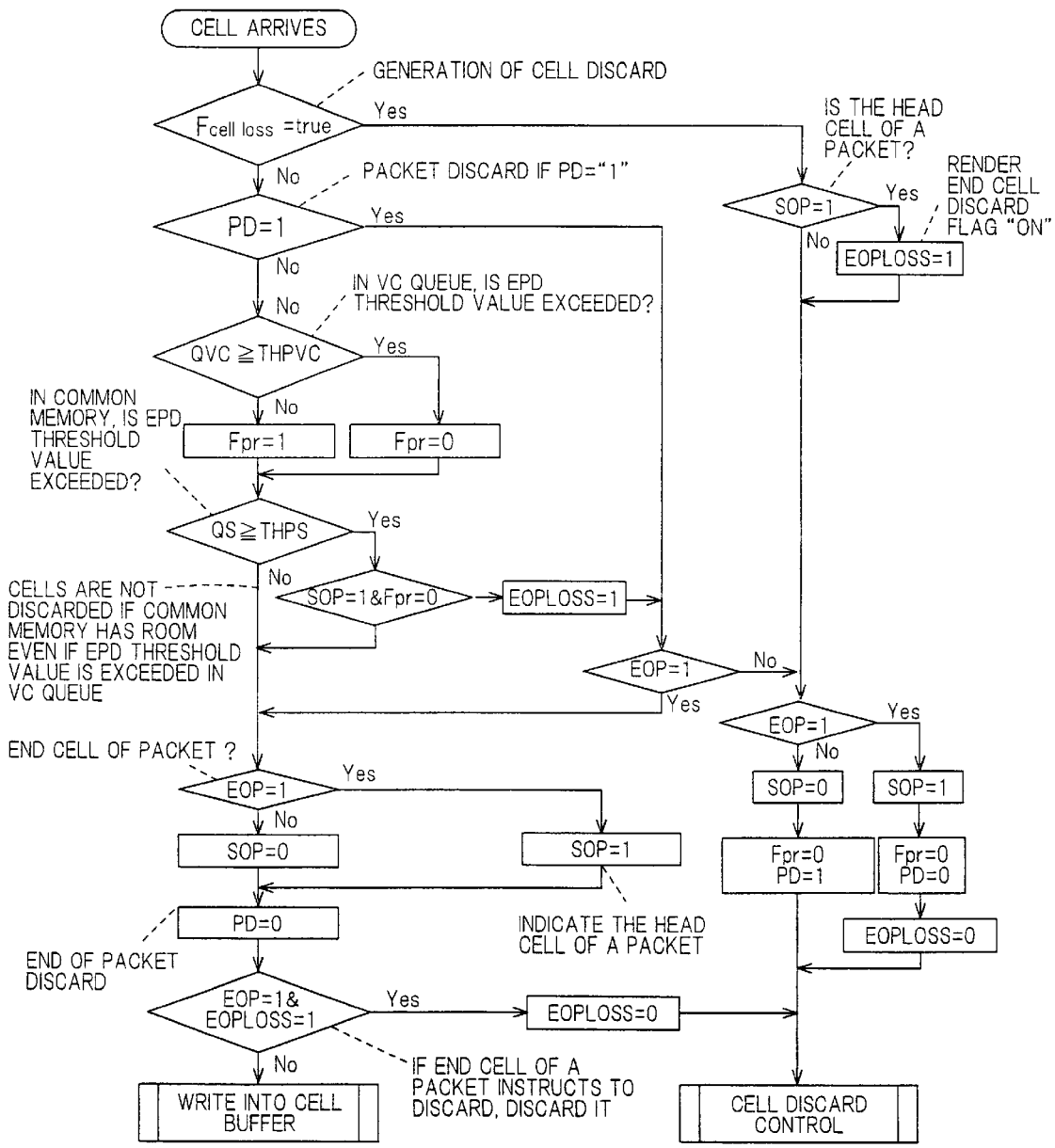
FIG. 47 is a flowchart of a process for discarding cells in a packet.

FIG. 47 is a flowchart of the known EPD (Early Packet Discard)/PPD (Partial Packet Discard) algorithm for discarding a packet which is divided into ATM cells and transferred in the ATM. An IP packet generally has a length of several hundred to several thousand bytes. If one cell is discarded in the ATM layer due to congestion, all the cells of the IP packet to which the one discarded cell belongs become invalid. That is, EPD/PPD is a function of discarding all the cells in the packet at the congested portion without transferring the remaining cells to the downward ATM network. There are two types of method of discarding a packet: PPD and EPD.

(1) PPD: In the PPD, when one cell is discarded, all the remaining cells in the packet to which the discarded cell belongs are discarded.

(2) EPD: In the EPD, a threshold value is provided in a buffer. When the queue length exceeds the threshold value, all the packets which will come thereafter are discarded. That is, packets are discarded a little before congestion is caused.

The parameters in FIG. 47 have the following meanings.

ENP: Packet discard (0: Invalid, 1: Valid)

QS: Queue length in a common buffer

QVC: Queue length in a buffer of the corresponding VC

THPS: Threshold value for starting EPD in a common buffer

THPVC: Threshold value of the EPD in a buffer

EOP: mark indicating the tail of a packet (1: Last cell of the packet)

Fpr: Packet transfer preference flag (0: Nonpreference, 1: Preference)

PD: Packet discard start flag (0: Don't discard 1: Discard)

SOP: Packet head cell identifier flag (1: Packet head cell)

EOPLOSS: EOP cell discard identifier flag (0: Don't discard, 1: Discard)

Fcell loss: Selected cell discard state flag (True: Discard cell, False: Don't discard)

(K) SVC Cut Control

When a connection is established in the ATM network by using an SVC, it is natural that the SVC connection is cut in response to a request from a receiver. It is, however, desirable to save resource (bandwidth, VPI/VCI) by automatically cutting the SVC connection when traffic is not flown from a terminal due to a power failure, a trouble in an apparatus or the like. For this purpose, when an SVC connection is established, a boundary apparatus monitors the arrival of traffic by using a timer, and if no traffic arrives from the IP network even after elapse of a predetermined time, the boundary apparatus automatically cuts the SVC connection. In this case, the boundary apparatus discerns the type of network service (FTP, SMTP, TELNET, etc.), and if it is a service type for a long-time communication such as FTP (File Transfer Protocol), the cutting timer is set to be long, and if it is a service type for a short-time communication such as SMTP (Simple Mail Transfer Protocol), the cutting timer is set to be short.

Figure 48:
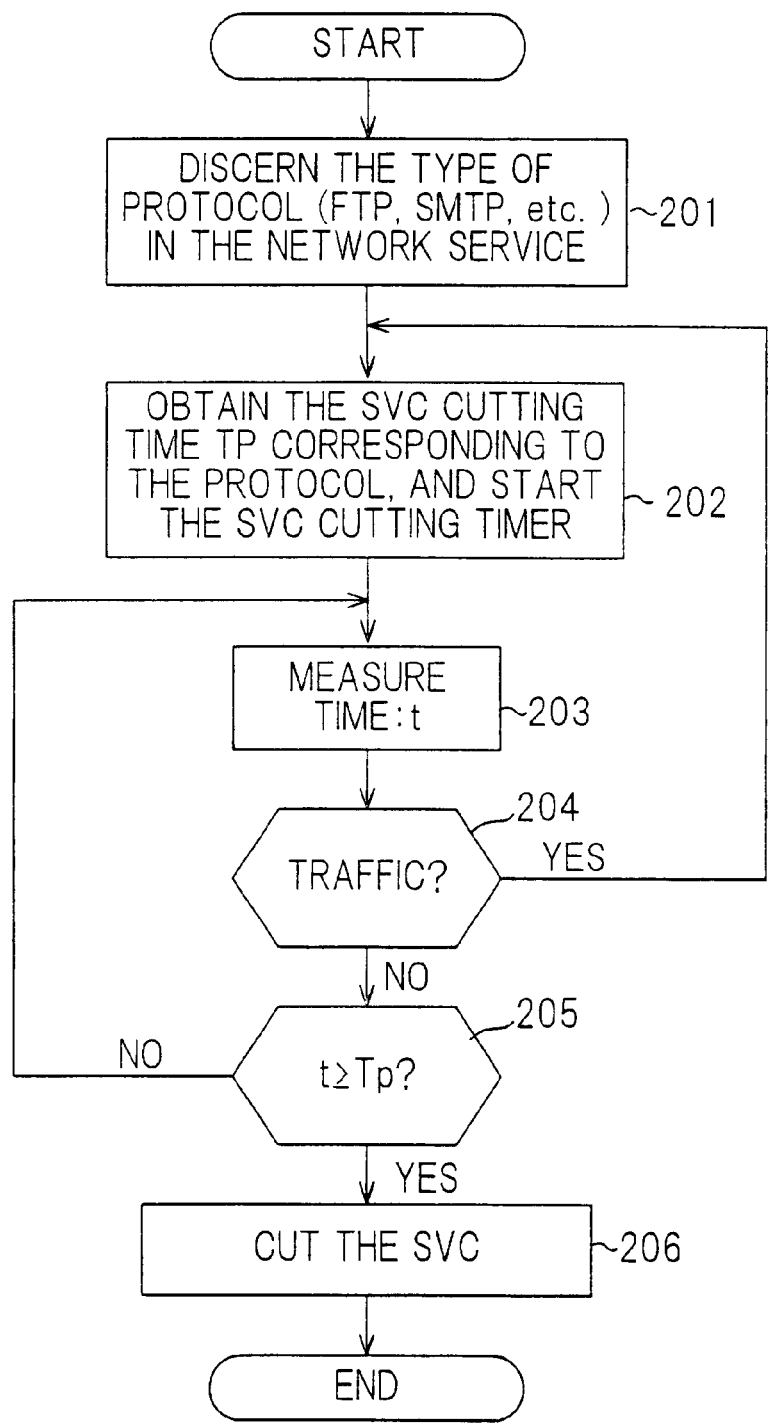
FIG. 48 is a flowchart of SVC cutting control.

FIG. 48 is a flowchart of the SVC cutting control process of the boundary apparatus $EN_0$ on the transmission side.

When the boundary apparatus $EN_0$ on the transmission side establishes a p-mp connection between the boundary apparatus $EN_0$ on the transmission side and each of the boundary apparatuses $EN_1$ to $EN_n$ on the reception side by using an SVC, it discerns the type of the protocol to be serviced by using an IP (step 201), obtains the SVC cutting time Tp corresponding to the protocol and starts an SVC cutting timer (step 202). Thereafter, the boundary apparatus $EN_0$ judges whether or not an IP packet has arrived at a predetermined interval while measuring time by the timer (step 203, 204), and if an IP packet has arrived, the measured time t is reset and the processing at the steps 202 and thereafter is repeated.

If there is no traffic which has arrived at the step 204, judgment is made as to whether or not the time t during which no traffic has arrived is larger than the SVC cutting time Tp (step 205), if it is smaller than Tp (t<Tp), the processing at the steps 203 and thereafter is executed. On the other hand, if the time t during which no traffic has arrived is larger than the SVC cutting time Tp (t>Tp), the SVC connection is cut by the ATM signaling process (step 206).

In this manner, it is possible to automatically cut the connection if no traffic is flown from a terminal due to a power failure, a trouble in an apparatus or the like, thereby saving the resource such as a bandwidth and a VPI/SVC. In addition, since the cutting time is set in accordance with the type of protocol in the network service, appropriate SVC cutting control is enabled.

(L) Connection Separating Policy with the Bandwidth Usage Ratio of the Entire ATM Network in Consideration In the above-described policy, a connection is selected/ established in accordance with the usage state of the resource between the boundary apparatus $EN_0$ on the transmission side and the first ATM switch connected thereto. In the following will be explained a policy about selecting/ establishing a connection for data transmission service with consideration for not only the bandwidth usage ratio between the boundary apparatus on the transmission side and the first ATM switch connected thereto, but the bandwidth usage ratio in the ATM switch in the core portion of the ATM network, i.e., the bandwidth usage ratio of the entire ATM network.

(a) Structure

Figure 49:
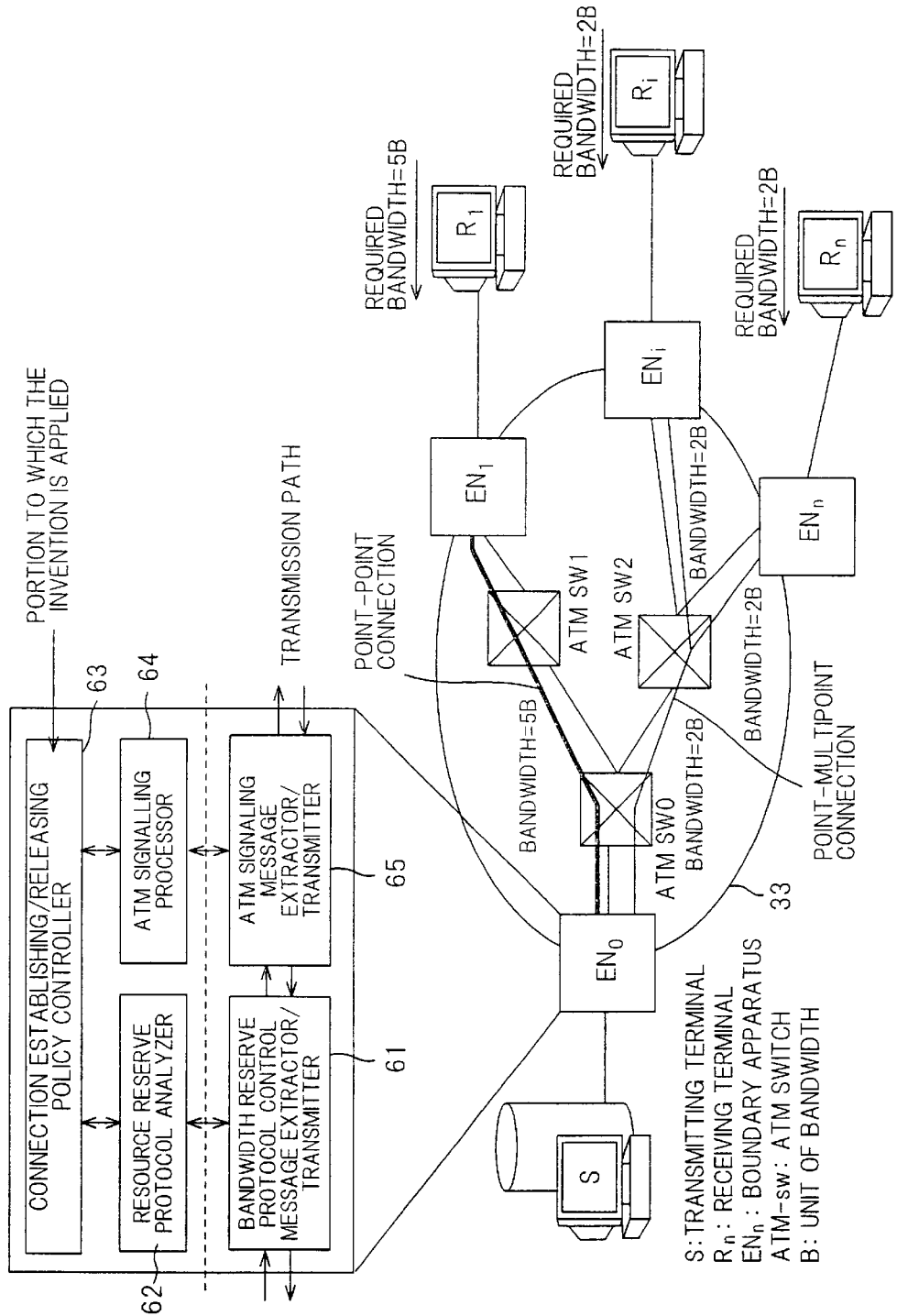
FIG. 49 shows the network structure for explaining a connection establishing policy with consideration for the bandwidth usage ratio in the entire ATM network.

FIG. 49 shows the structure of an internet system for establishing a connection with consideration for the bandwidth usage ratio of the entire ATM network according to the present invention. In FIG. 49, the symbol S represents a transmitting terminal, $R_1$ to $R_n$ receiving terminals, $EN_0$ a boundary apparatus $EN_0$ on the transmission side, $EN_1$ to $EN_n$ boundary apparatuses on the reception side, and ATM SW0 to ATM SW2 a plurality of ATM switches provided in the ATM network 33. A p-p connection of a bandwidth of, for example, 5B is established between the boundary apparatus $EN_0$ on the transmission side and the boundary apparatus $EN_1$ on the reception side, and a p-mp connection of a bandwidth of 2B is established between the boundary apparatus $EN_0$ on the transmission side and each of the boundary apparatuses $EN_i$ to $EN_n$.

In the boundary apparatus $EN_0$ on the transmission side, the reference numeral 61 represents a control message extractor/transmitter for extracting/transmitting a control message (Path message, Reserve message, etc.) of a communication quality control protocol, 62 a resource reservation protocol analyzer, 63 a connection establishing/ releasing policy controller, 64 an ATM signaling processor, and 65 an ATM signaling message extractor/transmitter.

The control message extractor/transmitter 61 corresponds to the cell receiving portion 41/the cell-packet converter 49/the packet transmitting portion 50 shown in FIG. 3, the resource reservation protocol analyzer corresponds to the RSVP message processor 42, the connection establishing/ releasing policy controller 63 corresponds to the entry controller 44/the entry timer 45/the ATM resource judging portion 46, the ATM signaling processor 64 corresponds to the IP address-ATM address conversion table memory 43/the ATM connection controller 47, and the ATM signaling message extractor/transmitter 65 corresponds to the cell transmitting portion 48.

Figure 50:
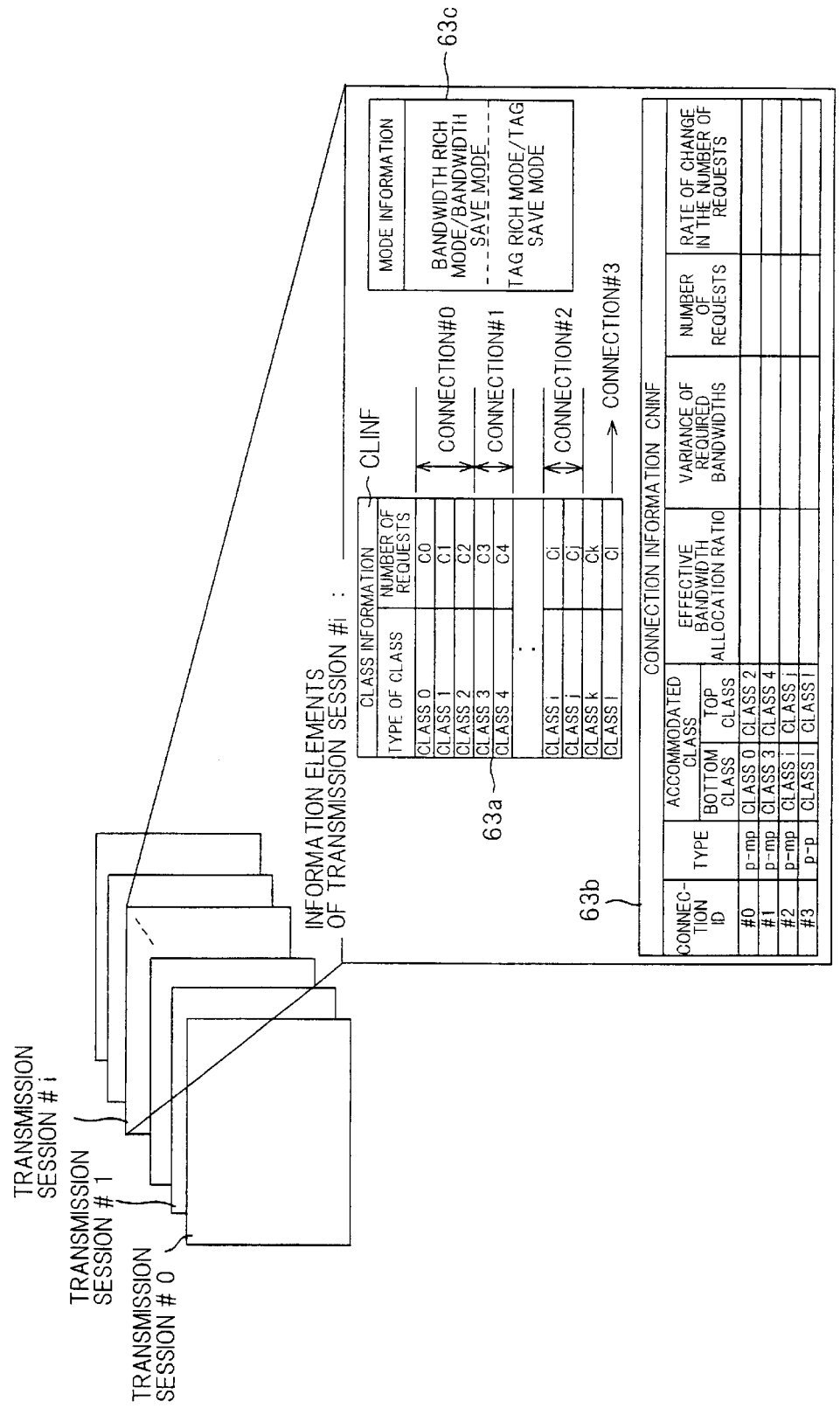
FIG. 50 is an explanatory view of class information and connection information.

The connection establishing/releasing policy controller 63 is provided with a class information table 63a, a connection information table 63b, a mode information table 63c, etc. for each of the transmission sessions #o to #n, as shown in FIG. 50. The class information table 63a updates and holds the latest class information CLINF, the connection information table 63b updates and holds the latest connection information CNINF, the mode information table 63c stores the mode (bandwidth rich mode or bandwidth save mode, tag rich mode or tag save mode, etc.), and the connection establishing/releasing policy controller 63 establishes a connection on the basis of these pieces of information.

The class information CLINF shows a correspondence between each of the x classes (class 0 to class x-1) into which the bandwidths are fixedly divided (see FIG. 19) and the number of requests for resource in each class. In the connection establishing method with the bandwidth usage ratio of the entire ATM network in consideration according to the present invention, a connection is not established for each class but a connection (p-p connection, p-mp connection) is established for each group consisting of 1 or more classes. More specifically, each request for resource is distributed to a predetermined class on the basis of the required bandwidth, and one p-mp connection supports a plurality of requests which belong to a plurality of classes. The connection information CNINF shows (1) type of connection (p-p connection or p-mp connection), (2) the top and bottom classes of the group corresponding to the connection, (3) the effective bandwidth allocation ratio, (4) the variance of the required bandwidths (or the square variation coefficient of the required bandwidths), (5) the number of requests for resource, and (6) the rate of change in the number of requests. The later-described establishing/ separation of a connection is executed on the basis of these pieces of information.

(b) First Connection Establishing/Separating Method with an Effective Bandwidth Allocation Ratio in Consideration (b-1) Summary The boundary apparatus $EN_0$ on the transmission side establishes/separates a connection in the following manner with consideration for an effective bandwidth allocation ratio. The effective bandwidth allocation ratio β of the connection corresponding to the group including a class to which a new request for resource is distributed is calculated from the following formula. If the effective bandwidth allocation ratio β is not more than a preset value, the connection is separated into two connections so that the effective bandwidth allocation ratio of the entire ATM network may improve. That is, the connection is separated into the remaining connection and a new connection.

The effective bandwidth allocation ratio β of the connection $$\#a = \Sigma_i b_i \times C_i / B \times \Sigma_i C_i \quad (3)$$

i: the identifier of the class which belongs to the group corresponding to the connection #a bi: the upper limit of the bandwidth of class i Ci: the number of requests belonging to class i B: the bandwidth of the connection #a (b-2) Meaning of the Effective Bandwidth Allocation Ratio β

In a single p-mp connection, since the bandwidth to be set is restricted to only one, it is necessary to make the bandwidth of each leaf the same. For this reason, the maximum required bandwidth in the transmission session is provided as the bandwidth of a single p-mp connection. However, this is an excessive bandwidth allocation, and wastes the bandwidth in the ATM network as a whole. The effective bandwidth allocation ratio β represented by the formula (3) shows the allocation ratio of the bandwidth of a connection between a boundary apparatus on the reception side and an ATM switch connected thereto. This serves as an index for estimating an excessive bandwidth allocation. For example, in FIG. 49, if three requests connected to the boundary apparatuses $EN_1$, $EN_i$, $EN_n$ are connected by a single p-mp connection (bandwidth: 5B), the effective bandwidth allocation ratio β of the connection becomes as follows from the formula (3):

$$\beta = (2 \times 2 + 5 \times 1)/5 \times 3 = 0.6$$

The effective use of the bandwidth and the VPI/VCI resource between the boundary apparatus $EN_0$ on the transmission side and the first ATM switch ATM SW0 has a trade-off relation with the effective use of the bandwidth in the entire ATM network. For example, the single p-mp connection described above is the most effective use of the bandwidth between the boundary apparatus $EN_0$ on the transmission side and the first ATM switch ATM SW0 in FIG. 49. The single p-mp connection, however, is not optimum with respect to the effective use of the bandwidth in the entire ATM network. It is more effective to establish a p-p connections between the boundary apparatus $EN_0$ on the transmission side and each of the boundary apparatuses on the reception side, namely to establish three p-p connections in all.

(b-3) Flow of Processing

The portion between the boundary apparatus $EN_0$ on the transmission side and the first ATM switch ATM SW0 is a bottleneck which is restricted by the physical circuit bandwidth. Accordingly, the establishing/separation of a connection based on the effective bandwidth allocation ratio β should be executed when there is room in the bandwidth and the resource between the boundary apparatus $EN_0$ on the transmission side and the first ATM switch ATM SW0.

Figure 51:
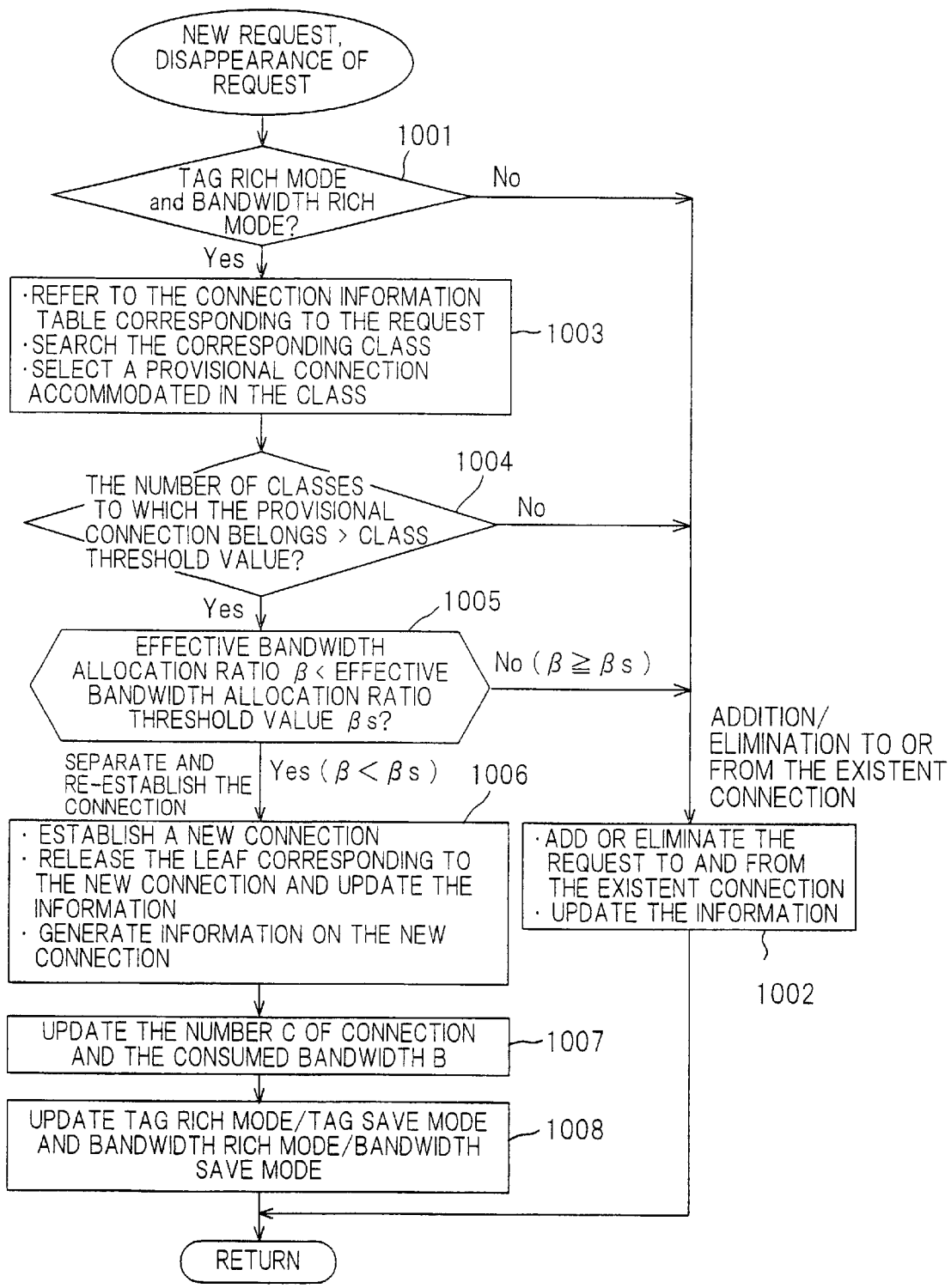
FIG. 51 is a flowchart of a process for establishing a connection with consideration for the effective bandwidth allocation ratio.

FIG. 51 is a flowchart of a connection establishing/separating control with the effective bandwidth allocation ratio β in consideration according to the present invention. The moment at which the processing starts is when a new request for resource is delivered or a flow of requests is interrupted, when the state of connection changes.

When the moment at which the processing starts comes, the state (mode) between the boundary apparatus $EN_0$ on the transmission side and the first ATM switch is first checked (step 1001). If it is the bandwidth save mode or the tag save mode, the request for resource is accommodated in the existent connection, or eliminated from the existent connection, and the class information CLING and the connection information CNINF are updated (step 1002). For example, when a new request for resource reaches, a class is obtained on the basis of the required bandwidth, and the request for resource is accommodated in the connection of the class (a leaf is added or the connection is re-established). In addition the corresponding class and the corresponding number of requests in the class information table 63a and the connection information table 63b, respectively, are updated. Thereafter, the process returns to the beginning, and the same processing is repeated.

If the mode is the bandwidth rich mode and the tag rich mode at the step 1001, the class to which the request for resource is to be distributed is obtained, and the connection (referred to as provisional connection hereinafter) corresponding to the group to which the class belongs is selected by reference to the connection information table 63b (step 1003).

Judgment is then made as to whether or not the provisional connection can be an object of separation (step 1004). If the class accommodated in the group of the provisional connection is only one, separation is impossible so that the connection is not an object of separation. If the number of classes accommodated is small, there will be small merit in separation. Consequently, only the connection in the group which accommodates not less than a preset number of classes is considered as an object of separation.

The effective bandwidth allocation ratio β of the provisional connection which satisfies the condition at the step 1004 with the request for resource added thereto or eliminated therefrom is calculated from the formula (3), and is compared with the threshold value for separation/re-establishing, namely the 'effective bandwidth allocation ratio threshold value βs' (step 1005). If $\beta \geq \beta s$, the bandwidth allocation ratio in the entire ATM network is good, so that the separation/re-establishing of the connection is unnecessary. Accordingly, the processing at the step 1002 is executed without separating/re-establishing of the connection.

On the other hand, if $\beta < \beta s$, the loss in bandwidth is large in the entire ATM network, so that the connection is separated into two (remaining and new) connections which are to be re-established so as to improve the effective bandwidth allocation ratio (step 1006). More specifically, (1) a new connection is established, (2) the corresponding leaf is released from the remaining connection, and (3) new connection information is generated while the remaining connection information is corrected, and the contents of both of the tables 63a and 63b are updated.

Thereafter, the number C of connections and consumed bandwidth B between the boundary apparatus $EN_0$ on the transmission side and the first ATM switch ATM SW0 are updated (step 1007), and judgment is made as to whether the mode is the tag rich mode or the tag save mode, and the bandwidth rich mode or the bandwidth save mode by reference to the number C of connections and consumed bandwidth B (step 1008). Thereafter, the process returns to the beginning, and the same processing is repeated.

In this manner, the effective use of the bandwidth in the entire ATM network is enabled.

(c) Connection Establishing/Separation with the Effective Bandwidth Allocation Ratio and the Rate of Change in the Number of Requests in Consideration (c-1) Summary An increase or decrease in the number of requests for reservation is sharp at the start of a data transmission session, during the rising time of the machine or when the contents are changed. Under such a circumstance, there may generates unsuitable connection re-establishing, or frequent connection re-establishing. Especially, frequent connection re-establishing leads to an increase in the amount of signaling message in the ATM network, and increases the signaling processing load on not only a boundary apparatus but also each ATM switch, so that it needs to be prevented. That is, when the rate of change in the number of requests is high, it is desirable to avoid the separation of the existent connection, and the re-establishing of the connection due to separation.

For this purpose, the change of rate in the number of requests for each connection is monitored, and when the rate of change is high, the effective bandwidth allocation ratio threshold value $\beta s$, which is the standard for judging re-establishing, is reduced so as to make it difficult for satisfy the condition at the step 1005.

(c-2) Flow of Processing

Figure 52:
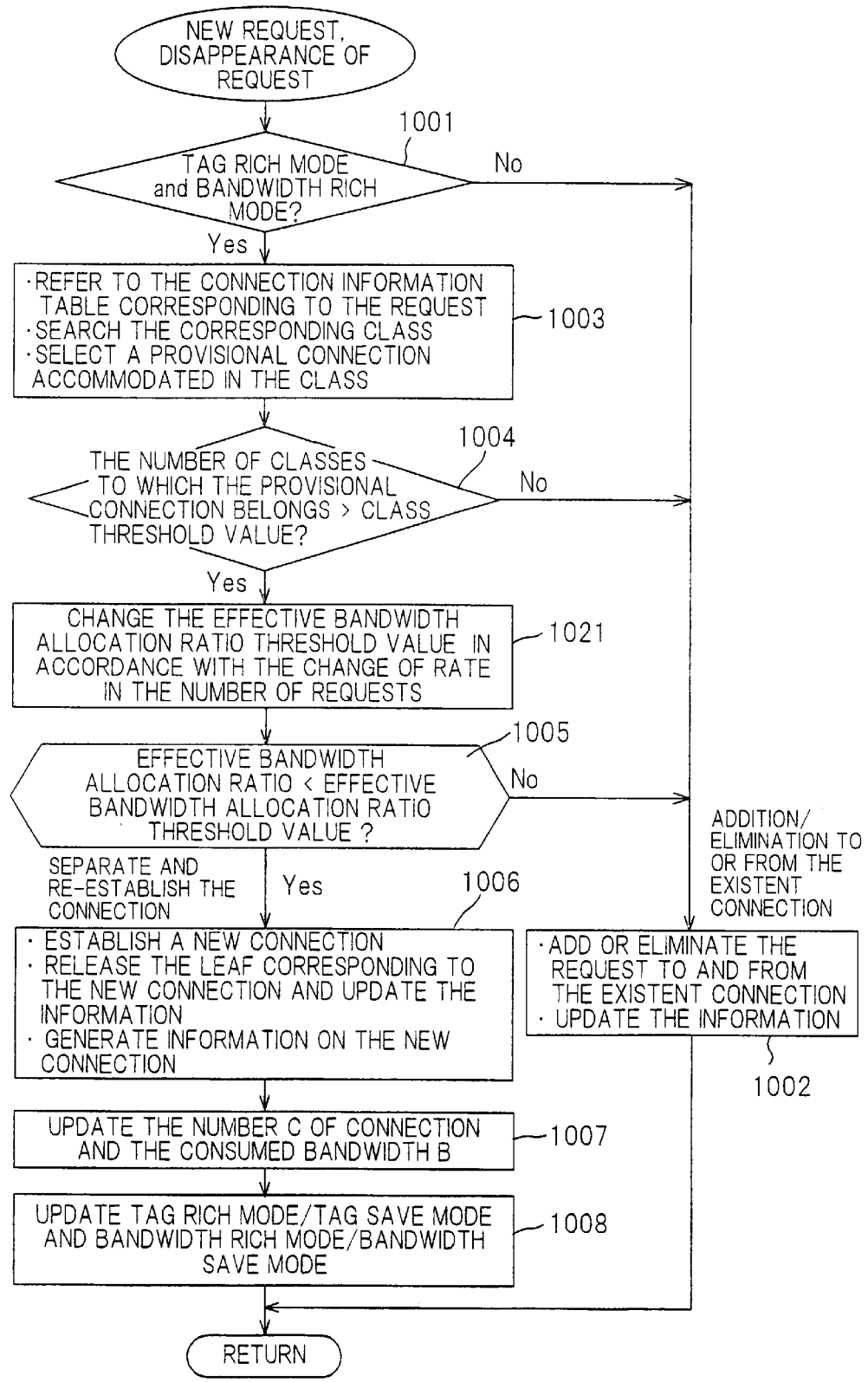
FIG. 52 is a flowchart of a first connection establishing process with the effective bandwidth allocation ratio and the rate of change in the number of requests in consideration.

FIG. 52 is a flowchart of the connection establishing and separation control with the effective bandwidth allocation ratio $\beta$ and the rate of change in the number of requests in consideration according to the present invention. This is the same as the flowchart shown in FIG. 51 except for the step 1021.

At the step 1004, if the number of classes which are accommodated in provisional connection is not less than a preset value, the rate of change in the number of requests is obtained, and the effective bandwidth allocation ratio threshold value $\beta s$ is changed in accordance with the following formula (step 1021), $$\beta s = \min\{\beta m, (Rcth/Rc) \cdot \beta b\} \quad (4)$$

herein, $\beta m$ is maximum effective bandwidth allocation ratio threshold value, Rcth threshold value of the change of rate in the number of requests, Rc change of rate in the number of requests) and $\beta b$ basic effective bandwidth allocation ratio threshold value.

The change of rate in the number of requests Rc may be obtained, for example, from the number of requests generated within a predetermined time such as several seconds. If the processing shown in FIG. 52 is repeated at an interval of the predetermined time, the number of requests generated within the predetermined time is considered to be the change of rate in the number of requests Rc.

When the change of rate in the number of requests becomes larger than the threshold value of the change of rate in the number of requests (Rc>Rcth), the effective bandwidth allocation ratio threshold value $\beta s$ reduces. If $\beta s$ increases, it is restricted by the maximum effective bandwidth allocation ratio threshold value $\beta m$ in accordance with the formula (4).

Thereafter, the effective bandwidth allocation ratio $\beta$ at the time of adding or eliminating the request for resource to or from the group corresponding to the provisional connection is calculated from the formula (3), it is compared with the 'effective bandwidth allocation ratio threshold value $\beta s$' obtained from the formula (4) (step 1005), and a similar processing to the processing shown in FIG. 50 is executed.

In this manner, since the rate of change in the number of requests Rc is monitored and when the change is large, the threshold value $\beta s$ is reduced so as to restrict connection re-establishing, it is possible to suppress excessive connection separation/re-establishing, and to lighten the signaling message processing load for re-establishing in the ATM network.

(c-3) Modification

Figure 53:
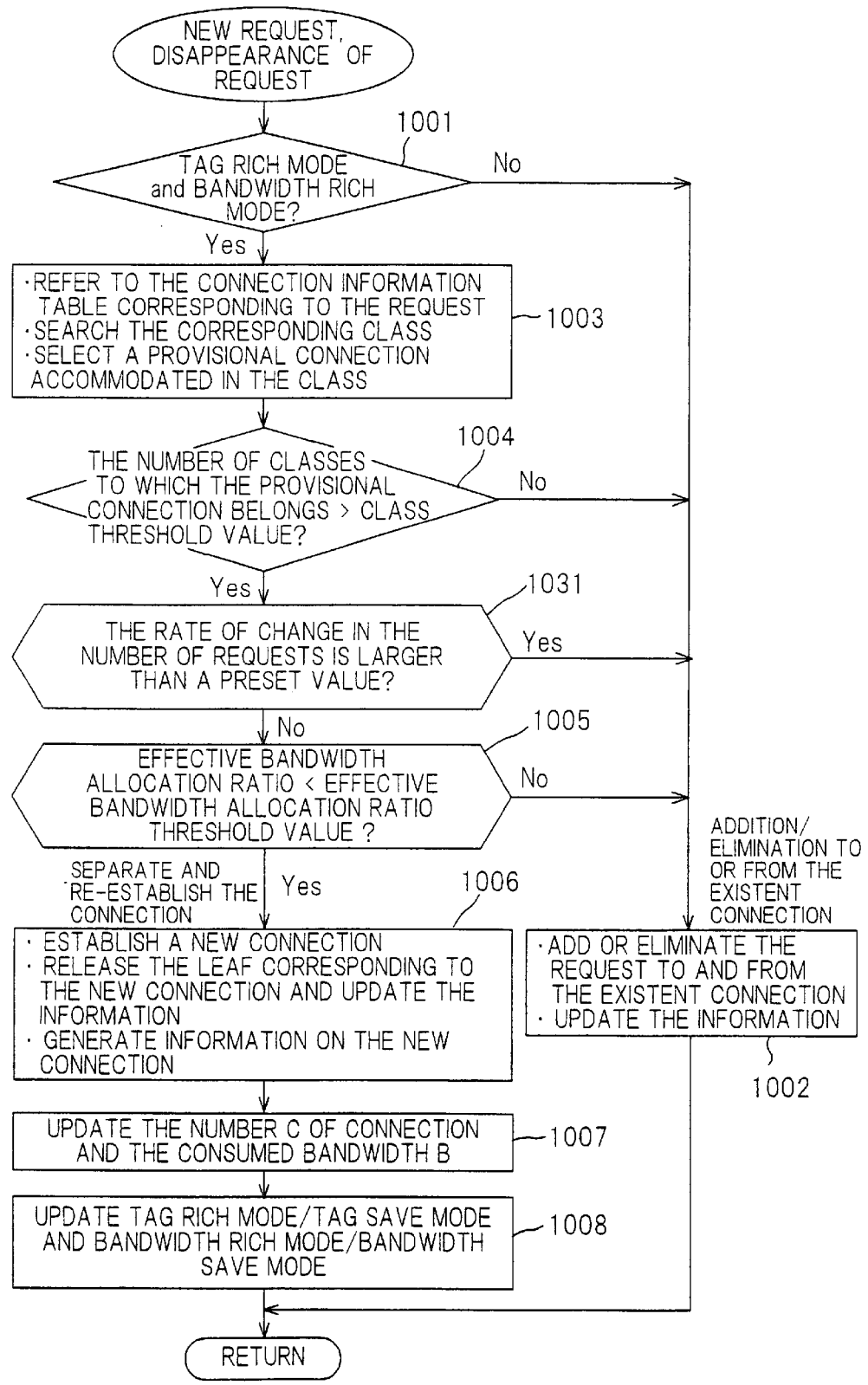
FIG. 53 is a flowchart of a second connection establishing process with the effective bandwidth allocation ratio and the rate of change in the number of requests in consideration.

FIG. 53 is another flowchart of the connection establishing and separation control with the effective bandwidth allocation ratio $\beta$ and the rate of change in the number of requests Rc in consideration according to the present invention. This is the same as the flowchart shown in FIG. 51 except for the step 1031. In this modification, if the rate of change in the number of requests Rc is larger than a preset threshold value Rcth at the step 1031, the separation of the connection is inhibited.

(d) Connection Establishing/Separation with the Effective Bandwidth Allocation Ratio and the Variance of Required Bandwidths in Consideration (d-1) Summary In a certain connection, requests for resource converge into the class of the highest bandwidth and the class of the lowest bandwidth. In such a case, if the class of the lowest bandwidth is separated and another connection is established, more effective use of the bandwidth is enabled. This is because, the largest bandwidth of a p-mp connection is allotted to a request for resource which is sufficient with the lowest bandwidth. To prevent this, in the connection in which $\beta<\beta s$ and which becomes the object of separation/re-establishing, if only the connection in which the distribution of the numbers of requests is biased toward the class of the highest bandwidth and the class of the lowest bandwidth is separated, the effective bandwidth allocation ratio $\beta$ is enhanced.

The bias of the distribution of the numbers of requests is represented by the variance of the required bandwidths. More concretely, the square bandwidth variation coefficient $\delta$ calculated from the variance of the required bandwidths is introduced, and a connection in which the square bandwidth variation coefficient $\delta$ exceeds the threshold value $\delta s$ is selected as an object of separation. The square bandwidth variation coefficient $\delta$ is obtained from the following formula:

$$\delta = v/bm^2 \quad (5)$$

v: the variance of the required bandwidths in the connection #a bm: the average of the required bandwidths in the connection #a $$bm = \Sigma_i bi \times Ci / \Sigma_i Ci \, (i=1 \text{ to } n) \quad (6)$$

$$v = (\Sigma_i bi^2 \times Ci)/(\Sigma_i Ci) - (\Sigma_i bi \times Ci)^2/(\Sigma_i Ci)^2 \quad (7)$$

i: the class identifier provided in the connection #a n: the number of classes which belong to the connection #a bi: the upper limit of the bandwidth of class Ci: the number of requests belonging to class i A connection accommodating three classes #0, #1 and #2 will be considered as an example. It is assumed that the classes #0, #1 and #2 accommodate the requests for the bandwidths 0 to 2B, 2B to 4B and 4B to 6B, respectively. The square bandwidth variation coefficient δ of the two connections #a and #b will be considered under the following conditions. It is assumed that in the connection #a, the number of requests in the classes #0, #1 and #2 are 7, 1, and 2, respectively, and in the connection #b, the number of requests in the classes #0, #1 and #2 are 5, 2, and 1, respectively.

The effective bandwidth allocation ratios of the connections #a and #b are equally 0.5.

However, the square bandwidth variation coefficient of the connection #a is 0.289, and that of the connection #b is 0.222. In #a, the numbers of requests are localized in class #0 and class #2, which are the lowest and the highest bandwidth classes, and this state is represented by the fact that the square bandwidth variation coefficient of the connection #a is larger than that of the connection #b.

If the class #0 is separated, the effective bandwidth allocation ratios (the weighted mean of the two separated connections) of the connections #a and #b are 0.944 and 0.889, respectively. It is clear the effect of separating #a is high.

As described above, if the threshold value δs of the square bandwidth variation coefficient is 0.25, for example, the connection #b is not an object of separation, but the connection #a is selected as an object of separation, and the effective bandwidth allocation is enhanced.

(d-2) Flow of a Process

Figure 54:
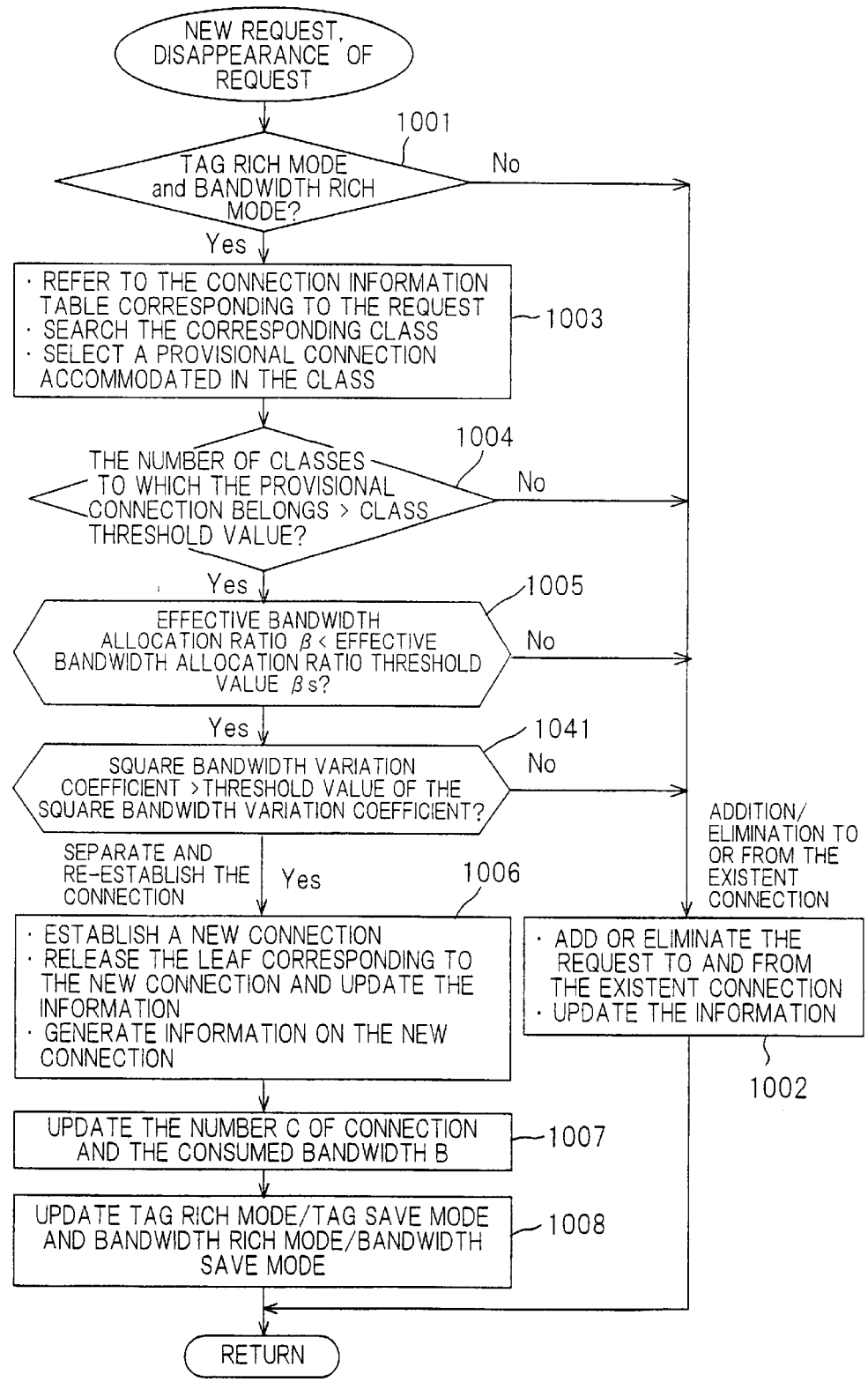
FIG. 54 is a flowchart of a third connection establishing process with the effective bandwidth allocation ratio and the rate of change in the number of requests in consideration.

FIG. 54 is a flowchart of the connection establishing and separation control with the effective bandwidth allocation ratio β and the variance of required bandwidths in consideration according to the present invention. This is the same as the flowchart shown in FIG. 51 except for the step 1041.

At the step 1005, the effective bandwidth allocation ratio β of the provisional connection with the request for resource added thereto or eliminated therefrom is calculated from the formula (3), and it is compared with the known effective bandwidth allocation ratio threshold value βs. If β>βs, the bandwidth allocation ratio in the entire ATM network is good, so that the separation or re-establishing of the connection is unnecessary. Accordingly, the processing at the step 1002 is executed without separating or re-establishing the connection.

On the other hand, if β<βs, the square bandwidth variation coefficient δ is calculated from the formulas (5) to (7), and the square bandwidth variation coefficient δ is compared with the preset threshold value δs of the square bandwidth variation coefficient (step 1041). If δ≦δs, it is impossible to effectively improve the effective bandwidth allocation ratio, so that the processing at the step 1002 is executed without separating or re-establishing the connection.

On the other hand, if δ>δs, it is possible to effectively improve the effective bandwidth allocation ratio, so that the processing at the steps 1006 and thereafter is executed in the same way as in FIG. 51.

In this manner, by judging the necessity of the separation/re-establishing of a connection by using the variance of the numbers of requests, it is possible to select an appropriate connection for separation/re-establishing, thereby effectively improving the effective bandwidth allocation ratio.

(M) Connection Separation Processing

In FIGS. 51 to 54, the connection separation/re-establishing processing is executed at the step 1006, but a concrete method of separation has not been explained. The algorithm for the connection separation/re-establishing will be explained in the following.

(a) First Connection Separating Method

Figure 55:
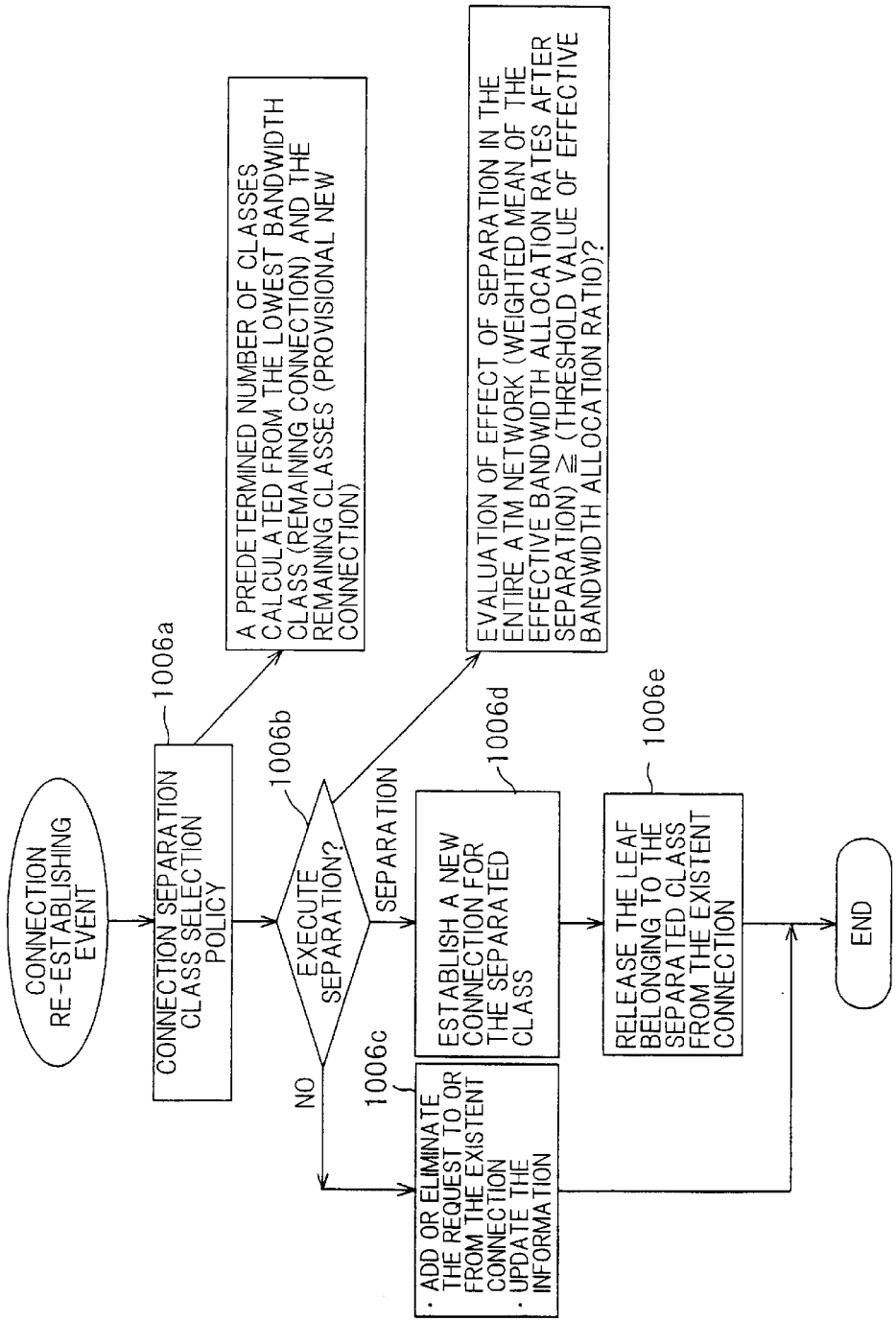
FIG. 55 is a flowchart of a first connection separating process.

FIG. 55 is a flowchart of a first connection separating process.

When the separation/re-establishing of a connection is necessitated, the requests in the group corresponding to the connection as the object of separation are separated into two groups in which the first group is consisted of the requests belonging to a predetermined number of the classes calculated from the smallest bandwidth class, and the second group is consisted of the remaining requests, and a new connection and the remaining connection are produced in accordance with the first and second group of requests, respectively (step 1006a).

The effective allocation ratios $\beta_1$ and $\beta_2$ are calculated with respect to the corresponding connections after the separation, and judgment is made as to whether or not the weighted mean $\beta$ ($=(\beta_1+\beta_2)/2$) is larger than the threshold value βs of the effective bandwidth allocation ratio (step 1006b). If β≦βs, it is impossible to effectively improve the effective bandwidth allocation ratio in the entire ATM network even if the connection is separated, so that the processing similar to that at the step 1002 shown in FIG. 52 is executed without separating or re-establishing the connection. That is, the corresponding request for resource is accommodated in the existent connection, or eliminated from the existent connection, and the class information CLING and the connection information CNINF are updated (step 1006c).

On the other hand, if β>βs, (1) a new connection is established for the first group, (2) the leaves related to the requests of the first group are released from the remaining connection for the second group, and (3) new connection information is created and the remaining connection information is corrected so as to update the contents of each of the tables 63a and 63b (steps 1006d, 1006e), thereby ending the connection separating/re-establishing process.

In this manner, it is possible to enhance the effective bandwidth allocation ratio with certainty by separating a connection. In addition, the separation/re-establishing of a connection is executed by a simple process.

(b) Second Connection Separating Method

Figure 56:
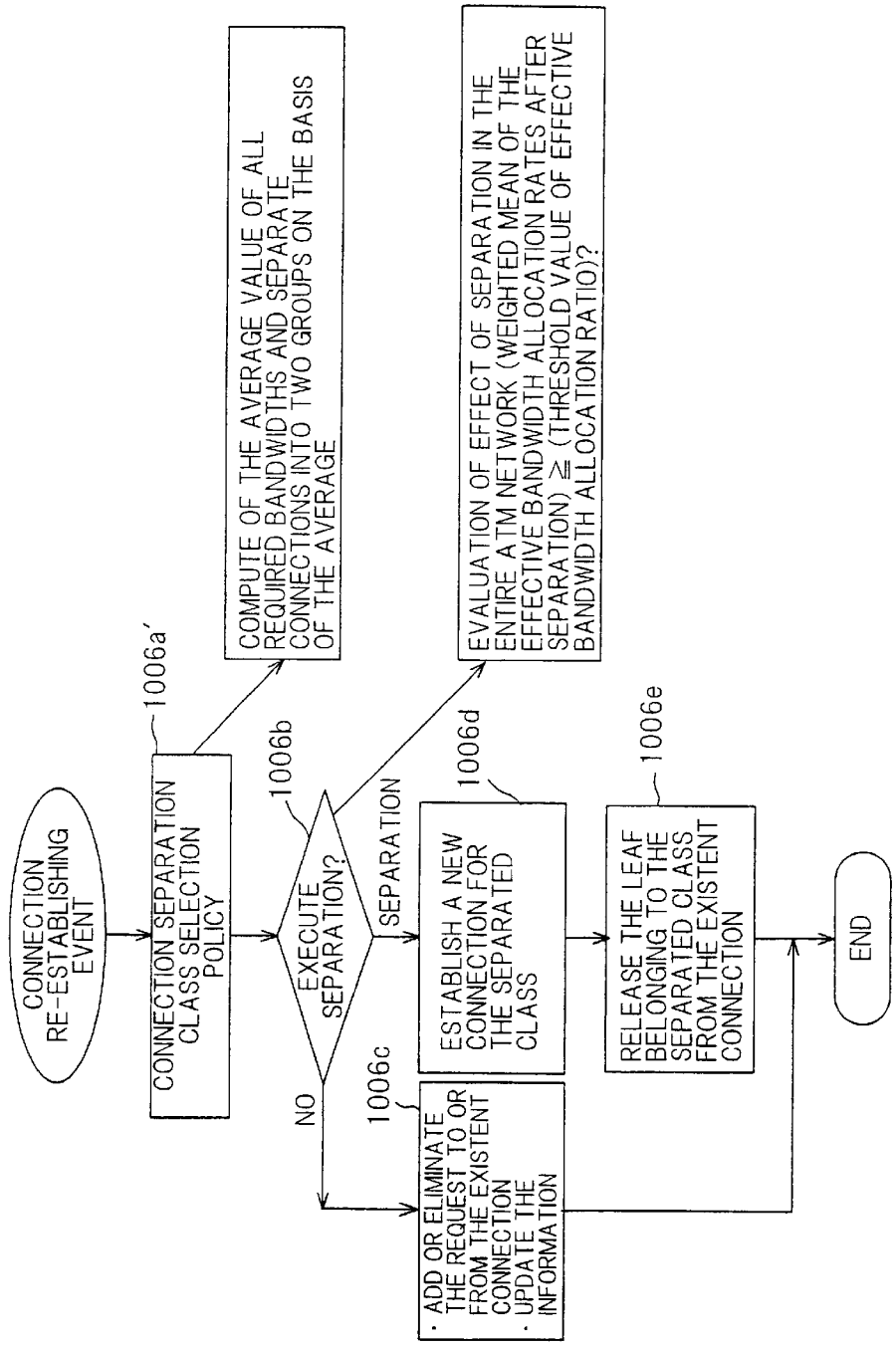
FIG. 56 is a flowchart of a second connection separating process.

FIG. 56 is a flowchart of a second connection separating process.

When the separation/re-establishing of a connection is necessitated, the average value of all the required bandwidths in the group corresponding to the connection as the object of separation is calculated and the class corresponding to the average value is obtained. The requests in the group are then separated into two group in which the first group is consisted of the requests belonging to the smaller bandwidth classes, and the second group is consisted of the remaining requests on the basis of the average value, and a new connection and the remaining connection are produced in accordance with the first and second group of requests, respectively (step 1006a'). Then, the processing at the steps 1006b and thereafter is executed in the same way as in FIG. 55, and whether or not the connection is to be separated/re-established is determined on the basis the judgment as to whether or not the effective bandwidth allocation ratio in the entire ATM network can be improved.

In this manner, it is possible to enhance the effective bandwidth allocation ratio with certainty by separating a connection. In addition, the separation/re-establishing of a connection is executed by a simple process.

(c) Third Connection Separating Method

When one p-mp connection is separated into two connections, if the number of requests accommodated in a new connection in the lower bandwidth classes is large, the load on each ATM switch applied by a separation/re-establishing signaling message increases. To prevent this, in a third method, the number of requests accommodated in the new connection in the lower bandwidth classes is set to be not more than a preset value M, thereby lowering the signaling load.

Figure 57:
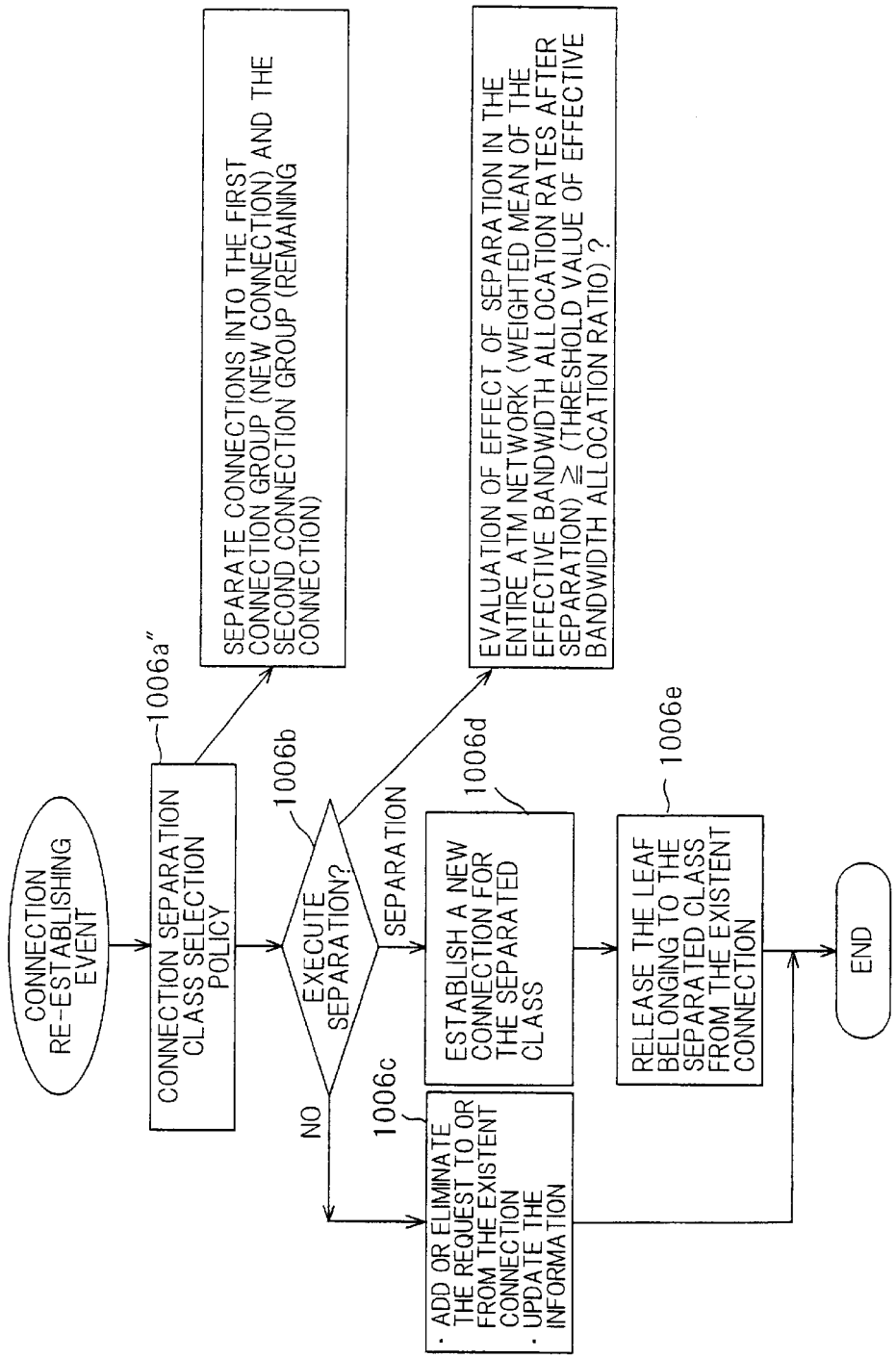
FIG. 57 is a flowchart of a third connection separating process.

FIG. 57 is a flowchart of a third connection separating process.

When the separation/re-establishing of a connection is necessitated, the number of requests of each class in the group corresponding to the connection as the object of separation is added up from the smallest bandwidth class until the total sum reaches M. The requests in the group are then separated into two groups in which the first group is consisted of the counted requests and the second group is consisted of the remaining requests, and a new connection and the remaining connection are produced in accordance with the first and second group of requests, respectively (step 1006a"). Then, the processing at the steps 1006b and thereafter is executed in the same way as in FIG. 55, and whether or not the connection is to be separated/re-established is determined on the basis of the judgment as to whether or not the effective bandwidth allocation ratio in the entire ATM network can be improved.

In this manner, it is possible to enhance the effective bandwidth allocation ratio with certainty by separating a connection. In addition, it is possible to restrict an increase in the signaling processing load on an ATM switch.

(N) Connection Unifying Policy with the Usage Ratio of the Entire ATM Network in Consideration

(a) Summary

The state between the boundary apparatus $EN_0$ on the transmission side and the adjacent ATM switch ATM SW0 is changes when a request for resource delivers or disappears. At such a time, the state in which there is sufficient bandwidth and VPI/VCI (resource rich mode) changes to the state in which there is no spare resource (resource save mode). Even in the bandwidth save mode, the state of each connection changes when a request for resource delivers or disappears, and it is possible to change the mode to the resource rich mode or a state approximate thereto by unifying connections. Consequently, the state between the boundary apparatus $EN_0$ on the transmission side and the adjacent ATM switch ATM SW0 is periodically checked, and if it is in the resource save mode, connections are unified to change the mode to the resource rich mode or a state approximate thereto and to enhance the effective bandwidth allocation ratio of the entire ATM network.

(b) Flow of a First Unification Process

Figure 58:
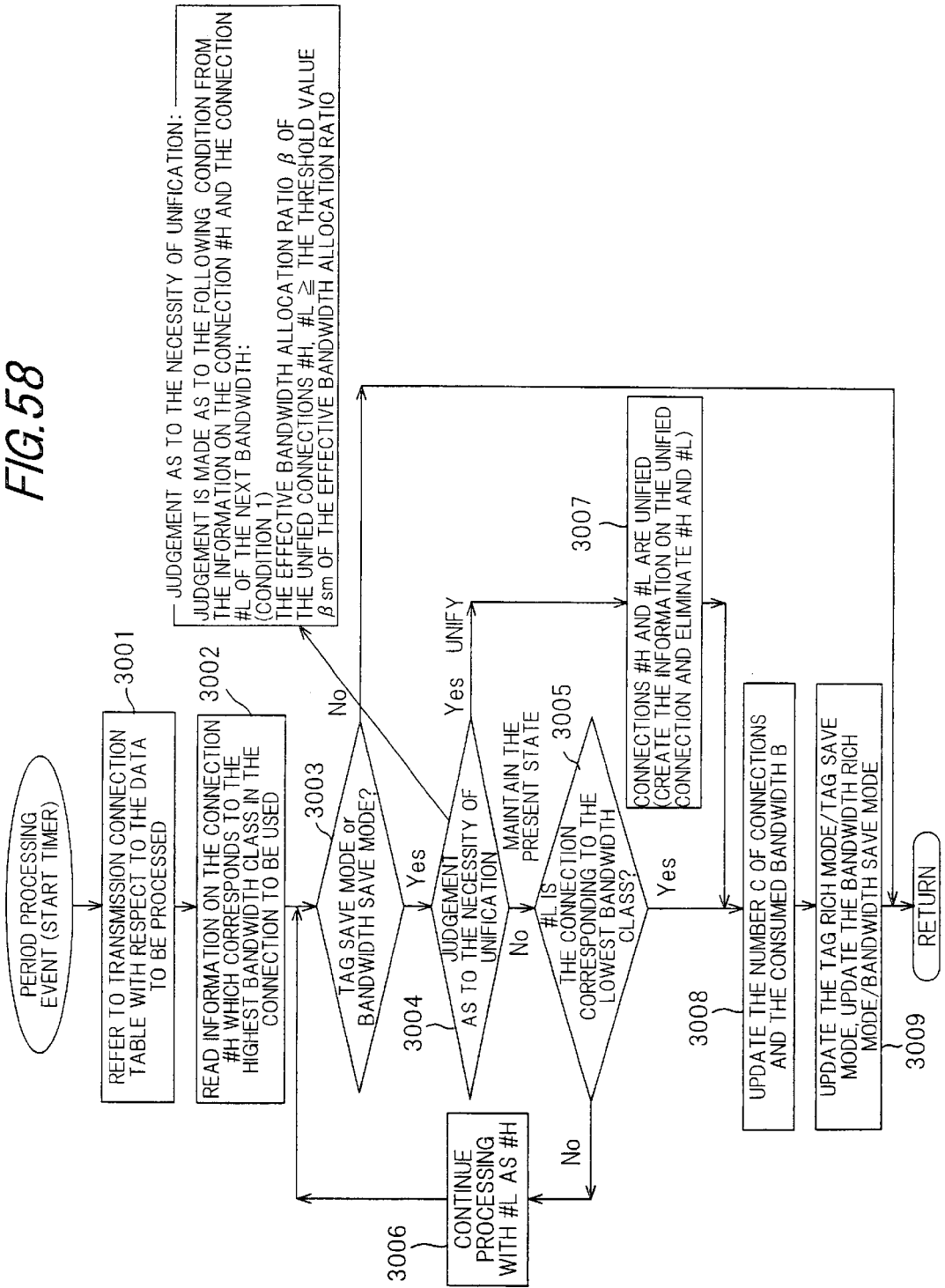
FIG. 58 is a flowchart of a first connection unifying process according to the present invention.

FIG. 58 is a flowchart of a first unification process according to the present invention. This is a system in which the effective bandwidth allocation ratio of each connection in a data transmission session is periodically monitored, and connections are unified on the basis of the result of monitoring.

The correspondence between each time slot of a periodic timer and a transmission session is set in advance, and the group of connections of the transmission session corresponding to the time slot indicated by the periodic timer is processed by reference to the table 63a to 63c in the following manner (step 3001).

The connection of the highest bandwidth in the session as the object is processed as a connection #H of a high bandwidth, and the connection information on the connection #H of a high bandwidth and other information are read from the tables 63a to 63c (3002). Judgment is then made as to whether or not the state between the boundary apparatus $EN_0$ on the transmission side and the adjacent ATM switch ATM SW0 is in the resource save mode (step 3003). If it is in the resource rich mode, the process is finished without the unification of connections, and the same process is repeated with respect to the next transmission session.

On the other hand, if it is in the resource save mode, the connection of the second highest bandwidth is processed as a connection #L of a low bandwidth, and the connection information thereof is read from the table so as to judge whether or not unification is necessary. More specifically, the effective bandwidth allocation ratio β of the unified connections #H, #L is calculated, and it is compared with the threshold value βsm of the effective bandwidth allocation ratio (step 3004). If β<βsm, that is, if the effective bandwidth allocation ratio β does not increase to more than βsm by the unification of the connections #H, #L, the connections #H, #L are not unified. Judgement is then made as to whether or not the connection #L of a low bandwidth is the connection in the lowest bandwidth of the transmission session as the object (step 3005), and if the answer is in the negative, the connection #L of a low bandwidth changes to the connection #H of a high bandwidth (step 3006), and the process at the steps 3003 and thereafter is repeated.

If β>βsm at the step 3004, that is, if the effective bandwidth allocation ratio β increases to more than βsm by the unification of the connections #H, #L, the connection #L of a low bandwidth and the connection #H of a high bandwidth are unified, and both the connections #L, #H are eliminated (step 3007).

Thereafter, the number C of connections and the consumed bandwidth B between the boundary apparatus $EN_0$ on the transmission side and the first ATM switch ATM SW0 are updated (step 3008). Judgment is then made as to whether the new connection is in the tag rich mode or tag save mode by reference to the updated number C of connections and consumed bandwidth B (step 3009), and the unification of the connections is finished. The same process is repeated with respect to the next transmission session.

In the above embodiment, if the unification of two connections is determined, the unification process of other connections in the same transmission session is stopped and finished. This is because, the frequent establishing/re-establishing operation of connections increases the signaling load on the ATM switch.

According to this embodiment, it is possible to solve a shortage of resource between the boundary apparatus $EN_0$ on the transmission side and the adjacent ATM switch ATM SW0, enhance the effective bandwidth allocation ratio of the entire ATM network, and establish an optimum connection by unifying connections.

(c) Flow of a Second Unification Process

Figure 59:
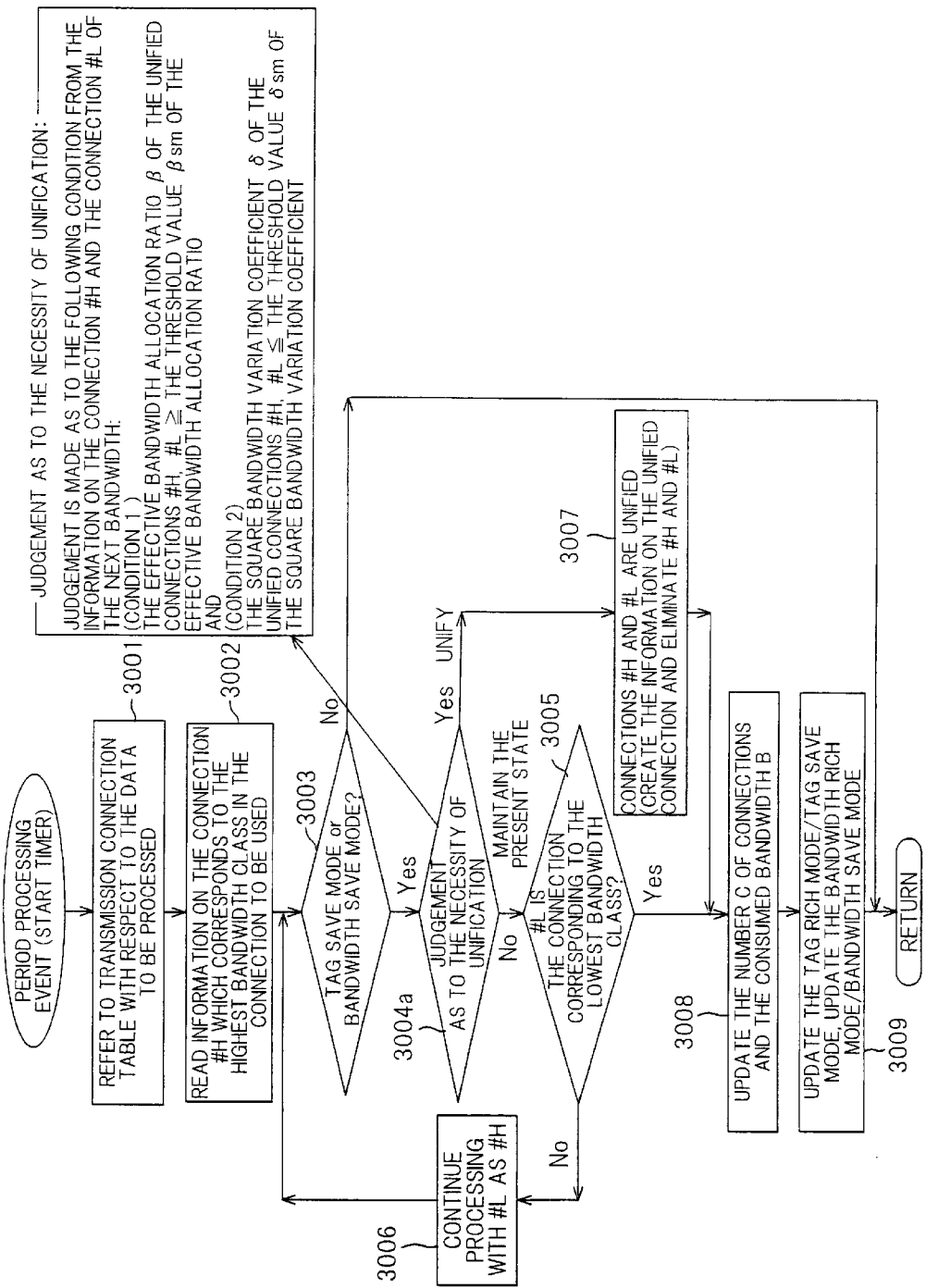
FIG. 59 is a flowchart of a second connection unifying process according to the present invention.

FIG. 59 is a flowchart of a second unification process according to the present invention. The same step number is attached to the same process as in the first unification process. This process is different from the first unification process at step 3004a. In the first unification process, the effective bandwidth allocation ratio β of the unified connections #H, and #L is calculated, it is compared with the threshold value βsm of the effective bandwidth allocation ratio, and whether or not the connections are unified is determined depending upon the result of comparison at the step 3004. In the second unification process, however, not only (1) β and βsm are compared, but also (2) the square bandwidth variation coefficient δ obtained from the variance of the required bandwidths and the threshold value thereof δs are compared, and connections are unified with these results in consideration, so that the high effective bandwidth allocation ratio may be maintained after the unification.

If the state between the boundary apparatus $EN_0$ on the transmission side and the adjacent ATM switch ATM SW0 is in the resource save mode at the step 3003, the connection of the next highest bandwidth is processed as a connection #L of a low bandwidth, and the information thereon is read from the table, and judgment is made as to the necessity of unification (step 3004a).

In the judgment as to the necessity of unification, the effective bandwidth allocation ratio β of the unified connections #H, #L is first calculated, and it is compared with the threshold value βsm of the effective bandwidth allocation ratio. If β<βsm, that is, if the effective bandwidth allocation ratio β does not increase to more than βsm by the unification of the connections #H, #L (the first condition is not satisfied), the connections #H, #L are not unified. If β≧βsm, the effective bandwidth allocation ratio β increases to more than the preset threshold value βsm by the unification of the connections #H, #L. That is, the effective bandwidth allocation ratio is improved (the first condition is satisfied).

If the first condition is satisfied, the square bandwidth variation coefficient δ is calculated from the formulae (5) to (7), and the square bandwidth variation coefficient δ is compared with the preset threshold value δsm of the square bandwidth variation coefficient. If δ>δsm (the second condition is not satisfied), requests are converged into the class of the highest bandwidth and the class of the lowest bandwidth of the connection after unification, so that it is impossible to effectively improve the effective bandwidth allocation ratio. Accordingly, if δ>δsm, the connections #H, #L are not unified.

On the other hand, if δ≦δsm (the second condition is satisfied), requests are no converged into the class of the highest bandwidth and the class of the lowest bandwidth of the connection after unification, so that the effective bandwidth allocation ratio is effectively improved. Accordingly, the connection #L of a low bandwidth and the connection #L of a high bandwidth are unified, and the connections #L, #H before the unification are eliminated (step 3007).

As described above, according to the second unification process, it is possible to generate a unified connection having a higher effective bandwidth allocation ratio by the judgment as to the necessity of unification using the variance of the number of requests than by the first unification method.

(d) Flow of a Third Unification Process

Figure 60:
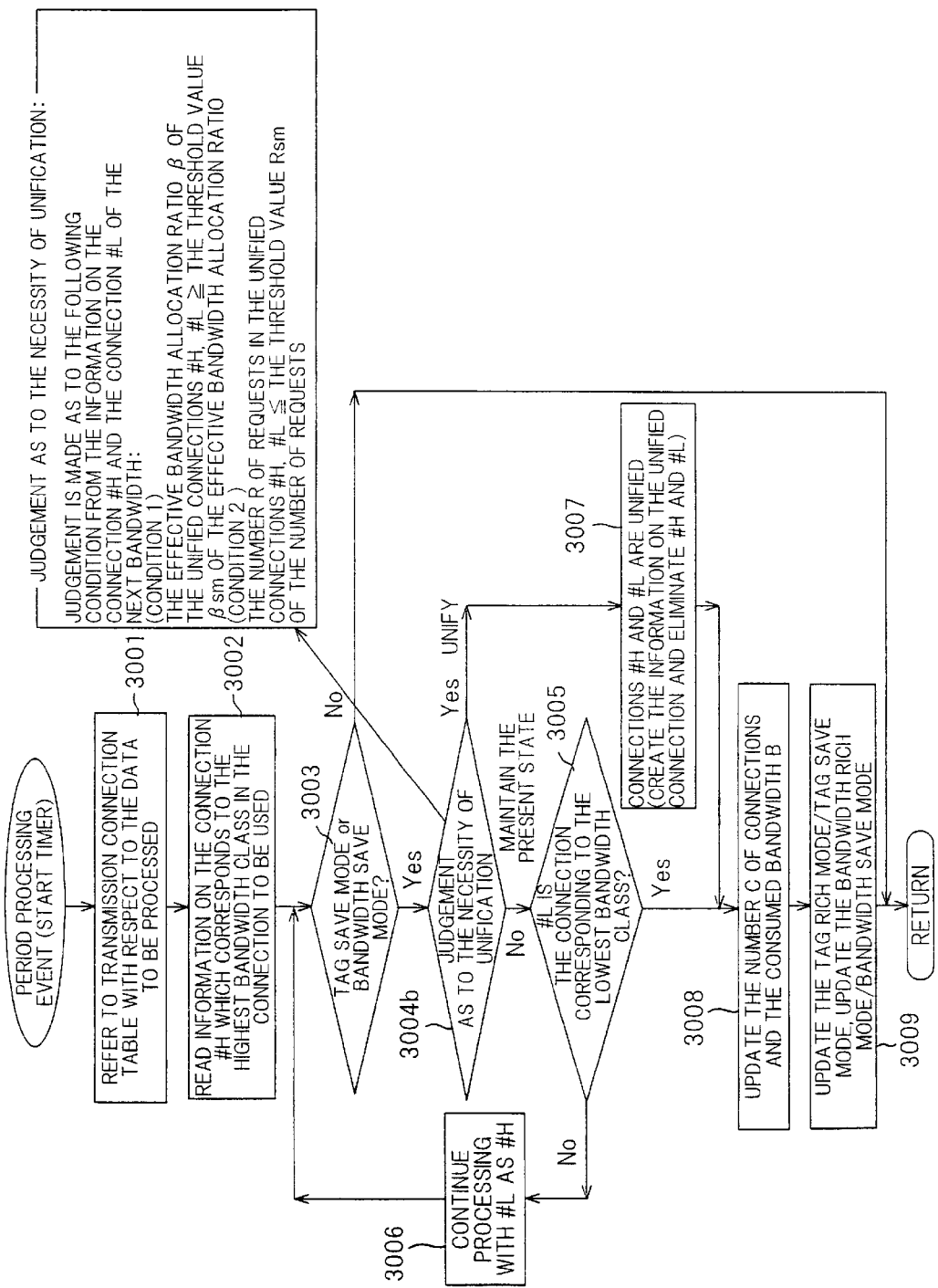
FIG. 60 is a flowchart of a third connection unifying process according to the present invention.

FIG. 60 is a flowchart of a third unification process according to the present invention. The same step number is attached to the same process as in the first unification process. This process is different from the first unification process at step 3004b. In the first unification process, the effective bandwidth allocation ratio β of the unified connections #H, and #L is calculated, it is compared with the threshold value βsm of the effective bandwidth allocation ratio, and whether or not the connections are unified is determined depending upon the result of comparison at the step 3004. In the third unification process, however, when connections are unified, not only (1) the comparison between β and βsm, but also (2) the number of requests after the unification of the connections are taken into consideration so that the connection re-establishing load on the ATM switch by the signaling message may be lightened.

If the state between the boundary apparatus $EN_0$ on the transmission side and the adjacent ATM switch ATM SW0 is in the resource save mode at the step 3003, the connection of the next highest bandwidth is processed as a connection #L of a low bandwidth, and the information thereon is read from the table, and judgment is made as to the necessity of unification (step 3004b).

In the judgment as to the necessity of unification, the effective bandwidth allocation ratio β of the unified connections #H, #L is first calculated, and it is compared with the threshold value βsm of the effective bandwidth allocation ratio. If β<βsm, that is, if the effective bandwidth allocation ratio β does not increase to more than βsm by the unification of the connections #H, #L (the first condition is not satisfied), the connections #H, #L are not unified. If β≧βsm, that is, if the effective bandwidth allocation ratio β increases to more than the threshold value βsm by the unification of the connections #H, #L (the first condition is satisfied), the number R of requests after the unification of the connections is calculated, and the number R is compared with the threshold value Rsm of the number of requests.

If R>Rsm (the second condition is not satisfied), the number of requests after the unification is excessive, so that the connection re-establishing load on each ATM switch increases. Accordingly, the connections #H, #L are not unified.

On the other hand, if R≦Rsm (the second condition is satisfied), since the number of requests after the unification is small, the connection re-establishing load is small. Accordingly, the connection #L of a low bandwidth and the connection #H of a high bandwidth are unified, and the connections #L, #H before the unification are eliminated (step 3007).

As described above, according to the third unification process, since the connections to be unified are selected with consideration for the number of requests after the unification, it is possible to lighten the signaling message processing load for re-establishing the connection on each ATM switch.

(e) Flow of a Fourth Unification Process

Figure 61:
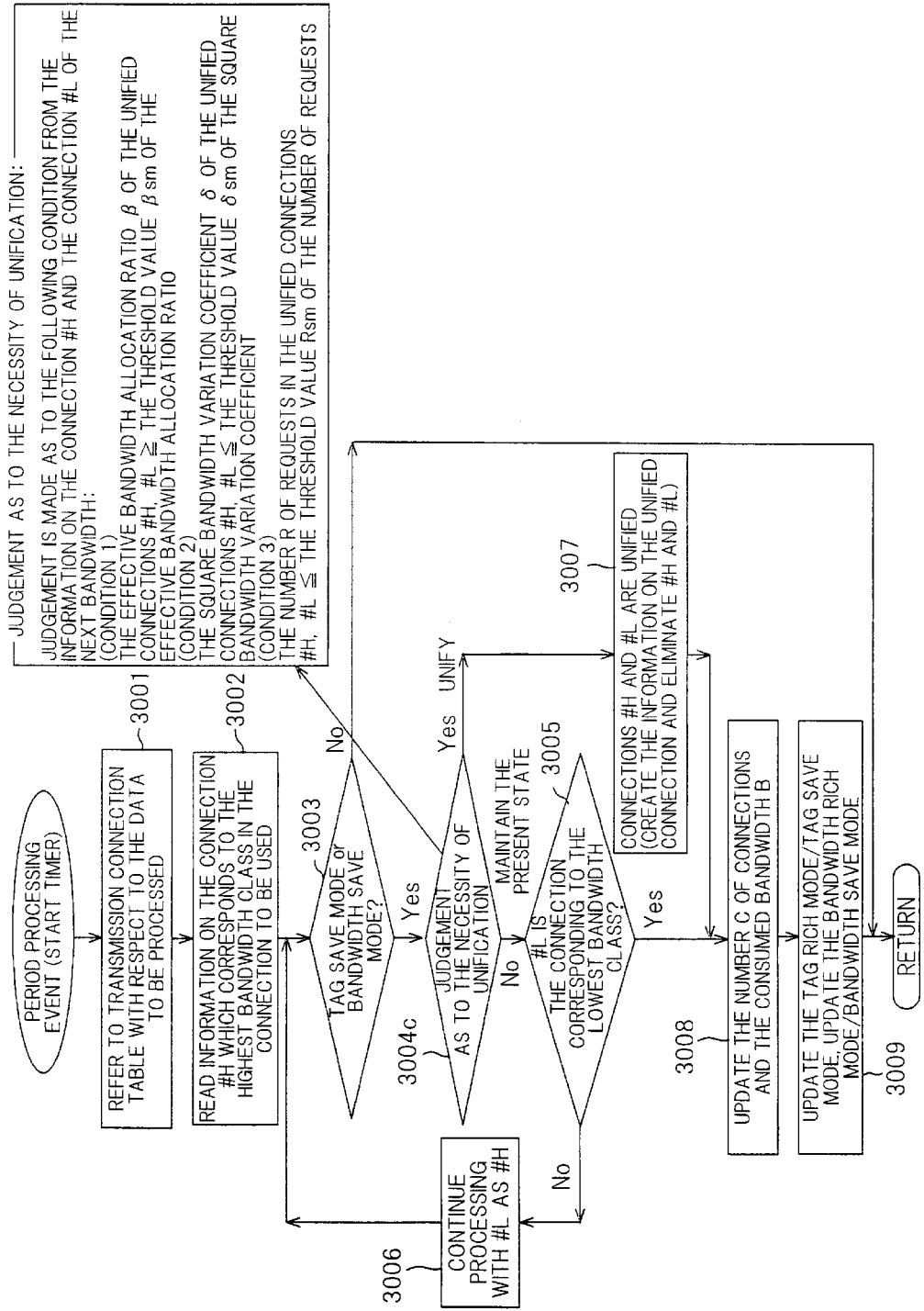
FIG. 61 is a flowchart of a fourth connection unifying process according to the present invention.
Figure 62:
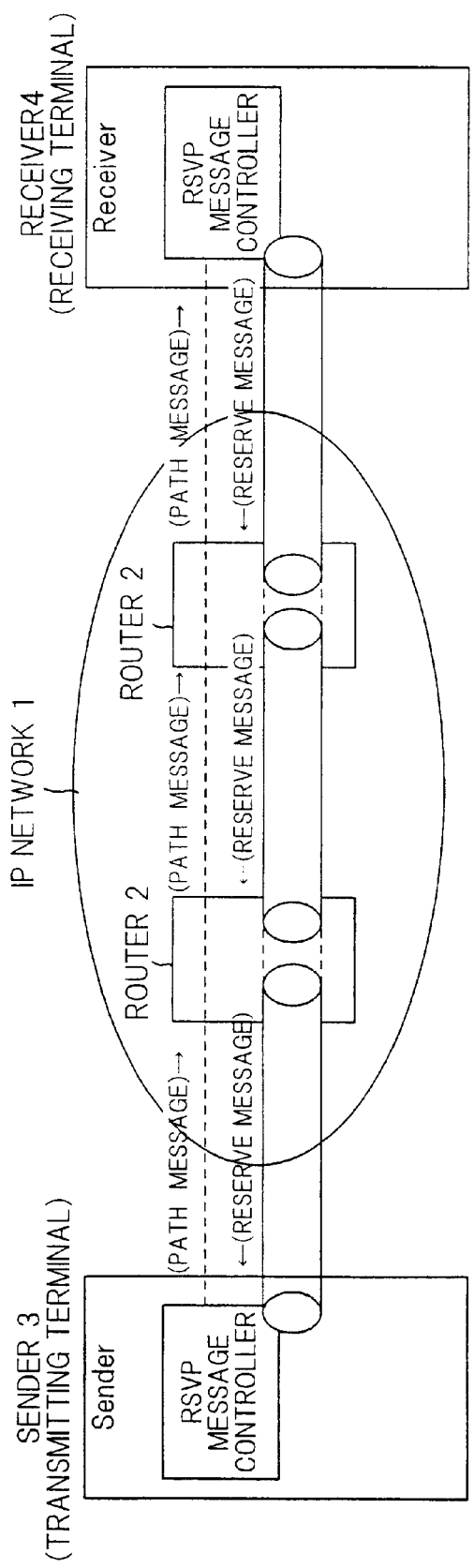
FIG. 62 shows the control of an RSVP in the prior art.

FIG. 61 is a flowchart of a fourth unification process according to the present invention. The same step number is attached to the same process as in the first unification process. This process is different from the first unification process at step 3004c. In the first unification process, the effective bandwidth allocation ratio β of the unified connections #H, and #L is calculated, it is compared with the threshold value βsm of the effective bandwidth allocation ratio, and whether or not the connections are unified is determined depending upon the result of comparison at the step 3004. In the fourth unification process, however, when connections are unified, not only (1) the comparison between β and βsm, but also (2) the comparison between the square bandwidth variation coefficient δ obtained from the variance of the required bandwidths and the threshold value thereof δs, and further (3) the number R of requests after the unification of the connections are taken into consideration.

If the state between the boundary apparatus $EN_0$ on the transmission side and the adjacent ATM switch ATM SW0 is in the resource save mode at the step 3003, the connection of the next highest bandwidth is processed as a connection #L of a low bandwidth, and the information thereon is read from the table, and judgment is made as to the necessity of unification (step 3004b). In the judgment as to the necessity of unification, if (1) β≧βsm, (2) δ≦δsm, and (3) R≦Rsm, the connections are unified, while if any of these conditions is not satisfied, the unification of the connection is not executed.

As explained above, according to the present invention, since the boundary apparatus $EN_i$ on the reception side converts the bandwidth BWr(i) required by a receiving terminal into the recommended bandwidth BWs which is reported from the transmitting terminal in the form of a Path message and transfers it to the boundary apparatus $EN_0$ on the transmission side so as to establish a p-mp connection of a bandwidth of BWs/ρ(k), even if there is a frequent change in the required bandwidth from the receiving terminal, the re-establishing of a connection is unnecessary, thereby the resetting of an SVC is unnecessary. In addition, it is possible to reduce the number of connections, thereby it is possible to avoid the waste of the SVC resource (VPI/VCI resource).

In addition, according to the present invention, since the boundary apparatus $EN_0$ on the transmission side converts the bandwidth BWr(i) required by a receiving terminal into the bandwidth BWs recommended by the transmitting terminal, and establishes a single p-mp connection of a bandwidth of BWs/ρ(k), it is possible to avoid the waste of SVC resource, and even if there is a frequent change in the required bandwidth from the receiving terminal, the resetting of an SVC is unnecessary.

According to the present invention, since the boundary apparatus $EN_0$ on the transmission side establishes a p-mp connection of a bandwidth of BWmax/ρ(k) (wherein BWmax is the maximum one of the bandwidths BWr(i) required by the boundary apparatuses $EN_i$ on the reception side), it is possible to prevent the waste of the SVC resource, and to reduce the number of times for resetting an SVC, even if there is a frequent change in the bandwidth required by a receiving terminal.

In addition, according to the present invention, the boundary apparatus $EN_i$ on the reception side converts the bandwidths required by a multiplicity of receiving terminals to the maximum bandwidth BWr(i), and transfers it to the boundary apparatus $EN_0$ on the transmission side, and the boundary apparatus $EN_0$ on the transmission side establishes a p-mp connection of a bandwidth of BWmax/ρ(k) (wherein BWmax is the maximum one of the bandwidths BWr(i) required by the boundary apparatuses $EN_i$ (i=1, 2, . . . ) on the reception side), it is possible to prevent the waste of SVC resource, and to reduce the number of times for resetting an SVC, even if there is a frequent change in the bandwidth required by a receiving terminal.

According to the present invention, since ρ(k) is reduced with an increase in the number of connections accommodated in the link, even if the allocation of a bandwidth becomes unstable due to an increase in the number of accommodated connections, it is possible to transmit data with a quality desired by a user.

According to the present invention, if the traffic class in the IP requires real-time processing, a boundary apparatus determines the corresponding class in the ATM which guarantees real-time processing, so that the QoS control of a desired class is possible in the IP communication as a whole.

According to the present invention, since the boundary apparatus $EN_0$ on the transmission side discards a packet if the traffic arriving from the IP network is larger than the traffic transmitted to the ATM network, while the boundary apparatus $EN_i$ on the transmission side discards cells for each frame if the traffic flown from the ATM network is larger than the traffic transmitting to the IP network, it is possible to deal with the state of congestion. In addition, since the priority is attached to the frames, and when the queue length exceeds a predetermined one, they are discarded in the reverse order of priority, it is possible to prevent a frame of high priority from being discarded.

According to the present invention, since the connection is automatically cut if no traffic is flown from a terminal due to a power failure, a trouble in an apparatus or the like, it is possible to save the resource such as a bandwidth and a VPI/VCI. In addition, since the cutting time of the connection is set in accordance with the type of protocol in the network service, appropriate SVC cutting control is enabled.

According to the present invention, since the effective bandwidth allocation ratio β of the connection corresponding to the class to which a new request for bandwidth is distributed is calculated, and if the effective bandwidth allocation ratio β is not more than a preset value, the connection is separated into two connections so that the effective bandwidth allocation ratio of the entire ATM network may improve, the effective use of the bandwidth in the entire ATM network is enabled.

According to the present invention, since the number of requests is monitored, and if there is a large change in the number of requests, the threshold value βs of the effective bandwidth allocation ratio is reduced so as to restrict the connection separating operation/connection establishing operation, it is possible to suppress excessive separation/re-establishing of connections, and further to reduce the signaling message processing load for re-establishing on the ATM network.

In addition, according to the present invention, since judgment as to the necessity of the separation/re-establishing of a connection is made by using the variance of the required bandwidths, it is possible to improve the effective bandwidth allocation ratio more effectively.

According to the present invention, since the requests composing a group which corresponds to the connection as the object of separation are separated into the first group of the requests belonging to a predetermined number of the classes calculated from the smallest bandwidth class, and the second group of the remaining requests, and a new connection and the remaining connection are produced in accordance with the first and second group of requests, respectively, it is possible to enhance the effective bandwidth allocation ratio with certainty, and to execute the separation/re-establishing of a connection by a simple process.

In addition, according to the present invention, since the requests composing a group which corresponds to the connection as the object of separation are separated into the first group of the requests belonging to the smaller bandwidth classes, and the second group of the remaining requests on the basis of the average value of all the required bandwidths, and a new connection and the remaining connection are produced in accordance with the first and second group of requests, respectively, it is possible to enhance the effective bandwidth allocation ratio with certainty, and to execute the separation/re-establishing of a connection by a simple process.

Furthermore, according to the present invention, since the requests composing a group which corresponds to the connection as the object of separation are separated into the first group of a preset number of requests calculated from the smallest bandwidth and the second group of the remaining requests, and a new connection and the remaining connection are produced in accordance with the first and second group of requests, it is possible to enhance the effective bandwidth allocation ratio with certainty, and to restrict an increase in the signaling processing load on the ATM switch by a simple processing.

According to the present invention, since connections are unified if the unification of the connections in the resource save mode increases the effective bandwidth allocation ratio β to not less than the threshold value βsm of the effective bandwidth allocation ratio, it is possible to solve a shortage of resource between the boundary apparatus on the transmission side and the adjacent ATM switch, and enhance the effective bandwidth allocation ratio of the entire ATM network. In addition, by making judgment as to the necessity of unification with consideration for the number of requests for bandwidth, it is possible to lighten the load for re-establishing a connection on each ATM switch by the signaling message.

As many apparently widely different embodiments of the present invention can be made without departing from the spirit and scope thereof, it is to be understood that the invention is not limited to the specific embodiments thereof except as defined in the appended claims.

What is claimed is:

1. A method of establishing a connection in an IP (Internet Protocol) communication network for executing 1-to-N communication between a transmitting terminal and N receiving terminals by establishing a connection in an ATM (Asynchronous Transfer Mode) network, said IP communication network having said ATM network between an IP network accommodating said transmitting terminal and an IP network accommodating said N receiving terminals, and boundary apparatuses provided with an IP communication function and an ATM communication function on the boundaries between said ATM network and said respective IP networks, said method comprising the steps of:

providing each of said transmitting terminal, said receiving terminals and said boundary apparatuses with a resource reserving function performed on said IP networks in accordance with a communication quality control protocol;

converting a bandwidth BWr(i) (i=1, 2, . . . ) required of said transmitting terminal by each of said receiving terminals in accordance with said protocol so as to receive one transmission data to a recommended bandwidth BWs which is transmitted from said transmitting terminal to each of said receiving terminals via said boundary apparatus on the transmission side and each of said boundary apparatuses on the reception side with respect to one data transmission session in accordance with said protocol, and transmitting a request of said bandwidth BWs to a boundary apparatus on the transmission side, by each of boundary apparatuses on the reception side; and establishing by said boundary apparatus on the transmission side, a point-multipoint connection of a bandwidth of BWs/ρ(k) between said boundary apparatus on the transmission side and each of said boundary apparatuses on the reception side in response to the request of said bandwidth BWs from said boundary apparatuses on the reception side so as to execute 1-to-N communication, wherein ρ(k) represents a usage ratio, which is smaller than 1 and depends upon the number k of connections accommodated in a link between said boundary apparatus on the transmission side and an ATM switch.

2. A method of establishing a connection in an IP communication network according to any of claim 1, wherein when 1-to-N communication is executed, if the traffic class in an IP layer requires real-time processing, said boundary apparatus on the transmission side selects the corresponding QoS class in an ATM layer which guarantees real-time processing.

3. A method of establishing a connection in an IP communication network according to any of claim 1, wherein, when the traffic BWip arriving from said IP network is larger than the traffic BWa transmitted to said ATM network and a buffer for traffic shaping becomes overflowing in said boundary apparatus on the transmission side, a frame discarding process is executed.

4. A method of establishing a connection in an IP communication network according to claim 3, wherein a priority identifier is attached to each frame, and frames are discarded in the reverse order of priority.

5. A method of establishing a connection in an IP communication network according to any of claims 1, 2, wherein, when the traffic BWa arriving from said ATM network is larger than the traffic BWip transmitted to said IP network and a buffer for traffic shaping becomes overflowing in said boundary apparatus on the reception side, a frame discarding process is executed.

6. A method of establishing a connection in an IP communication network according to claim 5, wherein a priority identifier is attached to each frame, and frames are discarded in the reverse order of priority.

7. A method of establishing a connection in an IP communication network according to any of claims 1, 2, wherein, in a case where said connection is automatically cut by reason of that no IP packet has arrived from a transmitting terminal for a predetermined time, said boundary apparatus on the transmission side identifies the protocol type of said connection, and if said protocol type is a service type for a long-time communication, said boundary apparatus sets a cutting timer to be long, while if said protocol type is a service type for a short-time communication, said boundary apparatus sets said cutting timer to be short.

8. A method of establishing a connection in an IP (Internet Protocol) communication network for executing 1-to-N communication between a transmitting terminal and N receiving terminals by establishing a connection in an ATM (Asynchronous Transfer Mode) network, said IP communication network having said ATM network between an IP network accommodating said transmitting terminal and an IP network accommodating said N receiving terminals, and boundary apparatuses provided with an IP communication function and an ATM communication function on the boundaries between said ATM network and said respective IP networks, said method comprising the steps of:

providing each of said transmitting terminal, said receiving terminals and said boundary apparatuses with a resource reserving function performed on said IP networks in accordance with a communication quality control protocol;

converting a bandwidth BWr(i) (i=1, 2, . . . ) required of said transmitting terminal by each of said receiving terminals in accordance with said protocol so as to receive one transmission data to a recommended bandwidth BWs which is transmitted from said transmitting terminal to each of said receiving terminals via said boundary apparatus on the transmission side and each of said boundary apparatuses on the reception side with respect to one data transmission session in accordance with said protocol, by said boundary apparatus on the transmission side; and establishing by said boundary apparatus on the transmission side, a point-multipoint connection of a bandwidth of BWs/ρ(k) between said boundary apparatus on the transmission side and each of said boundary apparatuses on the reception side so as to execute 1-to-N communication, wherein ρ(k) is smaller than 1 and represents a usage ratio, which depends upon the number k of connections accommodated in a link between said boundary apparatus on the transmission side and an ATM switch.

9. A method of establishing a connection in an IP (Internet Protocol) communication network for executing 1-to-N communication between a transmitting terminal and N receiving terminals by establishing a connection in an ATM (Asynchronous Transfer Mode) network, said IP communication network having said ATM network between an IP network accommodating said transmitting terminal and an IP network accommodating said N receiving terminals, and boundary apparatuses provided with an IP communication function and an ATM communication function on the boundaries between said ATM network and said respective IP networks, said method comprising the steps of:

providing each of said transmitting terminal, said receiving terminals and said boundary apparatuses with a resource reserving function performed on said IP networks in accordance with a communication quality control protocol;

converting a bandwidth BWr(i) (i=1, 2, ...) required of said transmitting terminal by each of said receiving terminals in accordance with said protocol so as to receive one transmission data to a maximum required bandwidth BWmax, by said boundary apparatus on the transmission side; and establishing by said boundary apparatus on the transmission side, a point-multipoint connection of a bandwidth of BWmax/ρ(k) between said boundary apparatus on the transmission side and each of said boundary apparatuses on the reception side so as to execute 1-to-N communication, wherein ρ(k) is smaller than 1 and represents a usage ratio, which depends upon the number k of connections accommodated in a link between said boundary apparatus on the transmission side and an ATM switch.

10. A method of establishing a connection in an IP (Internet Protocol) communication network for executing 1-to-N communication between a transmitting terminal and N receiving terminals by establishing a connection in an ATM (Asynchronous Transfer Mode) network, said IP communication network having said ATM network between an IP network accommodating said transmitting terminal and an IP network accommodating said N receiving terminals, and boundary apparatuses provided with an IP communication function and an ATM communication function on the boundaries between said ATM network and said respective IP networks, said method comprising the steps of:

providing each of said transmitting terminal, said receiving terminals and said boundary apparatuses with a resource reserving function performed on said IP networks in accordance with a communication quality control protocol;

converting a bandwidth required of said transmitting terminal by each of a plurality of receiving terminals connected to a boundary apparatus on the reception side with respect to one data transmission session in accordance with said protocol to a maximum required bandwidth BWr(i) (i=1, 2, ...), and transmitting a request of said bandwidth BWr(i) to a boundary apparatus on the transmission side, by said boundary apparatus on the reception side;

converting said required bandwidth BWr(i) from each of said receiving terminals into a maximum required bandwidth BWmax by said boundary apparatus on the transmission side; and establishing by said boundary apparatus on the transmission side, a point-multipoint connection of a bandwidth of BWmax/ρ(k) between said boundary apparatus on the transmission side and each of said boundary apparatuses on the reception side so as to execute 1-to-N communication, wherein ρ(k) is smaller than 1 and represents a usage ratio, which corresponds to the number k of connections accommodated in a link between said boundary apparatus on the transmission side and an ATM switch.

11. A boundary apparatus provided on the boundary between an IP (Internet Protocol) network and an ATM (Asynchronous Transfer Mode) network, and provided with an IP communication function, an ATM communication function, a resource reserving function performed on said IP networks in accordance with a communication quality control protocol, and an ATM connection establishing function, said boundary apparatus comprising:

a means for storing a recommended bandwidth BWs which is transmitted from a transmitting terminal accommodated in a predetermined IP network to each of receiving terminals accommodated in another IP network with respect to one data transmission session in accordance with said protocol;

a means for operating as a boundary apparatus on the reception side, converting a bandwidth BWr(i) (i=1, 2, ...) required of said transmitting terminal by each of said receiving terminals in accordance with said protocol so as to receive one transmission data to said recommended bandwidth BWs, and transmitting a request of said bandwidth BWs to a boundary apparatus on the transmission side;

a means for operating as a boundary apparatus on the transmission side and establishing a point-multipoint connection of a bandwidth of BWs/ρ(k) between said boundary apparatus on the transmission side and said boundary apparatus on the reception side in response to the request of said bandwidth of BWs from said boundary apparatus on the reception side, wherein ρ(k) is smaller than 1 and represents a usage ratio, which depends upon the number k of connections accommodated in a link between said boundary apparatus on the transmission side and an ATM switch.

12. A boundary apparatus provided on the boundary between an IP (Internet Protocol) network and an ATM (Asynchronous Transfer Mode) network, and provided with an IP communication function, an ATM communication function, a resource reserving function performed on said IP networks in accordance with a communication quality control protocol, and an ATM connection establishing function, said boundary apparatus comprising:

a means for storing a recommended bandwidth BWs which is transmitted from a transmitting terminal accommodated in a predetermined IP network to each of receiving terminals accommodated in another IP network with respect to one data transmission session in accordance with said protocol;

a means for converting a bandwidth BWr(i) (i=1, 2, ...) which is required of said transmitting terminal by each of said receiving terminals in accordance with said protocol so as to receive one transmission data and which is transmitted from a boundary apparatus on the reception side to said recommended bandwidth BWs; and a means for establishing a point-multipoint connection of a bandwidth of BWs/$\rho(k)$ between said boundary apparatus on the transmission side and said boundary apparatus on the reception side, wherein $\rho(k)$ is smaller than 1 and represents a usage ratio, which depends upon the number k of connections accommodated in a link between a boundary apparatus on the transmission side and an ATM switch.

13. A boundary apparatus provided on the boundary between an IP (Internet Protocol) network and an ATM (Asynchronous Transfer Mode) network, and provided with an IP communication function, an ATM communication function, a resource reserving function performed on said IP networks in accordance with a communication quality control protocol, and an ATM connection establishing function, said boundary apparatus comprising:

a means for converting a bandwidth BWr(i) (i=1, 2, ...) which is required of a transmitting terminal by each of receiving terminals with respect to one data transmission session in accordance with said protocol and which is transmitted from a boundary apparatus on the reception side to a maximum required bandwidth BWmax; and a means for establishing a point-multipoint connection of a bandwidth of BWmax/$\rho(k)$ between said boundary apparatus on the transmission side and said boundary apparatus on the reception side, wherein $\rho(k)$ is smaller than 1 and represents a usage ratio, which depends upon the number k of connections accommodated in a link between a boundary apparatus on the transmission side and an ATM switch.

14. A boundary apparatus provided on the boundary between an IP (Internet Protocol) network and an ATM (Asynchronous Transfer Mode) network, and provided with an IP communication function, an ATM communication function, a resource reserving function performed on said IP networks in accordance with a communication quality control protocol, and an ATM connection establishing function, said boundary apparatus comprising:

a means for operating as a boundary apparatus on the reception side when each of receiving terminals requires a predetermined bandwidth of a transmitting terminal with respect to one data transmission session in accordance with said protocol, converting a bandwidth required by each of a plurality of receiving terminals under the command of said boundary apparatus on the reception side to a maximum required bandwidth BWr(i) (i=1, 2, ...), and transmitting a request of said bandwidth BWr(i) to a boundary apparatus on the transmission side;

a means for operating as a boundary apparatus on the transmission side, and converting said required bandwidth BWr(i) (i=1, 2, ...) transmitted from said boundary apparatus on the reception side to a maximum required bandwidth BWmax; and establishing a point-multipoint connection of a bandwidth of BWmax/$\rho(k)$ between said boundary apparatus on the transmission side and each of said boundary apparatuses on the reception side, wherein $\rho(k)$ is smaller than 1 and represents a usage ratio, which depends upon the number k of connections accommodated in a link between said boundary apparatus on the transmission side and an ATM switch.

15. A method of establishing a connection according to claim 1, wherein a plurality of bandwidth classes are set for each predetermined bandwidth, a group is composed of not less than one of said bandwidth classes, a connection is established for each group, and when a predetermined group is divided into two groups so as to separate a connection, the bandwidth classes belonging to said group as the object of separation are separated into two, and a connection is established for each of the separated groups.

16. A method of establishing a connection according to claim 1, wherein, if said effective bandwidth allocation ratio is improved when said bandwidth classes of said group as the object of separation are separated into a group consisting of a predetermined number of smaller bandwidth classes and a group consisting of the other bandwidth classes, said group is separated into two groups and a connection is established for each of the separated groups.

17. A method of establishing a connection according to claim 15, wherein, if said effective bandwidth allocation ratio is improved when the average value of all the required bandwidths in the group as the object of separation is calculated and said group is separated into two groups on the basis of the class corresponding to said average value, said group is separated into two groups and a connection is established for each of the separated groups.

18. A method of establishing a connection according to claim 15, wherein, if said effective bandwidth allocation ratio is improved when the numbers of requests for bandwidth are added up from the smallest bandwidth class of said group until the sum becomes a preset value, and said group is separated into a group consisting of the bandwidth classes in which the number of requests have been added, and a group consisting of the remaining classes, said group is separated into two groups and a connection is established for each of the separated groups.

19. A boundary apparatus according to claim 1, wherein said connection control means sets a class for each predetermined bandwidth, composes each group of not less than one of said bandwidth classes and controls connection information for each group; and said connection separation means obtains a class to which a new request for bandwidth belongs, calculates the effective bandwidth allocation ratio of the connection of the group corresponding to said class, and separates said connection, if said effective bandwidth allocation ratio is not more than said preset value.

20. A boundary apparatus according to claim 19, wherein said connection separation means separates a group as the object of separation into a group consisting of a predetermined number of smaller bandwidth classes and a group consisting of the other bandwidth classes, and establishing a connection for each of the separated groups.

21. A boundary apparatus according to claim 19, wherein said connection separation means calculates the average value of all the required bandwidths in the group as the object of separation, separates said group into a group consisting of the smaller bandwidth classes and a group consisting of the remaining classes on the basis of said average value, and establishes a connection for each of the separated groups.

22. A boundary apparatus according to claim 19, wherein said connection separation means adds up the numbers of requests for bandwidth from the smallest bandwidth class of the group as the object of separation until the sum becomes a preset value, separates said group into a group consisting of the bandwidth classes in which the number of requests have been added, and a group consisting of the remaining classes, and establishes a connection for each of the separated groups.

* * * * *